US012613846B2

(12) United States Patent    (10) Patent No.:   US 12,613,846 B2

Dhuse et al.      (45) Date of Patent:    Apr. 28, 2026

(54) READING BOTH PAGES AND SEGMENTS VIA APPLYING A COLUMNAR-FORMATTED STRUCTURING-BASED READ PROCESS

(71) Applicant: Ocient Holdings LLC, Chicago, IL (US)

(72) Inventors: Greg R. Dhuse, Chicago, IL (US); Benjamin Daniel Rabe, Sandy, UT (US); Finley Jordan Lau, Chicago, IL (US); Pieter Charles Jas Svenson, Seattle, WA (US)

(73) Assignee: Ocient Holdings LLC, Chicago, IL (US)

( * ) Notice: Subject to any disclaimer, the term of this patent is extended or adjusted under 35 U.S.C. 154(b) by 0 days.

(21) Appl. No.: 18/910,353

(22) Filed: Oct. 9, 2024

(65) Prior Publication Data

US 2026/0099476 A1     Apr. 9, 2026

(51) Int. Cl.
| | |
|---|---|
| *G06F 16/22* | (2019.01) |
| *G06F 16/2455* | (2019.01) |
| *G06F 16/25* | (2019.01) |

(52) U.S. Cl.
CPC ........ *G06F 16/221* (2019.01); *G06F 16/2455* (2019.01); *G06F 16/258* (2019.01)

(58) Field of Classification Search
CPC ... G06F 16/221; G06F 16/2455; G06F 16/258
See application file for complete search history.

(56) References Cited

U.S. PATENT DOCUMENTS

| | | | |
|---|---|---|---|
| 5,548,770 A | 8/1996 | Bridges | |
| 6,230,200 B1 | 5/2001 | Forecast | |
| 6,633,772 B2 | 10/2003 | Ford | |
| 7,499,907 B2 | 3/2009 | Brown | |
| 7,908,242 B1 | 3/2011 | Achanta | |
| 11,086,832 B2 * | 8/2021 | Zhou ...................... | G06F 12/00 |
| 12,093,231 B1 | 9/2024 | Kondiles | |

(Continued)

OTHER PUBLICATIONS

A new high performance fabric for HPC, Michael Feldman, May 2016, Intersect360 Research.

(Continued)

*Primary Examiner* — Dangelino N Gortayo
(74) *Attorney, Agent, or Firm* — Garlick & Markison; Patricia M. Healy

(57)      ABSTRACT

A database system is operable to generating a plurality of pages from a plurality of rows, where each page of the plurality of pages is generated to include a corresponding set of rows of the plurality of rows in accordance with a columnar-formatted structuring based on generating a plurality of columns from the corresponding set of rows. A query is executed based on reading a first set of column values for a first plurality of rows based on applying a columnar-formatted structuring-based read process and reading a second set of column values for a second plurality of rows based on applying the columnar-formatted structuring-based read process. At least one page conversion process is performed to generate an additional plurality of segments based on reading all column values for the plurality of rows based on applying the columnar-formatted structuring-based read process.

16 Claims, 74 Drawing Sheets database system 10

(56) References Cited

U.S. PATENT DOCUMENTS

| 12,093,254 | B1 | 9/2024 | Kondiles | |
| 12,119,845 | B2 * | 10/2024 | Schreter | H03M 7/3077 |
| 2001/0051949 | A1 | 12/2001 | Carey | |
| 2002/0032676 | A1 | 3/2002 | Reiner | |
| 2004/0162853 | A1 | 8/2004 | Brodersen | |
| 2008/0133456 | A1 | 6/2008 | Richards | |
| 2009/0063893 | A1 | 3/2009 | Bagepalli | |
| 2009/0183167 | A1 | 7/2009 | Kupferschmidt | |
| 2010/0082577 | A1 | 4/2010 | Mirchandani | |
| 2010/0241646 | A1 | 9/2010 | Friedman | |
| 2010/0274983 | A1 | 10/2010 | Murphy | |
| 2010/0312756 | A1 | 12/2010 | Zhang | |
| 2011/0219169 | A1 | 9/2011 | Zhang | |
| 2012/0109888 | A1 | 5/2012 | Zhang | |
| 2012/0151118 | A1 | 6/2012 | Flynn | |
| 2012/0185866 | A1 | 7/2012 | Couvee | |
| 2012/0254252 | A1 | 10/2012 | Jin | |
| 2012/0311246 | A1 | 12/2012 | McWilliams | |
| 2013/0332484 | A1 | 12/2013 | Gajic | |
| 2014/0047095 | A1 | 2/2014 | Breternitz | |
| 2014/0136510 | A1 | 5/2014 | Parkkinen | |
| 2014/0188841 | A1 | 7/2014 | Sun | |
| 2015/0205607 | A1 | 7/2015 | Lindholm | |
| 2015/0244804 | A1 | 8/2015 | Warfield | |
| 2015/0248366 | A1 | 9/2015 | Bergsten | |
| 2015/0293966 | A1 | 10/2015 | Cai | |
| 2015/0310045 | A1 | 10/2015 | Konik | |
| 2016/0034547 | A1 | 2/2016 | Lerios | |
| 2020/0117649 | A1 | 4/2020 | Arnold | |
| 2020/0117664 | A1 | 4/2020 | Arnold | |
| 2021/0240713 | A1 | 8/2021 | Kondiles | |
| 2021/0240718 | A1 | 8/2021 | Kondiles | |
| 2022/0043690 | A1 | 2/2022 | Kondiles | |
| 2022/0043755 | A1 | 2/2022 | Kondiles | |
| 2022/0043787 | A1 | 2/2022 | Kondiles | |
| 2022/0148013 | A1 * | 5/2022 | Sinha | G06F 16/904 |
| 2022/0382751 | A1 | 12/2022 | Dhuse | |
| 2023/0011790 | A1 * | 1/2023 | Agarwal | G06F 16/24552 |
| 2023/0107652 | A1 | 4/2023 | Veselova | |
| 2023/0325101 | A1 * | 10/2023 | Sridharan | G06F 3/0644 |
| 2023/0359633 | A1 | 11/2023 | Kondiles | |
| 2023/0385277 | A1 | 11/2023 | Schmidt | |
| 2024/0134858 | A1 | 4/2024 | Schieferstein | |
| 2024/0403762 | A1 * | 12/2024 | Powers | G06F 16/26 |

OTHER PUBLICATIONS

Alechina, N. (2006-2007). B-Trees. School of Computer Science, University of Nottingham, http://www.cs.nott.ac.uk/~psznza/G5BADS06/lecture13-print.pdf. 41 pages.

Amazon DynamoDB: ten things you really should know, Nov. 13, 2015, Chandan Patra, http://cloudacademy...com/blog/amazon-dynamodb-ten-thing.

An Inside Look at Google BigQuery, by Kazunori Sato, Solutions Architect, Cloud Solutions team, Google Inc., 2012.

Big Table, a NoSQL massively parallel table, Paul Krzyzanowski, Nov. 2011, https://www.cs.rutgers.edu/pxk/417/notes/contentlbigtable.html.

Distributed Systems, Fall2012, Mohsen Taheriyan, http://www-scf.usc.edu/-csci57212011Spring/presentations/Taheriyan.pptx.

International Searching Authority; International Search Report and Written Opinion; International Application No. PCT/US2017/054773; Feb. 13, 2018; 17 pgs.

International Searching Authority; International Search Report and Written Opinion; International Application No. PCT/US2017/054784; Dec. 28, 2017; 10 pgs.

International Searching Authority; International Search Report and Written Opinion; International Application No. PCT/US2017/066145; Mar. 5, 2018; 13 pgs.

International Searching Authority; International Search Report and Written Opinion; International Application No. PCT/US2017/066169; Mar. 6, 2018; 15 pgs.

International Searching Authority; International Search Report and Written Opinion; International Application No. PCT/US2018/025729; Jun. 27, 2018; 9 pgs.

International Searching Authority; International Search Report and Written Opinion; International Application No. PCT/US2018/034859; Oct. 30, 2018; 8 pgs.

MapReduce: Simplified Data Processing on Large Clusters, OSDI 2004, Jeffrey Dean and Sanjay Ghemawat, Google, Inc., 13 pgs.

Rodero-Merino, L.; Storage of Structured Data: Big Table and HBase, New Trends In Distributed Systems, MSc Software and Systems, Distributed Systems Laboratory; Oct. 17, 2012; 24 pages.

Step 2: Examine the data model and implementation details, 2016, Amazon Web Services, Inc., http://docs.aws.amazon.com/amazondynamodb/latestldeveloperguide!Ti . . . .

* cited by examiner database system 10 external network(s) 17 configuration processing 20-n computing device 18-n configuration processing 20-1 computing device 18-1 configuration sub-system 16 system communication resources 14 external network(s) 17 administrative processing 19-n computing device 18-n administrative processing 19-1 computing device 18-1 administrative sub-system 15 system communication resources 14 computing device 18 computing device 18 computing device 18 node 37 node 37 node 37

DB OS = DataBase Operating Sysetm
CD OS = computing device operating system node 37 data set 32 columns 80 rows or records

FIG. 23 segment group segment 1
- data & parity section
- manifest section
- index 0 section
- • • •
- index x section
- statistics section segment 2
- data & parity section
- manifest section
- index 0 section
- • • •
- index x section
- statistics section segment 3
- data & parity section
- manifest section
- index 0 section
- • • •
- index x section
- statistics section segment 4
- data & parity section
- manifest section
- index 0 section
- • • •
- index x section
- statistics section segment 5
- data & parity section
- manifest section
- index 0 section
- • • •
- index x section
- statistics section query processing system 2502 query execution module
2504 database system 10 database system 10 query execution module 2504 database system 10 database system 10 query processing system 2510 query processing system 2510 database system 10 database
system 10 query execution module 2504 database system 10 record processing and storage system 2505

2505 record processing and storage system 2505 long term storage 2540 database system 10 database system 10 database system 10 database system 10 database system 10 page generator 2511 page generator 2511 database system 10 database
system 10

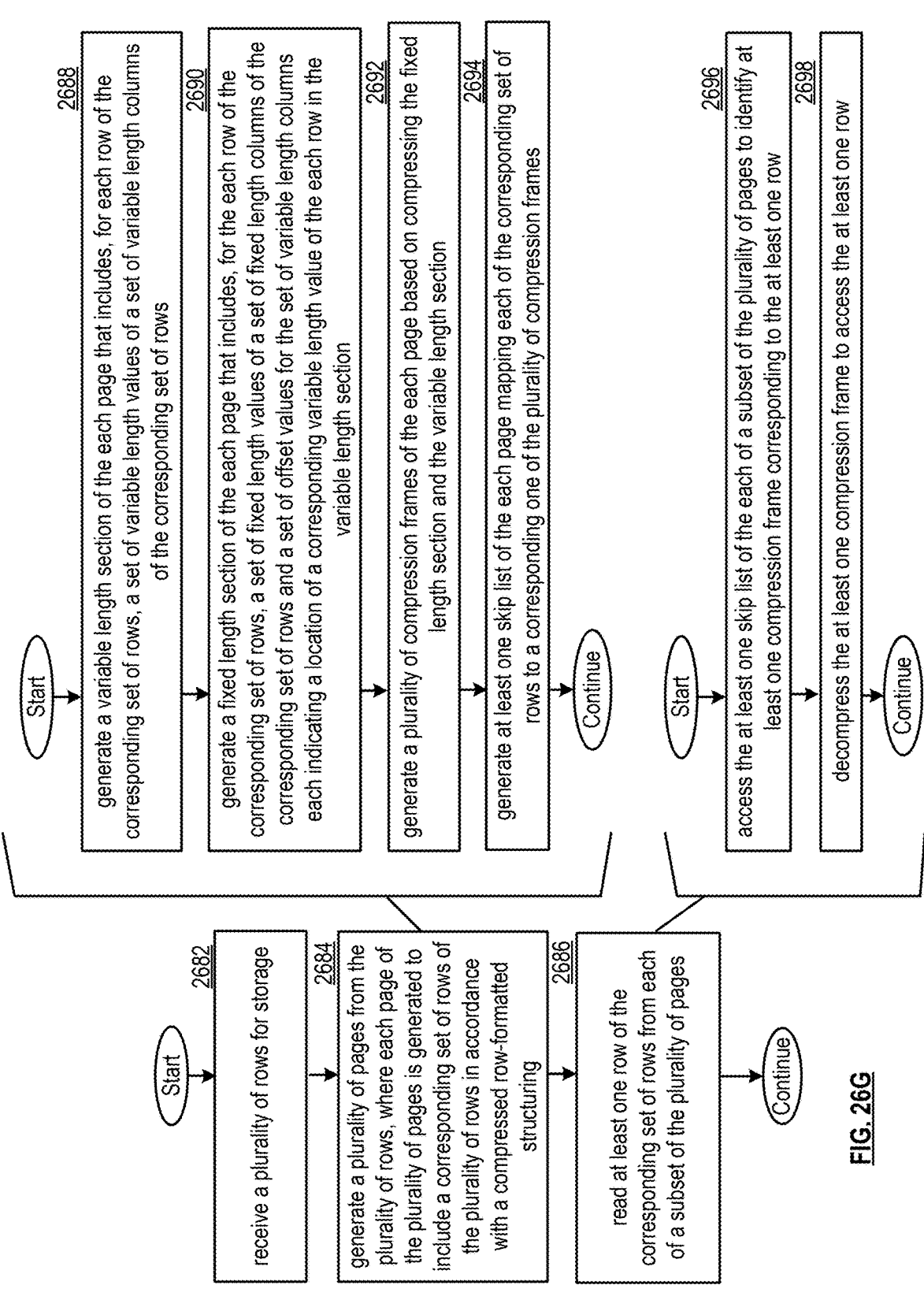

2682 — receive a plurality of rows for storage

2684 — generate a plurality of pages from the plurality of rows, where each page of the plurality of pages is generated to include a corresponding set of rows of the plurality of rows in accordance with a compressed row-formatted structuring 2686 — read at least one row of the corresponding set of rows from each of a subset of the plurality of pages 2688 — generate a variable length section of the each page that includes, for each row of the corresponding set of rows, a set of variable length values of a set of variable length columns of the corresponding set of rows 2690 — generate a fixed length section of the each page that includes, for the each row of the corresponding set of rows, a set of fixed length values of a set of fixed length columns of the corresponding set of rows and a set of offset values for the set of variable length columns each indicating a location of a corresponding variable length value of the each row in the variable length section 2692 — generate a plurality of compression frames of the each page based on compressing the fixed length section and the variable length section 2694 — generate at least one skip list of the each page mapping each of the corresponding set of rows to a corresponding one of the plurality of compression frames 2696 — access the at least one skip list of the each of a subset of the plurality of pages to identify at least one compression frame corresponding to the at least one row 2698 — decompress the at least one compression frame to access the at least one row

FIG. 26G database system 10 database system 10

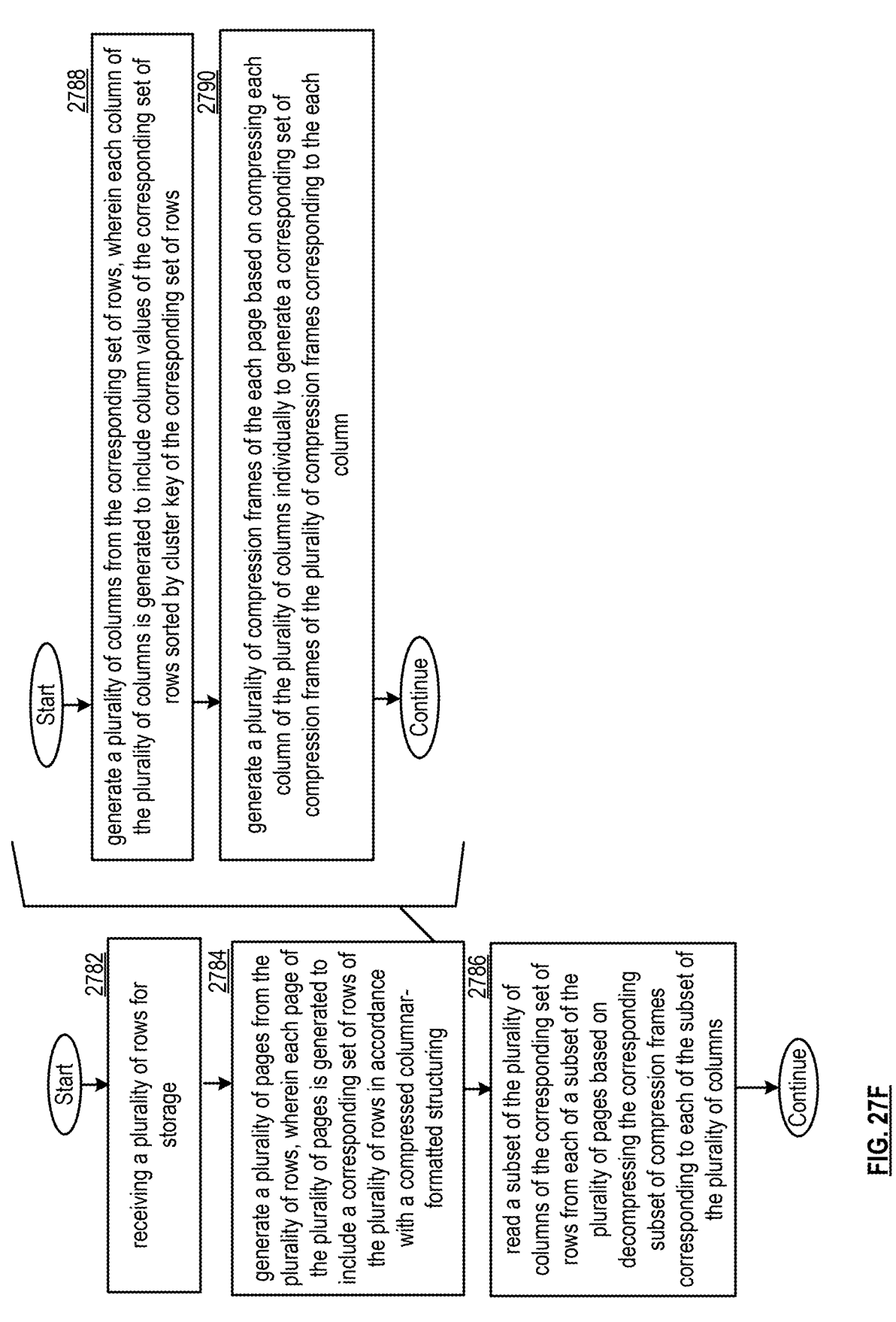

Start

2782 receiving a plurality of rows for storage

2784 generate a plurality of pages from the plurality of rows, wherein each page of the plurality of pages is generated to include a corresponding set of rows of the plurality of rows in accordance with a compressed columnar-formatted structuring

2786 read a subset of the plurality of columns of the corresponding set of rows from each of a subset of the plurality of pages based on decompressing the corresponding subset of compression frames corresponding to each of the subset of the plurality of columns Continue Start

2788 generate a plurality of columns from the corresponding set of rows, wherein each column of the plurality of columns is generated to include column values of the corresponding set of rows sorted by cluster key of the corresponding set of rows

2790 generate a plurality of compression frames of the each page based on compressing each column of the plurality of columns individually to generate a corresponding set of compression frames of the plurality of compression frames corresponding to the each column Continue

FIG. 27F database system 10 database system 10 database system 10 database system 10

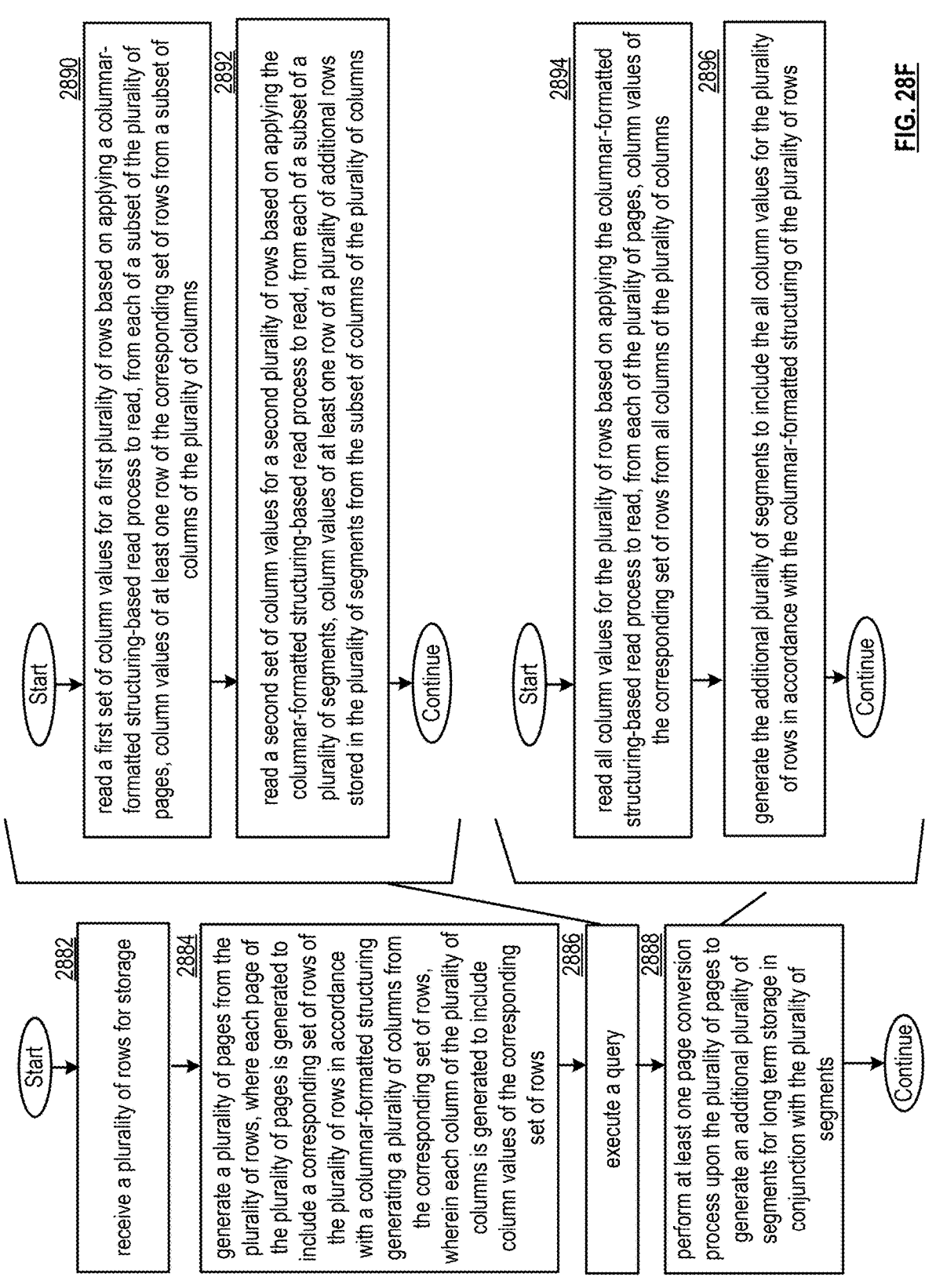

Start — 2882 receive a plurality of rows for storage — 2884 generate a plurality of pages from the plurality of rows, where each page of the plurality of pages is generated to include a corresponding set of rows of the plurality of rows in accordance with a columnar-formatted structuring generating a plurality of columns from the corresponding set of rows, wherein each column of the plurality of columns is generated to include column values of the corresponding set of rows — 2886 execute a query — 2888 perform at least one page conversion process upon the plurality of pages to generate an additional plurality of segments for long term storage in conjunction with the plurality of segments

Continue

Start — 2890 read a first set of column values for a first plurality of rows based on applying a columnar-formatted structuring-based read process to read, from each of a subset of the plurality of pages, column values of at least one row of the corresponding set of rows from a subset of columns of the plurality of columns — 2892 read a second set of column values for a second plurality of rows based on applying the columnar-formatted structuring-based read process to read, from each of a subset of a plurality of segments, column values of at least one row of a plurality of additional rows stored in the plurality of segments from the subset of columns of the plurality of columns

Continue

Start — 2894 read all column values for the plurality of rows based on applying the columnar-formatted structuring-based read process to read, from each of the plurality of pages, column values of the corresponding set of rows from all columns of the plurality of columns — 2896 generate the additional plurality of segments to include the all column values for the plurality of rows in accordance with the columnar-formatted structuring of the plurality of rows

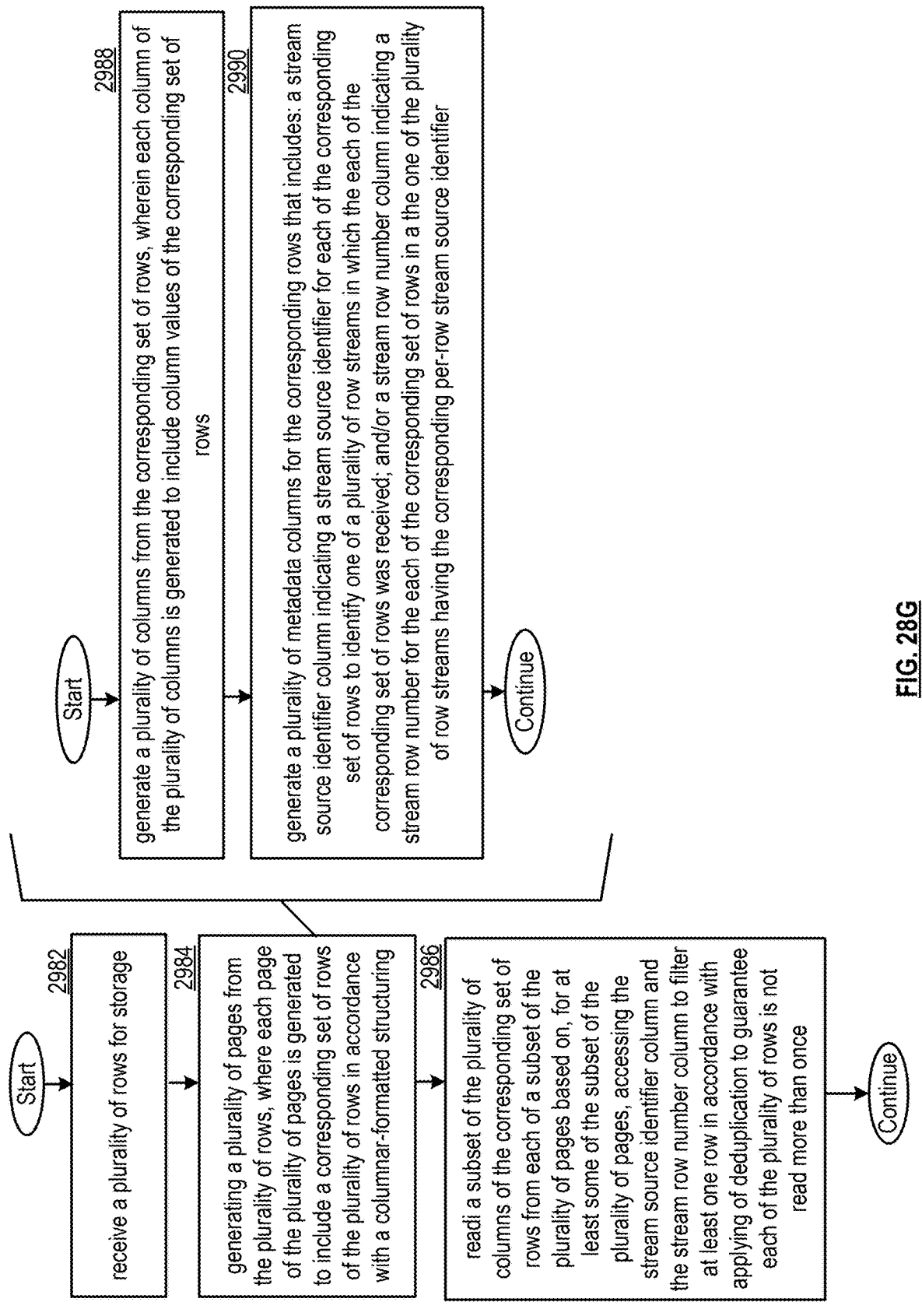

Start 2982
receive a plurality of rows for storage 2984
generating a plurality of pages from the plurality of rows, where each page of the plurality of pages is generated to include a corresponding set of rows of the plurality of rows in accordance with a columnar-formatted structuring 2986
read a subset of the plurality of columns of the corresponding set of rows from each of a subset of the plurality of pages based on, for at least some of the subset of the plurality of pages, accessing the stream source identifier column and the stream row number column to filter at least one row in accordance with applying of deduplication to guarantee each of the plurality of rows is not read more than once Continue Start 2988
generate a plurality of columns from the corresponding set of rows, wherein each column of the plurality of columns is generated to include column values of the corresponding set of rows 2990
generate a plurality of metadata columns for the corresponding rows that includes: a stream source identifier column indicating a stream source identifier for each of the corresponding set of rows to identify one of a plurality of row streams in which the each of the corresponding set of rows was received; and/or a stream row number column indicating a stream row number for the each of the corresponding set of rows in a the one of the plurality of row streams having the corresponding per-row stream source identifier Continue

FIG. 28G

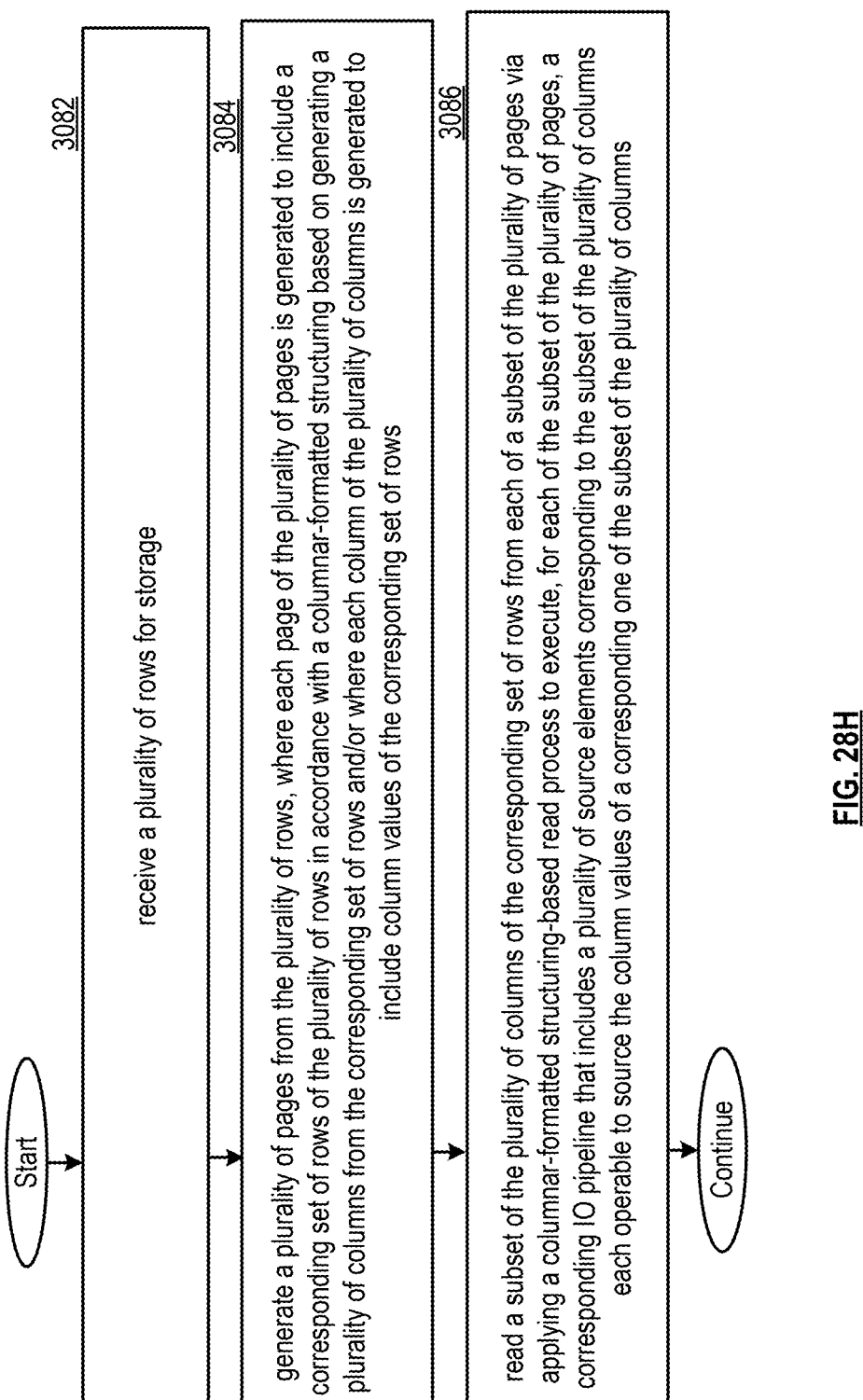

Start

3082 receive a plurality of rows for storage

3084 generate a plurality of pages from the plurality of rows, where each page of the plurality of pages is generated to include a corresponding set of rows of the plurality of rows in accordance with a columnar-formatted structuring based on generating a plurality of columns from the corresponding set of rows and/or where each column of the plurality of columns is generated to include column values of the corresponding set of rows

3086 read a subset of the plurality of columns of the corresponding set of rows from each of a subset of the plurality of pages via applying a columnar-formatted structuring-based read process to execute, for each of the subset of the plurality of pages, a corresponding IO pipeline that includes a plurality of source elements corresponding to the subset of the plurality of columns each operable to source the column values of a corresponding one of the subset of the plurality of columns Continue

FIG. 28H

READING BOTH PAGES AND SEGMENTS VIA APPLYING A COLUMNAR-FORMATTED STRUCTURING-BASED READ PROCESS

CROSS-REFERENCE TO RELATED APPLICATIONS

None

STATEMENT REGARDING FEDERALLY SPONSORED RESEARCH OR DEVELOPMENT

Not Applicable.

INCORPORATION-BY-REFERENCE OF MATERIAL SUBMITTED ON A COMPACT DISC

Not Applicable.

BACKGROUND OF THE INVENTION

Technical Field of the Invention

This invention relates generally to computer networking and more particularly to database system and operation.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function.

Of the many applications a computer can perform, a database system is one of the largest and most complex applications. In general, a database system stores a large amount of data in a particular way for subsequent processing. In some situations, the hardware of the computer is a limiting factor regarding the speed at which a database system can process a particular function. In some other instances, the way in which the data is stored is a limiting factor regarding the speed of execution. In yet some other instances, restricted co-process options are a limiting factor regarding the speed of execution.

BRIEF DESCRIPTION OF THE SEVERAL VIEWS OF THE DRAWING(S)

FIGS. 15-23 are schematic block diagrams of an example of processing a table or data set for storage in the database system in accordance with various embodiments;

FIG. 26G is a logic diagram illustrating a method for execution in accordance with various embodiments;

FIG. 27F is a logic diagram illustrating a method for execution in accordance with various embodiments;

FIGS. 28F-28H are logic diagrams illustrating methods for execution in accordance with various embodiments.

DETAILED DESCRIPTION OF THE INVENTION

Figure 1:
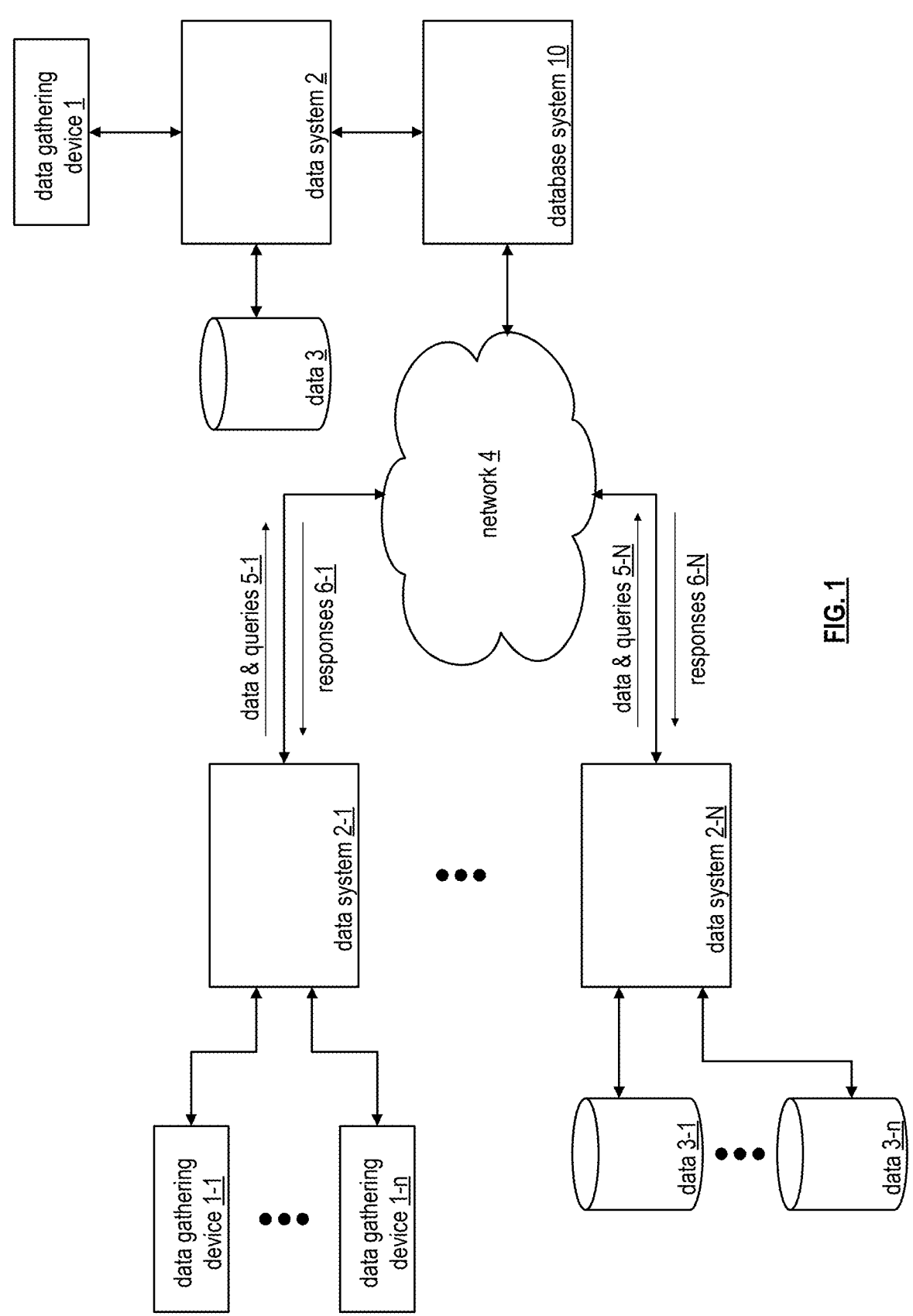
FIG. 1 is a schematic block diagram of an embodiment of a large scale data processing network that includes a database system in accordance with various embodiments.

FIG. 1 is a schematic block diagram of an embodiment of a large-scale data processing network that includes data gathering devices (1, 1-1 through 1-*n*), data systems (2, 2-1 through 2-N), data storage systems (3, 3-1 through 3-*n*), a network 4, and a database system 10. The data gathering devices are computing devices that collect a wide variety of data and may further include sensors, monitors, measuring instruments, and/or other instrument for collecting data. The data gathering devices collect data in real-time (i.e., as it is happening) and provides it to data system 2-1 for storage and real-time processing of queries 5-1 to produce responses 6-1. As an example, the data gathering devices are computing in a factory collecting data regarding manufacturing of one or more products and the data system is evaluating queries to determine manufacturing efficiency, quality control, and/or product development status.

The data storage systems 3 store existing data. The existing data may originate from the data gathering devices or other sources, but the data is not real time data. For example, the data storage system stores financial data of a bank, a credit card company, or like financial institution. The data system 2-N processes queries 5-N regarding the data stored in the data storage systems to produce responses 6-N.

Data system 2 processes queries regarding real time data from data gathering devices and/or queries regarding non-real time data stored in the data storage system 3. The data system 2 produces responses in regard to the queries. Storage of real time and non-real time data, the processing of queries, and the generating of responses will be discussed with reference to one or more of the subsequent figures.

Figure 1A:
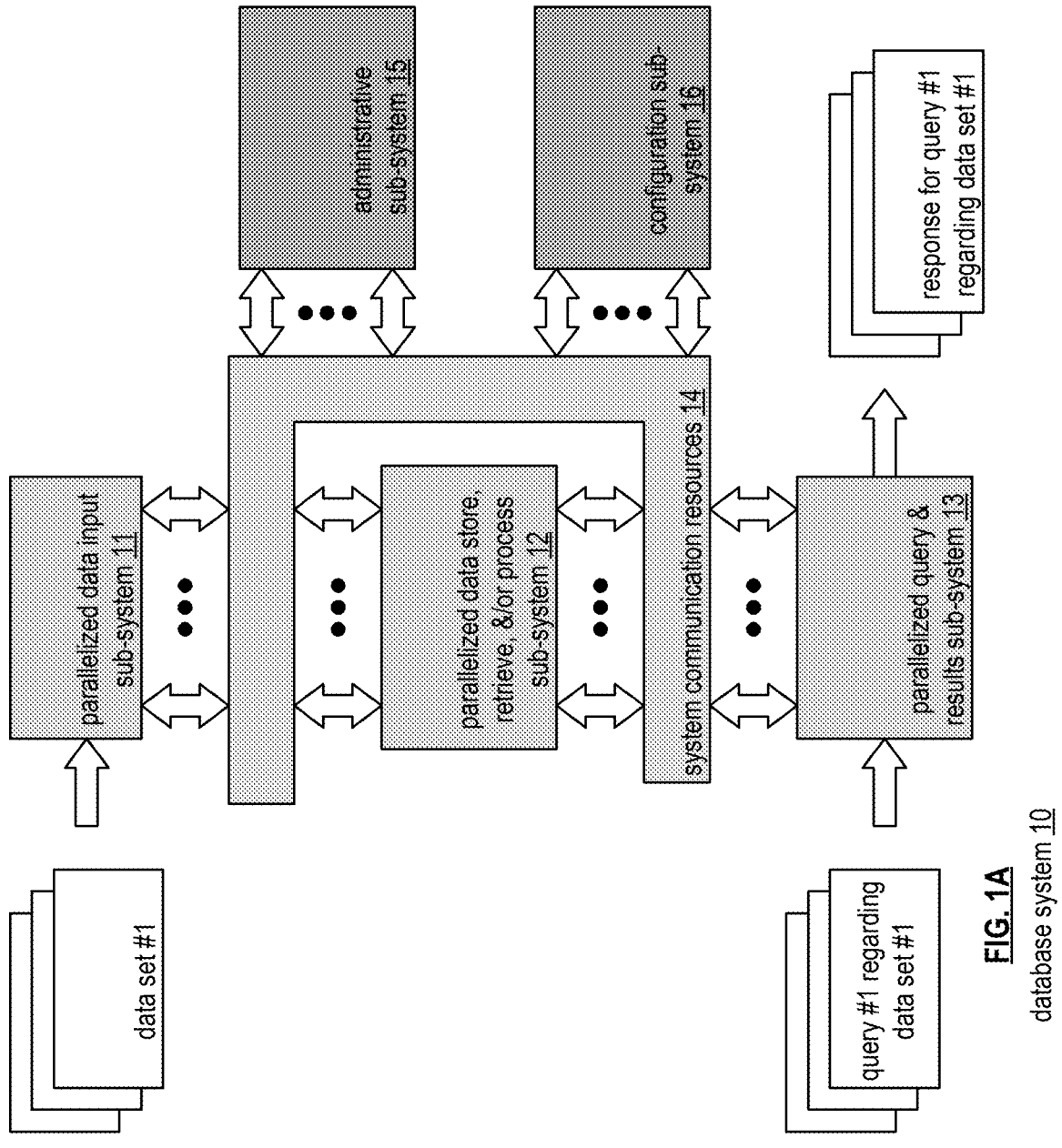
FIG. 1A is a schematic block diagram of an embodiment of a database system in accordance with various embodiments.

FIG. 1A is a schematic block diagram of an embodiment of a database system 10 that includes a parallelized data input sub-system 11, a parallelized data store, retrieve, and/or process sub-system 12, a parallelized query and response sub-system 13, system communication resources 14, an administrative sub-system 15, and a configuration sub-system 16. The system communication resources 14 include one or more of: wide area network (WAN) connections, local area network (LAN) connections, wireless connections, wireline connections, etc. to couple the sub-systems 11, 12, 13, 15, and 16 together.

Each of the sub-systems 11, 12, 13, 15, and 16 include a plurality of computing devices; an example of which is discussed with reference to one or more of FIGS. 7-9. Hereafter, the parallelized data input sub-system 11 may also be referred to as a data input sub-system, the parallelized data store, retrieve, and/or process sub-system may also be referred to as a data storage and processing sub-system, and the parallelized query and response sub-system 13 may also be referred to as a query and results sub-system.

In an example of operation, the parallelized data input sub-system 11 receives a data set (e.g., a table) that includes a plurality of records. A record includes a plurality of data fields. As a specific example, the data set includes tables of data from a data source. For example, a data source includes one or more computers. As another example, the data source is a plurality of machines. As yet another example, the data source is a plurality of data mining algorithms operating on one or more computers.

As is further discussed with reference to FIG. 15, the data source organizes its records of the data set into a table that includes rows and columns. The columns represent data fields of data for the rows. Each row corresponds to a record of data. For example, a table includes payroll information for a company's employees. Each row is an employee's payroll record. The columns include data fields for employee name, address, department, annual salary, tax deduction information, direct deposit information, etc.

The parallelized data input sub-system 11 processes a table to determine how to store it. For example, the parallelized data input sub-system 11 divides the data set into a plurality of data partitions. For each partition, the parallelized data input sub-system 11 divides it into a plurality of data segments based on a segmenting factor. The segmenting factor includes a variety of approaches of dividing a partition into segments. For example, the segment factor indicates a number of records to include in a segment. As another example, the segmenting factor indicates a number of segments to include in a segment group. As another example, the segmenting factor identifies how to segment a data partition based on storage capabilities of the data store and processing sub-system. As a further example, the segmenting factor indicates how many segments for a data partition based on a redundancy storage encoding scheme.

As an example of dividing a data partition into segments based on a redundancy storage encoding scheme, assume that it includes a 4 of 5 encoding scheme (meaning any 4 of 5 encoded data elements can be used to recover the data). Based on these parameters, the parallelized data input sub-system 11 divides a data partition into 5 segments: one corresponding to each of the data elements).

The parallelized data input sub-system 11 restructures the plurality of data segments to produce restructured data segments. For example, the parallelized data input sub-system 11 restructures records of a first data segment of the plurality of data segments based on a key field of the plurality of data fields to produce a first restructured data segment. The key field is common to the plurality of records. As a specific example, the parallelized data input sub-system 11 restructures a first data segment by dividing the first data segment into a plurality of data slabs (e.g., columns of a segment of a partition of a table). Using one or more of the columns as a key, or keys, the parallelized data input sub-system 11 sorts the data slabs. The restructuring to produce the data slabs is discussed in greater detail with reference to FIG. 4 and FIGS. 16-18.

The parallelized data input sub-system 11 also generates storage instructions regarding how sub-system 12 is to store the restructured data segments for efficient processing of subsequently received queries regarding the stored data. For example, the storage instructions include one or more of: a naming scheme, a request to store, a memory resource requirement, a processing resource requirement, an expected access frequency level, an expected storage duration, a required maximum access latency time, and other requirements associated with storage, processing, and retrieval of data.

A designated computing device of the parallelized data store, retrieve, and/or process sub-system 12 receives the restructured data segments and the storage instructions. The designated computing device (which is randomly selected, selected in a round robin manner, or by default) interprets the storage instructions to identify resources (e.g., itself, its components, other computing devices, and/or components thereof) within the computing device's storage cluster. The designated computing device then divides the restructured data segments of a segment group of a partition of a table into segment divisions based on the identified resources and/or the storage instructions. The designated computing device then sends the segment divisions to the identified resources for storage and subsequent processing in accordance with a query. The operation of the parallelized data store, retrieve, and/or process sub-system 12 is discussed in greater detail with reference to FIG. 6.

The parallelized query and response sub-system 13 receives queries regarding tables (e.g., data sets) and processes the queries prior to sending them to the parallelized data store, retrieve, and/or process sub-system 12 for execution. For example, the parallelized query and response sub-system 13 generates an initial query plan based on a data processing request (e.g., a query) regarding a data set (e.g., the tables). Sub-system 13 optimizes the initial query plan based on one or more of the storage instructions, the engaged resources, and optimization functions to produce an optimized query plan.

For example, the parallelized query and response sub-system 13 receives a specific query no. 1 regarding the data set no. 1 (e.g., a specific table). The query is in a standard query format such as Open Database Connectivity (ODBC), Java Database Connectivity (JDBC), and/or SPARK. The query is assigned to a node within the parallelized query and response sub-system 13 for processing. The assigned node identifies the relevant table, determines where and how it is stored, and determines available nodes within the parallelized data store, retrieve, and/or process sub-system 12 for processing the query.

In addition, the assigned node parses the query to create an abstract syntax tree. As a specific example, the assigned node converts an SQL (Structured Query Language) statement into a database instruction set. The assigned node then validates the abstract syntax tree. If not valid, the assigned node generates a SQL exception, determines an appropriate correction, and repeats. When the abstract syntax tree is validated, the assigned node then creates an annotated abstract syntax tree. The annotated abstract syntax tree includes the verified abstract syntax tree plus annotations regarding column names, data type(s), data aggregation or not, correlation or not, sub-query or not, and so on.

The assigned node then creates an initial query plan from the annotated abstract syntax tree. The assigned node optimizes the initial query plan using a cost analysis function (e.g., processing time, processing resources, etc.) and/or other optimization functions. Having produced the optimized query plan, the parallelized query and response sub-system 13 sends the optimized query plan to the parallelized data store, retrieve, and/or process sub-system 12 for execution. The operation of the parallelized query and response sub-system 13 is discussed in greater detail with reference to FIG. 5.

The parallelized data store, retrieve, and/or process sub-system 12 executes the optimized query plan to produce resultants and sends the resultants to the parallelized query and response sub-system 13. Within the parallelized data store, retrieve, and/or process sub-system 12, a computing device is designated as a primary device for the query plan (e.g., optimized query plan) and receives it. The primary device processes the query plan to identify nodes within the parallelized data store, retrieve, and/or process sub-system 12 for processing the query plan. The primary device then sends appropriate portions of the query plan to the identified nodes for execution. The primary device receives responses from the identified nodes and processes them in accordance with the query plan.

The primary device of the parallelized data store, retrieve, and/or process sub-system 12 provides the resulting response (e.g., resultants) to the assigned node of the parallelized query and response sub-system 13. For example, the assigned node determines whether further processing is needed on the resulting response (e.g., joining, filtering, etc.). If not, the assigned node outputs the resulting response as the response to the query (e.g., a response for query no. 1 regarding data set no. 1). If, however, further processing is determined, the assigned node further processes the resulting response to produce the response to the query. Having received the resultants, the parallelized query and response sub-system 13 creates a response from the resultants for the data processing request.

Figures 2, 3:
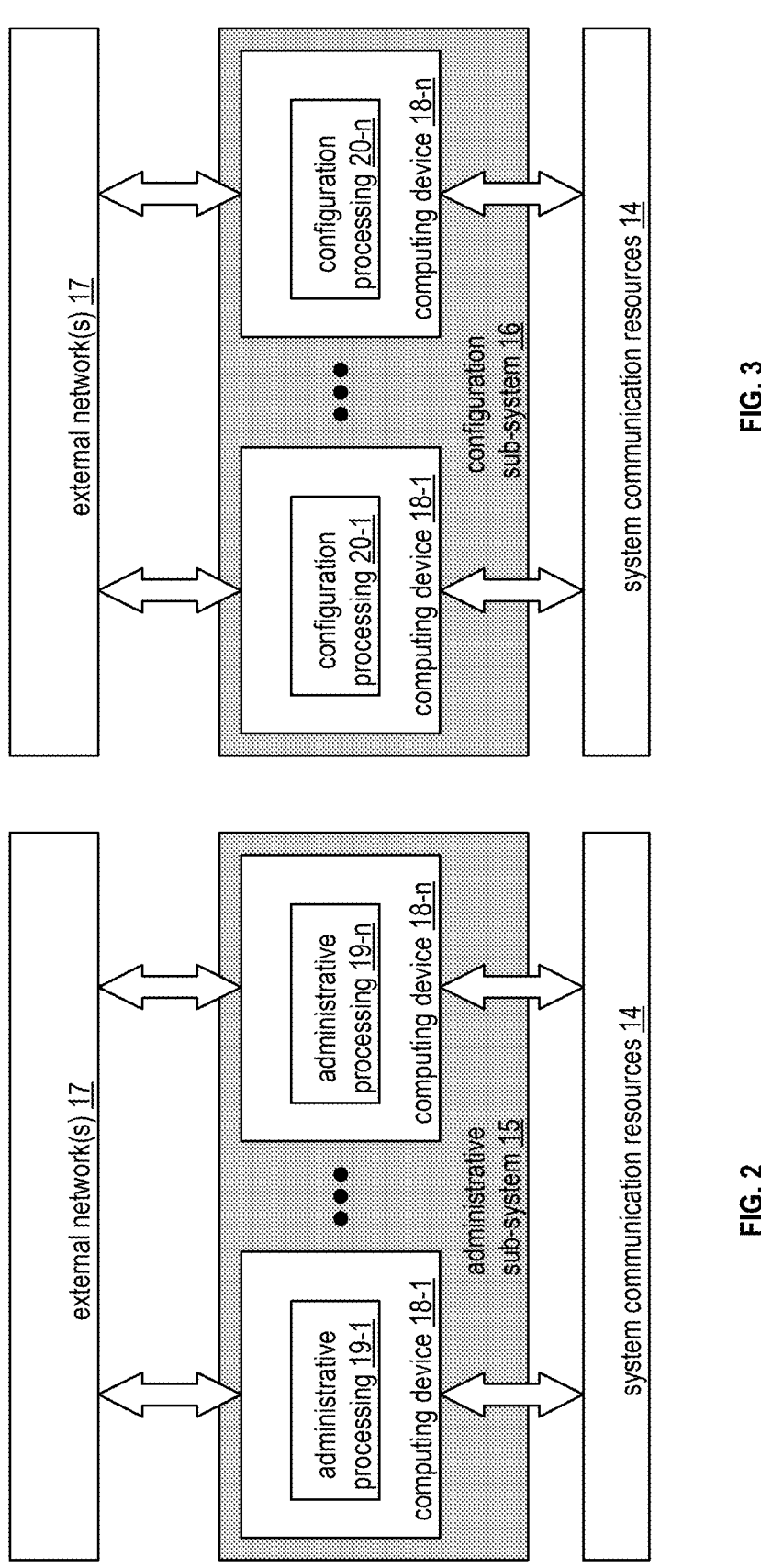
FIG. 2 is a schematic block diagram of an embodiment of an administrative sub-system in accordance with various embodiments.
FIG. 3 is a schematic block diagram of an embodiment of a configuration sub-system in accordance with various embodiments.

FIG. 2 is a schematic block diagram of an embodiment of the administrative sub-system 15 of FIG. 1A that includes one or more computing devices 18-1 through 18-n. Each of the computing devices executes an administrative processing function utilizing a corresponding administrative processing of administrative processing 19-1 through 19-n (which includes a plurality of administrative operations) that coordinates system level operations of the database system. Each computing device is coupled to an external network 17, or networks, and to the system communication resources 14 of FIG. 1A.

As will be described in greater detail with reference to one or more subsequent figures, a computing device includes a plurality of nodes and each node includes a plurality of processing core resources. Each processing core resource is capable of executing at least a portion of an administrative operation independently. This supports lock free and parallel execution of one or more administrative operations.

The administrative sub-system 15 functions to store metadata of the data set described with reference to FIG. 1A. For example, the storing includes generating the metadata to include one or more of an identifier of a stored table, the size of the stored table (e.g., bytes, number of columns, number of rows, etc.), labels for key fields of data segments, a data type indicator, the data owner, access permissions, available storage resources, storage resource specifications, software for operating the data processing, historical storage information, storage statistics, stored data access statistics (e.g., frequency, time of day, accessing entity identifiers, etc.) and any other information associated with optimizing operation of the database system 10.

FIG. 3 is a schematic block diagram of an embodiment of the configuration sub-system 16 of FIG. 1A that includes one or more computing devices 18-1 through 18-n. Each of the computing devices executes a configuration processing function 20-1 through 20-n (which includes a plurality of configuration operations) that coordinates system level configurations of the database system. Each computing device is coupled to the external network 17 of FIG. 2, or networks, and to the system communication resources 14 of FIG. 1A.

Figure 4:
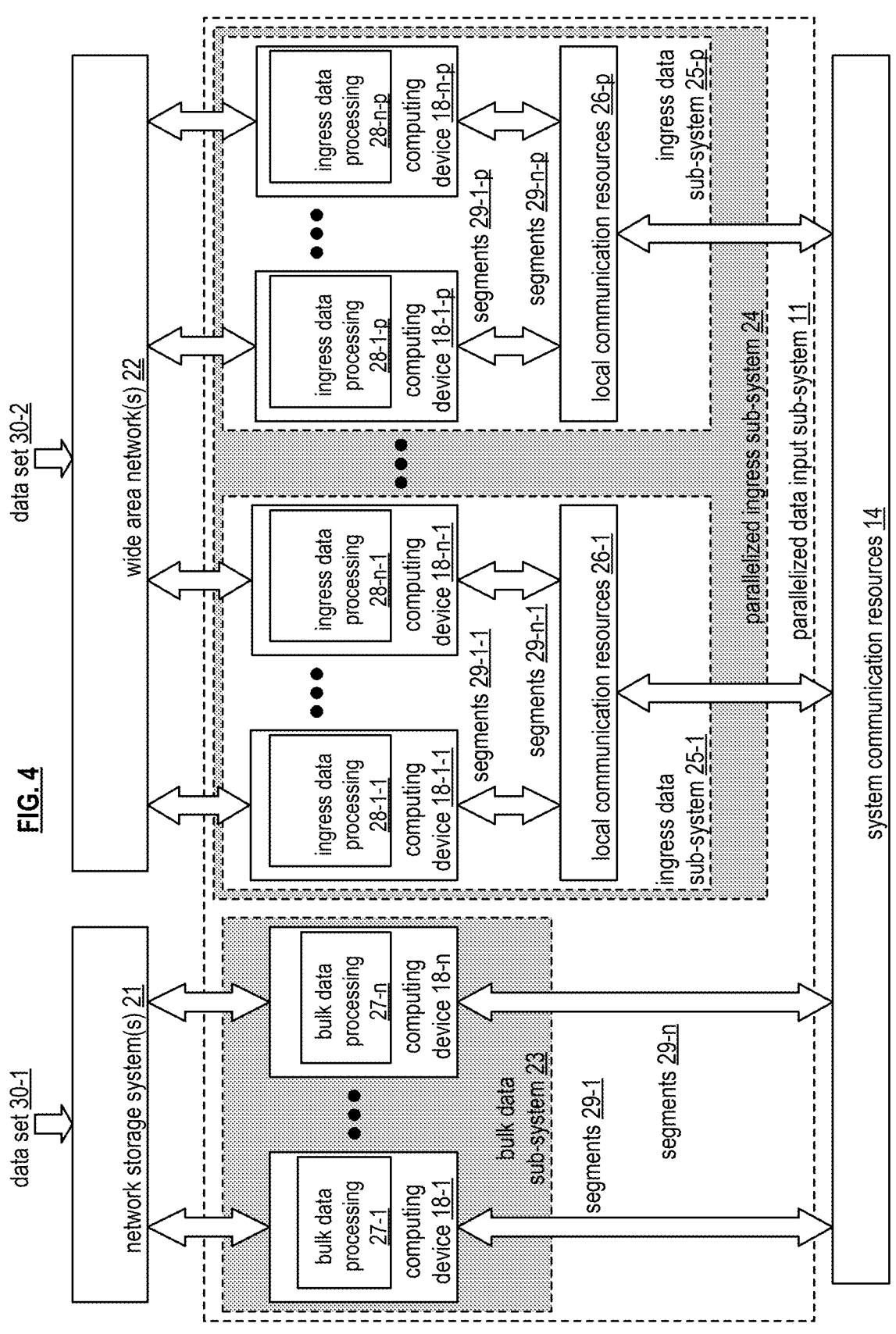
FIG. 4 is a schematic block diagram of an embodiment of a parallelized data input sub-system in accordance with various embodiments.

FIG. 4 is a schematic block diagram of an embodiment of the parallelized data input sub-system 11 of FIG. 1A that includes a bulk data sub-system 23 and a parallelized ingress sub-system 24. The bulk data sub-system 23 includes a plurality of computing devices 18-1 through 18-n. A computing device includes a bulk data processing function (e.g., 27-1) for receiving a table from a network storage system 21 (e.g., a server, a cloud storage service, etc.) and processing it for storage as generally discussed with reference to FIG. 1A.

The parallelized ingress sub-system 24 includes a plurality of ingress data sub-systems 25-1 through 25-p that each include a local communication resource of local communication resources 26-1 through 26-p and a plurality of computing devices 18-1 through 18-n. A computing device executes an ingress data processing function (e.g., 28-1) to receive streaming data regarding a table via a wide area network 22 and processing it for storage as generally discussed with reference to FIG. 1A. With a plurality of ingress data sub-systems 25-1 through 25-p, data from a plurality of tables can be streamed into the database system 10 at one time.

In general, the bulk data processing function is geared towards receiving data of a table in a bulk fashion (e.g., the table exists and is being retrieved as a whole, or portion thereof). The ingress data processing function is geared towards receiving streaming data from one or more data sources (e.g., receive data of a table as the data is being generated). For example, the ingress data processing function is geared towards receiving data from a plurality of machines in a factory in a periodic or continual manner as the machines create the data.

Figure 5:
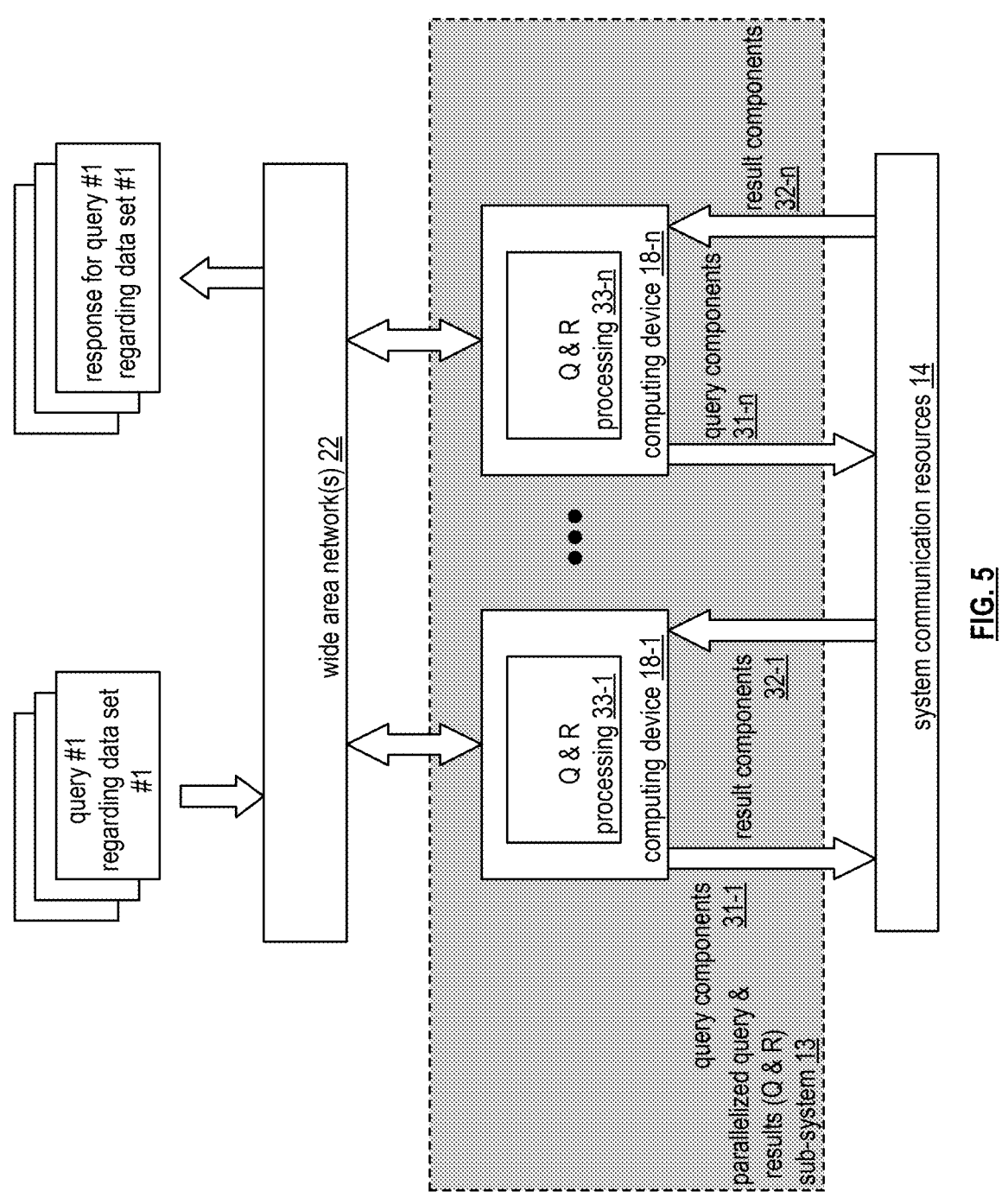
FIG. 5 is a schematic block diagram of an embodiment of a parallelized query and response (Q&R) sub-system in accordance with various embodiments.

FIG. 5 is a schematic block diagram of an embodiment of a parallelized query and results sub-system 13 that includes a plurality of computing devices 18-1 through 18-n. Each of the computing devices executes a query (Q) & response (R) processing function 33-1 through 33-n. The computing devices are coupled to the wide area network 22 to receive queries (e.g., query no. 1 regarding data set no. 1) regarding tables and to provide responses to the queries (e.g., response for query no. 1 regarding the data set no. 1). For example, a computing device (e.g., 18-1) receives a query, creates an initial query plan therefrom, and optimizes it to produce an optimized plan. The computing device then sends components (e.g., one or more operations) of the optimized plan to the parallelized data store, retrieve, &/or process sub-system 12.

Processing resources of the parallelized data store, retrieve, &/or process sub-system 12 processes the components of the optimized plan to produce results components 32-1 through 32-n. The computing device of the Q&R sub-system 13 processes the result components to produce a query response.

The Q&R sub-system 13 allows for multiple queries regarding one or more tables to be processed concurrently. For example, a set of processing core resources of a computing device (e.g., one or more processing core resources) processes a first query and a second set of processing core resources of the computing device (or a different computing device) processes a second query.

As will be described in greater detail with reference to one or more subsequent figures, a computing device includes a plurality of nodes and each node includes multiple processing core resources such that a plurality of computing devices includes pluralities of multiple processing core resources A processing core resource of the pluralities of multiple processing core resources generates the optimized query plan and other processing core resources of the pluralities of multiple processing core resources generates other optimized query plans for other data processing requests. Each processing core resource is capable of executing at least a portion of the Q & R function. In an embodiment, a plurality of processing core resources of one or more nodes executes the Q & R function to produce a response to a query. The processing core resource is discussed in greater detail with reference to FIG. 13.

Figure 6:
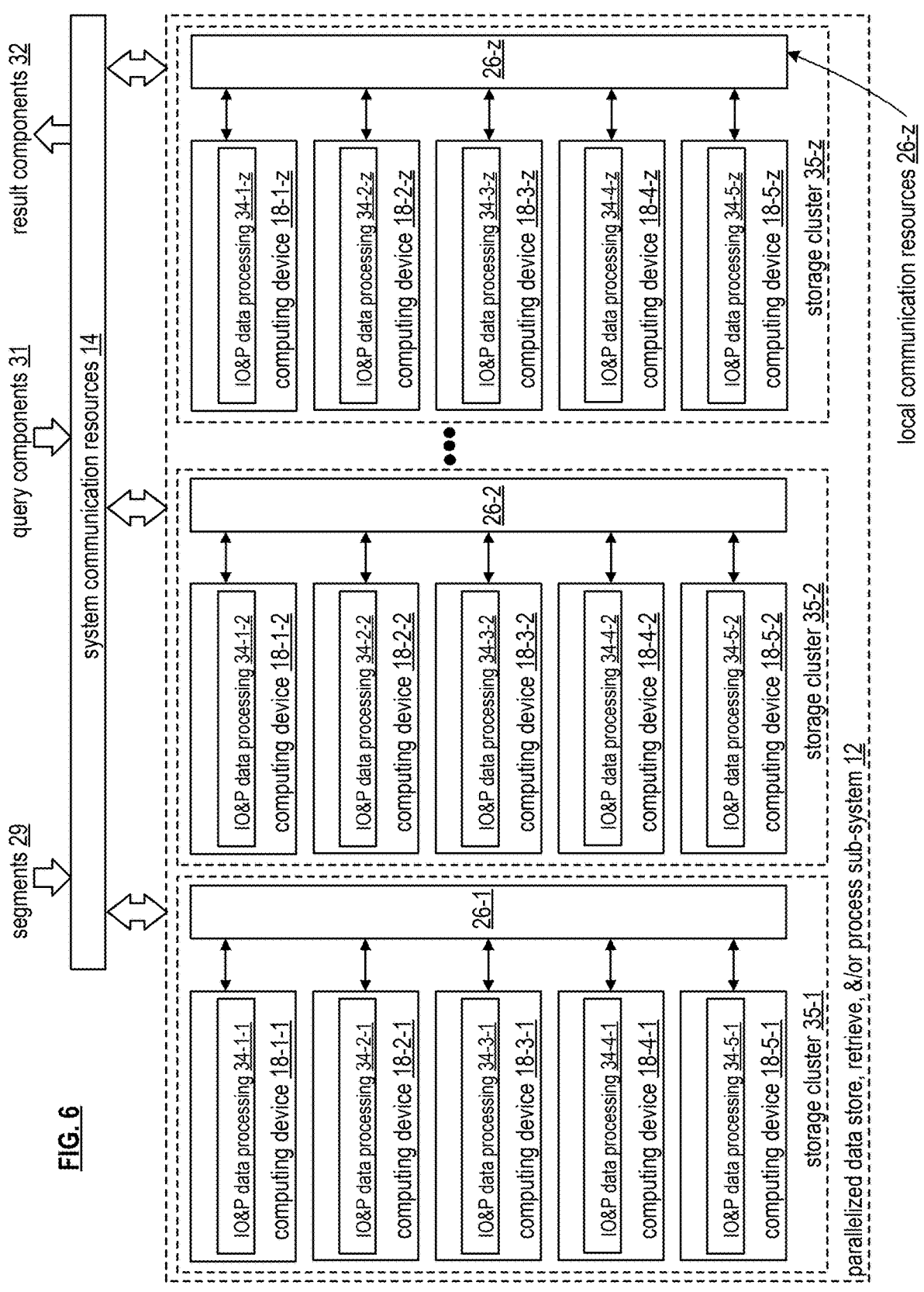
FIG. 6 is a schematic block diagram of an embodiment of a parallelized data store, retrieve, and/or process (IO& P) sub-system in accordance with various embodiments.

FIG. 6 is a schematic block diagram of an embodiment of a parallelized data store, retrieve, and/or process sub-system 12 that includes a plurality of computing devices, where each computing device includes a plurality of nodes and each node includes multiple processing core resources. Each processing core resource is capable of executing at least a portion of the function of the parallelized data store, retrieve, and/or process sub-system 12. The plurality of computing devices is arranged into a plurality of storage clusters. Each storage cluster includes a number of computing devices.

In an embodiment, the parallelized data store, retrieve, and/or process sub-system 12 includes a plurality of storage clusters 35-1 through 35-z. Each storage cluster includes a corresponding local communication resource 26-1 through 26-z and a number of computing devices 18-1 through 18-5. Each computing device executes an input, output, and processing (IO &P) processing function 34-1 through 34-5 to store and process data.

The number of computing devices in a storage cluster corresponds to the number of segments (e.g., a segment group) in which a data partitioned is divided. For example, if a data partition is divided into five segments, a storage cluster includes five computing devices. As another example, if the data is divided into eight segments, then there are eight computing devices in the storage clusters.

To store a segment group of segments 29 within a storage cluster, a designated computing device of the storage cluster interprets storage instructions to identify computing devices (and/or processing core resources thereof) for storing the segments to produce identified engaged resources. The designated computing device is selected by a random selection, a default selection, a round-robin selection, or any other mechanism for selection.

The designated computing device sends a segment to each computing device in the storage cluster, including itself. Each of the computing devices stores their segment of the segment group. As an example, five segments 29 of a segment group are stored by five computing devices of storage cluster 35-1. The first computing device 18-1-1 stores a first segment of the segment group; a second computing device 18-2-1 stores a second segment of the segment group; and so on. With the segments stored, the computing devices are able to process queries (e.g., query components from the Q&R sub-system 13) and produce appropriate result components.

While storage cluster 35-1 is storing and/or processing a segment group, the other storage clusters 35-2 through 35-n are storing and/or processing other segment groups. For example, a table is partitioned into three segment groups. Three storage clusters store and/or process the three segment groups independently. As another example, four tables are independently stored and/or processed by one or more storage clusters. As yet another example, storage cluster 35-1 is storing and/or processing a second segment group while it is storing/or and processing a first segment group.

Figure 7:
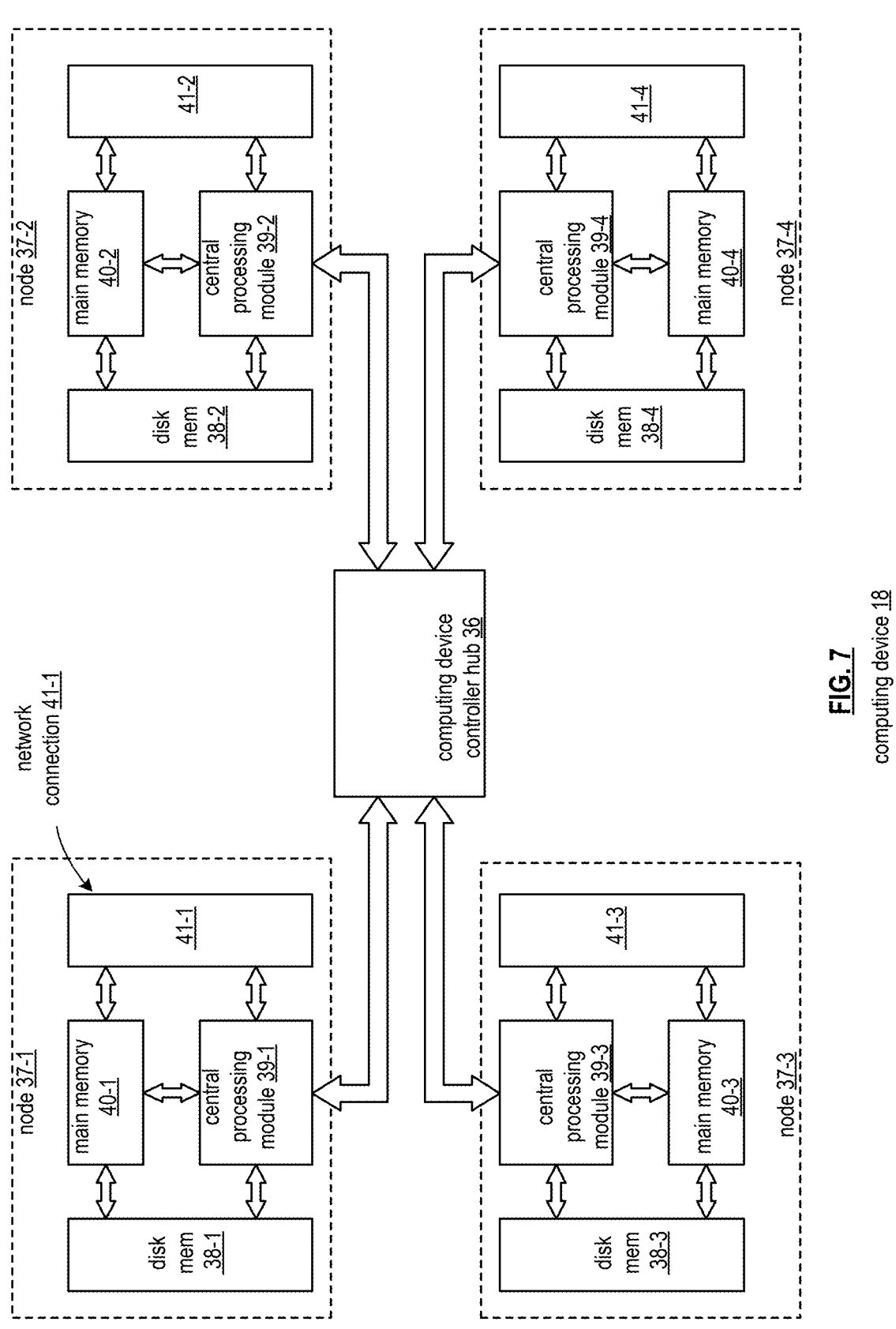
FIG. 7 is a schematic block diagram of an embodiment of a computing device in accordance with various embodiments.

FIG. 7 is a schematic block diagram of an embodiment of a computing device 18 that includes a plurality of nodes 37-1 through 37-4 coupled to a computing device controller hub 36. The computing device controller hub 36 includes one or more of a chipset, a quick path interconnect (QPI), and an ultra path interconnection (UPI). Each node 37-1 through 37-4 includes a central processing module 39-1 through 39-4, a main memory 40-1 through 40-4 (e.g., volatile memory), a disk memory 38-1 through 38-4 (non-volatile memory), and a network connection 41-1 through 41-4. In an alternate configuration, the nodes share a network connection, which is coupled to the computing device controller hub 36 or to one of the nodes as illustrated in subsequent figures.

In an embodiment, each node is capable of operating independently of the other nodes. This allows for large scale parallel operation of a query request, which significantly reduces processing time for such queries. In another embodiment, one or more node function as co-processors to share processing requirements of a particular function, or functions.

Figure 8:
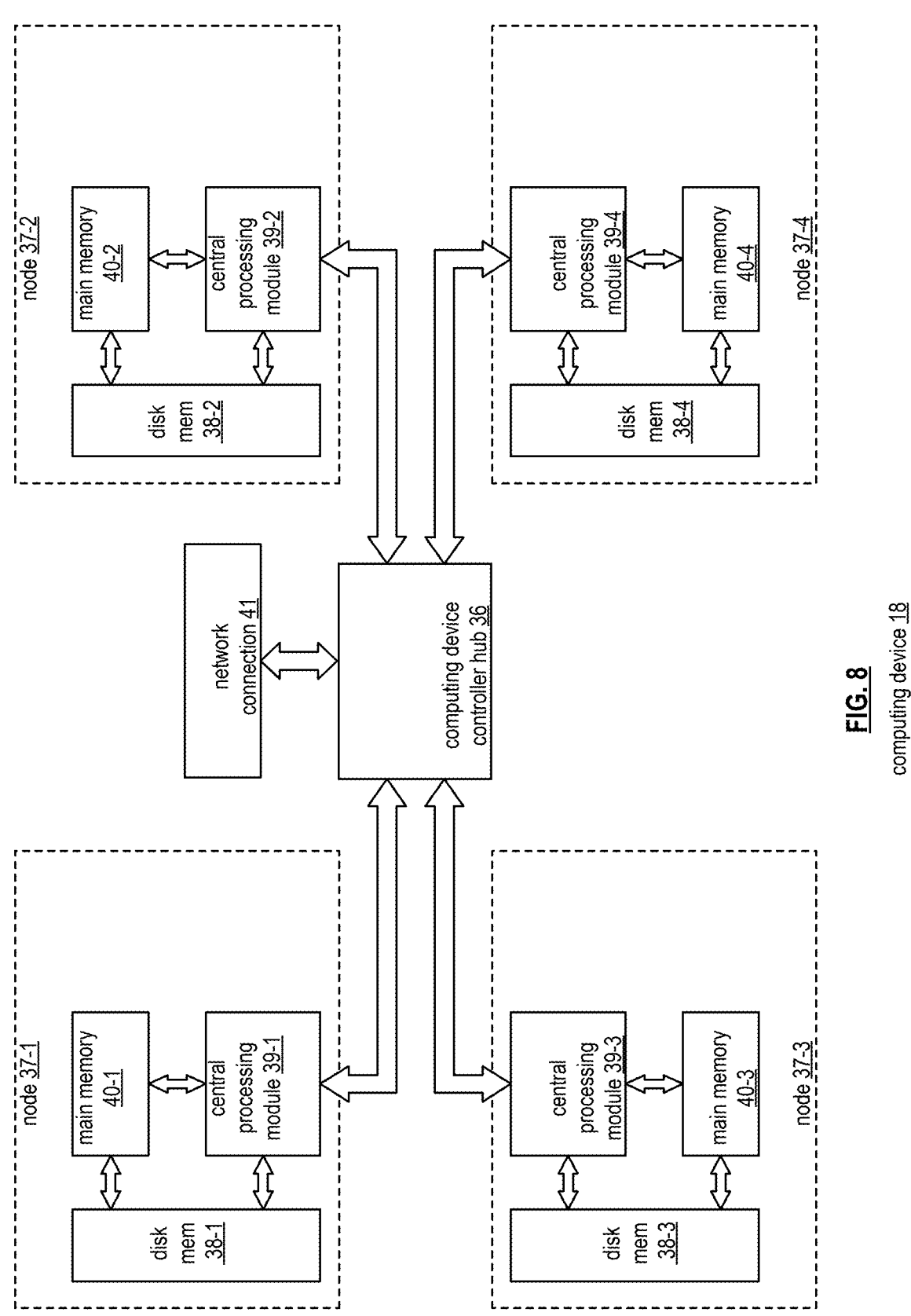
FIG. 8 is a schematic block diagram of another embodiment of a computing device in accordance with various embodiments.

FIG. 8 is a schematic block diagram of another embodiment of a computing device similar to the computing device of FIG. 7 with an exception that it includes a single network connection 41, which is coupled to the computing device controller hub 36. As such, each node coordinates with the computing device controller hub to transmit or receive data via the network connection.

Figure 9:
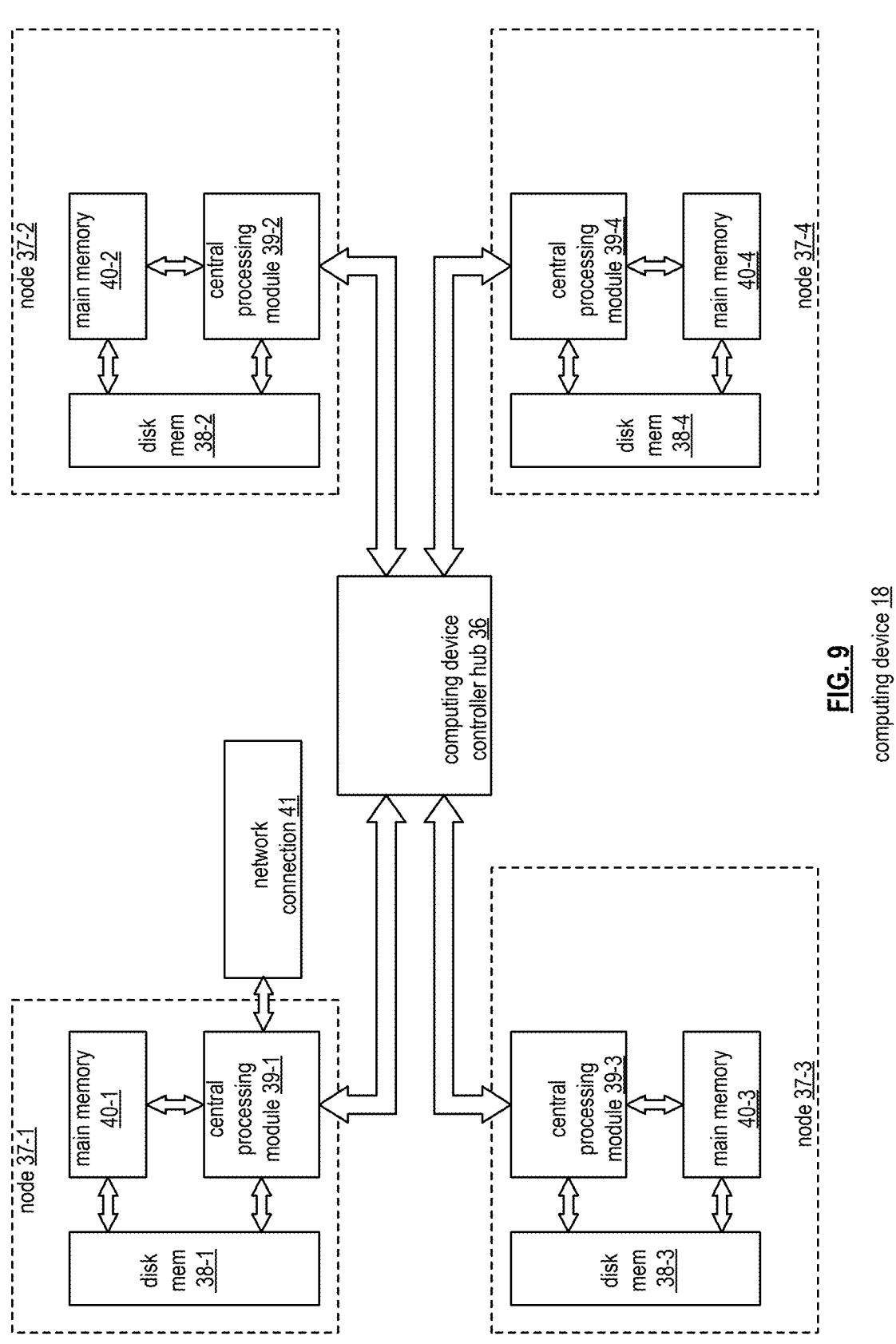
FIG. 9 is a schematic block diagram of another embodiment of a computing device in accordance with various embodiments.

FIG. 9 is a schematic block diagram of another embodiment of a computing device is similar to the computing device of FIG. 7 with an exception that it includes a single network connection 41, which is coupled to a central processing module of a node (e.g., to central processing module 39-1 of node 37-1). As such, each node coordinates with the central processing module via the computing device controller hub 36 to transmit or receive data via the network connection.

Figure 10:
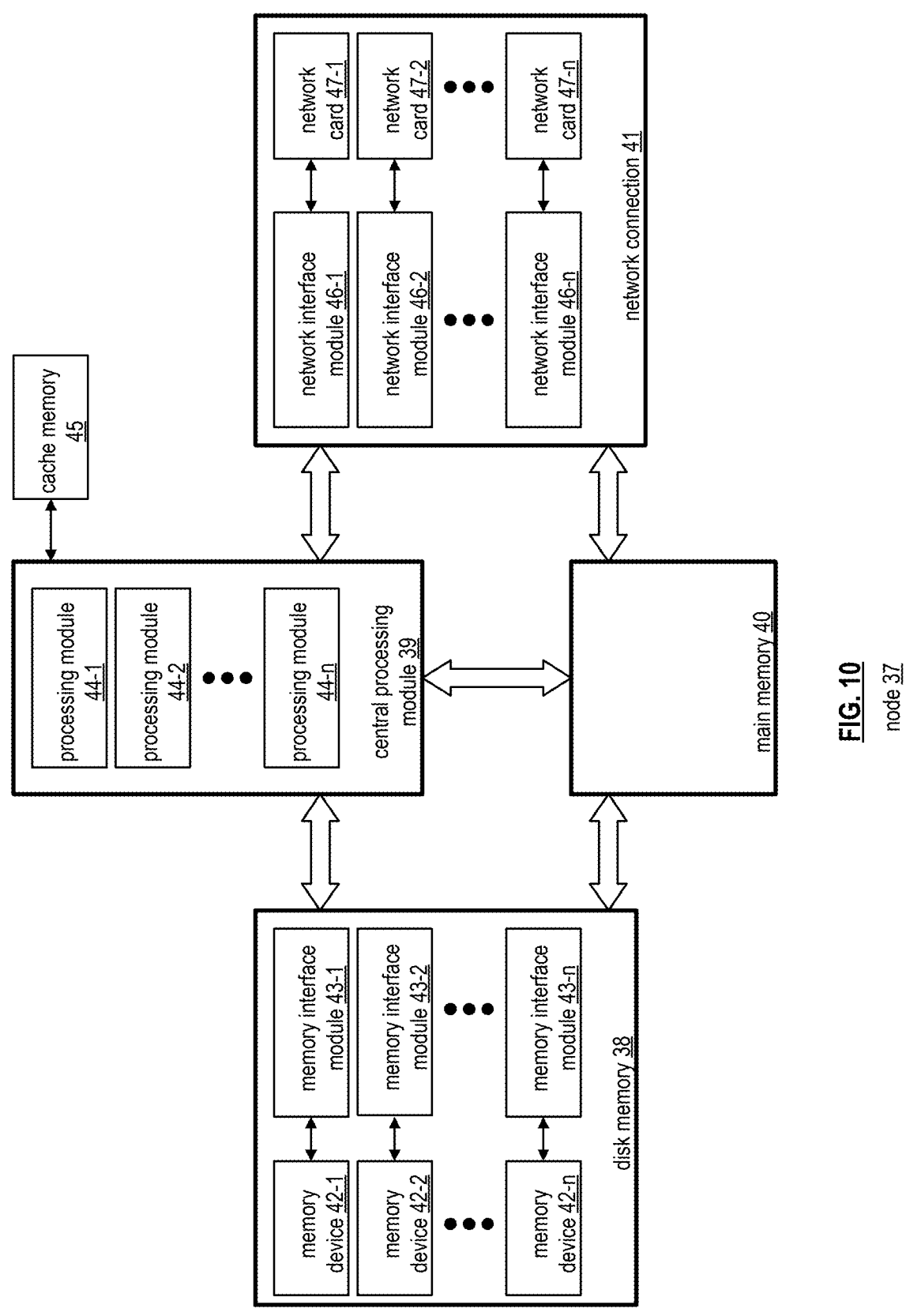
FIG. 10 is a schematic block diagram of an embodiment of a node of a computing device in accordance with various embodiments.

FIG. 10 is a schematic block diagram of an embodiment of a node 37 of computing device 18. The node 37 includes the central processing module 39, the main memory 40, the disk memory 38, and the network connection 41. The main memory 40 includes read only memory (RAM) and/or other form of volatile memory for storage of data and/or operational instructions of applications and/or of the operating system. The central processing module 39 includes a plurality of processing modules 44-1 through 44-$n$ and an associated one or more cache memory 45. A processing module is as defined at the end of the detailed description.

The disk memory 38 includes a plurality of memory interface modules 43-1 through 43-$n$ and a plurality of memory devices 42-1 through 42-$n$ (e.g., non-volatile memory). The memory devices 42-1 through 42-$n$ include, but are not limited to, solid state memory, disk drive memory, cloud storage memory, and other non-volatile memory. For each type of memory device, a different memory interface module 43-1 through 43-$n$ is used. For example, solid state memory uses a standard, or serial, ATA (SATA), variation, or extension thereof, as its memory interface. As another example, disk drive memory devices use a small computer system interface (SCSI), variation, or extension thereof, as its memory interface.

In an embodiment, the disk memory 38 includes a plurality of solid state memory devices and corresponding memory interface modules. In another embodiment, the disk memory 38 includes a plurality of solid state memory devices, a plurality of disk memories, and corresponding memory interface modules.

The network connection 41 includes a plurality of network interface modules 46-1 through 46-$n$ and a plurality of network cards 47-1 through 47-$n$. A network card includes a wireless LAN (WLAN) device (e.g., an IEEE 802.11n or another protocol), a LAN device (e.g., Ethernet), a cellular device (e.g., CDMA), etc. The corresponding network interface modules 46-1 through 46-$n$ include a software driver for the corresponding network card and a physical connection that couples the network card to the central processing module 39 or other component(s) of the node.

The connections between the central processing module 39, the main memory 40, the disk memory 38, and the network connection 41 may be implemented in a variety of ways. For example, the connections are made through a node controller (e.g., a local version of the computing device controller hub 36). As another example, the connections are made through the computing device controller hub 36.

Figure 11:
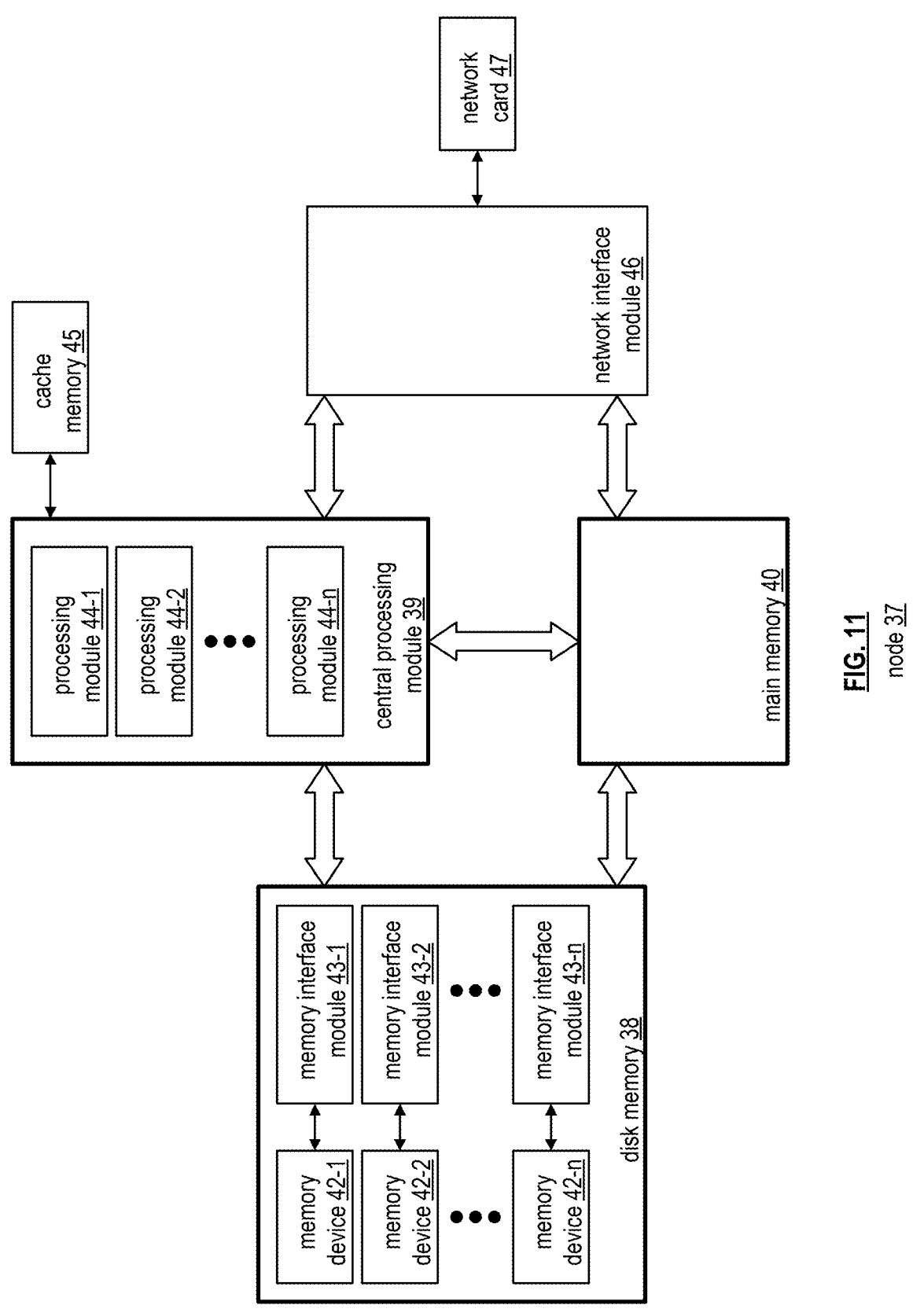
FIG. 11 is a schematic block diagram of an embodiment of a node of a computing device in accordance with various embodiments.

FIG. 11 is a schematic block diagram of an embodiment of a node 37 of a computing device 18 that is similar to the node of FIG. 10, with a difference in the network connection. In this embodiment, the node 37 includes a single network interface module 46 and a corresponding network card 47 configuration.

Figure 12:
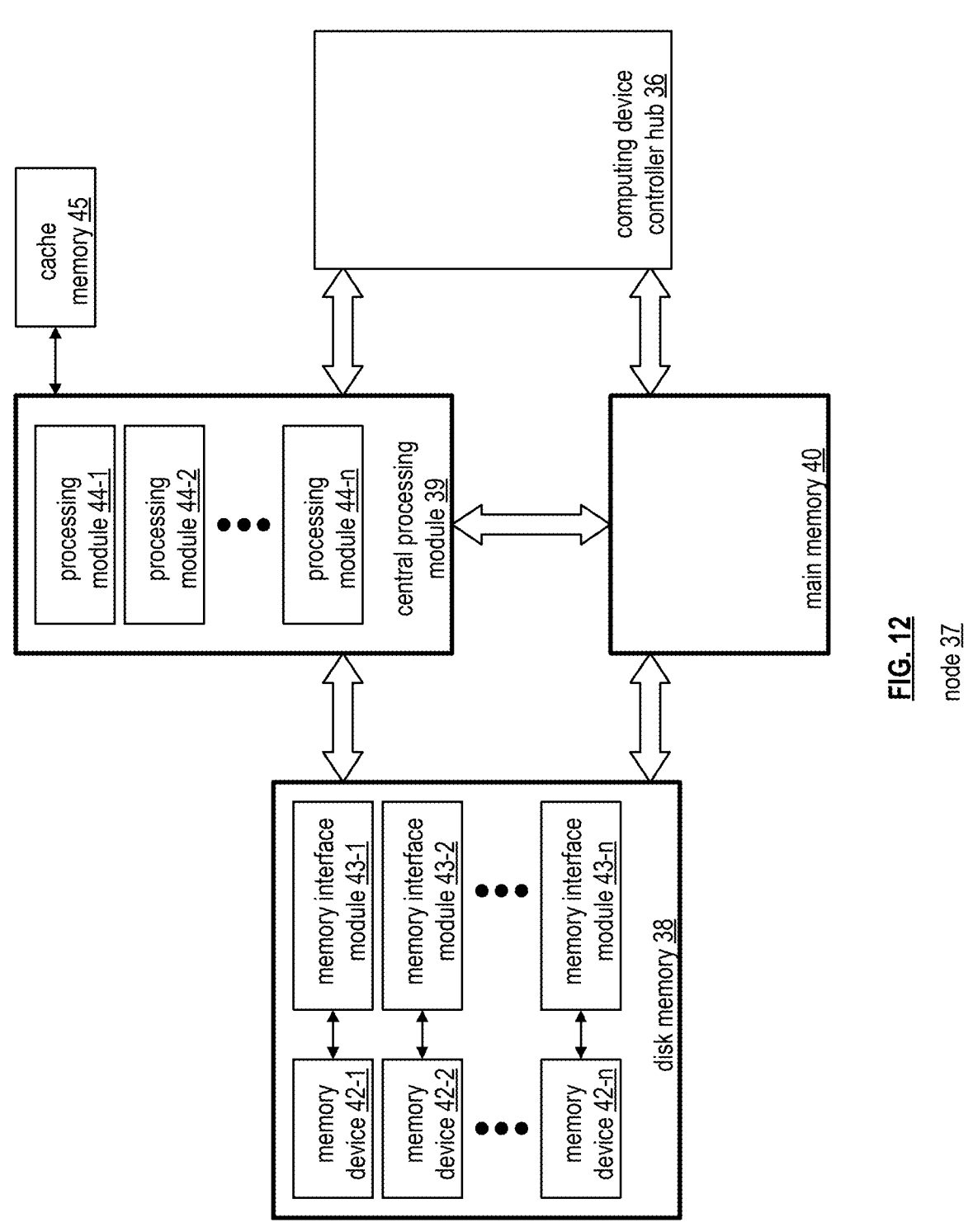
FIG. 12 is a schematic block diagram of an embodiment of a node of a computing device in accordance with various embodiments.

FIG. 12 is a schematic block diagram of an embodiment of a node 37 of a computing device 18 that is similar to the node of FIG. 10, with a difference in the network connection. In this embodiment, the node 37 connects to a network connection via the computing device controller hub 36.

Figure 13:
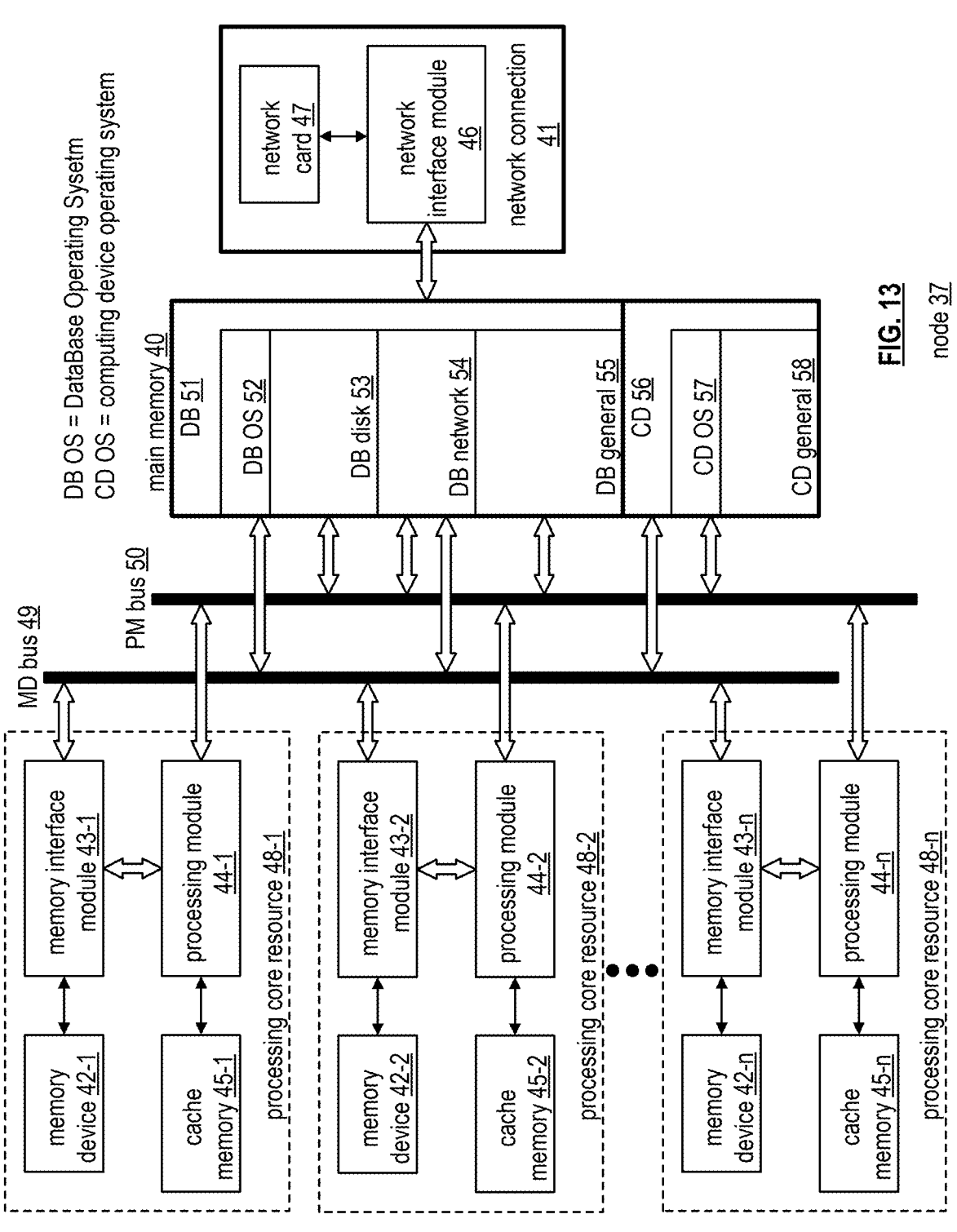
FIG. 13 is a schematic block diagram of an embodiment of a node of a computing device in accordance with various embodiments.

FIG. 13 is a schematic block diagram of another embodiment of a node 37 of computing device 18 that includes processing core resources 48-1 through 48-$n$, a memory device (MD) bus 49, a processing module (PM) bus 50, a main memory 40 and a network connection 41. The network connection 41 includes the network card 47 and the network interface module 46 of FIG. 10. Each processing core resource 48 includes a corresponding processing module 44-1 through 44-$n$, a corresponding memory interface module 43-1 through 43-$n$, a corresponding memory device 42-1 through 42-$n$, and a corresponding cache memory 45-1 through 45-$n$. In this configuration, each processing core resource can operate independently of the other processing core resources. This further supports increased parallel operation of database functions to further reduce execution time.

The main memory 40 is divided into a computing device (CD) 56 section and a database (DB) 51 section. The database section includes a database operating system (OS) area 52, a disk area 53, a network area 54, and a general area 55. The computing device section includes a computing device operating system (OS) area 57 and a general area 58. Note that each section could include more or less allocated areas for various tasks being executed by the database system.

In general, the database OS 52 allocates main memory for database operations. Once allocated, the computing device OS 57 cannot access that portion of the main memory 40. This supports lock free and independent parallel execution of one or more operations.

Figure 14:
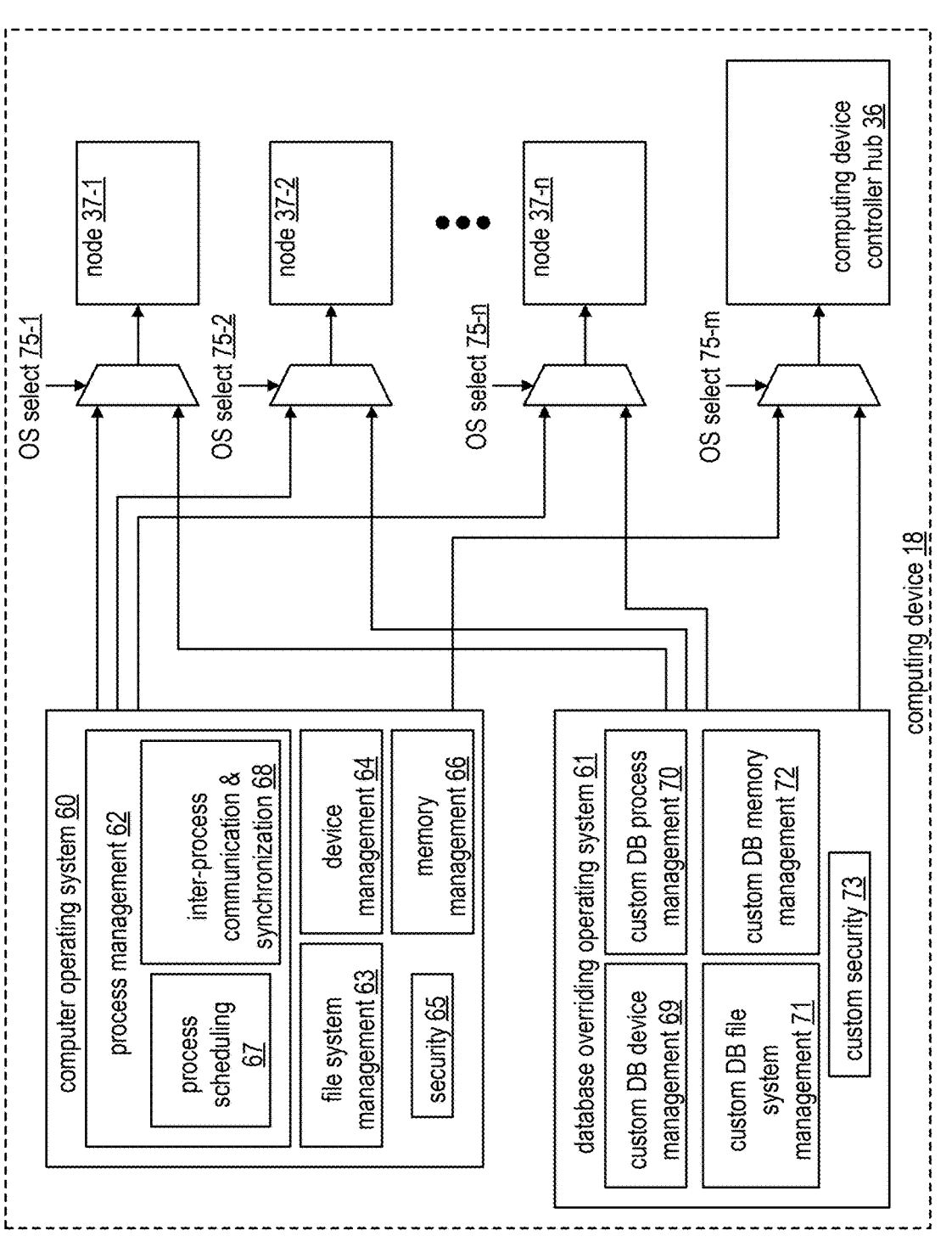
FIG. 14 is a schematic block diagram of an embodiment of operating systems of a computing device in accordance with various embodiments.

FIG. 14 is a schematic block diagram of an embodiment of operating systems of a computing device 18. The computing device 18 includes a computer operating system 60 and a database overriding operating system (DB OS) 61. The computer OS 60 includes process management 62, file system management 63, device management 64, memory management 66, and security 65. The processing management 62 generally includes process scheduling 67 and inter-process communication and synchronization 68. In general, the computer OS 60 is a conventional operating system used by a variety of types of computing devices. For example, the computer operating system is a personal computer operating system, a server operating system, a tablet operating system, a cell phone operating system, etc.

The database overriding operating system (DB OS) 61 includes custom DB device management 69, custom DB process management 70 (e.g., process scheduling and/or inter-process communication & synchronization), custom DB file system management 71, custom DB memory management 72, and/or custom security 73. In general, the database overriding OS 61 provides hardware components of a node for more direct access to memory, more direct access to a network connection, improved independency, improved data storage, improved data retrieval, and/or improved data processing than the computing device OS.

In an example of operation, the database overriding OS 61 controls which operating system, or portions thereof, operate with each node and/or computing device controller hub of a computing device (e.g., via OS select 75-1 through 75-n when communicating with nodes 37-1 through 37-n and via OS select 75-m when communicating with the computing device controller hub 36). For example, device management of a node is supported by the computer operating system, while process management, memory management, and file system management are supported by the database overriding operating system. To override the computer OS, the database overriding OS provides instructions to the computer OS regarding which management tasks will be controlled by the database overriding OS. The database overriding OS also provides notification to the computer OS as to which sections of the main memory it is reserving exclusively for one or more database functions, operations, and/or tasks. One or more examples of the database overriding operating system are provided in subsequent figures.

The database system 10 can be implemented as a massive scale database system that is operable to process data at a massive scale. As used herein, a massive scale refers to a massive number of records of a single dataset and/or many datasets, such as millions, billions, and/or trillions of records that collectively include many Gigabytes, Terabytes, Petabytes, and/or Exabytes of data. As used herein, a massive scale database system refers to a database system operable to process data at a massive scale. The processing of data at this massive scale can be achieved via a large number, such as hundreds, thousands, and/or millions of computing devices 18, nodes 37, and/or processing core resources 48 performing various functionality of database system 10 described herein in parallel, for example, independently and/or without coordination.

Such processing of data at this massive scale cannot practically be performed by the human mind. In particular, the human mind is not equipped to perform processing of data at a massive scale. Furthermore, the human mind is not equipped to perform hundreds, thousands, and/or millions of independent processes in parallel, within overlapping time spans. The embodiments of database system 10 discussed herein improves the technology of database systems by enabling data to be processed at a massive scale efficiently and/or reliably.

In particular, the database system 10 can be operable to receive data and/or to store received data at a massive scale. For example, the parallelized input and/or storing of data by the database system 10 achieved by utilizing the parallelized data input sub-system 11 and/or the parallelized data store, retrieve, and/or process sub-system 12 can cause the database system 10 to receive records for storage at a massive scale, where millions, billions, and/or trillions of records that collectively include many Gigabytes, Terabytes, Petabytes, and/or Exabytes can be received for storage, for example, reliably, redundantly and/or with a guarantee that no received records are missing in storage and/or that no received records are duplicated in storage. This can include processing real-time and/or near-real time data streams from one or more data sources at a massive scale based on facilitating ingress of these data streams in parallel. To meet the data rates required by these one or more real-time data streams, the processing of incoming data streams can be distributed across hundreds, thousands, and/or millions of computing devices 18, nodes 37, and/or processing core resources 48 for separate, independent processing with minimal and/or no coordination. The processing of incoming data streams for storage at this scale and/or this data rate cannot practically be performed by the human mind. The processing of incoming data streams for storage at this scale and/or this data rate improves database system by enabling greater amounts of data to be stored in databases for analysis and/or by enabling real-time data to be stored and utilized for analysis. The resulting richness of data stored in the database system can improve the technology of database systems by improving the depth and/or insights of various data analyses performed upon this massive scale of data.

Additionally, the database system 10 can be operable to perform queries upon data at a massive scale. For example, the parallelized retrieval and processing of data by the database system 10 achieved by utilizing the parallelized query and results sub-system 13 and/or the parallelized data store, retrieve, and/or process sub-system 12 can cause the database system 10 to retrieve stored records at a massive scale and/or to and/or filter, aggregate, and/or perform query operators upon records at a massive scale in conjunction with query execution, where millions, billions, and/or trillions of records that collectively include many Gigabytes, Terabytes, Petabytes, and/or Exabytes can be accessed and processed in accordance with execution of one or more queries at a given time, for example, reliably, redundantly and/or with a guarantee that no records are inadvertently missing from representation in a query resultant and/or duplicated in a query resultant. To execute a query against a massive scale of records in a reasonable amount of time such as a small number of seconds, minutes, or hours, the processing of a given query can be distributed across hundreds, thousands, and/or millions of computing devices 18, nodes 37, and/or processing core resources 48 for separate, independent processing with minimal and/or no coordination. The processing of queries at this massive scale and/or this data rate cannot practically be performed by the human mind. The processing of queries at this massive scale improves the technology of database systems by facilitating greater depth and/or insights of query resultants for queries performed upon this massive scale of data.

Furthermore, the database system 10 can be operable to perform multiple queries concurrently upon data at a massive scale. For example, the parallelized retrieval and processing of data by the database system 10 achieved by utilizing the parallelized query and results sub-system 13 and/or the parallelized data store, retrieve, and/or process sub-system 12 can cause the database system 10 to perform multiple queries concurrently, for example, in parallel, against data at this massive scale, where hundreds and/or thousands of queries can be performed against the same, massive scale dataset within a same time frame and/or in overlapping time frames. To execute multiple concurrent queries against a massive scale of records in a reasonable amount of time such as a small number of seconds, minutes, or hours, the processing of a multiple queries can be distributed across hundreds, thousands, and/or millions of computing devices 18, nodes 37, and/or processing core resources 48 for separate, independent processing with minimal and/or no coordination. A given computing devices 18, nodes 37, and/or processing core resources 48 may be responsible for participating in execution of multiple queries at a same time and/or within a given time frame, where its execution of different queries occurs within overlapping time frames. The processing of many concurrent queries at this massive scale and/or this data rate cannot practically be performed by the human mind. The processing of concurrent queries improves the technology of database systems by facilitating greater numbers of users and/or greater numbers of analyses to be serviced within a given time frame and/or over time.

Figure 15:
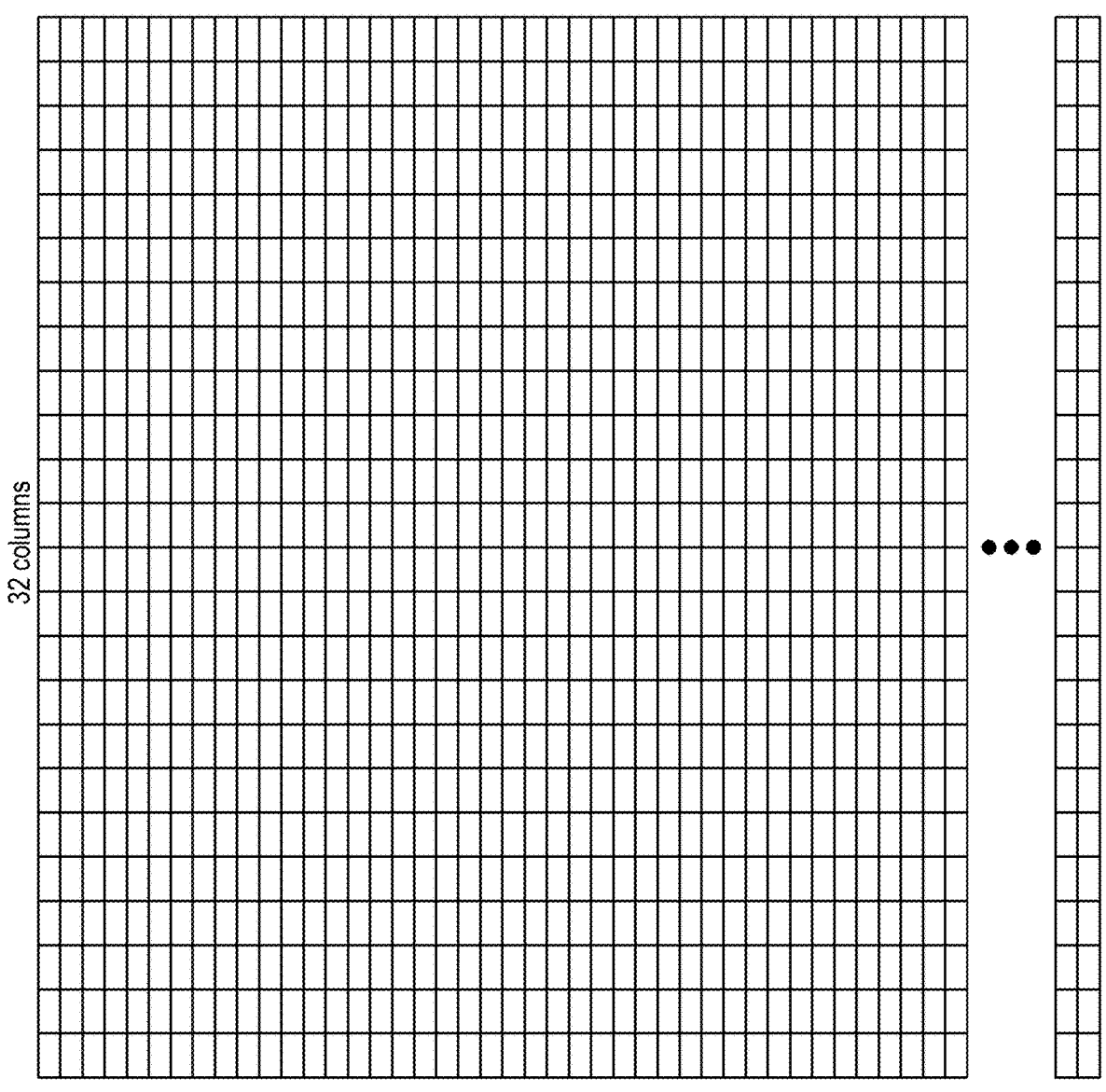

FIGS. 15-23 are schematic block diagrams of an example of processing a table or data set for storage in the database system 10. FIG. 15 illustrates an example of a data set or table that includes 32 columns and 80 rows, or records, that is received by the parallelized data input-subsystem. This is a very small table, but is sufficient for illustrating one or more concepts regarding one or more aspects of a database system. The table is representative of a variety of data ranging from insurance data, to financial data, to employee data, to medical data, and so on.

Figure 16:
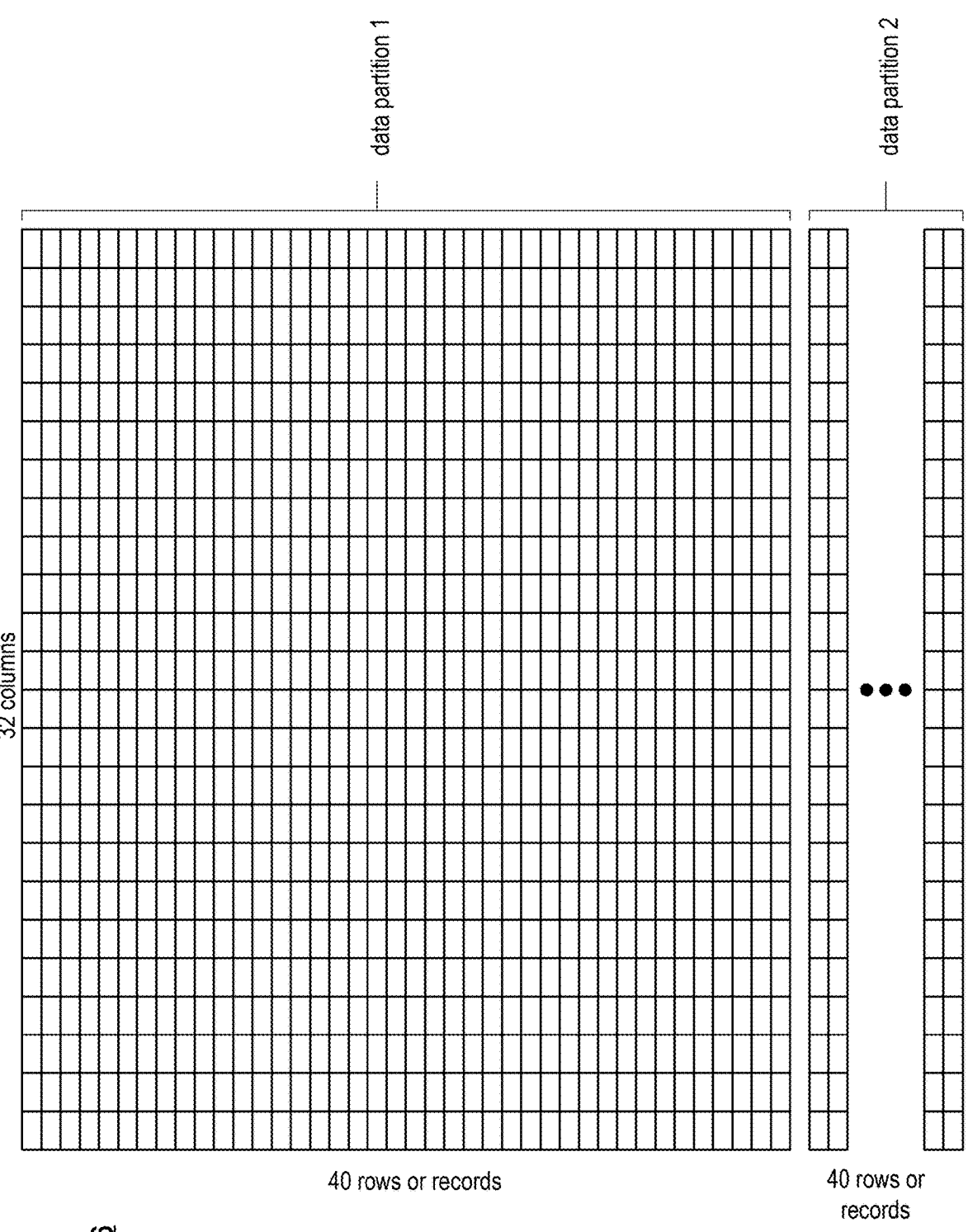

FIG. 16 illustrates an example of the parallelized data input-subsystem dividing the data set into two partitions. Each of the data partitions includes 40 rows, or records, of the data set. In another example, the parallelized data input-subsystem divides the data set into more than two partitions. In yet another example, the parallelized data input-subsystem divides the data set into many partitions and at least two of the partitions have a different number of rows.

Figure 17:
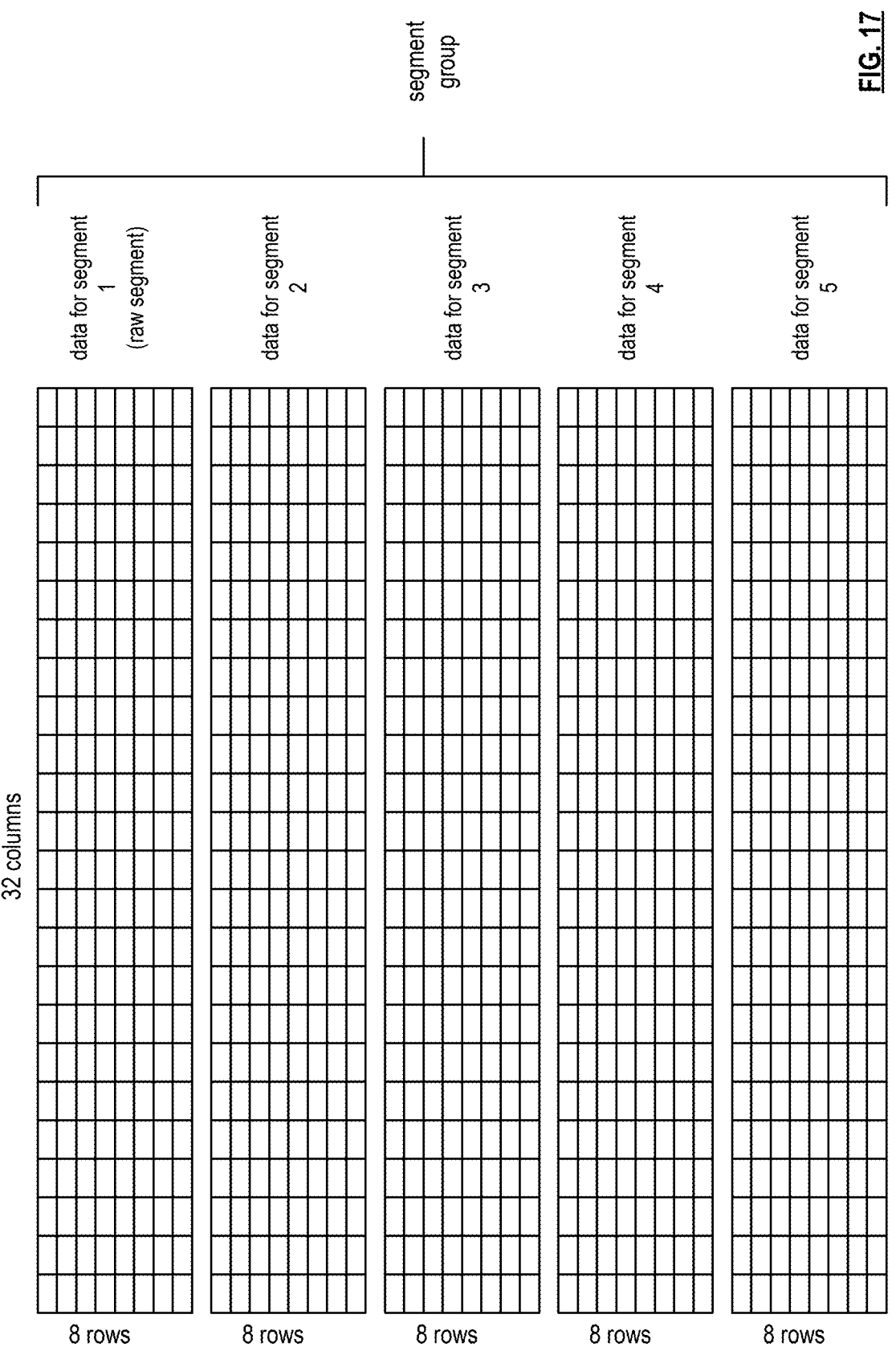

FIG. 17 illustrates an example of the parallelized data input-subsystem dividing a data partition into a plurality of segments to form a segment group. The number of segments in a segment group is a function of the data redundancy encoding. In this example, the data redundancy encoding is single parity encoding from four data pieces; thus, five segments are created. In another example, the data redundancy encoding is a two parity encoding from four data pieces; thus, six segments are created. In yet another example, the data redundancy encoding is single parity encoding from seven data pieces; thus, eight segments are created.

Figures 18, 19, 20:
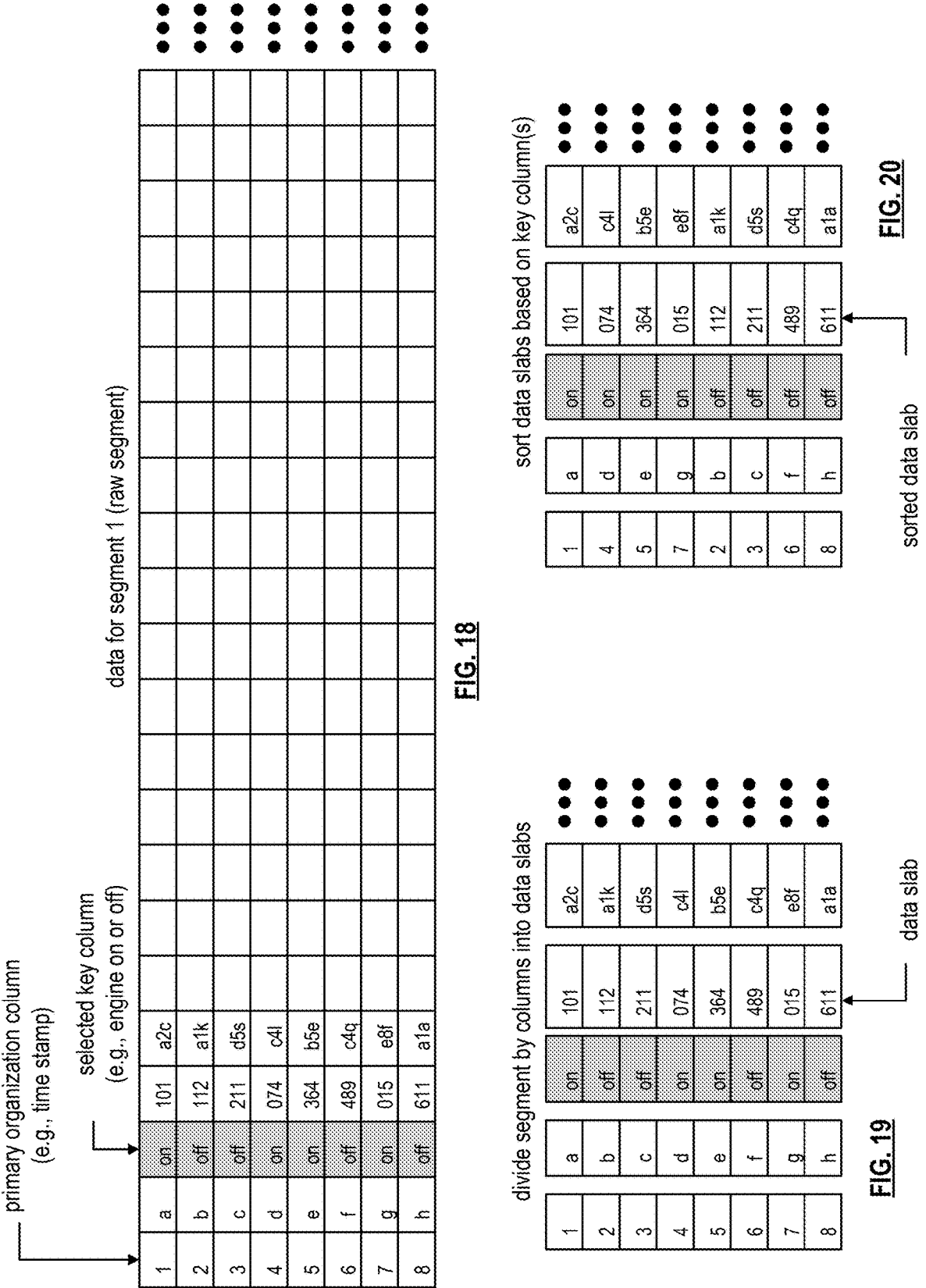

FIG. 18 illustrates an example of data for segment 1 of the segments of FIG. 17. The segment is in a raw form since it has not yet been key column sorted. As shown, segment 1 includes 8 rows and 32 columns. The third column is selected as the key column and the other columns store various pieces of information for a given row (i.e., a record). The key column may be selected in a variety of ways. For example, the key column is selected based on a type of query (e.g., a query regarding a year, where a data column is selected as the key column). As another example, the key column is selected in accordance with a received input command that identified the key column. As yet another example, the key column is selected as a default key column (e.g., a date column, an ID column, etc.)

As an example, the table is regarding a fleet of vehicles. Each row represents data regarding a unique vehicle. The first column stores a vehicle ID, the second column stores make and model information of the vehicle. The third column stores data as to whether the vehicle is on or off. The remaining columns store data regarding the operation of the vehicle such as mileage, gas level, oil level, maintenance information, routes taken, etc.

With the third column selected as the key column, the other columns of the segment are to be sorted based on the key column. Prior to being sorted, the columns are separated to form data slabs. As such, one column is separated out to form one data slab.

FIG. 19 illustrates an example of the parallelized data input-subsystem dividing segment 1 of FIG. 18 into a plurality of data slabs. A data slab is a column of segment 1. In this figure, the data of the data slabs has not been sorted. Once the columns have been separated into data slabs, each data slab is sorted based on the key column. Note that more than one key column may be selected and used to sort the data slabs based on two or more other columns.

FIG. 20 illustrates an example of the parallelized data input-subsystem sorting the each of the data slabs based on the key column. In this example, the data slabs are sorted based on the third column which includes data of "on" or "off". The rows of a data slab are rearranged based on the key column to produce a sorted data slab. Each segment of the segment group is divided into similar data slabs and sorted by the same key column to produce sorted data slabs.

Figure 21:
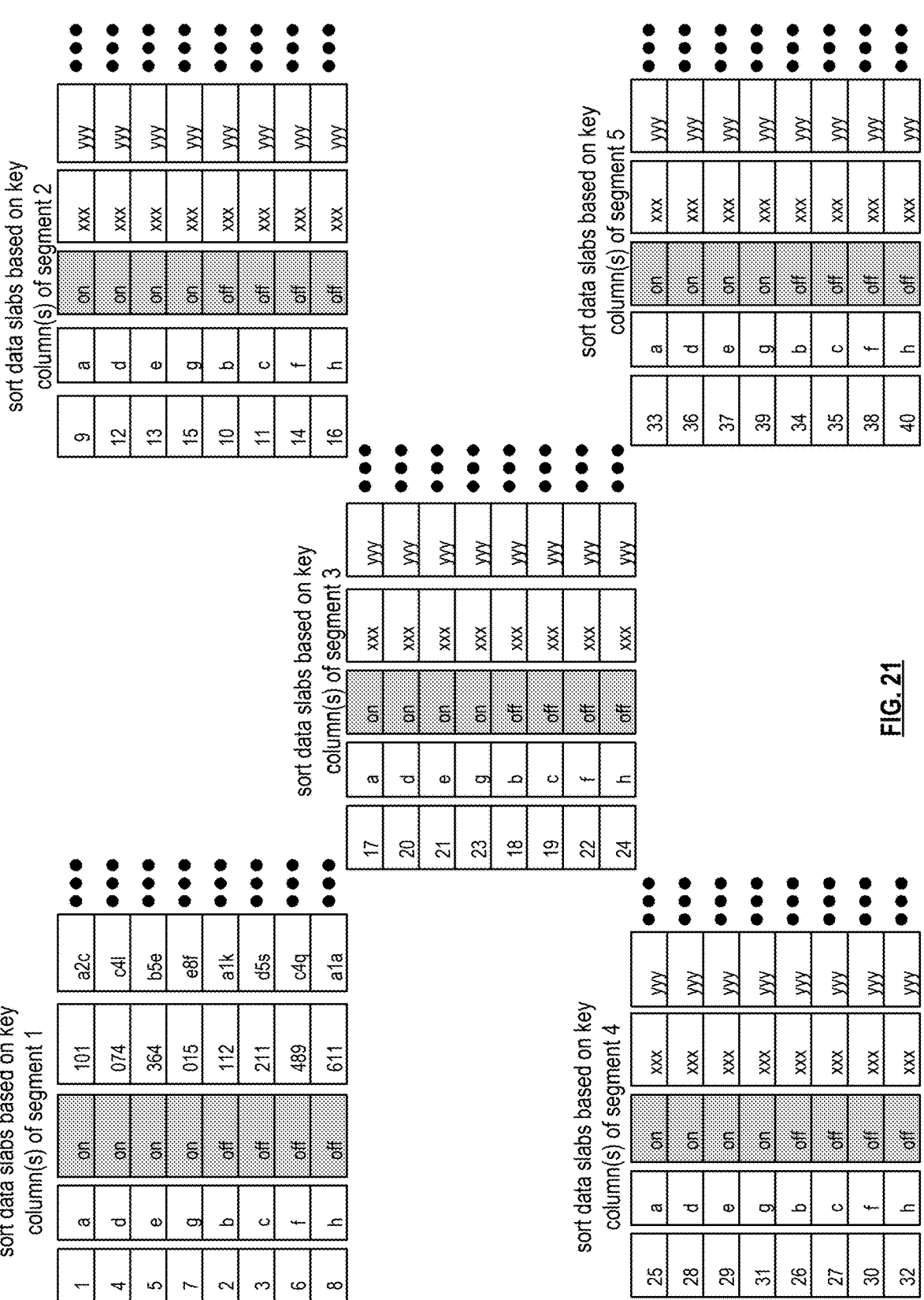

FIG. 21 illustrates an example of each segment of the segment group sorted into sorted data slabs. The similarity of data from segment to segment is for the convenience of illustration. Note that each segment has its own data, which may or may not be similar to the data in the other sections.

Figure 22:
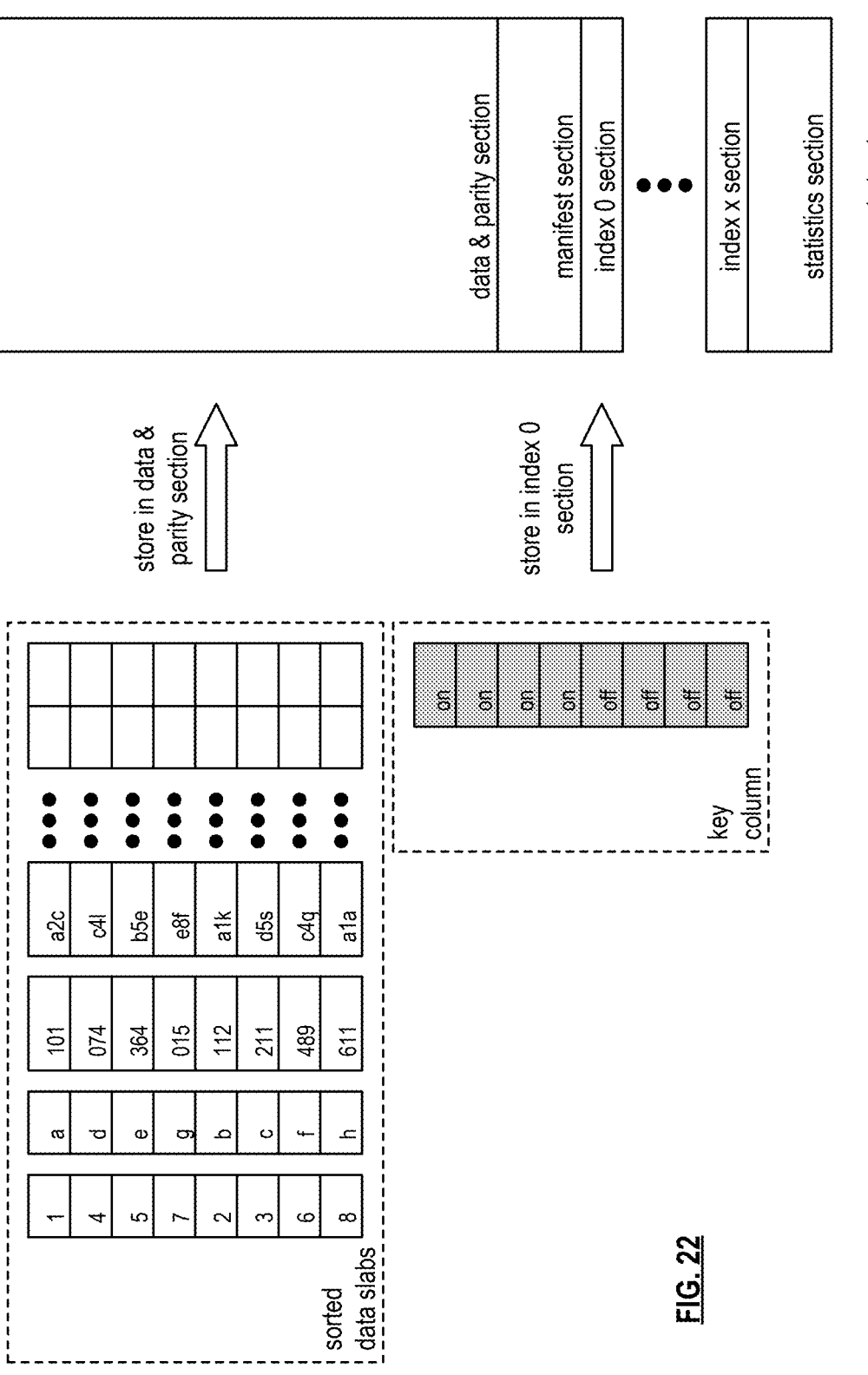

FIG. 22 illustrates an example of a segment structure for a segment of the segment group. The segment structure for a segment includes the data & parity section, a manifest section, one or more index sections, and a statistics section. The segment structure represents a storage mapping of the data (e.g., data slabs and parity data) of a segment and associated data (e.g., metadata, statistics, key column(s), etc.) regarding the data of the segment. The sorted data slabs of FIG. 16 of the segment are stored in the data & parity section of the segment structure. The sorted data slabs are stored in the data & parity section in a compressed format or as raw data (i.e., non-compressed format). Note that a segment structure has a particular data size (e.g., 32 Giga-Bytes) and data is stored within coding block sizes (e.g., 4 Kilo-Bytes).

Before the sorted data slabs are stored in the data & parity section, or concurrently with storing in the data & parity section, the sorted data slabs of a segment are redundancy encoded. The redundancy encoding may be done in a variety of ways. For example, the redundancy encoding is in accordance with RAID 5, RAID 6, or RAID 10. As another example, the redundancy encoding is a form of forward error encoding (e.g., Reed Solomon, Trellis, etc.). As another example, the redundancy encoding utilizes an erasure coding scheme.

The manifest section stores metadata regarding the sorted data slabs. The metadata includes one or more of, but is not limited to, descriptive metadata, structural metadata, and/or administrative metadata. Descriptive metadata includes one or more of, but is not limited to, information regarding data such as name, an abstract, keywords, author, etc. Structural metadata includes one or more of, but is not limited to, structural features of the data such as page size, page ordering, formatting, compression information, redundancy encoding information, logical addressing information, physical addressing information, physical to logical addressing information, etc. Administrative metadata includes one or more of, but is not limited to, information that aids in managing data such as file type, access privileges, rights management, preservation of the data, etc.

The key column is stored in an index section. For example, a first key column is stored in index #0. If a second key column exists, it is stored in index #1. As such, for each key column, it is stored in its own index section. Alternatively, one or more key columns are stored in a single index section.

The statistics section stores statistical information regarding the segment and/or the segment group. The statistical information includes one or more of, but is not limited, to number of rows (e.g., data values) in one or more of the sorted data slabs, average length of one or more of the sorted data slabs, average row size (e.g., average size of a data value), etc. The statistical information includes information regarding raw data slabs, raw parity data, and/or compressed data slabs and parity data.

Figure 23:
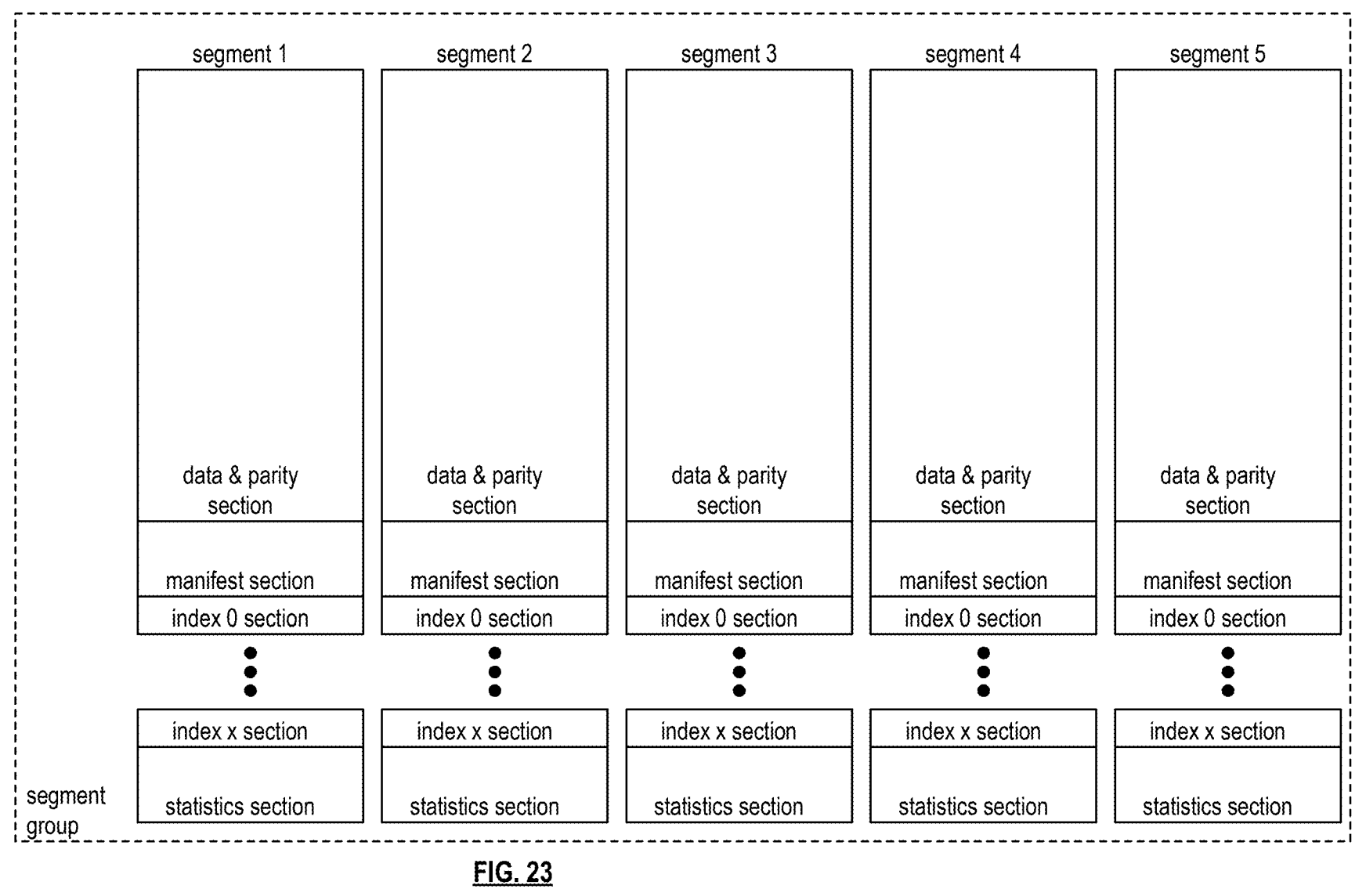

FIG. 23 illustrates the segment structures for each segment of a segment group having five segments. Each segment includes a data & parity section, a manifest section, one or more index sections, and a statistic section. Each segment is targeted for storage in a different computing device of a storage cluster. The number of segments in the segment group corresponds to the number of computing devices in a storage cluster. In this example, there are five computing devices in a storage cluster. Other examples include more or less than five computing devices in a storage cluster.

Figure 24A:
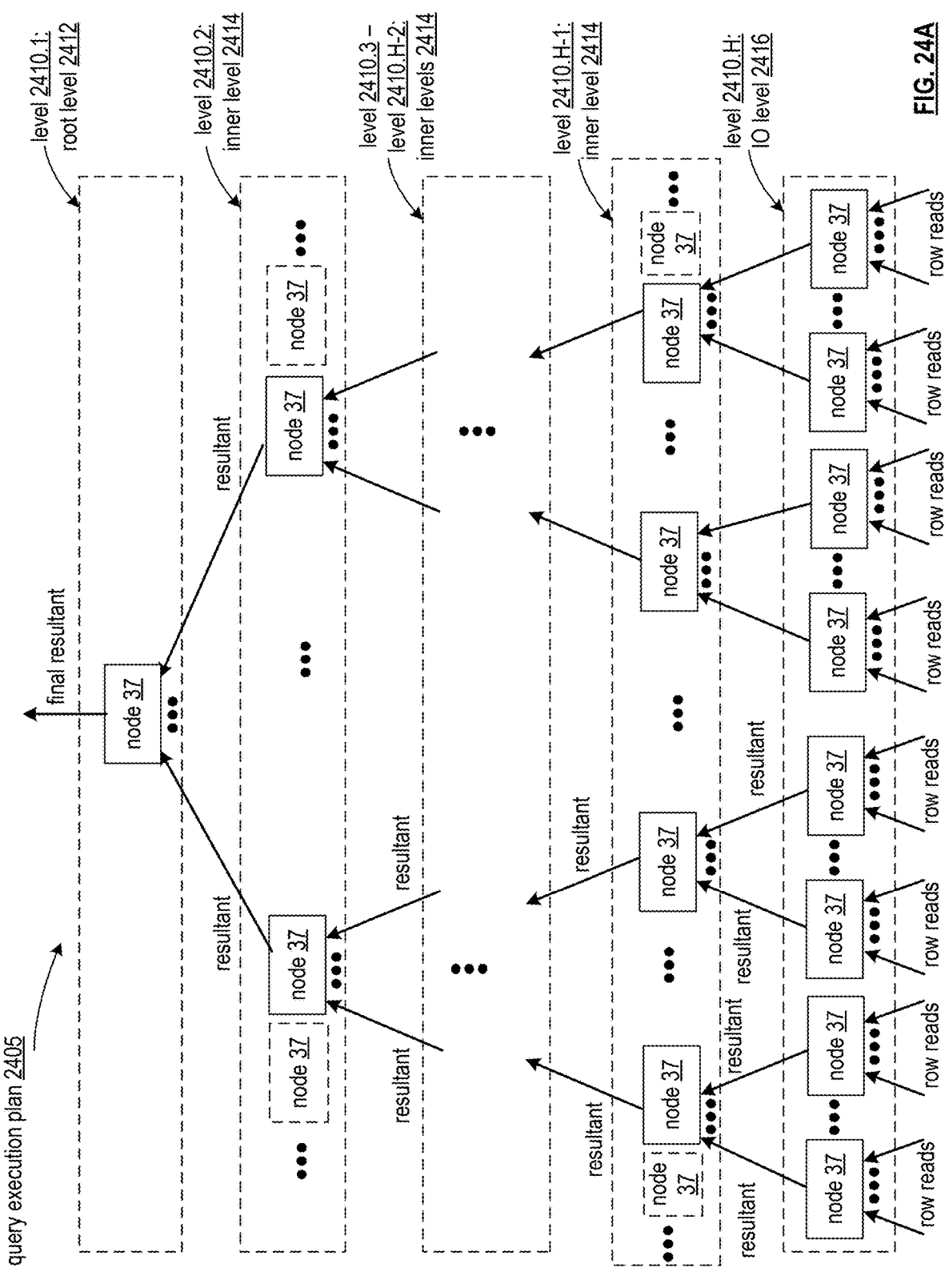
FIG. 24A is a schematic block diagram of a query execution plan implemented via a plurality of nodes in accordance with various embodiments.

FIG. 24A illustrates an example of a query execution plan 2405 implemented by the database system 10 to execute one or more queries by utilizing a plurality of nodes 37. Each node 37 can be utilized to implement some or all of the plurality of nodes 37 of some or all computing devices 18-1-18-$n$, for example, of the of the parallelized data store, retrieve, and/or process sub-system 12, and/or of the parallelized query and results sub-system 13. The query execution plan can include a plurality of levels 2410. In this example, a plurality of H levels in a corresponding tree structure of the query execution plan 2405 are included. The plurality of levels can include a top, root level 2412; a bottom, IO level 2416, and one or more inner levels 2414. In some embodiments, there is exactly one inner level 2414, resulting in a tree of exactly three levels 2410.1, 2410.2, and 2410.3, where level 2410.H corresponds to level 2410.3. In such embodiments, level 2410.2 is the same as level 2410.H−1, and there are no other inner levels 2410.3-2410.H−2. Alternatively, any number of multiple inner levels 2414 can be implemented to result in a tree with more than three levels.

This illustration of query execution plan 2405 illustrates the flow of execution of a given query by utilizing a subset of nodes across some or all of the levels 2410. In this illustration, nodes 37 with a solid outline are nodes involved in executing a given query. Nodes 37 with a dashed outline are other possible nodes that are not involved in executing the given query, but could be involved in executing other queries in accordance with their level of the query execution plan in which they are included.

Each of the nodes of IO level 2416 can be operable to, for a given query, perform the necessary row reads for gathering corresponding rows of the query. These row reads can correspond to the segment retrieval to read some or all of the rows of retrieved segments determined to be required for the given query. Thus, the nodes 37 in level 2416 can include any nodes 37 operable to retrieve segments for query execution from its own storage or from storage by one or more other nodes; to recover segment for query execution via other segments in the same segment grouping by utilizing the redundancy error encoding scheme; and/or to determine which exact set of segments is assigned to the node for retrieval to ensure queries are executed correctly.

IO level 2416 can include all nodes in a given storage cluster 35 and/or can include some or all nodes in multiple storage clusters 35, such as all nodes in a subset of the storage clusters 35-1-35-$z$ and/or all nodes in all storage clusters 35-1-35-$z$. For example, all nodes 37 and/or all currently available nodes 37 of the database system 10 can be included in level 2416. As another example, IO level 2416 can include a proper subset of nodes in the database system, such as some or all nodes that have access to stored segments and/or that are included in a segment set. In some cases, nodes 37 that do not store segments included in segment sets, that do not have access to stored segments, and/or that are not operable to perform row reads are not included at the IO level, but can be included at one or more inner levels 2414 and/or root level 2412.

The query executions discussed herein by nodes in accordance with executing queries at level 2416 can include retrieval of segments; extracting some or all necessary rows from the segments with some or all necessary columns; and sending these retrieved rows to a node at the next level 2410.H−1 as the query resultant generated by the node 37. For each node 37 at IO level 2416, the set of raw rows retrieved by the node 37 can be distinct from rows retrieved from all other nodes, for example, to ensure correct query execution. The total set of rows and/or corresponding columns retrieved by nodes 37 in the IO level for a given query can be dictated based on the domain of the given query, such as one or more tables indicated in one or more SELECT statements of the query, and/or can otherwise include all data blocks that are necessary to execute the given query.

Each inner level 2414 can include a subset of nodes 37 in the database system 10. Each level 2414 can include a distinct set of nodes 37 and/or some or more levels 2414 can include overlapping sets of nodes 37. The nodes 37 at inner levels are implemented, for each given query, to execute queries in conjunction with operators for the given query. For example, a query operator execution flow can be generated for a given incoming query, where an ordering of execution of its operators is determined (e.g. as an acyclic directed graph of operators), and this ordering is utilized to assign one or more operators of the query operator execution flow to each node in a given inner level 2414 for execution. For example, each node at a same inner level can be operable to execute a same set of operators for a given query, in response to being selected to execute the given query, upon incoming resultants generated by nodes at a directly lower level to generate its own resultants sent to a next higher level. In particular, each node at a same inner level can be operable to execute a same portion of a same query operator execution flow for a given query. In cases where there is exactly one inner level, each node selected to execute a query at a given inner level performs some or all of the given query's operators upon the raw rows received as resultants from the nodes at the IO level, such as the entire query operator execution flow and/or the portion of the query operator execution flow performed upon data that has already been read from storage by nodes at the IO level. In some cases, some operators beyond row reads are also performed by the nodes at the IO level. Each node at a given inner level 2414 can further perform a gather function to collect, union, and/or aggregate resultants sent from a previous level, for example, in accordance with one or more corresponding operators of the given query.

The root level 2412 can include exactly one node for a given query that gathers resultants from every node at the top-most inner level 2414. The node 37 at root level 2412 can perform additional query operators of the query and/or can otherwise collect, aggregate, and/or union the resultants from the top-most inner level 2414 to generate the final resultant of the query, which includes the resulting set of rows and/or one or more aggregated values, in accordance with the query, based on being performed on all rows required by the query. The root level node can be selected from a plurality of possible root level nodes, where different root nodes are selected for different queries. Alternatively, the same root node can be selected for all queries.

As depicted in FIG. 24A, resultants are sent by nodes upstream with respect to the tree structure of the query execution plan as they are generated, where the root node generates a final resultant of the query. While not depicted in FIG. 24A, nodes at a same level can share data and/or send resultants to each other, for example, in accordance with operators of the query at this same level dictating that data is sent between nodes.

In some cases, the IO level 2416 always includes the same set of nodes 37, such as a full set of nodes and/or all nodes that are in a storage cluster 35 that stores data required to process incoming queries. In some cases, the lowest inner level corresponding to level 2410.H−1 includes at least one node from the IO level 2416 in the possible set of nodes. In such cases, while each selected node in level 2410.H−1 is depicted to process resultants sent from other nodes 37 in FIG. 24A, each selected node in level 2410.H−1 that also operates as a node at the IO level further performs its own row reads in accordance with its query execution at the IO level, and gathers the row reads received as resultants from other nodes at the IO level with its own row reads for processing via operators of the query. One or more inner levels 2414 can also include nodes that are not included in IO level 2416, such as nodes 37 that do not have access to stored segments and/or that are otherwise not operable and/or selected to perform row reads for some or all queries.

The node 37 at root level 2412 can be fixed for all queries, where the set of possible nodes at root level 2412 includes only one node that executes all queries at the root level of the query execution plan. Alternatively, the root level 2412 can similarly include a set of possible nodes, where one node selected from this set of possible nodes for each query and where different nodes are selected from the set of possible nodes for different queries. In such cases, the nodes at inner level 2410.2 determine which of the set of possible root nodes to send their resultant to. In some cases, the single node or set of possible nodes at root level 2412 is a proper subset of the set of nodes at inner level 2410.2, and/or is a proper subset of the set of nodes at the IO level 2416. In cases where the root node is included at inner level 2410.2, the root node generates its own resultant in accordance with inner level 2410.2, for example, based on multiple resultants received from nodes at level 2410.3, and gathers its resultant that was generated in accordance with inner level 2410.2 with other resultants received from nodes at inner level 2410.2 to ultimately generate the final resultant in accordance with operating as the root level node.

In some cases where nodes are selected from a set of possible nodes at a given level for processing a given query, the selected node must have been selected for processing this query at each lower level of the query execution tree. For example, if a particular node is selected to process a node at a particular inner level, it must have processed the query to generate resultants at every lower inner level and the IO level. In such cases, each selected node at a particular level will always use its own resultant that was generated for processing at the previous, lower level, and will gather this resultant with other resultants received from other child nodes at the previous, lower level. Alternatively, nodes that have not yet processed a given query can be selected for processing at a particular level, where all resultants being gathered are therefore received from a set of child nodes that do not include the selected node.

The configuration of query execution plan 2405 for a given query can be determined in a downstream fashion, for example, where the tree is formed from the root downwards. Nodes at corresponding levels are determined from configuration information received from corresponding parent nodes and/or nodes at higher levels, and can each send configuration information to other nodes, such as their own child nodes, at lower levels until the lowest level is reached. This configuration information can include assignment of a particular subset of operators of the set of query operators that each level and/or each node will perform for the query. The execution of the query is performed upstream in accordance with the determined configuration, where IO reads are performed first, and resultants are forwarded upwards until the root node ultimately generates the query result.

Some or all features and/or functionality of FIG. 24A can be performed via at least one node 37 in conjunction with system metadata applied across a plurality of nodes 37, for example, where at least one node 37 participates in some or all features and/or functionality of FIG. 24A based on receiving and storing the system metadata in local memory of the at least one node 37 as configuration data and/or based on further accessing and/or executing this configuration data to participate in a query execution plan of FIG. 24A as part of its database functionality accordingly. Performance of some or all features and/or functionality of FIG. 24A can optionally change and/or be updated over time, and/or a set of nodes participating in executing some or all features and/or functionality of FIG. 24A can have changing nodes over time, based on the system metadata applied across the plurality of nodes 37 being updated over time, based on nodes on updating their configuration data stored in local memory to reflect changes in the system metadata based on receiving data indicating these changes to the system metadata, and/or based on nodes being added and/or removed from the plurality of nodes over time.

Figure 24B:
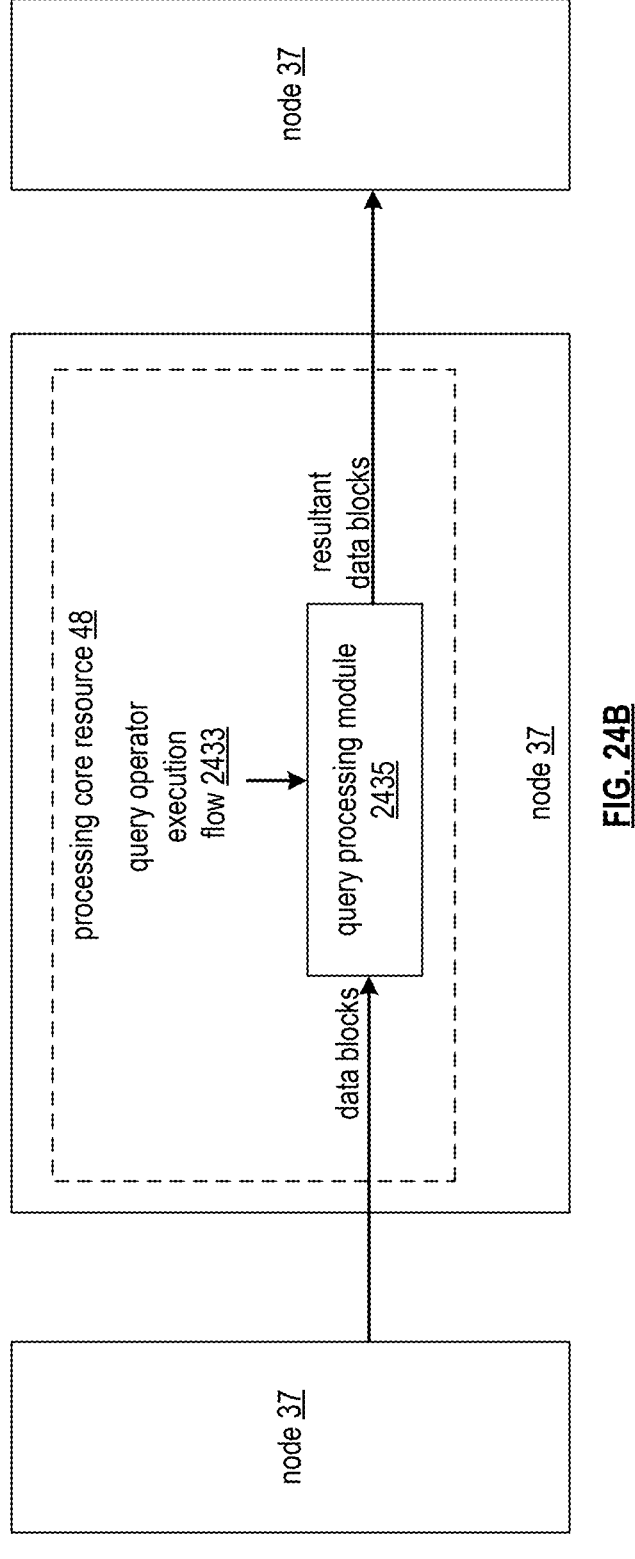
FIGS. 24B-24D are schematic block diagrams of embodiments of a node that implements a query processing module in accordance with various embodiments.

FIG. 24B illustrates an embodiment of a node 37 executing a query in accordance with the query execution plan 2405 by implementing a query processing module 2435. The query processing module 2435 can be operable to execute a query operator execution flow 2433 determined by the node 37, where the query operator execution flow 2433 corresponds to the entirety of processing of the query upon incoming data assigned to the corresponding node 37 in accordance with its role in the query execution plan 2405. This embodiment of node 37 that utilizes a query processing module 2435 can be utilized to implement some or all of the plurality of nodes 37 of some or all computing devices 18-1-18-n, for example, of the of the parallelized data store, retrieve, and/or process sub-system 12, and/or of the parallelized query and results sub-system 13.

As used herein, execution of a particular query by a particular node 37 can correspond to the execution of the portion of the particular query assigned to the particular node in accordance with full execution of the query by the plurality of nodes involved in the query execution plan 2405. This portion of the particular query assigned to a particular node can correspond to execution of a plurality of operators indicated by a query operator execution flow 2433 (e.g. as an acyclic directed graph of operators). In particular, the execution of the query for a node 37 at an inner level 2414 and/or root level 2412 corresponds to generating a resultant by processing all incoming resultants received from nodes at a lower level of the query execution plan 2405 that send their own resultants to the node 37. The execution of the query for a node 37 at the IO level corresponds to generating all resultant data blocks by retrieving and/or recovering all segments assigned to the node 37.

Thus, as used herein, a node 37's full execution of a given query corresponds to only a portion of the query's execution across all nodes in the query execution plan 2405. In particular, a resultant generated by an inner level node 37's execution of a given query may correspond to only a portion of the entire query result, such as a subset of rows in a final result set, where other nodes generate their own resultants to generate other portions of the full resultant of the query. In such embodiments, a plurality of nodes at this inner level can fully execute queries on different portions of the query domain independently in parallel by utilizing the same query operator execution flow 2433. Resultants generated by each of the plurality of nodes at this inner level 2414 can be gathered into a final result of the query, for example, by the node 37 at root level 2412 if this inner level is the top-most inner level 2414 or the only inner level 2414. As another example, resultants generated by each of the plurality of nodes at this inner level 2414 can be further processed via additional operators of a query operator execution flow 2433 being implemented by another node at a consecutively higher inner level 2414 of the query execution plan 2405, where all nodes at this consecutively higher inner level 2414 all execute their own same query operator execution flow 2433.

As discussed in further detail herein, the resultant generated by a node 37 can include a plurality of resultant data blocks generated via a plurality of partial query executions. As used herein, a partial query execution performed by a node corresponds to generating a resultant based on only a subset of the query input received by the node 37. In particular, the query input corresponds to all resultants generated by one or more nodes at a lower level of the query execution plan that send their resultants to the node. However, this query input can correspond to a plurality of input data blocks received over time, for example, in conjunction with the one or more nodes at the lower level processing their own input data blocks received over time to generate their resultant data blocks sent to the node over time. Thus, the resultant generated by a node's full execution of a query can include a plurality of resultant data blocks, where each resultant data block is generated by processing a subset of all input data blocks as a partial query execution upon the subset of all data blocks via the query operator execution flow 2433.

As illustrated in FIG. 24B, the query processing module 2435 can be implemented by a single processing core resource 48 of the node 37. In such embodiments, each one of the processing core resources 48-1-48-n of a same node 37 can be executing at least one query concurrently via their own query processing module 2435, where a single node 37 implements each of set of operator processing modules 2435-1-2435-n via a corresponding one of the set of processing core resources 48-1-48-n. A plurality of queries can be concurrently executed by the node 37, where each of its processing core resources 48 can each independently execute at least one query within a same temporal period by utilizing a corresponding at least one query operator execution flow 2433 to generate at least one query resultant corresponding to the at least one query.

Some or all features and/or functionality of FIG. 24B can be performed via a corresponding node 37 in conjunction with system metadata applied across a plurality of nodes 37 that includes the given node, for example, where the given node 37 participates in some or all features and/or functionality of FIG. 24B based on receiving and storing the system metadata in local memory of given node 37 as configuration data and/or based on further accessing and/or executing this configuration data to process data blocks via a query processing module as part of its database functionality accordingly. Performance of some or all features and/or functionality of FIG. 24B can optionally change and/or be updated over time, based on the system metadata applied across a plurality of nodes 37 that includes the given node being updated over time, and/or based on the given node updating its configuration data stored in local memory to reflect changes in the system metadata based on receiving data indicating these changes to the system metadata.

Figure 24C:
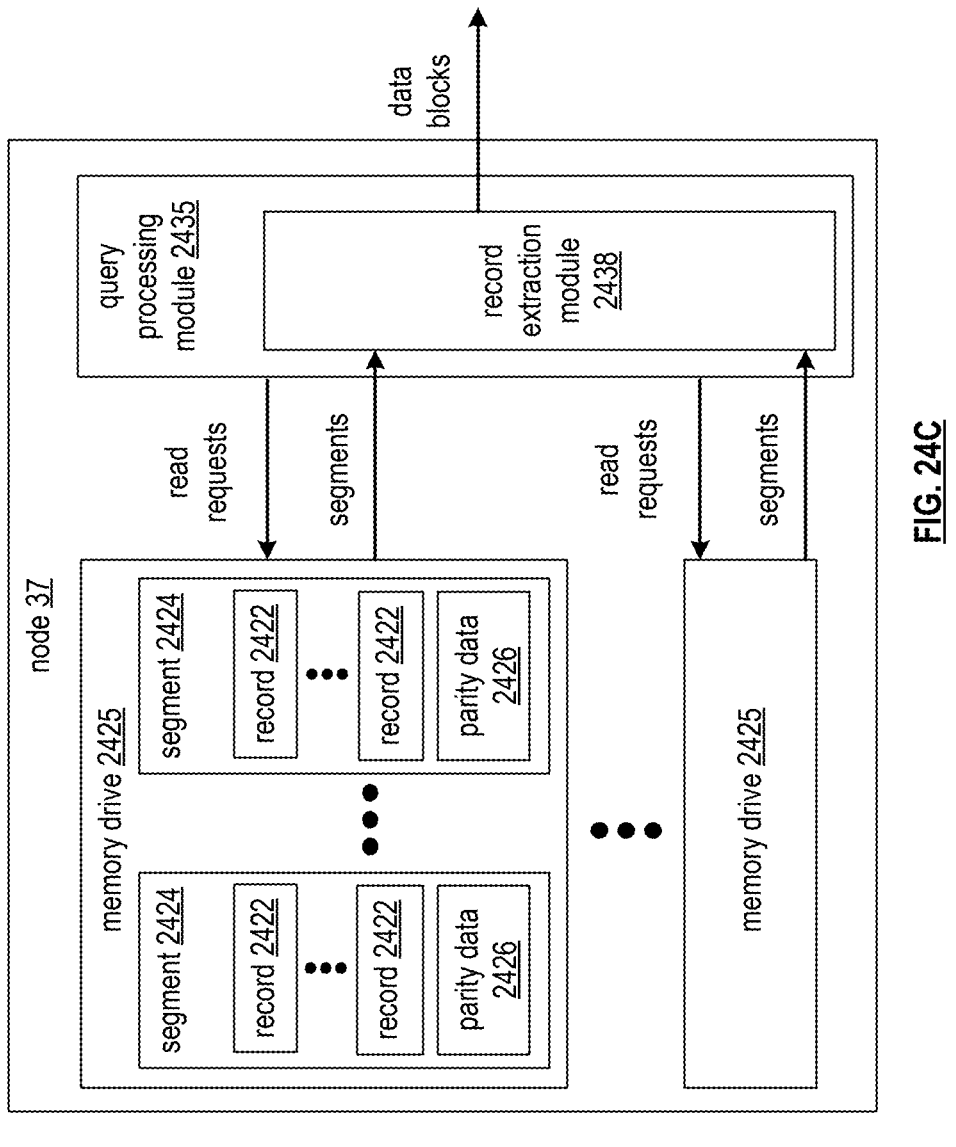

FIG. 24C illustrates a particular example of a node 37 at the IO level 2416 of the query execution plan 2405 of FIG. 24A. A node 37 can utilize its own memory resources, such as some or all of its disk memory 38 and/or some or all of its main memory 40 to implement at least one memory drive 2425 that stores a plurality of segments 2424. Memory drives 2425 of a node 37 can be implemented, for example, by utilizing disk memory 38 and/or main memory 40. In particular, a plurality of distinct memory drives 2425 of a node 37 can be implemented via the plurality of memory devices 42-1-42-n of the node 37's disk memory 38.

Each segment 2424 stored in memory drive 2425 can be generated as discussed previously in conjunction with FIGS. 15-23. A plurality of records 2422 can be included in and/or extractable from the segment, for example, where the plurality of records 2422 of a segment 2424 correspond to a plurality of rows designated for the particular segment 2424 prior to applying the redundancy storage coding scheme as illustrated in FIG. 17. The records 2422 can be included in data of segment 2424, for example, in accordance with a column-format and/or other structured format. Each segments 2424 can further include parity data 2426 as discussed previously to enable other segments 2424 in the same segment group to be recovered via applying a decoding function associated with the redundancy storage coding scheme, such as a RAID scheme and/or erasure coding scheme, that was utilized to generate the set of segments of a segment group.

Thus, in addition to performing the first stage of query execution by being responsible for row reads, nodes 37 can be utilized for database storage, and can each locally store a set of segments in its own memory drives 2425. In some cases, a node 37 can be responsible for retrieval of only the records stored in its own one or more memory drives 2425 as one or more segments 2424. Executions of queries corresponding to retrieval of records stored by a particular node 37 can be assigned to that particular node 37. In other embodiments, a node 37 does not use its own resources to store segments. A node 37 can access its assigned records for retrieval via memory resources of another node 37 and/or via other access to memory drives 2425, for example, by utilizing system communication resources 14.

The query processing module 2435 of the node 37 can be utilized to read the assigned by first retrieving or otherwise accessing the corresponding redundancy-coded segments 2424 that include the assigned records its one or more memory drives 2425. Query processing module 2435 can include a record extraction module 2438 that is then utilized to extract or otherwise read some or all records from these segments 2424 accessed in memory drives 2425, for example, where record data of the segment is segregated from other information such as parity data included in the segment and/or where this data containing the records is converted into row-formatted records from the column-formatted row data stored by the segment. Once the necessary records of a query are read by the node 37, the node can further utilize query processing module 2435 to send the retrieved records all at once, or in a stream as they are retrieved from memory drives 2425, as data blocks to the next node 37 in the query execution plan 2405 via system communication resources 14 or other communication channels.

Some or all features and/or functionality of FIG. 24C can be performed via a corresponding node 37 in conjunction with system metadata applied across a plurality of nodes 37 that includes the given node, for example, where the given node 37 participates in some or all features and/or functionality of FIG. 24C based on receiving and storing the system metadata in local memory of given node 37 as configuration data and/or based on further accessing and/or executing this configuration data to read segments and/or extract rows from segments via a query processing module as part of its database functionality accordingly. Performance of some or all features and/or functionality of FIG. 24C can optionally change and/or be updated over time, based on the system metadata applied across a plurality of nodes 37 that includes the given node being updated over time, and/or based on the given node updating its configuration data stored in local memory to reflect changes in the system metadata based on receiving data indicating these changes to the system metadata.

Figure 24D:
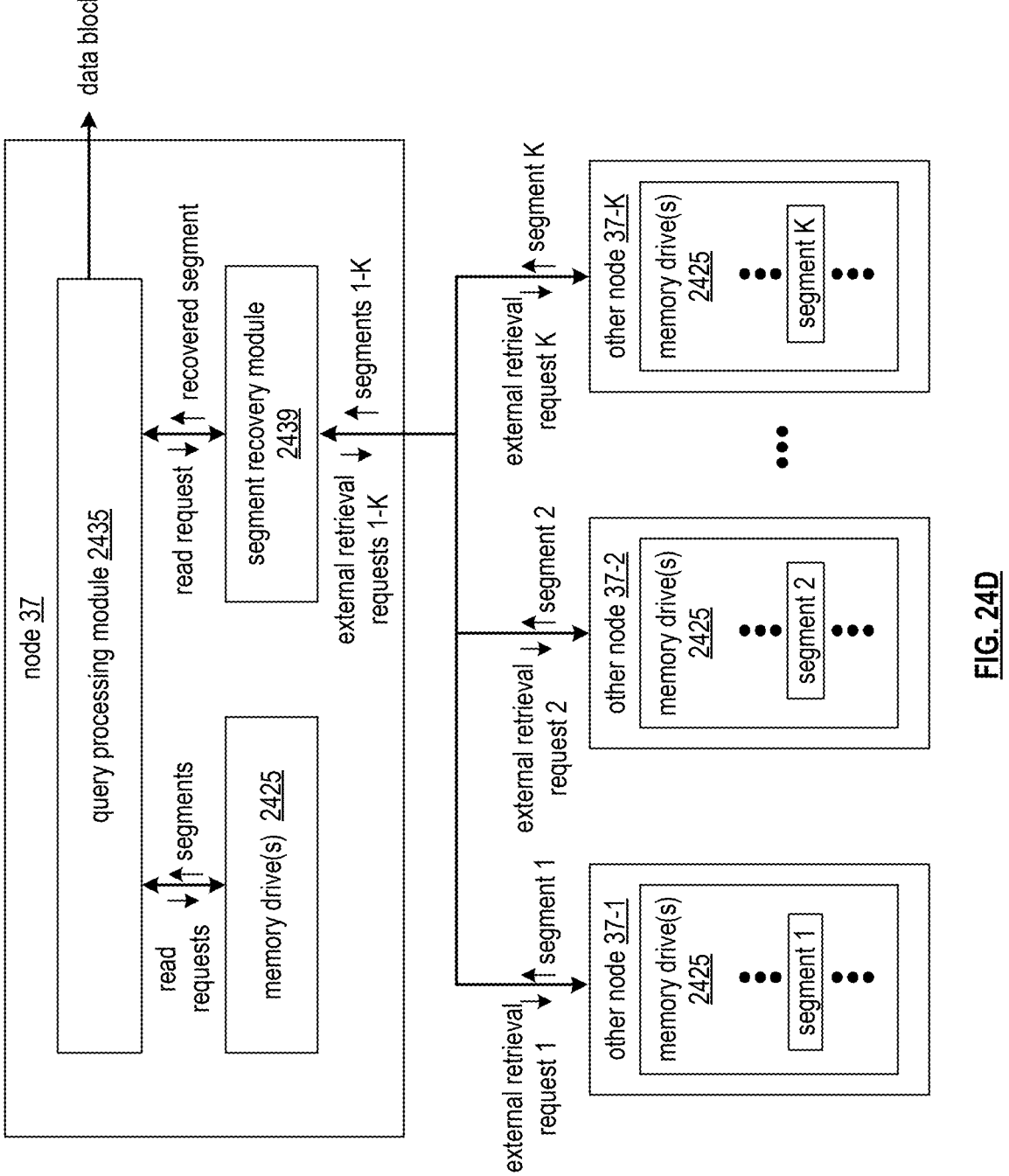

FIG. 24D illustrates an embodiment of a node 37 that implements a segment recovery module 2439 to recover some or all segments that are assigned to the node for retrieval, in accordance with processing one or more queries, that are unavailable. Some or all features of the node 37 of FIG. 24D can be utilized to implement the node 37 of FIGS. 24B and 24C, and/or can be utilized to implement one or more nodes 37 of the query execution plan 2405 of FIG. 24A, such as nodes 37 at the IO level 2416. A node 37 may store segments on one of its own memory drives 2425 that becomes unavailable, or otherwise determines that a segment assigned to the node for execution of a query is unavailable for access via a memory drive the node 37 accesses via system communication resources 14. The segment recovery module 2439 can be implemented via at least one processing module of the node 37, such as resources of central processing module 39. The segment recovery module 2439 can retrieve the necessary number of segments 1-K in the same segment group as an unavailable segment from other nodes 37, such as a set of other nodes 37-1-37-K that store segments in the same storage cluster 35. Using system communication resources 14 or other communication channels, a set of external retrieval requests 1-K for this set of segments 1-K can be sent to the set of other nodes 37-1-37-K, and the set of segments can be received in response. This set of K segments can be processed, for example, where a decoding function is applied based on the redundancy storage coding scheme utilized to generate the set of segments in the segment group and/or parity data of this set of K segments is otherwise utilized to regenerate the unavailable segment. The necessary records can then be extracted from the unavailable segment, for example, via the record extraction module 2438, and can be sent as data blocks to another node 37 for processing in conjunction with other records extracted from available segments retrieved by the node 37 from its own memory drives 2425.

Note that the embodiments of node 37 discussed herein can be configured to execute multiple queries concurrently by communicating with nodes 37 in the same or different tree configuration of corresponding query execution plans and/or by performing query operations upon data blocks and/or read records for different queries. In particular, incoming data blocks can be received from other nodes for multiple different queries in any interleaving order, and a plurality of operator executions upon incoming data blocks for multiple different queries can be performed in any order, where output data blocks are generated and sent to the same or different next node for multiple different queries in any interleaving order. IO level nodes can access records for the same or different queries any interleaving order. Thus, at a given point in time, a node 37 can have already begun its execution of at least two queries, where the node 37 has also not yet completed its execution of the at least two queries.

A query execution plan 2405 can guarantee query correctness based on assignment data sent to or otherwise communicated to all nodes at the IO level ensuring that the set of required records in query domain data of a query, such as one or more tables required to be accessed by a query, are accessed exactly one time: if a particular record is accessed multiple times in the same query and/or is not accessed, the query resultant cannot be guaranteed to be correct. Assignment data indicating segment read and/or record read assignments to each of the set of nodes 37 at the IO level can be generated, for example, based on being mutually agreed upon by all nodes 37 at the IO level via a consensus protocol executed between all nodes at the IO level and/or distinct groups of nodes 37 such as individual storage clusters 35. The assignment data can be generated such that every record in the database system and/or in query domain of a particular query is assigned to be read by exactly one node 37. Note that the assignment data may indicate that a node 37 is assigned to read some segments directly from memory as illustrated in FIG. 24C and is assigned to recover some segments via retrieval of segments in the same segment group from other nodes 37 and via applying the decoding function of the redundancy storage coding scheme as illustrated in FIG. 24D.

Assuming all nodes 37 read all required records and send their required records to exactly one next node 37 as designated in the query execution plan 2405 for the given query, the use of exactly one instance of each record can be guaranteed. Assuming all inner level nodes 37 process all the required records received from the corresponding set of nodes 37 in the IO level 2416, via applying one or more query operators assigned to the node in accordance with their query operator execution flow 2433, correctness of their respective partial resultants can be guaranteed. This correctness can further require that nodes 37 at the same level intercommunicate by exchanging records in accordance with JOIN operations as necessary, as records received by other nodes may be required to achieve the appropriate result of a JOIN operation. Finally, assuming the root level node receives all correctly generated partial resultants as data blocks from its respective set of nodes at the penultimate, highest inner level 2414 as designated in the query execution plan 2405, and further assuming the root level node appropriately generates its own final resultant, the correctness of the final resultant can be guaranteed.

In some embodiments, each node 37 in the query execution plan can monitor whether it has received all necessary data blocks to fulfill its necessary role in completely generating its own resultant to be sent to the next node 37 in the query execution plan. A node 37 can determine receipt of a complete set of data blocks that was sent from a particular node 37 at an immediately lower level, for example, based on being numbered and/or have an indicated ordering in transmission from the particular node 37 at the immediately lower level, and/or based on a final data block of the set of data blocks being tagged in transmission from the particular node 37 at the immediately lower level to indicate it is a final data block being sent. A node 37 can determine the required set of lower level nodes from which it is to receive data blocks based on its knowledge of the query execution plan 2405 of the query. A node 37 can thus conclude when a complete set of data blocks has been received each designated lower level node in the designated set as indicated by the query execution plan 2405. This node 37 can therefore determine itself that all required data blocks have been processed into data blocks sent by this node 37 to the next node 37 and/or as a final resultant if this node 37 is the root node. This can be indicated via tagging of its own last data block, corresponding to the final portion of the resultant generated by the node, where it is guaranteed that all appropriate data was received and processed into the set of data blocks sent by this node 37 in accordance with applying its own query operator execution flow 2433.

In some embodiments, if any node 37 determines it did not receive all of its required data blocks, the node 37 itself cannot fulfill generation of its own set of required data blocks. For example, the node 37 will not transmit a final data block tagged as the "last" data block in the set of outputted data blocks to the next node 37, and the next node 37 will thus conclude there was an error and will not generate a full set of data blocks itself. The root node, and/or these intermediate nodes that never received all their data and/or never fulfilled their generation of all required data blocks, can independently determine the query was unsuccessful. In some cases, the root node, upon determining the query was unsuccessful, can initiate re-execution of the query by re-establishing the same or different query execution plan 2405 in a downward fashion as described previously, where the nodes 37 in this re-established query execution plan 2405 execute the query accordingly as though it were a new query. For example, in the case of a node failure that caused the previous query to fail, the new query execution plan 2405 can be generated to include only available nodes where the node that failed is not included in the new query execution plan 2405.

Some or all features and/or functionality of FIG. 24D can be performed via a corresponding node 37 in conjunction with system metadata applied across a plurality of nodes 37 that includes the given node, for example, where the given node 37 participates in some or all features and/or functionality of FIG. 24D based on receiving and storing the system metadata in local memory of given node 37 as configuration data and/or based on further accessing and/or executing this configuration data to recover segments via external retrieval requests and performing a rebuilding process upon corresponding segments as part of its database functionality accordingly. Performance of some or all features and/or functionality of FIG. 24D can optionally change and/or be updated over time, based on the system metadata applied across a plurality of nodes 37 that includes the given node being updated over time, and/or based on the given node updating its configuration data stored in local memory to reflect changes in the system metadata based on receiving data indicating these changes to the system metadata.

Figure 24E:
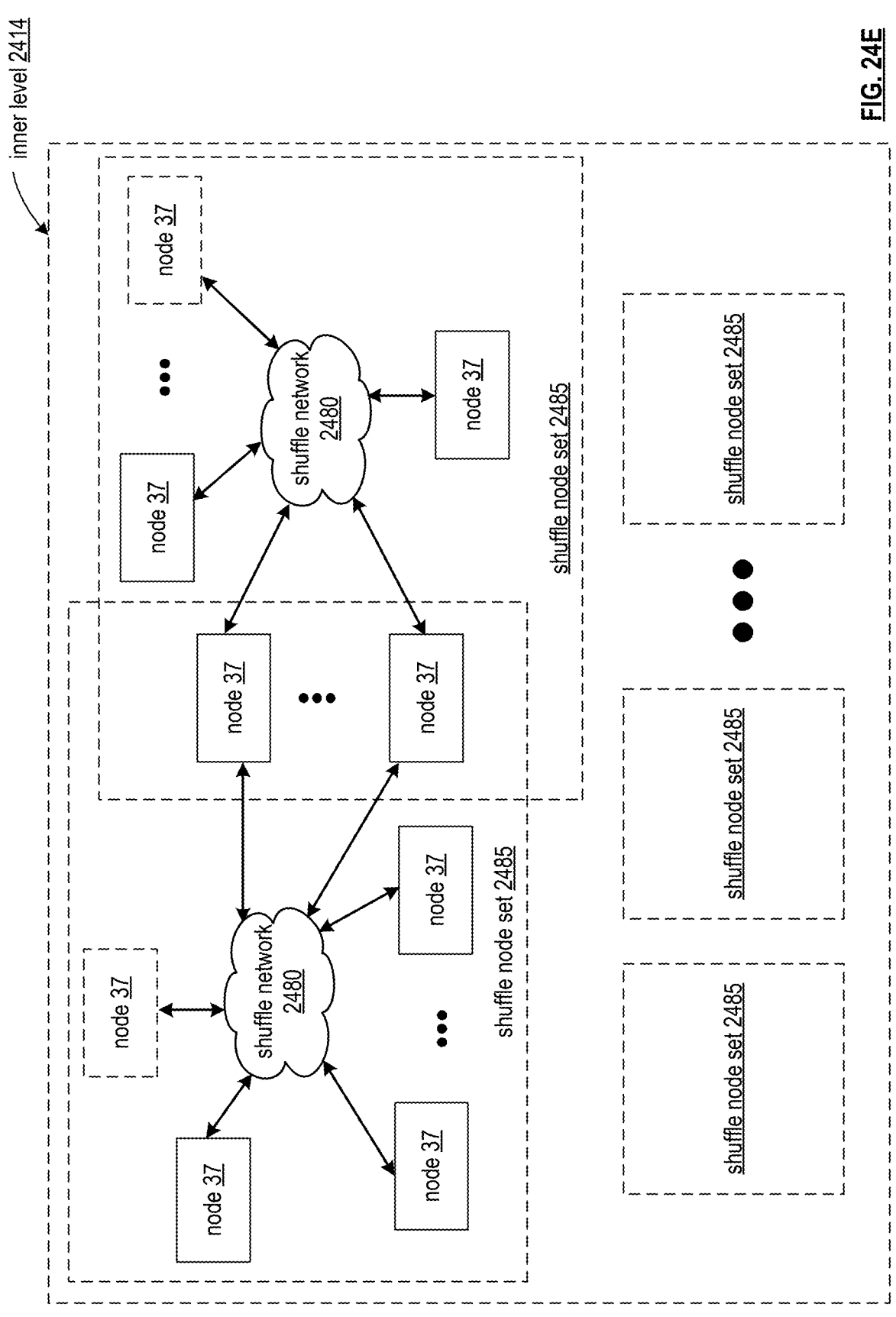
FIG. 24E is an embodiment is schematic block diagrams illustrating a plurality of nodes that communicate via shuffle networks in accordance with various embodiments.

FIG. 24E illustrates an embodiment of an inner level 2414 that includes at least one shuffle node set 2485 of the plurality of nodes assigned to the corresponding inner level. A shuffle node set 2485 can include some or all of a plurality of nodes assigned to the corresponding inner level, where all nodes in the shuffle node set 2485 are assigned to the same inner level. In some cases, a shuffle node set 2485 can include nodes assigned to different levels 2410 of a query execution plan. A shuffle node set 2485 at a given time can include some nodes that are assigned to the given level, but are not participating in a query at that given time, as denoted with dashed outlines and as discussed in conjunction with FIG. 24A. For example, while a given one or more queries are being executed by nodes in the database system 10, a shuffle node set 2485 can be static, regardless of whether all of its members are participating in a given query at that time. In other cases, shuffle node set 2485 only includes nodes assigned to participate in a corresponding query, where different queries that are concurrently executing and/or executing in distinct time periods have different shuffle node sets 2485 based on which nodes are assigned to participate in the corresponding query execution plan. While FIG. 24E depicts multiple shuffle node sets 2485 of an inner level 2414, in some cases, an inner level can include exactly one shuffle node set, for example, that includes all possible nodes of the corresponding inner level 2414 and/or all participating nodes of the of the corresponding inner level 2414 in a given query execution plan.

While FIG. 24E depicts that different shuffle node sets 2485 can have overlapping nodes 37, in some cases, each shuffle node set 2485 includes a distinct set of nodes, for example, where the shuffle node sets 2485 are mutually exclusive. In some cases, the shuffle node sets 2485 are collectively exhaustive with respect to the corresponding inner level 2414, where all possible nodes of the inner level 2414, or all participating nodes of a given query execution plan at the inner level 2414, are included in at least one shuffle node set 2485 of the inner level 2414. If the query execution plan has multiple inner levels 2414, each inner level can include one or more shuffle node sets 2485. In some cases, a shuffle node set 2485 can include nodes from different inner levels 2414, or from exactly one inner level 2414. In some cases, the root level 2412 and/or the IO level 2416 have nodes included in shuffle node sets 2485. In some cases, the query execution plan 2405 includes and/or indicates assignment of nodes to corresponding shuffle node sets 2485 in addition to assigning nodes to levels 2410, where nodes 37 determine their participation in a given query as participating in one or more levels 2410 and/or as participating in one or more shuffle node sets 2485, for example, via downward propagation of this information from the root node to initiate the query execution plan 2405 as discussed previously.

The shuffle node sets 2485 can be utilized to enable transfer of information between nodes, for example, in accordance with performing particular operations in a given query that cannot be performed in isolation. For example, some queries require that nodes 37 receive data blocks from its children nodes in the query execution plan for processing, and that the nodes 37 additionally receive data blocks from other nodes at the same level 2410. In particular, query operations such as JOIN operations of a SQL query expression may necessitate that some or all additional records that were access in accordance with the query be processed in tandem to guarantee a correct resultant, where a node processing only the records retrieved from memory by its child IO nodes is not sufficient.

In some cases, a given node 37 participating in a given inner level 2414 of a query execution plan may send data blocks to some or all other nodes participating in the given inner level 2414, where these other nodes utilize these data blocks received from the given node to process the query via their query processing module 2435 by applying some or all operators of their query operator execution flow 2433 to the data blocks received from the given node. In some cases, a given node 37 participating in a given inner level 2414 of a query execution plan may receive data blocks to some or all other nodes participating in the given inner level 2414, where the given node utilizes these data blocks received from the other nodes to process the query via their query processing module 2435 by applying some or all operators of their query operator execution flow 2433 to the received data blocks.

This transfer of data blocks can be facilitated via a shuffle network 2480 of a corresponding shuffle node set 2485. Nodes in a shuffle node set 2485 can exchange data blocks in accordance with executing queries, for example, for execution of particular operators such as JOIN operators of their query operator execution flow 2433 by utilizing a corresponding shuffle network 2480. The shuffle network 2480 can correspond to any wired and/or wireless communication network that enables bidirectional communication between any nodes 37 communicating with the shuffle network 2480. In some cases, the nodes in a same shuffle node set 2485 are operable to communicate with some or all other nodes in the same shuffle node set 2485 via a direct communication link of shuffle network 2480, for example, where data blocks can be routed between some or all nodes in a shuffle network 2480 without necessitating any relay nodes 37 for routing the data blocks. In some cases, the nodes in a same shuffle set can broadcast data blocks.

In some cases, some nodes in a same shuffle node set 2485 do not have direct links via shuffle network 2480 and/or cannot send or receive broadcasts via shuffle network 2480 to some or all other nodes 37. For example, at least one pair of nodes in the same shuffle node set cannot communicate directly. In some cases, some pairs of nodes in a same shuffle node set can only communicate by routing their data via at least one relay node 37. For example, two nodes in a same shuffle node set do not have a direct communication link and/or cannot communicate via broadcasting their data blocks. However, if these two nodes in a same shuffle node set can each communicate with a same third node via corresponding direct communication links and/or via broadcast, this third node can serve as a relay node to facilitate communication between the two nodes. Nodes that are "further apart" in the shuffle network 2480 may require multiple relay nodes.

Thus, the shuffle network 2480 can facilitate communication between all nodes 37 in the corresponding shuffle node set 2485 by utilizing some or all nodes 37 in the corresponding shuffle node set 2485 as relay nodes, where the shuffle network 2480 is implemented by utilizing some or all nodes in the nodes shuffle node set 2485 and a corresponding set of direct communication links between pairs of nodes in the shuffle node set 2485 to facilitate data transfer between any pair of nodes in the shuffle node set 2485. Note that these relay nodes facilitating data blocks for execution of a given query within a shuffle node sets 2485 to implement shuffle network 2480 can be nodes participating in the query execution plan of the given query and/or can be nodes that are not participating in the query execution plan of the given query. In some cases, these relay nodes facilitating data blocks for execution of a given query within a shuffle node sets 2485 are strictly nodes participating in the query execution plan of the given query. In some cases, these relay nodes facilitating data blocks for execution of a given query within a shuffle node sets 2485 are strictly nodes that are not participating in the query execution plan of the given query.

Different shuffle node sets 2485 can have different shuffle networks 2480. These different shuffle networks 2480 can be isolated, where nodes only communicate with other nodes in the same shuffle node sets 2485 and/or where shuffle node sets 2485 are mutually exclusive. For example, data block exchange for facilitating query execution can be localized within a particular shuffle node set 2485, where nodes of a particular shuffle node set 2485 only send and receive data from other nodes in the same shuffle node set 2485, and where nodes in different shuffle node sets 2485 do not communicate directly and/or do not exchange data blocks at all. In some cases, where the inner level includes exactly one shuffle network, all nodes 37 in the inner level can and/or must exchange data blocks with all other nodes in the inner level via the shuffle node set via a single corresponding shuffle network 2480.

Alternatively, some or all of the different shuffle networks 2480 can be interconnected, where nodes can and/or must communicate with other nodes in different shuffle node sets 2485 via connectivity between their respective different shuffle networks 2480 to facilitate query execution. As a particular example, in cases where two shuffle node sets 2485 have at least one overlapping node 37, the interconnectivity can be facilitated by the at least one overlapping node 37, for example, where this overlapping node 37 serves as a relay node to relay communications from at least one first node in a first shuffle node sets 2485 to at least one second node in a second first shuffle node set 2485. In some cases, all nodes 37 in a shuffle node set 2485 can communicate with any other node in the same shuffle node set 2485 via a direct link enabled via shuffle network 2480 and/or by otherwise not necessitating any intermediate relay nodes. However, these nodes may still require one or more relay nodes, such as nodes included in multiple shuffle node sets 2485, to communicate with nodes in other shuffle node sets 2485, where communication is facilitated across multiple shuffle node sets 2485 via direct communication links between nodes within each shuffle node set 2485.

Note that these relay nodes facilitating data blocks for execution of a given query across multiple shuffle node sets 2485 can be nodes participating in the query execution plan of the given query and/or can be nodes that are not participating in the query execution plan of the given query. In some cases, these relay nodes facilitating data blocks for execution of a given query across multiple shuffle node sets 2485 are strictly nodes participating in the query execution plan of the given query. In some cases, these relay nodes facilitating data blocks for execution of a given query across multiple shuffle node sets 2485 are strictly nodes that are not participating in the query execution plan of the given query.

In some cases, a node 37 has direct communication links with its child node and/or parent node, where no relay nodes are required to facilitate sending data to parent and/or child nodes of the query execution plan 2405 of FIG. 24A. In other cases, at least one relay node may be required to facilitate communication across levels, such as between a parent node and child node as dictated by the query execution plan. Such relay nodes can be nodes within a and/or different same shuffle network as the parent node and child node, and can be nodes participating in the query execution plan of the given query and/or can be nodes that are not participating in the query execution plan of the given query.

Some or all features and/or functionality of FIG. 24E can be performed via at least one node 37 in conjunction with system metadata applied across a plurality of nodes 37, for example, where at least one node 37 participates in some or all features and/or functionality of FIG. 24E based on receiving and storing the system metadata in local memory of the at least one node 37 as configuration data and/or based on further accessing and/or executing this configuration data to participate in one or more shuffle node sets of FIG. 24E as part of its database functionality accordingly. Performance of some or all features and/or functionality of FIG. 24E can optionally change and/or be updated over time, and/or a set of nodes participating in executing some or all features and/or functionality of FIG. 24E can have changing nodes over time, based on the system metadata applied across the plurality of nodes 37 being updated over time, based on nodes on updating their configuration data stored in local memory to reflect changes in the system metadata based on receiving data indicating these changes to the system metadata, and/or based on nodes being added and/or removed from the plurality of nodes over time.

Figure 24F:
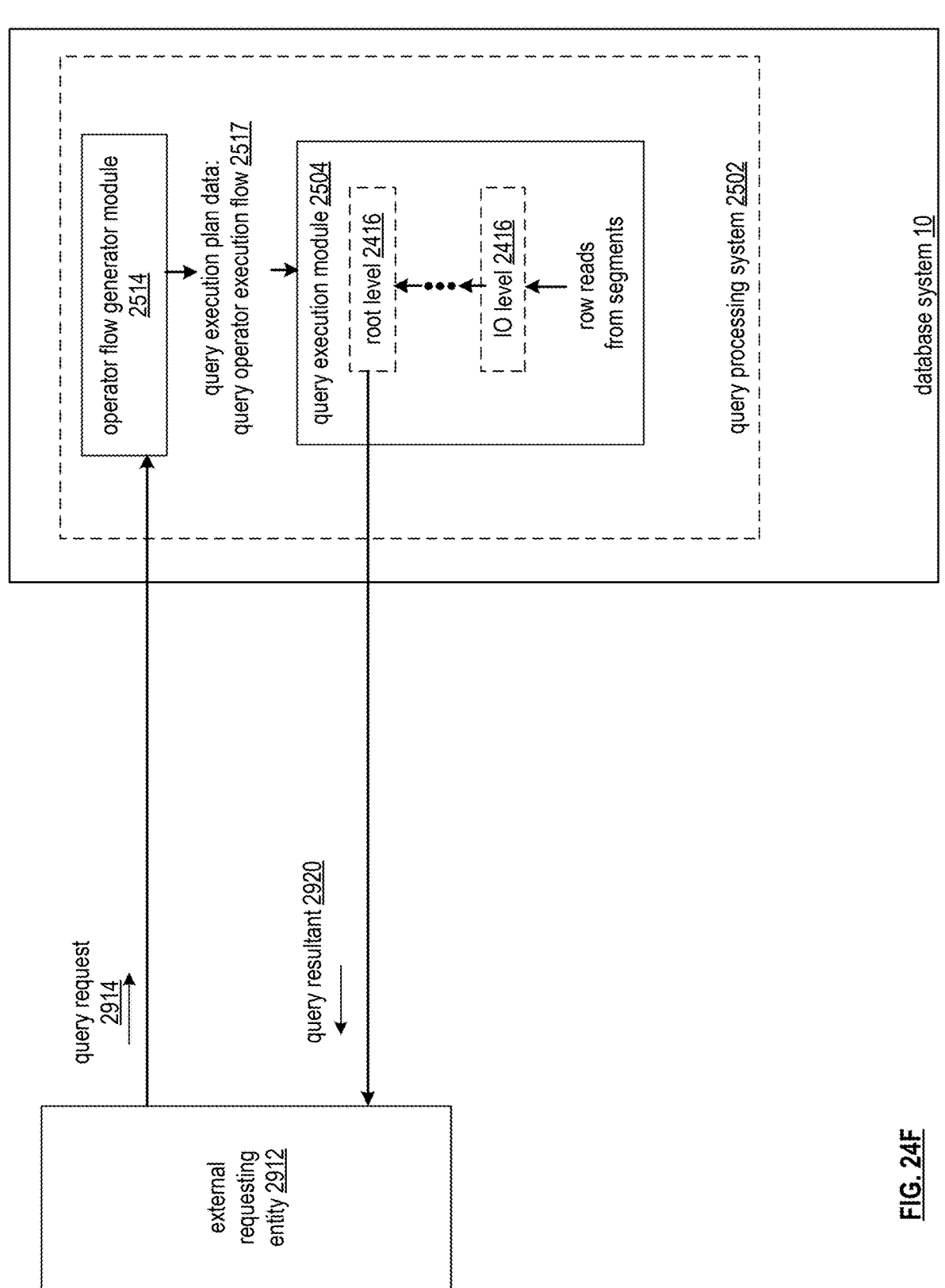
FIG. 24F is a schematic block diagram of a database system communicating with an external requesting entity in accordance with various embodiments.

FIG. 24F illustrates an embodiment of a database system that receives some or all query requests from one or more external requesting entities 2912. The external requesting entities 2912 can be implemented as a client device such as a personal computer and/or device, a server system, or other external system that generates and/or transmits query requests 2914. A query resultant 2920 can optionally be transmitted back to the same or different external requesting entity 2912. Some or all query requests processed by database system 10 as described herein can be received from external requesting entities 2912 and/or some or all query resultants generated via query executions described herein can be transmitted to external requesting entities 2912.

For example, a user types or otherwise indicates a query for execution via interaction with a computing device associated with and/or communicating with an external requesting entity. The computing device generates and transmits a corresponding query request 2914 for execution via the database system 10, where the corresponding query resultant 2920 is transmitted back to the computing device, for example, for storage by the computing device and/or for display to the corresponding user via a display device.

As another example, a query is automatically generated for execution via processing resources via a computing device and/or via communication with an external requesting entity implemented via at least one computing device. For example, the query is automatically generated and/or modified from a request generated via user input and/or received from a requesting entity in conjunction with implementing a query generator system, a query optimizer, generative artificial intelligence (AI), and/or other artificial intelligence and/or machine learning techniques. The computing device generates and transmits a corresponding query request 2914 for execution via the database system 10, where the corresponding query resultant 2920 is transmitted back to the computing device, for example, for storage by the computing device, transmission to another system, and/or for display to at least one corresponding user via a display device.

Some or all features and/or functionality of FIG. 24F can be performed via at least one node 37 in conjunction with system metadata applied across a plurality of nodes 37, for example, where at least one node 37 participates in some or all features and/or functionality of FIG. 24F based on receiving and storing the system metadata in local memory of the at least one node 37 as configuration data, and/or based on further accessing and/or executing this configuration data to generate query execution plan data from query requests by implementing some or all of the operator flow generator module 2514 as part of its database functionality accordingly, and/or to participate in one or more query execution plans of a query execution module 2504 as part of its database functionality accordingly. Performance of some or all features and/or functionality of FIG. 24F can optionally change and/or be updated over time, and/or a set of nodes participating in executing some or all features and/or functionality of FIG. 24F can have changing nodes over time, based on the system metadata applied across the plurality of nodes 37 being updated over time, based on nodes on updating their configuration data stored in local memory to reflect changes in the system metadata based on receiving data indicating these changes to the system metadata, and/or based on nodes being added and/or removed from the plurality of nodes over time.

Figure 24G:
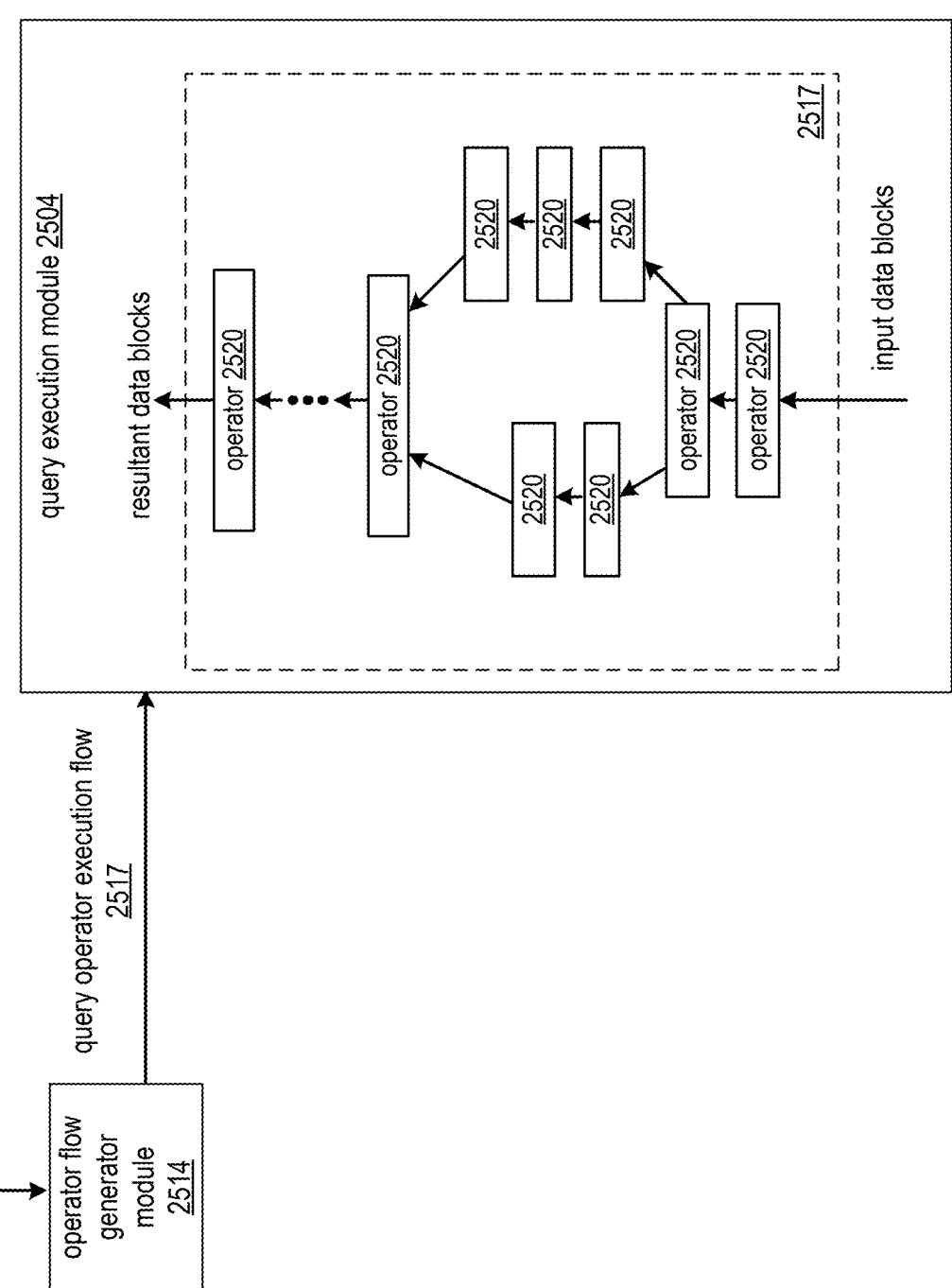
FIG. 24G is a schematic block diagram of a query processing system in accordance with various embodiments.

FIG. 24G illustrates an embodiment of a query processing system 2502 that generates a query operator execution flow 2517 from a query expression 2509 for execution via a query execution module 2504. The query processing system 2502 can be implemented utilizing, for example, the parallelized query and/or response sub-system 13 and/or the parallelized data store, retrieve, and/or process subsystem 12. The query processing system 2502 can be implemented by utilizing at least one computing device 18, for example, by utilizing at least one central processing module 39 of at least one node 37 utilized to implement the query processing system 2502. The query processing system 2502 can be implemented utilizing any processing module and/or memory of the database system 10, for example, communicating with the database system 10 via system communication resources 14.

As illustrated in FIG. 24G, an operator flow generator module 2514 of the query processing system 2502 can be utilized to generate a query operator execution flow 2517 for the query indicated in a query expression 2509. This can be generated based on a plurality of query operators indicated in the query expression and their respective sequential, parallelized, and/or nested ordering in the query expression (e.g. as an acyclic directed graph of operators), and/or based on optimizing the execution of the plurality of operators of the query expression. This query operator execution flow 2517 can include and/or be utilized to determine the query operator execution flow 2433 assigned to nodes 37 at one or more particular levels of the query execution plan 2405 and/or can include the operator execution flow to be implemented across a plurality of nodes 37, for example, based on a query expression indicated in the query request and/or based on optimizing the execution of the query expression.

In some cases, the operator flow generator module 2514 implements an optimizer to select the query operator execution flow 2517 based on determining the query operator execution flow 2517 is a most efficient and/or otherwise most optimal one of a set of query operator execution flow options and/or that arranges the operators in the query operator execution flow 2517 such that the query operator execution flow 2517 compares favorably to a predetermined efficiency threshold. For example, the operator flow generator module 2514 selects and/or arranges the plurality of operators of the query operator execution flow 2517 to implement the query expression in accordance with performing optimizer functionality, for example, by performing a deterministic function upon the query expression to select and/or arrange the plurality of operators in accordance with the optimizer functionality. This can be based on known and/or estimated processing times of different types of operators. This can be based on known and/or estimated levels of record filtering that will be applied by particular filtering parameters of the query. This can be based on selecting and/or deterministically utilizing a conjunctive normal form and/or a disjunctive normal form to build the query operator execution flow 2517 from the query expression. This can be based on selecting a determining a first possible serial ordering of a plurality of operators to implement the query expression based on determining the first possible serial ordering of the plurality of operators is known to be or expected to be more efficient than at least one second possible serial ordering of the same or different plurality of operators that implements the query expression. This can be based on ordering a first operator before a second operator in the query operator execution flow 2517 based on determining executing the first operator before the second operator results in more efficient execution than executing the second operator before the first operator. For example, the first operator is known to filter the set of records upon which the second operator would be performed to improve the efficiency of performing the second operator due to being executed upon a smaller set of records than if performed before the first operator. This can be based on other optimizer functionality that otherwise selects and/or arranges the plurality of operators of the query operator execution flow 2517 based on other known, estimated, and/or otherwise determined criteria.

A query execution module 2504 of the query processing system 2502 can execute the query expression via execution of the query operator execution flow 2517 to generate a query resultant. For example, the query execution module 2504 can be implemented via a plurality of nodes 37 that execute the query operator execution flow 2517. In particular, the plurality of nodes 37 of a query execution plan 2405 of FIG. 24A can collectively execute the query operator execution flow 2517. In such cases, nodes 37 of the query execution module 2504 can each execute their assigned portion of the query to produce data blocks as discussed previously, starting from IO level nodes propagating their data blocks upwards until the root level node processes incoming data blocks to generate the query resultant, where inner level nodes execute their respective query operator execution flow 2433 upon incoming data blocks to generate their output datablocks. The query execution module 2504 can be utilized to implement the parallelized query and results sub-system 13 and/or the parallelized data store, receive and/or process sub-system 12.

Some or all features and/or functionality of FIG. 24G can be performed via at least one node 37 in conjunction with system metadata applied across a plurality of nodes 37, for example, where at least one node 37 participates in some or all features and/or functionality of FIG. 24G based on receiving and storing the system metadata in local memory of the at least one node 37 as configuration data and/or based on further accessing and/or executing this configuration data to generate query execution plan data from query requests by executing some or all operators of a query operator flow 2517 as part of its database functionality accordingly. Performance of some or all features and/or functionality of FIG. 24G can optionally change and/or be updated over time, and/or a set of nodes participating in executing some or all features and/or functionality of FIG. 24G can have changing nodes over time, based on the system metadata applied across the plurality of nodes 37 being updated over time, based on nodes on updating their configuration data stored in local memory to reflect changes in the system metadata based on receiving data indicating these changes to the system metadata, and/or based on nodes being added and/or removed from the plurality of nodes over time.

Figure 24H:
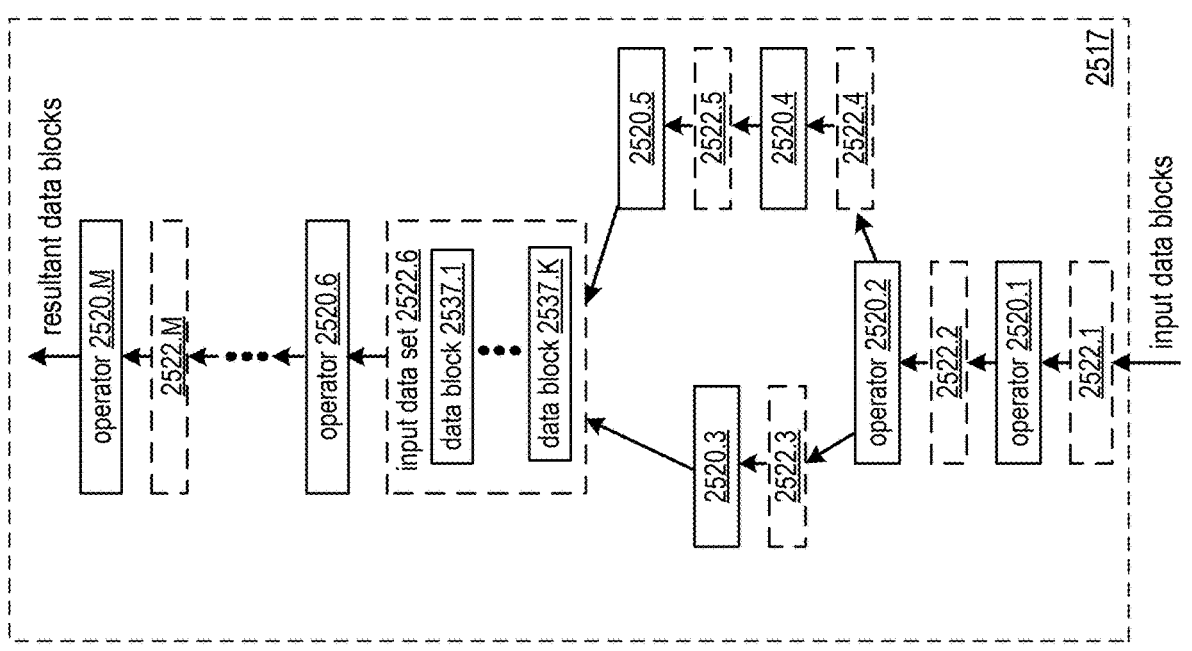
FIG. 24H is a schematic block diagram of a query operator execution flow in accordance with various embodiments.

FIG. 24H presents an example embodiment of a query execution module 2504 that executes query operator execution flow 2517. Some or all features and/or functionality of the query execution module 2504 of FIG. 24H can implement the query execution module 2504 of FIG. 24G and/or any other embodiment of the query execution module 2504 discussed herein. Some or all features and/or functionality of the query execution module 2504 of FIG. 24H can optionally be utilized to implement the query processing module 2435 of node 37 in FIG. 24B and/or to implement some or all nodes 37 at inner levels 2414 of a query execution plan 2405 of FIG. 24A.

The query execution module 2504 can execute the determined query operator execution flow 2517 by performing a plurality of operator executions of operators 2520 of the query operator execution flow 2517 in a corresponding plurality of sequential operator execution steps. Each operator execution step of the plurality of sequential operator execution steps can correspond to execution of a particular operator 2520 of a plurality of operators 2520-1-2520-M of a query operator execution flow 2433.

In some embodiments, a single node 37 executes the query operator execution flow 2517 as illustrated in FIG. 24H as their operator execution flow 2433 of FIG. 24B, where some or all nodes 37 such as some or all inner level nodes 37 utilize the query processing module 2435 as discussed in conjunction with FIG. 24B to generate output data blocks to be sent to other nodes 37 and/or to generate the final resultant by applying the query operator execution flow 2517 to input data blocks received from other nodes and/or retrieved from memory as read and/or recovered records. In such cases, the entire query operator execution flow 2517 determined for the query as a whole can be segregated into multiple query operator execution sub-flows 2433 that are each assigned to the nodes of each of a corresponding set of inner levels 2414 of the query execution plan 2405, where all nodes at the same level execute the same query operator execution flows 2433 upon different received input data blocks. In some cases, the query operator execution flows 2433 applied by each node 37 includes the entire query operator execution flow 2517, for example, when the query execution plan includes exactly one inner level 2414. In other embodiments, the query processing module 2435 is otherwise implemented by at least one processing module the query execution module 2504 to execute a corresponding query, for example, to perform the entire query operator execution flow 2517 of the query as a whole.

A single operator execution by the query execution module 2504, such as via a particular node 37 executing its own query operator execution flows 2433, by executing one of the plurality of operators of the query operator execution flow 2433. As used herein, an operator execution corresponds to executing one operator 2520 of the query operator execution flow 2433 on one or more pending data blocks 2537 in an operator input data set 2522 of the operator 2520. The operator input data set 2522 of a particular operator 2520 includes data blocks that were outputted by execution of one or more other operators 2520 that are immediately below the particular operator in a serial ordering of the plurality of operators of the query operator execution flow 2433. In particular, the pending data blocks 2537 in the operator input data set 2522 were outputted by the one or more other operators 2520 that are immediately below the particular operator via one or more corresponding operator executions of one or more previous operator execution steps in the plurality of sequential operator execution steps. Pending data blocks 2537 of an operator input data set 2522 can be ordered, for example as an ordered queue, based on an ordering in which the pending data blocks 2537 are received by the operator input data set 2522. Alternatively, an operator input data set 2522 is implemented as an unordered set of pending data blocks 2537.

If the particular operator 2520 is executed for a given one of the plurality of sequential operator execution steps, some or all of the pending data blocks 2537 in this particular operator 2520's operator input data set 2522 are processed by the particular operator 2520 via execution of the operator to generate one or more output data blocks. For example, the input data blocks can indicate a plurality of rows, and the operation can be a SELECT operator indicating a simple predicate. The output data blocks can include only proper subset of the plurality of rows that meet the condition specified by the simple predicate.

Once a particular operator 2520 has performed an execution upon a given data block 2537 to generate one or more output data blocks, this data block is removed from the operator's operator input data set 2522. In some cases, an operator selected for execution is automatically executed upon all pending data blocks 2537 in its operator input data set 2522 for the corresponding operator execution step. In this case, an operator input data set 2522 of a particular operator 2520 is therefore empty immediately after the particular operator 2520 is executed. The data blocks outputted by the executed data block are appended to an operator input data set 2522 of an immediately next operator 2520 in the serial ordering of the plurality of operators of the query operator execution flow 2433, where this immediately next operator 2520 will be executed upon its data blocks once selected for execution in a subsequent one of the plurality of sequential operator execution steps.

Operator 2520.1 can correspond to a bottom-most operator 2520 in the serial ordering of the plurality of operators 2520.1-2520.M. As depicted in FIG. 24G, operator 2520.1 has an operator input data set 2522.1 that is populated by data blocks received from another node as discussed in conjunction with FIG. 24B, such as a node at the IO level of the query execution plan 2405. Alternatively these input data blocks can be read by the same node 37 from storage, such as one or more memory devices that store segments that include the rows required for execution of the query. In some cases, the input data blocks are received as a stream over time, where the operator input data set 2522.1 may only include a proper subset of the full set of input data blocks required for execution of the query at a particular time due to not all of the input data blocks having been read and/or received, and/or due to some data blocks having already been processed via execution of operator 2520.1. In other cases, these input data blocks are read and/or retrieved by performing a read operator or other retrieval operation indicated by operator 2520.

Note that in the plurality of sequential operator execution steps utilized to execute a particular query, some or all operators will be executed multiple times, in multiple corresponding ones of the plurality of sequential operator execution steps. In particular, each of the multiple times a particular operator 2520 is executed, this operator is executed on set of pending data blocks 2537 that are currently in their operator input data set 2522, where different ones of the multiple executions correspond to execution of the particular operator upon different sets of data blocks that are currently in their operator queue at corresponding different times.

As a result of this mechanism of processing data blocks via operator executions performed over time, at a given time during the query's execution by the node 37, at least one of the plurality of operators 2520 has an operator input data set

2522 that includes at least one data block 2537. At this given time, one more other ones of the plurality of operators 2520 can have input data sets 2522 that are empty. For example, a given operator's operator input data set 2522 can be empty as a result of one or more immediately prior operators 2520 in the serial ordering not having been executed yet, and/or as a result of the one or more immediately prior operators 2520 not having been executed since a most recent execution of the given operator.

Some types of operators 2520, such as JOIN operators or aggregating operators such as SUM, AVERAGE, MAXIMUM, or MINIMUM operators, require knowledge of the full set of rows that will be received as output from previous operators to correctly generate their output. As used herein, such operators 2520 that must be performed on a particular number of data blocks, such as all data blocks that will be outputted by one or more immediately prior operators in the serial ordering of operators in the query operator execution flow 2517 to execute the query, are denoted as "blocking operators." Blocking operators are only executed in one of the plurality of sequential execution steps if their corresponding operator queue includes all of the required data blocks to be executed. For example, some or all blocking operators can be executed only if all prior operators in the serial ordering of the plurality of operators in the query operator execution flow 2433 have had all of their necessary executions completed for execution of the query, where none of these prior operators will be further executed in accordance with executing the query.

Some operator output generated via execution of an operator 2520, alternatively or in addition to being added to the input data set 2522 of a next sequential operator in the sequential ordering of the plurality of operators of the query operator execution flow 2433, can be sent to one or more other nodes 37 in a same shuffle node set as input data blocks to be added to the input data set 2522 of one or more of their respective operators 2520. In particular, the output generated via a node's execution of an operator 2520 that is serially before the last operator 2520.M of the node's query operator execution flow 2433 can be sent to one or more other nodes 37 in a same shuffle node set as input data blocks to be added to the input data set 2522 of a respective operators 2520 that is serially after the last operator 2520.1 of the query operator execution flow 2433 of the one or more other nodes 37.

As a particular example, the node 37 and the one or more other nodes 37 in a shuffle node set all execute queries in accordance with the same, common query operator execution flow 2433, for example, based on being assigned to a same inner level 2414 of the query execution plan 2405. The output generated via a node's execution of a particular operator 2520.i this common query operator execution flow 2433 can be sent to the one or more other nodes 37 in a same shuffle node set as input data blocks to be added to the input data set 2522 the next operator 2520.i+1, with respect to the serialized ordering of the query of this common query operator execution flow 2433 of the one or more other nodes 37. For example, the output generated via a node's execution of a particular operator 2520.i is added input data set 2522 the next operator 2520.i+1 of the same node's query operator execution flow 2433 based on being serially next in the sequential ordering and/or is alternatively or additionally added to the input data set 2522 of the next operator 2520.i+1 of the common query operator execution flow 2433 of the one or more other nodes in a same shuffle node set based on being serially next in the sequential ordering.

In some cases, in addition to a particular node sending this output generated via a node's execution of a particular operator 2520.*i* to one or more other nodes to be input data set 2522 the next operator 2520.*i*+1 in the common query operator execution flow 2433 of the one or more other nodes 37, the particular node also receives output generated via some or all of these one or more other nodes' execution of this particular operator 2520.*i* in their own query operator execution flow 2433 upon their own corresponding input data set 2522 for this particular operator. The particular node adds this received output of execution of operator 2520.*i* by the one or more other nodes to the be input data set 2522 of its own next operator 2520.*i*+1.

This mechanism of sharing data can be utilized to implement operators that require knowledge of all records of a particular table and/or of a particular set of records that may go beyond the input records retrieved by children or other descendants of the corresponding node. For example, JOIN operators can be implemented in this fashion, where the operator 2520.*i*+1 corresponds to and/or is utilized to implement JOIN operator and/or a custom-join operator of the query operator execution flow 2517, and where the operator 2520.*i*+1 thus utilizes input received from many different nodes in the shuffle node set in accordance with their performing of all of the operators serially before operator 2520.*i*+1 to generate the input to operator 2520.*i*+1.

Some or all features and/or functionality of FIG. 24H can be performed via at least one node 37 in conjunction with system metadata applied across a plurality of nodes 37, for example, where at least one node 37 participates in some or all features and/or functionality of FIG. 24H based on receiving and storing the system metadata in local memory of the at least one node 37 as configuration data and/or based on further accessing and/or executing this configuration data execute some or all operators of a query operator flow 2517 as part of its database functionality accordingly. Performance of some or all features and/or functionality of FIG. 24H can optionally change and/or be updated over time, and/or a set of nodes participating in executing some or all features and/or functionality of FIG. 24H can have changing nodes over time, based on the system metadata applied across the plurality of nodes 37 being updated over time, based on nodes on updating their configuration data stored in local memory to reflect changes in the system metadata based on receiving data indicating these changes to the system metadata, and/or based on nodes being added and/or removed from the plurality of nodes over time.

Figure 24I:
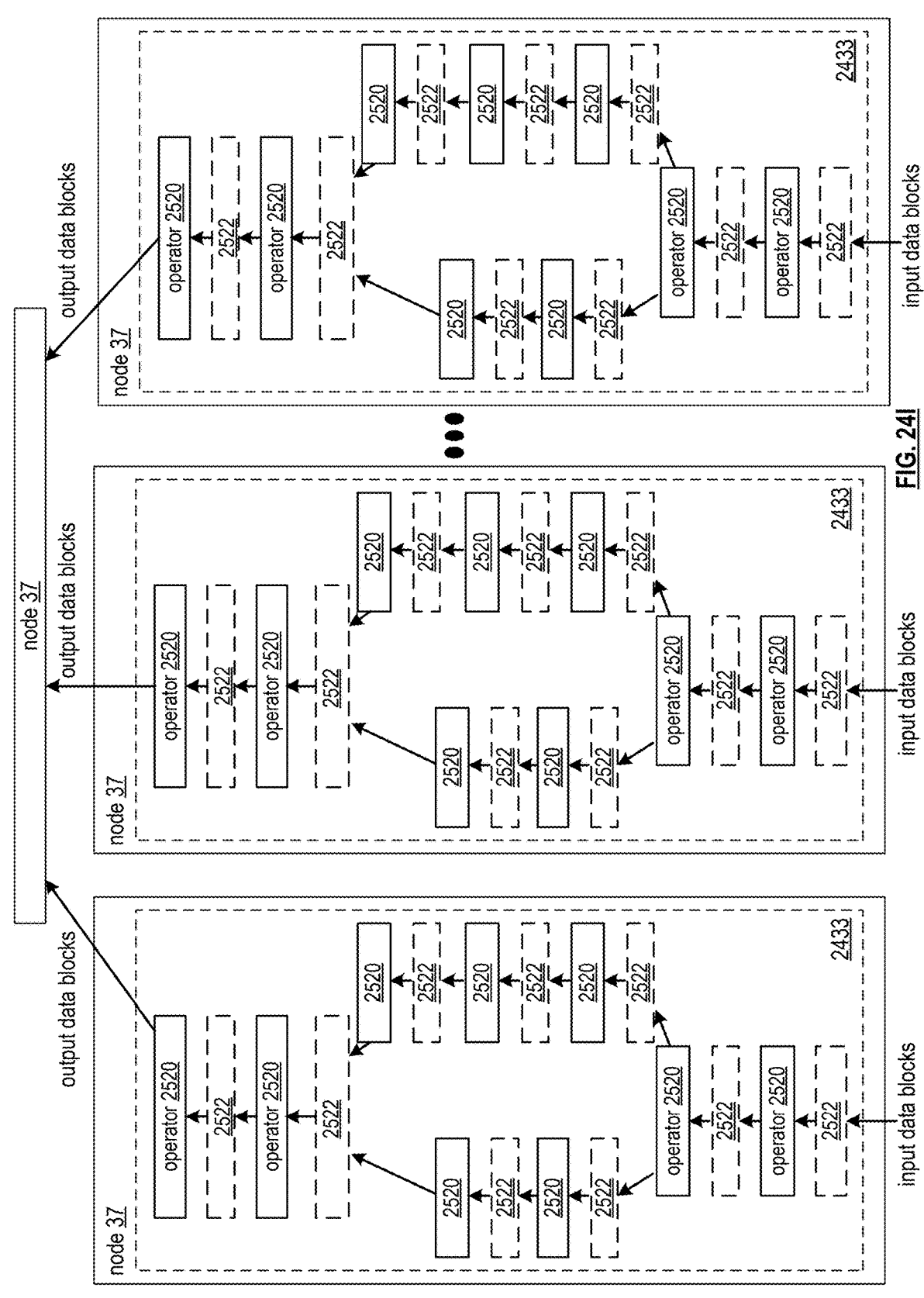
FIG. 24I is a schematic block diagram of a plurality of nodes that utilize query operator execution flows in accordance with various embodiments.

FIG. 24I illustrates an example embodiment of multiple nodes 37 that execute a query operator execution flow 2433. For example, these nodes 37 are at a same level 2410 of a query execution plan 2405, and receive and perform an identical query operator execution flow 2433 in conjunction with decentralized execution of a corresponding query. Each node 37 can determine this query operator execution flow 2433 based on receiving the query execution plan data for the corresponding query that indicates the query operator execution flow 2433 to be performed by these nodes 37 in accordance with their participation at a corresponding inner level 2414 of the corresponding query execution plan 2405 as discussed in conjunction with FIG. 24G. This query operator execution flow 2433 utilized by the multiple nodes can be the full query operator execution flow 2517 generated by the operator flow generator module 2514 of FIG. 24G. This query operator execution flow 2433 can alternatively include a sequential proper subset of operators from the query operator execution flow 2517 generated by the operator flow generator module 2514 of FIG. 24G, where one or more other sequential proper subsets of the query operator execution flow 2517 are performed by nodes at different levels of the query execution plan.

Each node 37 can utilize a corresponding query processing module 2435 to perform a plurality of operator executions for operators of the query operator execution flow 2433 as discussed in conjunction with FIG. 24H. This can include performing an operator execution upon input data sets 2522 of a corresponding operator 2520, where the output of the operator execution is added to an input data set 2522 of a sequentially next operator 2520 in the operator execution flow, as discussed in conjunction with FIG. 24H, where the operators 2520 of the query operator execution flow 2433 are implemented as operators 2520 of FIG. 24H. Some or operators 2520 can correspond to blocking operators that must have all required input data blocks generated via one or more previous operators before execution. Each query processing module can receive, store in local memory, and/or otherwise access and/or determine necessary operator instruction data for operators 2520 indicating how to execute the corresponding operators 2520.

Some or all features and/or functionality of FIG. 24I can be performed via at least one node 37 in conjunction with system metadata applied across a plurality of nodes 37, for example, where at least one node 37 participates in some or all features and/or functionality of FIG. 24I based on receiving and storing the system metadata in local memory of the at least one node 37 as configuration data and/or based on further accessing and/or executing this configuration data to execute some or all operators of a query operator flow 2517 in parallel with other nodes, send data blocks to a parent node, and/or process data blocks from child nodes as part of its database functionality accordingly. Performance of some or all features and/or functionality of FIG. 24I can optionally change and/or be updated over time, and/or a set of nodes participating in executing some or all features and/or functionality of FIG. 24I can have changing nodes over time, based on the system metadata applied across the plurality of nodes 37 being updated over time, based on nodes on updating their configuration data stored in local memory to reflect changes in the system metadata based on receiving data indicating these changes to the system metadata, and/or based on nodes being added and/or removed from the plurality of nodes over time.

Figure 24J:
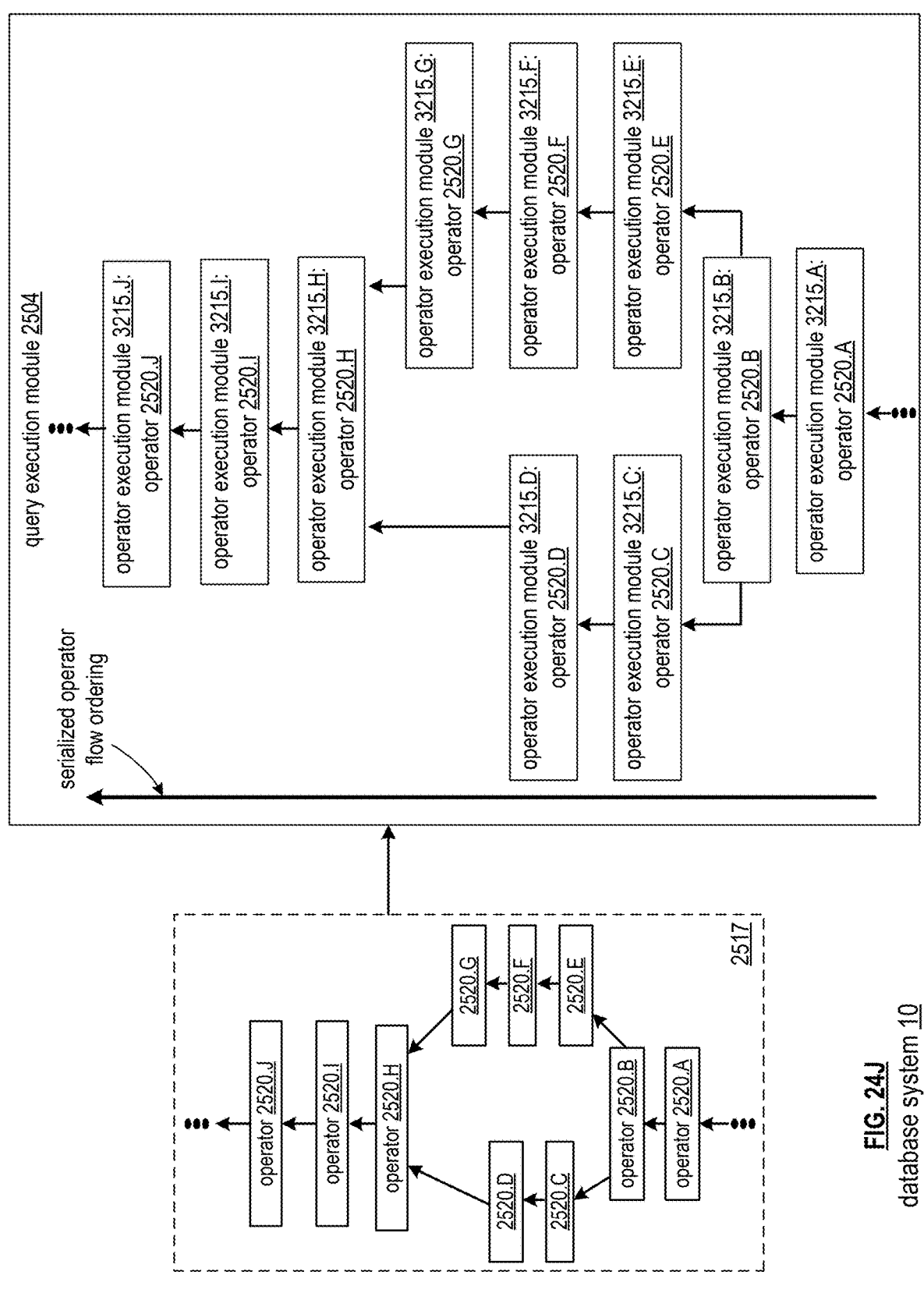
FIG. 24J is a schematic block diagram of a query execution module that executes a query operator execution flow via a plurality of corresponding operator execution modules in accordance with various embodiments.

FIG. 24J illustrates an embodiment of a query execution module 2504 that executes each of a plurality of operators of a given operator execution flow 2517 via a corresponding one of a plurality of operator execution modules 3215. The operator execution modules 3215 of FIG. 24J can be implemented to execute any operators 2520 being executed by a query execution module 2504 for a given query as described herein.

In some embodiments, a given node 37 can optionally execute one or more operators, for example, when participating in a corresponding query execution plan 2405 for a given query, by implementing some or all features and/or functionality of the operator execution module 3215, for example, by implementing its operator processing module 2435 to execute one or more operator execution modules 3215 for one or more operators 2520 being processed by the given node 37. For example, a plurality of nodes of a query execution plan 2405 for a given query execute their operators based on implementing corresponding query processing modules 2435 accordingly.

Figure 24K:
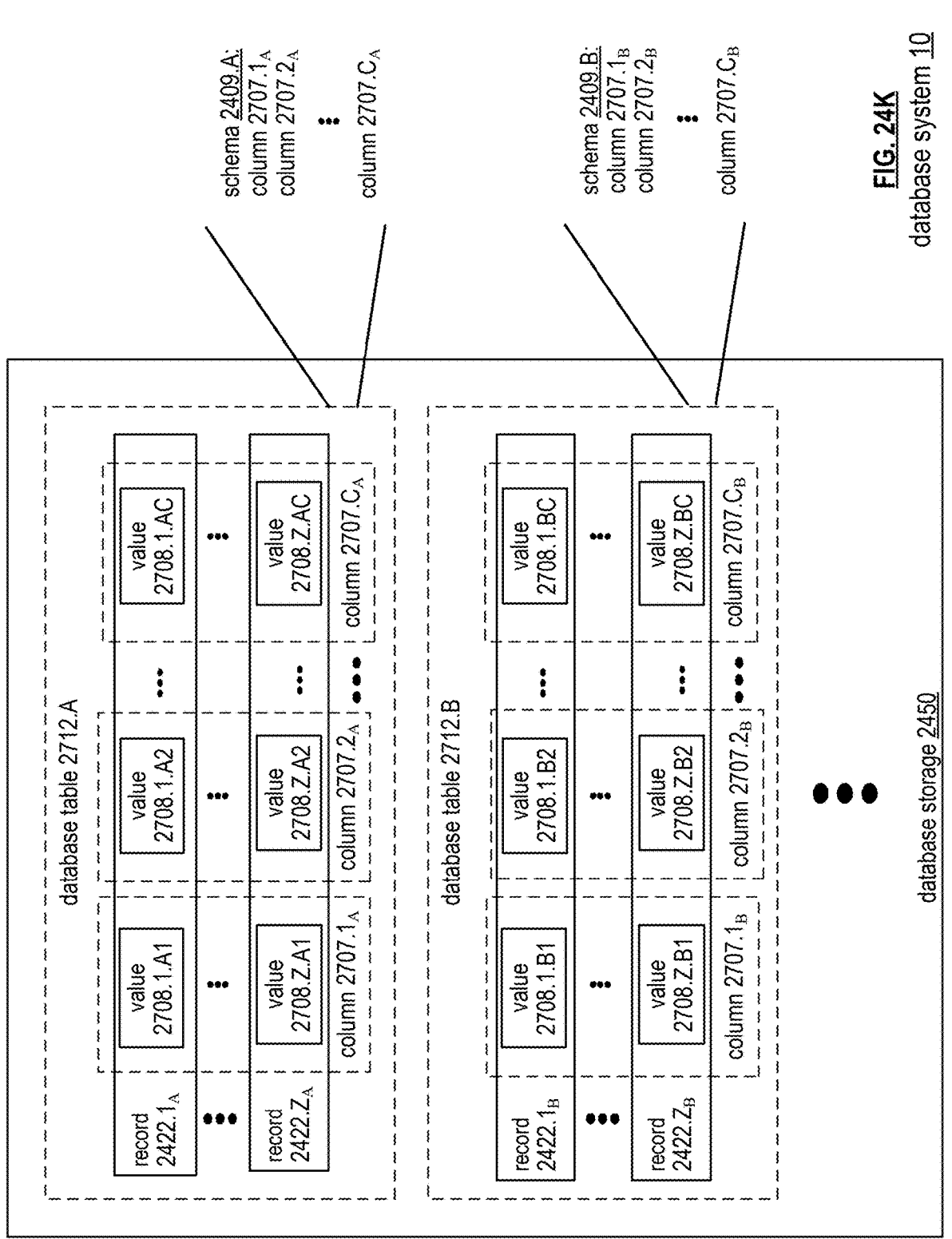
FIG. 24K illustrates an example embodiment of a plurality of database tables stored in database storage in accordance with various embodiments.

FIG. 24K illustrates an embodiment of database storage 2450 operable to store a plurality of database tables 2712, such as relational database tables or other database tables as described previously herein. Database storage 2450 can be implemented via the parallelized data store, retrieve, and/or process sub-system 12, via memory drives 2425 of one or more nodes 37 implementing the database storage 2450, and/or via other memory and/or storage resources of database system 10. The database tables 2712 can be stored as segments as discussed in conjunction with FIGS. 15-23 and/or FIGS. 24B-24D. A database table 2712 can be implemented as one or more datasets and/or a portion of a given dataset, such as the dataset of FIG. 15.

A given database table 2712 can be stored based on being received for storage, for example, via the parallelized ingress sub-system 24 and/or via other data ingress. Alternatively or in addition, a given database table 2712 can be generated and/or modified by the database system 10 itself based on being generated as output of a query executed by query execution module 2504, such as a Create Table As Select (CTAS) query or Insert query.

A given database table 2712 can be in accordance with a schema 2409 defining columns of the database table, where records 2422 correspond to rows having values 2708 for some or all of these columns. Different database tables can have different numbers of columns and/or different datatypes for values stored in different columns. For example, the set of columns $27070.1_A$-$2707.C_A$ of schema 2709.A for database table 2712.A can have a different number of columns than and/or can have different datatypes for some or all columns of the set of columns $2707.1_B$-$2707.C_B$ of schema 2709.B for database table 2712.B. The schema 2409 for a given n database table 2712 can denote same or different datatypes for some or all of its set of columns. For example, some columns are variable-length and other columns are fixed-length. As another example, some columns are integers, other columns are binary values, other columns are Strings, and/or other columns are char types.

Row reads performed during query execution, such as row reads performed at the IO level of a query execution plan 2405, can be performed by reading values 2708 for one or more specified columns 2707 of the given query for some or all rows of one or more specified database tables, as denoted by the query expression defining the query to be performed. Filtering, join operations, and/or values included in the query resultant can be further dictated by operations to be performed upon the read values 2708 of these one or more specified columns 2707.

Figure 24L:
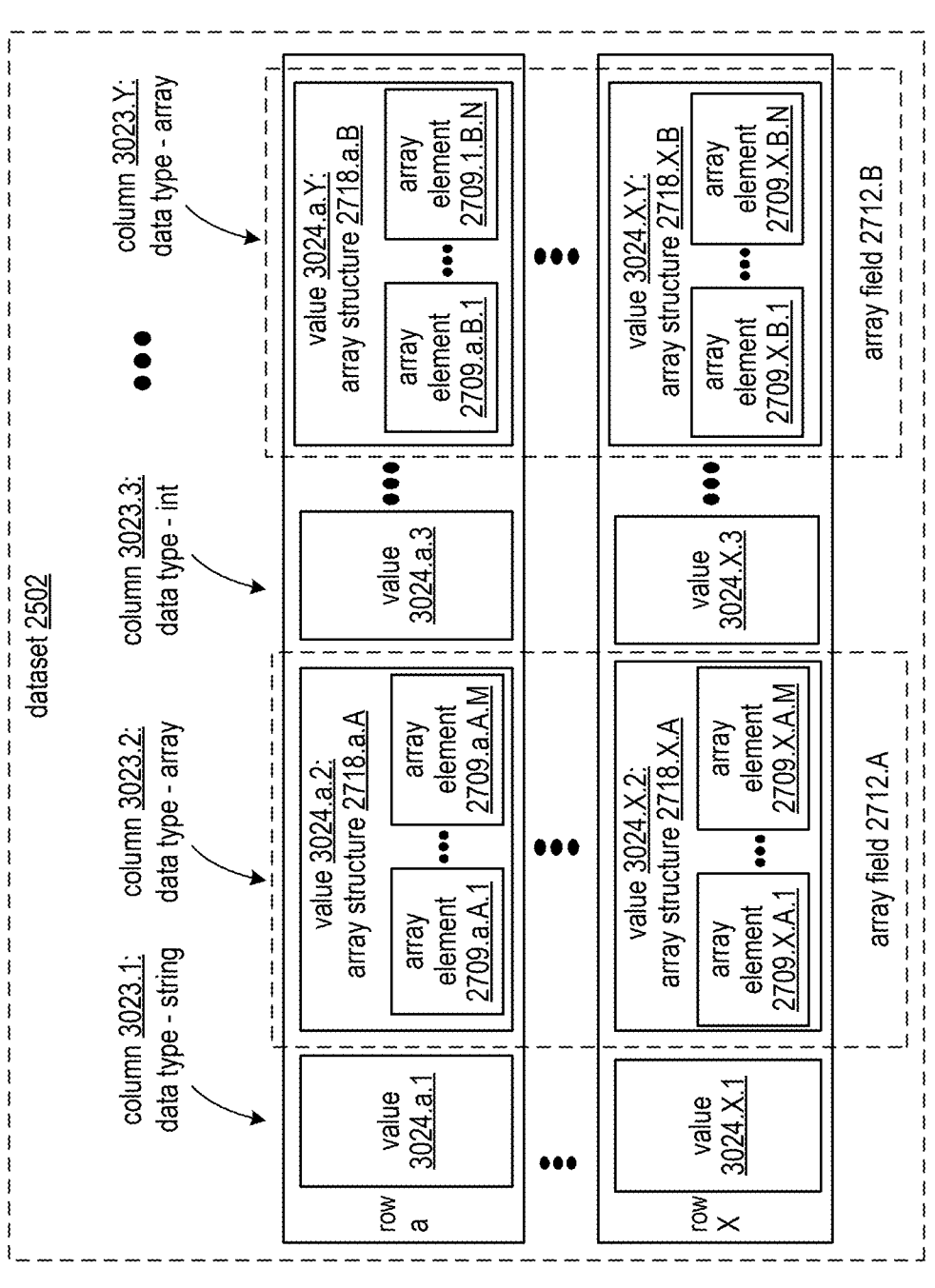
FIG. 24L illustrates an example embodiment of a dataset stored in database storage that includes at least one array field in accordance with various embodiments.

FIG. 24L illustrates an embodiment of a dataset 2502 having one or more columns 3023 implemented as array fields 2712. Some or all features and/or functionality of the dataset 2502 of FIG. 24L can be utilized to implement one or more of the database tables 2712 of FIG. 24K and/or any embodiment of any database table and/or dataset received, stored, and processed via the database system 10 as described herein.

Columns 3023 implemented as array fields 2712 can include array structures 2718 as values 3024 for some or all rows. A given array structure 2718 can have a set of elements 2709.1-2709.M. The value of M can be fixed for a given array field 2712, or can be different for different array structures 2718 of a given array field 2712. In embodiments where the number of elements is fixed, different array fields 2712 can have different fixed numbers of array elements 2709, for example, where a first array field 2712.A has array structures having M elements, and where a second array field 2712.B has array structures having N elements.

Note that a given array structure 2718 of a given array field can optionally have zero elements, where such array structures are considered as empty arrays satisfying the empty array condition. An empty array structure 2718 is distinct from a null value 3852, as it is a defined structure as an array 2718, despite not being populated with any values. For example, consider an example where an array field for rows corresponding to people is implemented to note a list of spouse names for all marriages of each person. An empty array for this array field for a first given row denotes a first corresponding person was never married, while a null value for this array field for a second given row denotes that it is unknown as to whether the second corresponding person was ever married, or who they were married to.

Array elements 2709 of a given array structure can have the same or different data type. In some embodiments, data types of array elements 2709 can be fixed for a given array field (e.g. all array elements 2709 of all array structures 2718 of array field 2712.A are string values, and all array elements 2709 of all array structures 2718 of array field 2712.B are integer values). In other embodiments, data types of array elements 2709 can be different for a given array field and/or a given array structure.

Some array structures 2718 that are non-empty can have one or more array elements having the null value 3852, where the corresponding value 3024 thus meets the null-inclusive array condition. This is distinct from the null value condition 3842, as the value 3024 itself is not null, but is instead an array structure 2718 having some or all of its array elements 2709 with values of null. Continuing example where an array field for rows corresponding to people is implemented to note a list of spouse names for all marriages of each person, a null value for this array field for the second given row denotes that it is unknown as to whether the second corresponding person was ever married or who they were married to, while a null value within an array structure for a third given row denotes that the name of the spouse for a corresponding one of a set of marriages of the person is unknown.

Some array structures 2718 that are non-empty can have all non-null values for its array elements 2709, where all corresponding array elements 2709 were populated and/or defined. Some array structures 2718 that are non-empty can have values for some of its array elements 2709 that are null, and values for others of its array elements 2709 that are non-null values.

Some array structures 2718 that are non-empty can have values for all of its array elements 2709 that are null. This is still distinct from the case where the value 3024 denotes a value of null with no array structure 2718. Continuing example where an array field for rows corresponding to people is implemented to note a list of spouse names for all marriages of each person, a null value for this array field for the second given row denotes that it is unknown as to whether the second corresponding person was ever married, how many times they were married or who they were married to, while the array structure for the third given row denotes a set of three null values and non-null values, denoting that the person was married three times, but the names of the spouses for all three marriages are unknown.

Figure 24M:
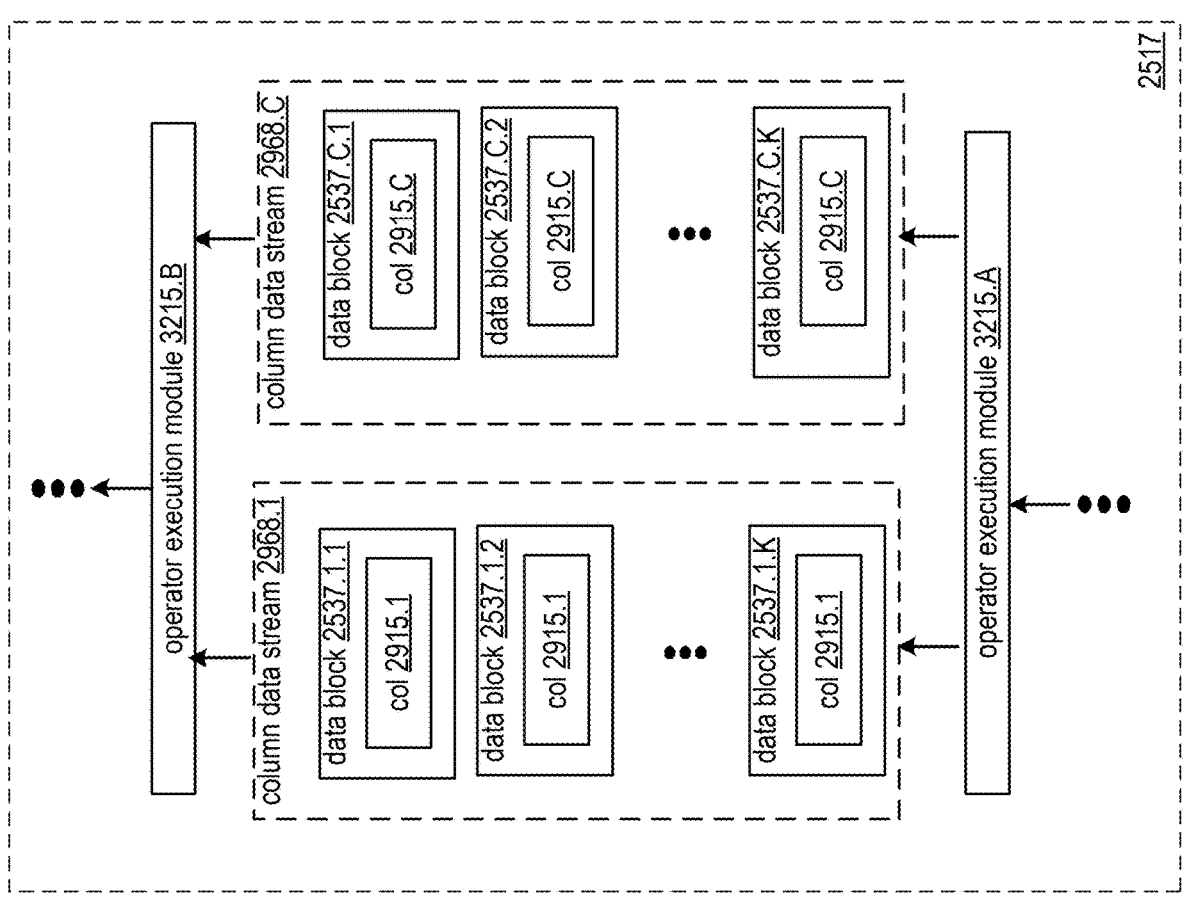
FIG. 24M is a schematic block diagram of a query execution module that implements a plurality of column data streams in accordance with various embodiments.
Figure 24N:
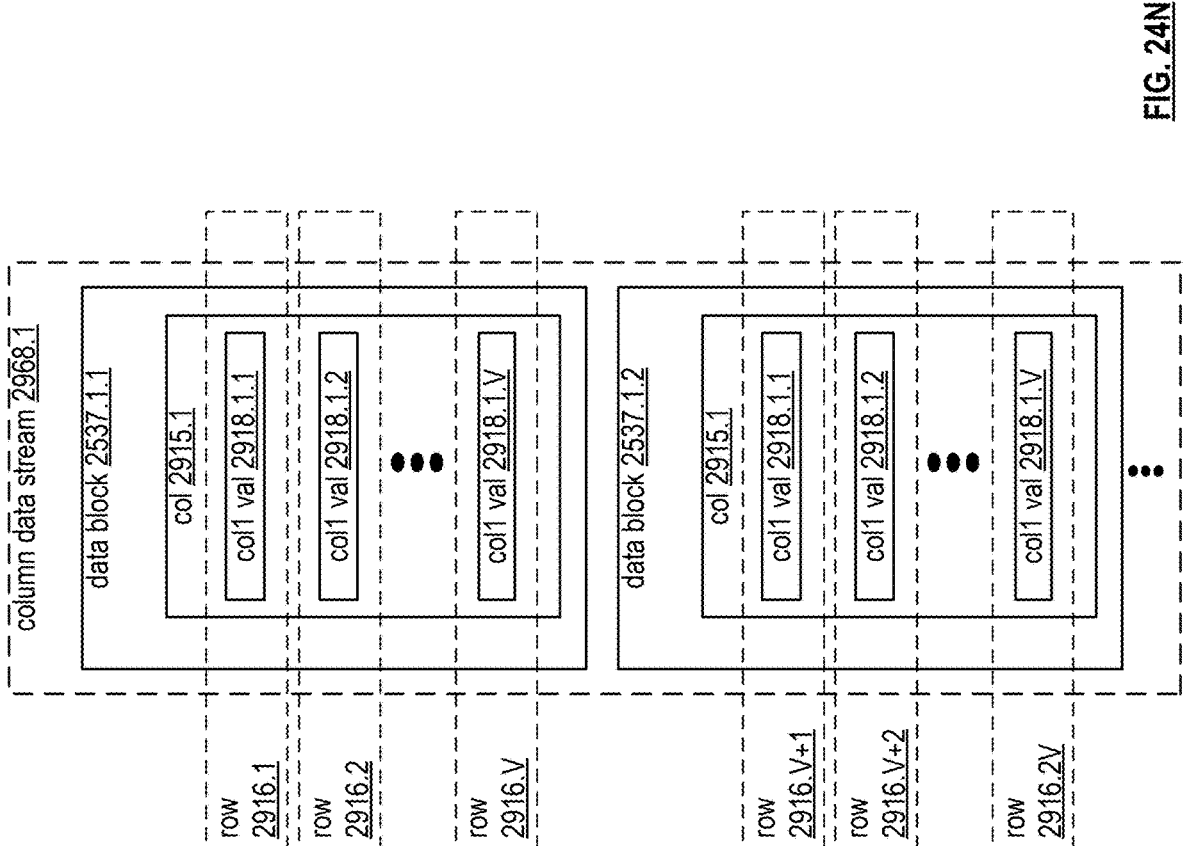
FIG. 24N illustrates example data blocks of a column data stream in accordance with various embodiments.

FIGS. 24M-24N illustrates an example embodiment of a query execution module 2504 of a database system 10 that executes queries via generation, storage, and/or communication of a plurality of column data streams 2968 corresponding to a plurality of columns. Some or all features and/or functionality of query execution module 2504 of FIGS. 24M-24N can implement any embodiment of query execution module 2504 described herein and/or any performance of query execution described herein. Some or all features and/or functionality of column data streams 2968 of FIGS. 24M-24N can implement any embodiment of data blocks 2537 and/or other communication of data between operators 2520 of a query operator execution flow 2517 when executed by a query execution module 2504, for example, via a corresponding plurality of operator execution modules 3215.

As illustrated in FIG. 24M, in some embodiments, data values of each given column 2915 are included in data blocks of their own respective column data stream 2968. Each column data stream 2968 can correspond to one given column 2915, where each given column 2915 is included in one data stream included in and/or referenced by output data blocks generated via execution of one or more operator execution module 3215, for example, to be utilized as input by one or more other operator execution modules 3215. Different columns can be designated for inclusion in different data streams. For example, different column streams are written do different portions of memory, such as different sets of memory fragments of query execution memory resources.

As illustrated in FIG. 24N, each data block 2537 of a given column data stream 2968 can include values 2918 for the respective column for one or more corresponding rows 2916. In the example of FIG. 24N, each data block includes values for V corresponding rows, where different data blocks in the column data stream include different respective sets of V rows, for example, that are each a subset of a total set of rows to be processed. In other embodiments, different data blocks can have different numbers of rows. The subsets of rows across a plurality of data blocks 2537 of a given column data stream 2968 can be mutually exclusive and collectively exhaustive with respect to the full output set of rows, for example, emitted by a corresponding operator execution module 3215 as output.

Values 2918 of a given row utilized in query execution are thus dispersed across different A given column 2915 can be implemented as a column 2707 having corresponding values 2918 implemented as values 2708 read from database table 2712 read from database storage 2450, for example, via execution of corresponding IO operators. Alternatively or in addition, a given column 2915 can be implemented as a column 2707 having new and/or modified values generated during query execution, for example, via execution of an extend expression and/or other operation. Alternatively or in addition, a given column 2915 can be implemented as a new column generated during query execution having new values generated accordingly, for example, via execution of an extend expression and/or other operation. The set of column data streams 2968 generated and/or emitted between operators in query execution can correspond to some or all columns of one or more tables 2712 and/or new columns of an existing table and/or of a new table generated during query execution.

Additional column streams emitted by the given operator execution module can have their respective values for the same full set of output rows across for other respective columns. For example, the values across all column streams are in accordance with a consistent ordering, where a first row's values 2918.1.1-2918.1.C for columns 2915.1-2915.C are included first in every respective column data stream, where a second row's values 2918.2.1-2918.2.C for columns 2915.1-2915.C are included second in every respective column data stream, and so on. In other embodiments, rows are optionally ordered differently in different column streams. Rows can be identified across column streams based on consistent ordering of values, based on being mapped to and/or indicating row identifiers, or other means.

As a particular example, for every fixed-length column, a huge block can be allocated to initialize a fixed length column stream, which can be implemented via mutable memory as a mutable memory column stream, and/or for every variable-length column, another huge block can be allocated to initialize a binary stream, which can be implemented via mutable memory as a mutable memory binary stream. A given column data stream 2968 can be continuously appended with fixed length values to data runs of contiguous memory and/or may grow the underlying huge page memory region to acquire more contiguous runs and/or fragments of memory.

In other embodiments, rather than emitting data blocks with values 2918 for different columns in different column streams, values 2918 for a set of multiple columns can be emitted in a same multi-column data stream.

Figure 24O:
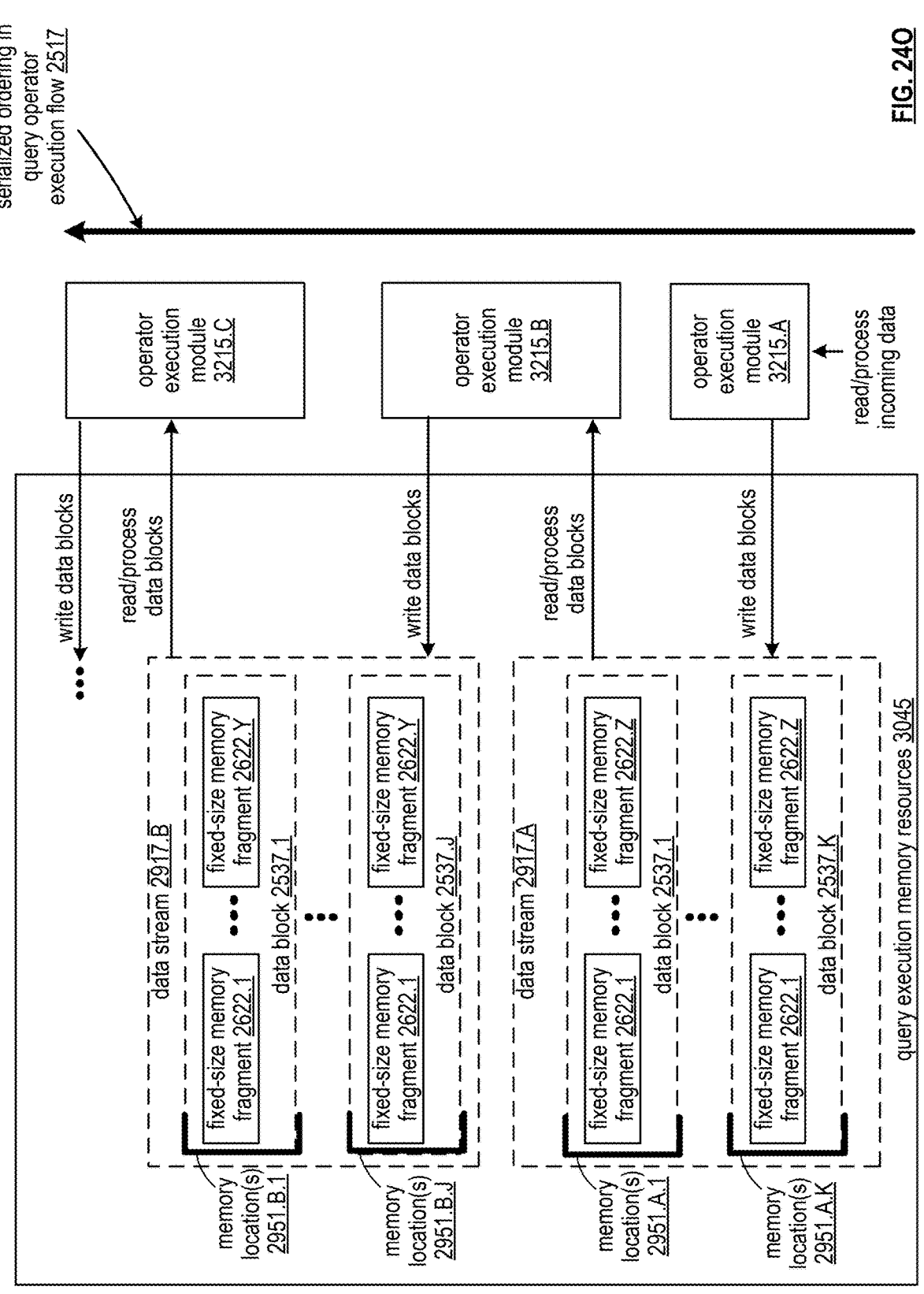
FIG. 24O is a schematic block diagram of a query execution module illustrating writing and processing of data blocks by operator execution modules in accordance with various embodiments.

FIG. 24O illustrates an example of operator execution modules 3215.C that each write their output memory blocks to one or more memory fragments 2622 of query execution memory resources 3045 and/or that each read/process input data blocks based on accessing the one or more memory fragments 2622 Some or all features and/or functionality of the operator execution modules 3215 of FIG. 24O can implement the operator execution modules of FIG. 24J and/or can implement any query execution described herein. The data blocks 2537 can implement the data blocks of column streams of FIGS. 24M and/or 24N, and/or any operator 2520's input data blocks and/or output data blocks described herein.

A given operator execution module 3215.A for an operator that is a child operator of the operator executed by operator execution module 3215.B can emit its output data blocks for processing by operator execution module 3215.B based on writing each of a stream of data blocks 2537.1-2537.K of data stream 2917.A to contiguous or non-contiguous memory fragments 2622 at one or more corresponding memory locations 2951 of query execution memory resources 3045.

Operator execution module 3215.A can generate these datablocks 2537.1-2537.K of data stream 2917.A in conjunction with execution of the respective operator on incoming data. This incoming data can correspond to one or more other streams of data blocks 2537 of another data stream 2917 accessed in memory resources 3045 based on being written by one or more child operator execution modules corresponding to child operators of the operator executed by operator execution module 3215.A. Alternatively or in addition, the incoming data is read from database storage 2450 and/or is read from one or more segments stored on memory drives, for example, based on the operator executed by operator execution module 3215.A being implemented as an IO operator.

The parent operator execution module 3215.B of operator execution module 3215.A can generate its own output data blocks 2537.1-2537.J of data stream 2917.B based on execution of the respective operator upon data blocks 2537.1-2537.K of data stream 2917.A. Executing the operator can include reading the values from and/or performing operations toy filter, aggregate, manipulate, generate new column values from, and/or otherwise determine values that are written to data blocks 2537.1-2537.J.

In other embodiments, the operator execution module 3215.B does not read the values from these data blocks, and instead forwards these data blocks, for example, where data blocks 2537.1-2537.J include memory reference data for the data blocks 2537.1-2537.K to enable one or more parent operator modules, such as operator execution module 3215.C, to access and read the values from forwarded streams.

In the case where operator execution module 3215.A has multiple parents, the datablocks 2537.1-2537.K of data stream 2917.A can be read, forwarded, and/or otherwise processed by each parent operator execution module 3215 independently in a same or similar fashion. Alternatively or in addition, in the case where operator execution module 3215.B has multiple children, each child's emitted set of data blocks 2537 of a respective data stream 2917 can be read, forwarded, and/or otherwise processed by operator execution module 3215.B in a same or similar fashion.

The parent operator execution module 3215.C of operator execution module 3215.B can similarly read, forward, and/or otherwise process data blocks 2537.1-2537.J of data stream 2917.B based on execution of the respective operator to render generation and emitting of its own data blocks in a similar fashion. Executing the operator can include reading the values from and/or performing operations to filter, aggregate, manipulate, generate new column values from, and/or otherwise process data blocks 2537.1-2537.J to determine values that are written to its own output data. For example, the operator execution module 3215.C reads data blocks 2537.1-2537.K of data stream 2917.A and/or the operator execution module 3215.B writes data blocks 2537.1-2537.J of data stream 2917.B. As another example, the operator execution module 3215.C reads data blocks 2537.1-2537.K of data stream 2917.A, or data blocks of another descendent, based on having been forwarded, where corresponding memory reference information denoting the location of these data blocks is read and processed from the received data blocks data blocks 2537.1-2537.J of data stream 2917.B enable accessing the values from data blocks 2537.1-2537.K of data stream 2917.A. As another example, the operator execution module 3215.B does not read the values from these data blocks, and instead forwards these data blocks, for example, where data blocks 2537.1-2537.J include memory reference data for the datablocks 2537.1-2537.J to enable one or more parent operator modules to read these forwarded streams.

This pattern of reading and/or processing input data blocks from one or more children for use in generating output data blocks for one or more parents can continue until ultimately a final operator, such as an operator executed by a root level node, generates a query resultant, which can itself be stored as data blocks in this fashion in query execution memory resources and/or can be transmitted to a requesting entity for display and/or storage.

For example, rather than accessing this large data for some or all potential records prior to filtering in a query execution, for example, via IO level 2416 of a corresponding query execution plan 2405 as illustrated in FIGS. 24A and 24C, and/or rather than passing this large data to other nodes 37 for processing, for example, from IO level nodes 37 to inner level nodes 37 and/or between any nodes 37 as illustrated in FIGS. 24A, 24B, and 24C, this large data is not accessed until a final stage of a query. As a particular example, this large data of the projected field is simply joined at the end of the query for the corresponding outputted rows that meet query predicates of the query. This ensures that, rather than accessing and/or passing the large data of these fields for some or all possible records that may be projected in the resultant, only the large data of these fields for final, filtered set of records that meet the query predicates are accessed and projected.

Figure 24P:
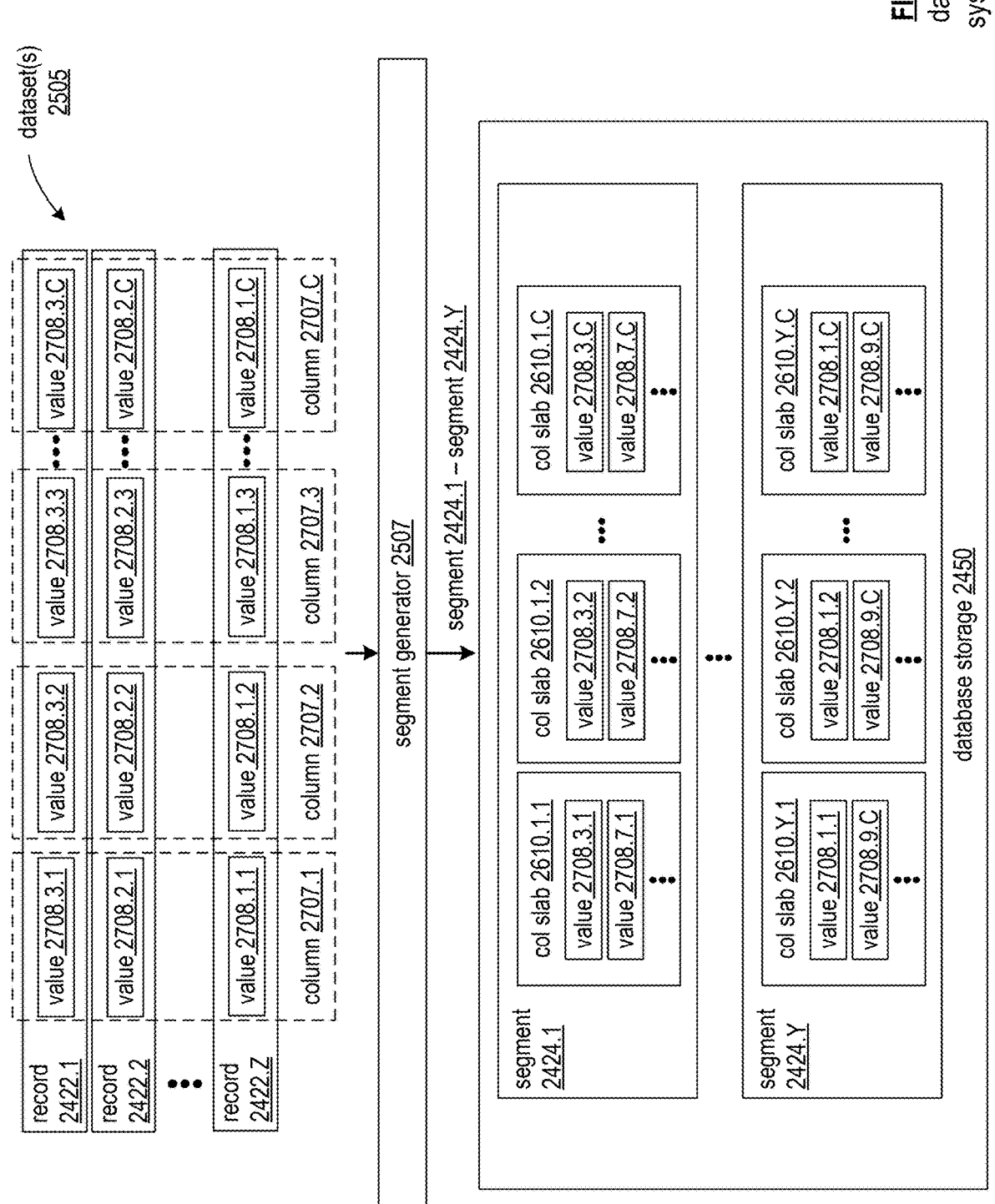
FIG. 24P is a schematic block diagram of a database system that implements a segment generator that generates segments from a plurality of records in accordance with various embodiments.

FIG. 24P illustrates an embodiment of a database system 10 that implements a segment generator 2507 to generate segments 2424. Some or all features and/or functionality of the database system 10 of FIG. 24P can implement any embodiment of the database system 10 described herein. Some or all features and/or functionality of segments 2424 of FIG. 24P can implement any embodiment of segment 2424 described herein.

A plurality of records 2422.1-2422.Z of one or more datasets 2505 to be converted into segments can be processed to generate a corresponding plurality of segments 2424.1-2424.Y. Each segment can include a plurality of column slabs 2610.1-2610.C corresponding to some or all of the C columns of the set of records.

In some embodiments, the dataset 2505 can correspond to a given database table 2712. In some embodiments, the dataset 2505 can correspond to only portion of a given database table 2712 (e.g. the most recently received set of records of a stream of records received for the table over time), where other datasets 2505 are later processed to generate new segments as more records are received over time. In some embodiments, the dataset 2505 can correspond to multiple database tables. The dataset 2505 optionally includes non-relational records and/or any records/files/data that is received from/generated by a given data source multiple different data sources.

Each record 2422 of the incoming dataset 2505 can be assigned to be included in exactly one segment 2424. In this example, segment 2424.1 includes at least records 2422.3 and 2422.7, while segment 2424 includes at least records 2422.1 and 2422.9. All of the Z records can be guaranteed to be included in exactly one segment by segment generator 2507. Rows are optionally grouped into segments based on a cluster-key based grouping or other grouping by same or similar column values of one or more columns. Alternatively, rows are optionally grouped randomly, in accordance with a round robin fashion, or by any other means.

A given row 2422 can thus have all of its column values 2708.1-2708.C included in exactly one given segment 2424, where these column values are dispersed across different column slabs 2610 based on which columns each column value corresponds. This division of column values into different column slabs can implement the columnar-format of segments described herein. The generation of column slabs can optionally include further processing of each set of column values assigned to each column slab. For example, some or all column slabs are optionally compressed and stored as compressed column slabs.

The database storage 2450 can thus store one or more datasets as segments 2424, for example, where these segments 2424 are accessed during query execution to identify/read values of rows of interest as specified in query predicates, where these identified rows/the respective values are further filtered/processed/etc., for example, via operators 2520 of a corresponding query operator execution flow 2517, or otherwise accordance with the query to render generation of the query resultant.

Figure 24Q:
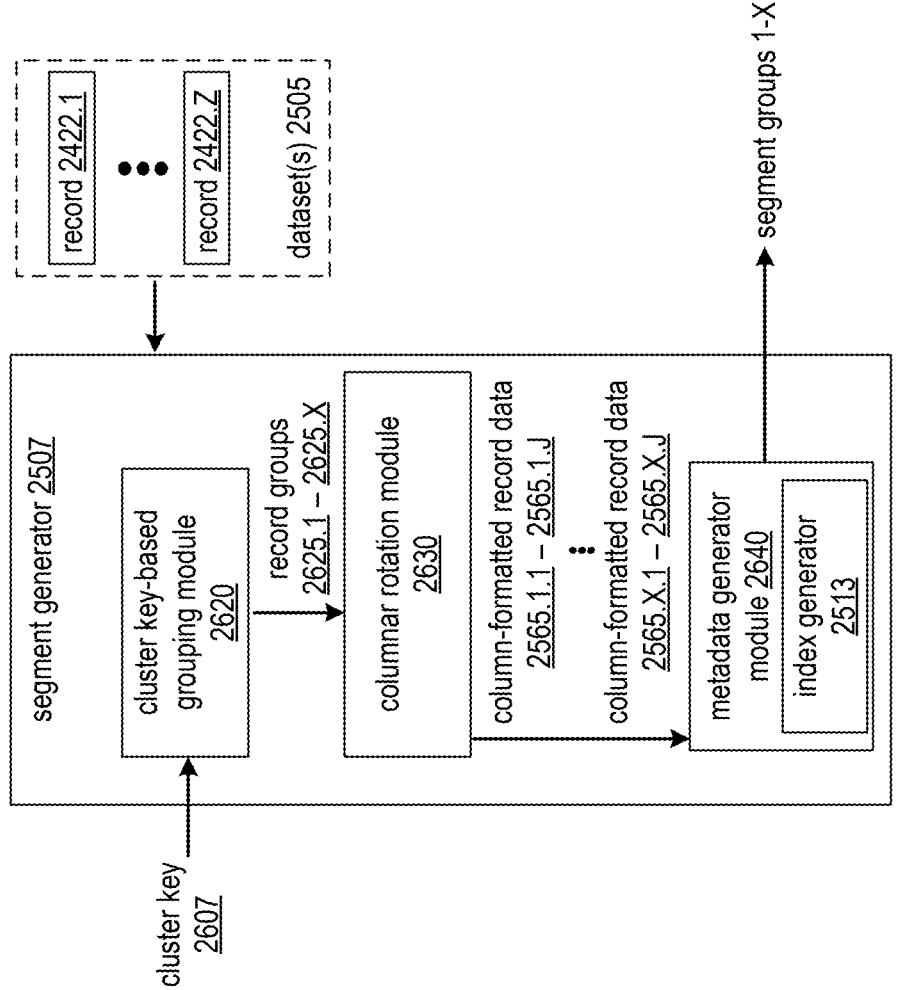
FIG. 24Q is a schematic block diagram of a segment generator that implements a cluster key-based grouping module, a columnar rotation module, and a metadata generator module in accordance with various embodiments.

FIG. 24Q illustrates an example embodiment of a segment generator 2507 of database system 10. Some or all features and/or functionality of the database system 10 of FIG. 24Q can implement any embodiment of the database system 10 described herein. Some or all features and/or functionality of the segment generator 2507 of FIG. 24Q can implement the segment generator 2507 of FIG. 24P and/or any embodiment of the segment generator 2507 described herein.

The segment generator 2507 can implement a cluster key-based grouping module 2620 to group records of a dataset 2505 by a predetermined cluster key 2607, which can correspond to one or more columns. The cluster key can be received, accessed in memory, configured via user input, automatically selected based on an optimization, or otherwise determined. This grouping by cluster key can render generation of a plurality of record groups 2625.1-2625.X.

The segment generator 2507 can implement a columnar rotation module 2630 to generate a plurality of column formatted record data (e.g. column slabs 2610 to be included in respective segments 2424). Each record group 2625 can have a corresponding set of J column-formatted record data 2565.1-2565.J generated, for example, corresponding to J segments in a given segment group.

A metadata generator module 2640 can further generate parity data, index data, statistical data, and/or other metadata to be included in segments in conjunction with the column-formatted record data. A set of X segment groups corresponding to the X record groups can be generated and stored in database storage 2450. For example, each segment group includes J segments, where parity data of a proper subset of segments in the segment group can be utilized to rebuild column-formatted record data of other segments in the same segment group as discussed previously.

In some embodiments, the segment generator 2507 implements some or all features and/or functionality of the segment generator disclosed by: U.S. Utility application Ser. No. 16/985,723, entitled "DELAYING SEGMENT GENERATION IN DATABASE SYSTEMS", filed Aug. 5, 2020, which is hereby incorporated herein by reference in its entirety and made part of the present U.S. Utility Patent Application for all purposes; U.S. Utility application Ser. No. 16/985,957 entitled "PARALLELIZED SEGMENT GENERATION VIA KEY-BASED SUBDIVISION IN DATABASE SYSTEMS", filed Aug. 5, 2020, which is hereby incorporated herein by reference in its entirety and made part of the present U.S. Utility Patent Application for all purposes; and/or U.S. Utility application Ser. No. 16/985, 930, entitled "RECORD DEDUPLICATION IN DATABASE SYSTEMS", filed Aug. 5, 2020, issued as U.S. Pat. No. 11,321,288 on May 3, 2022, which is hereby incorporated herein by reference in its entirety and made part of the present U.S. Utility Patent Application for all purposes. For example, the database system 10 implements some or all features and/or functionality of record processing and storage system of U.S. Utility application Ser. No. 16/985,723, U.S. Utility application Ser. No. 16/985,957, and/or U.S. Utility application Ser. No. 16/985,930.

Figure 24R:
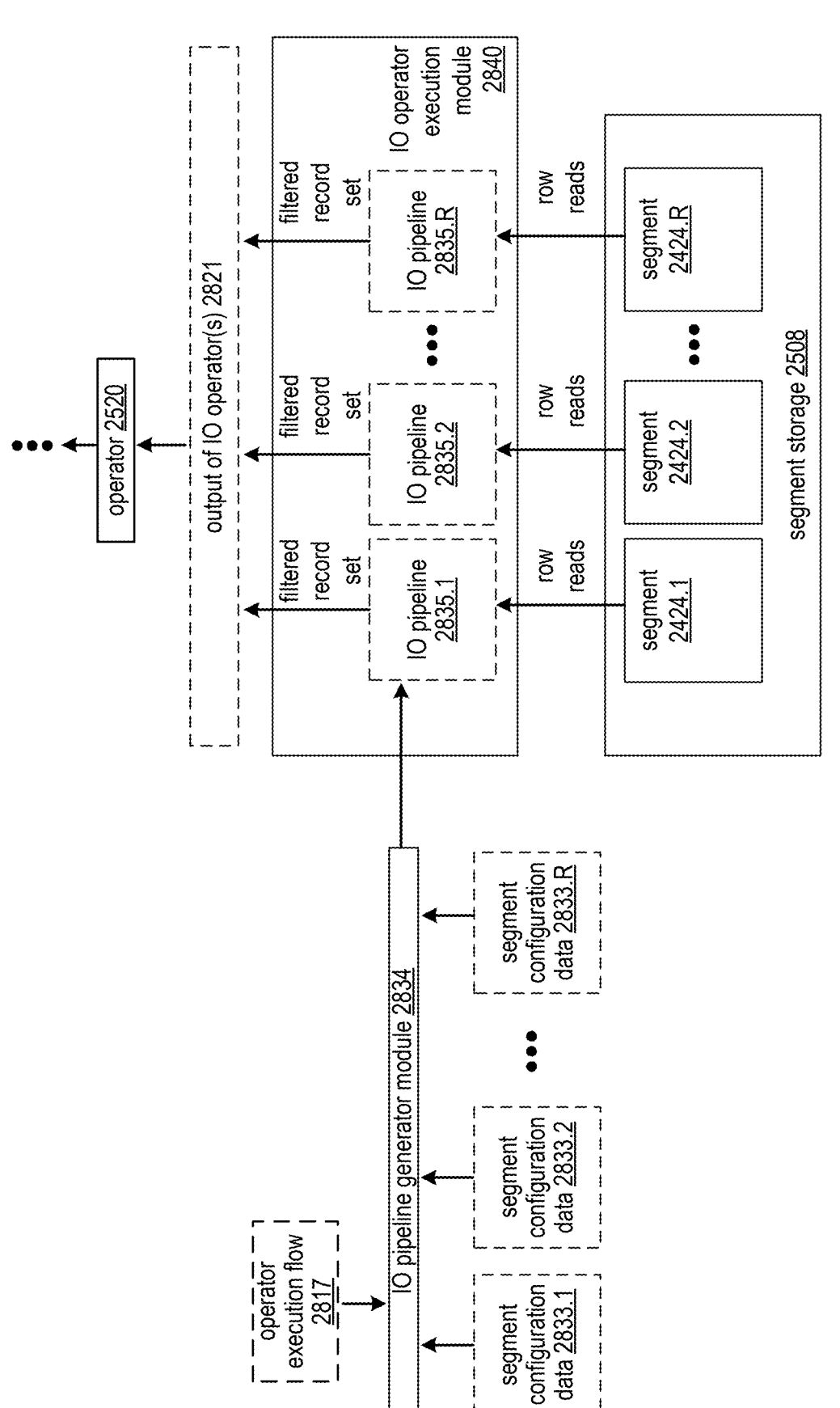
FIG. 24R is a schematic block diagram of a query processing system that generates and executes a plurality of IO pipelines to generate filtered records sets from a plurality of segments in conjunction with executing a query in accordance with various embodiments.

FIG. 24R illustrates an embodiment of a query processing system 2510 that implements an IO pipeline generator module 2834 to generate a plurality of IO pipelines 2835.1-2835.R for a corresponding plurality of segments 2424.1-2424.R, where these IO pipelines 2835.1-2835.R are each executed by an IO operator execution module 2840 to facilitate generation of a filtered record set by accessing the corresponding segment. Some or all features and/or functionality of the query processing system 2510 of FIG. 24R can implement any embodiment of query processing system 2510, any embodiment of query execution module 2504, and/or any embodiment of executing a query described herein.

Each IO pipeline 2835 can be generated based on corresponding segment configuration data 2833 for the corresponding segment 2424, such as secondary indexing data for the segment, statistical data/cardinality data for the segment, compression schemes applied to the column slabs of the segment, or other information denoting how the segment is configured. For example, different segments 2424 have different IO pipelines 2835 generated for a given query based on having different secondary indexing schemes, different statistical data/cardinality data for its values, different compression schemes applied for some of all of the columns of its records, or other differences.

An IO operator execution module 2840 can execute each respective IO pipeline 2835. For example, the IO operator execution module 2840 is implemented by nodes 37 at the IO level of a corresponding query execution plan 2405, where a node 37 storing a given segment 2424 is responsible for accessing the segment as described previously, and thus executes the IO pipeline for the given segment.

This execution of IO pipelines 2835 by IO operator execution module 2840 correspond to executing IO operators 2421 of a query operator execution flow 2517. The output of IO operators 2421 can correspond to output of IO operators 2421 and/or output of IO level. This output can correspond to data blocks that are further processed via additional operators 2520, for example, by nodes at inner levels and/or the root level of a corresponding query execution plan.

Each IO pipeline 2835 can be generated based on pushing some or all filtering down to the 1O level, where query predicates are applied via the IO pipeline based on accessing index structures, sourcing values, filtering rows, etc. Each IO pipeline 2835 can be generated to render semantically equivalent application of query predicates, despite differences in how the IO pipeline is arranged/executed for the given segment. For example, an index structure of a first segment is used to identify a set of rows meeting a condition for a corresponding column in a first corresponding IO pipeline while a second segment has its row values sourced and compared to a value to identify which rows meet the condition, for example, based on the first segment having the corresponding column indexed and the second segment not having the corresponding column indexed. As another example, the IO pipeline for a first segment applies a compressed column slab processing element to identify where rows are stored in a compressed column slab and to further facilitate decompression of the rows, while a second segment accesses this column slab directly for the corresponding column based on this column being compressed in the first segment and being uncompressed for the second segment.

Figure 24S:
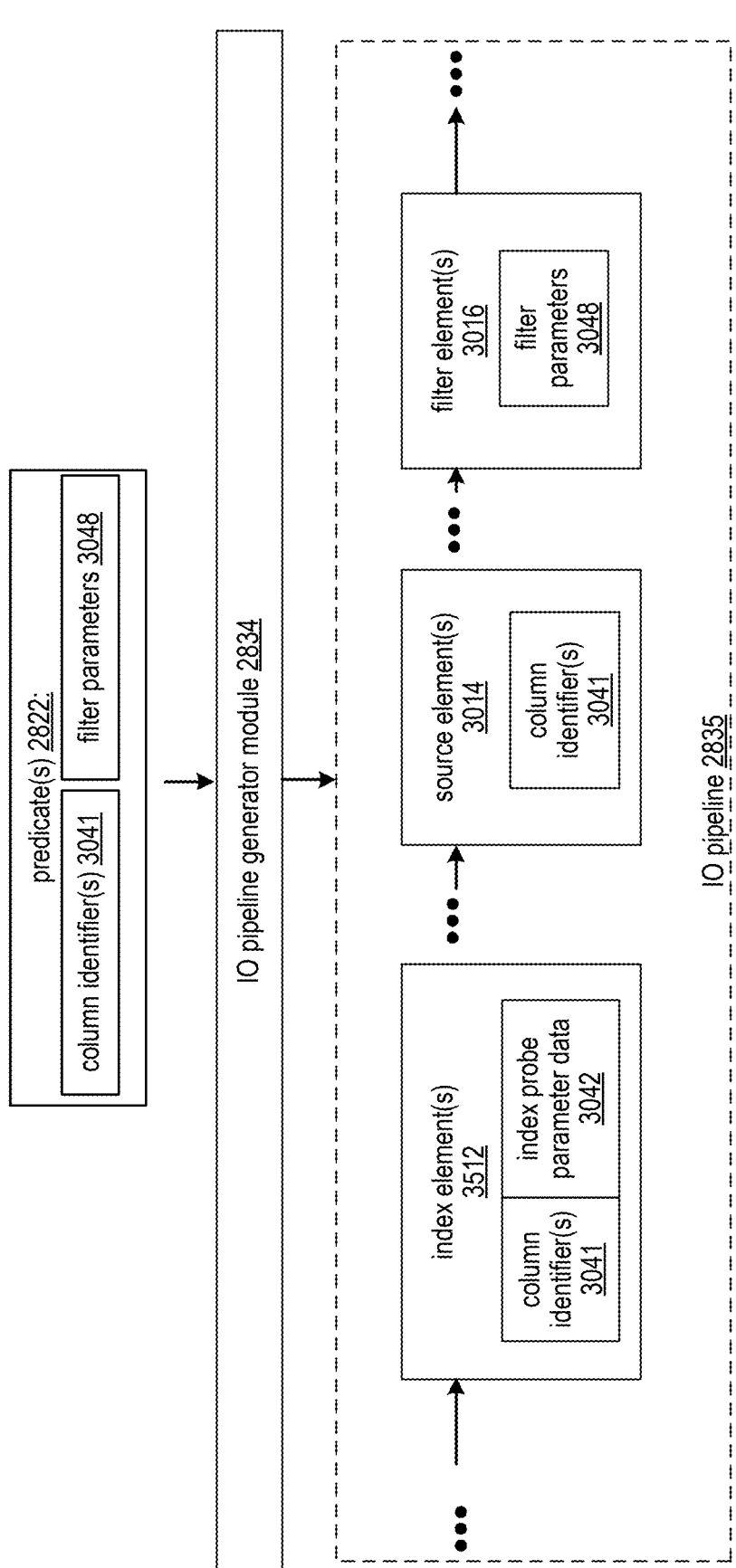
FIG. 24S is a schematic block diagram of a query processing system that generates an IO pipeline for accessing a corresponding segment based on predicates of a query in accordance with various embodiments.

FIG. 24S illustrates an example embodiment of an IO pipeline 2835 that is generated to include one or more index elements 3512, one or more source elements 3014, and/or one or more filter elements 3016. These elements can be arranged in a serialized ordering that includes one or more parallelized paths (e.g. the IO pipeline includes an acyclic directed graph of elements). These elements can implement sourcing and/or filtering of rows based on query predicates 2822 applied to one or more columns, identified by corresponding column identifiers 3041 and corresponding filter parameters 3048. Some or all features and/or functionality of the IO pipeline 2835 and/or IO pipeline generator module 2834 of FIG. 24S can implement the IO pipeline 2835 and/or IO pipeline generator module 2834 of FIG. 24R, and/or any embodiment of IO pipeline 2835, of IO pipeline generator module 2834, or of any query execution via accessing segments described herein.

In some embodiments, the IO pipeline generator module 2834, IO pipeline 2835, IO operator execution module 2840, and/or any embodiment of IO pipeline generation and/or IO pipeline execution described herein, implements some or all features and/or functionality of the IO pipeline generator module 2834, IO pipeline 2835, IO operator execution module 2840, and/or pushing of filtering and/or other operations to the IO level as disclosed by: U.S. Utility application Ser. No. 17/303,437, entitled "QUERY EXECUTION UTILIZING PROBABILISTIC INDEXING" and filed May 28, 2021; U.S. Utility application Ser. No. 17/450,109, entitled "MISSING DATA-BASED INDEXING IN DATABASE SYSTEMS" and filed Oct. 6, 2021; U.S. Utility application Ser. No. 18/310,177, entitled "OPTIMIZING AN OPERATOR FLOW FOR PERFORMING AGGREGATION VIA A DATABASE SYSTEM" and filed May 1, 2023; U.S. Utility application Ser. No. 18/355,505, entitled "STRUCTURING GEOSPATIAL INDEX DATA FOR ACCESS DURING QUERY EXECUTION VIA A DATABASE SYSTEM" and filed Jul. 20, 2023; and/or U.S. Utility application Ser. No. 18/485,861, entitled "QUERY PROCESSING IN A DATABASE SYSTEM BASED ON APPLYING A DISJUNCTION OF CONJUNCTIVE NORMAL FORM PREDICATES" and filed Oct. 12, 2023; all of which hereby incorporated herein by reference in its entirety and made part of the present U.S. Utility Patent Application for all purposes.

Figure 24T:
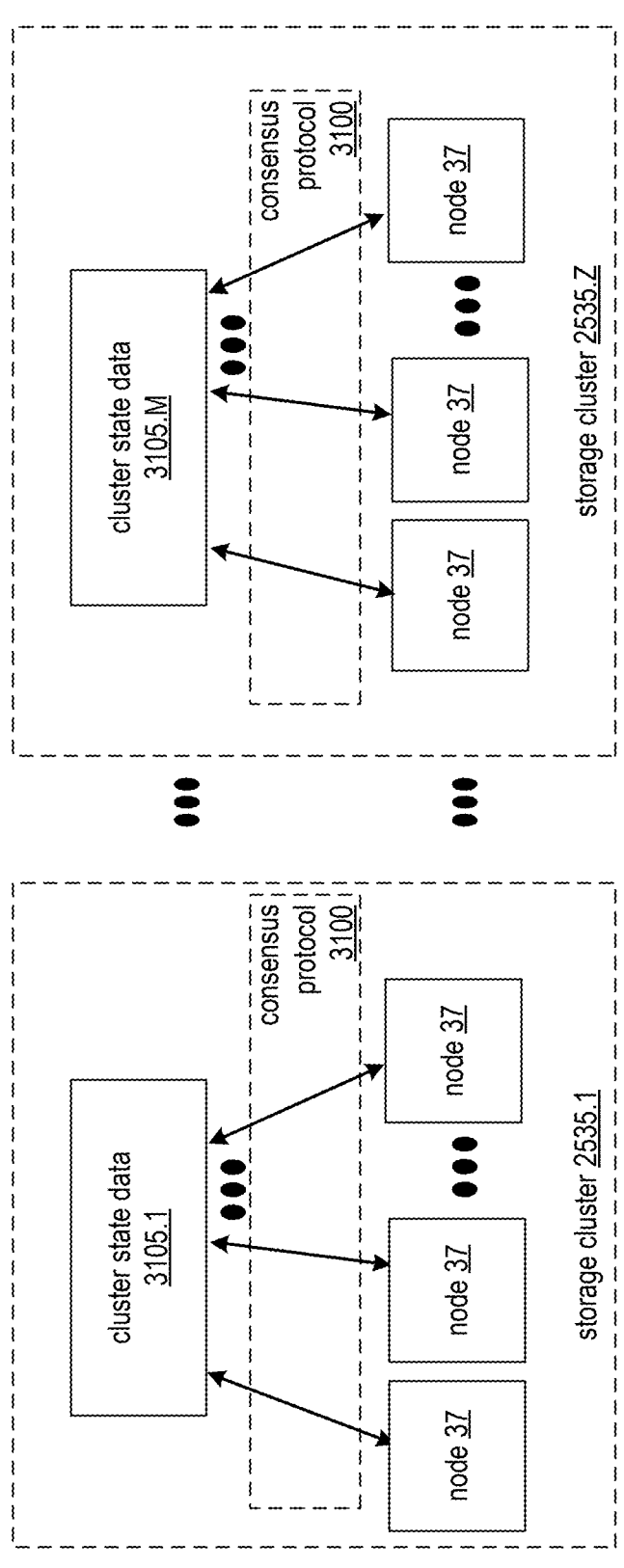
FIG. 24T is a schematic block diagram of a database system that includes a plurality of storage clusters that each mediate cluster state data via a plurality of nodes in accordance with a consensus protocol in accordance with various embodiments.

FIG. 24T presents an embodiment of a database system 10 that includes a plurality of storage clusters 2535. Storage clusters 2535.1-2535.Z of FIG. 24T can implement some or all features and/or functionality of storage clusters 35-1-35-Z described herein, and/or can implement some or all features and/or functionality of any embodiment of a storage cluster described herein. Some or all features and/or functionality of database system 10 of FIG. 24T can implement any embodiment of database system 10 described herein.

Each storage cluster 2535 can be implemented via a corresponding plurality of nodes 37. In some embodiments, a given node 37 of database system 10 is optionally included in exactly one storage cluster. In some embodiments, one or more nodes 37 of database system 10 are optionally included in no storage clusters (e.g. aren't configured to store segments). In some embodiments, one or more nodes 37 of database system 10 can be included in multiple storage clusters.

In some embodiments, some or all nodes 37 in a storage cluster 2535 participate at the IO level 2416 in query execution plans based on storing segments 2424 in corresponding memory drives 2425, and based on accessing these segments 2424 during query execution. This can include executing corresponding IO operators, for example, via executing an IO pipeline 2835 (and/or multiple IO pipelines 2835, where each IO pipeline is configured for each respective segment 2424). All segments in a given same segment group (e.g. a set of segments collectively storing parity data and/or replicated parts enabling any given segment in the segment group to be rebuilt/accessed as a virtual segment during query execution via access to some or all other segments in the same segment group as described previously) are optionally guaranteed to be stored in a same storage cluster 2535, where segment rebuilds and/or virtual segment use in query execution can thus be facilitated via communication between nodes in a given storage cluster 2535 accordingly, for example, in response to a node failing and/or a segment becoming unavailable.

Each storage cluster 2535 can further mediate cluster state data 3105 in accordance with a consensus protocol mediated via the plurality of nodes 37 of the given storage cluster. Cluster state data 3105 can implement any embodiment of state data and/or system metadata described herein. In some embodiments, cluster state data 3105 can indicate data ownership information indicating ownership of each segments stored by the cluster by exactly one node (e.g. as a physical segment or a virtual segment) to ensure queries are executed correctly via processing rows in each segment (e.g. of a given dataset against which the query is executed) exactly once.

Consensus protocol 3100 can be implemented via the raft consensus protocol and/or any other consensus protocol. Consensus protocol 3100 can be implemented be based on distributing a state machine across a plurality of nodes, ensuring that each node in the cluster agrees upon the same series of state transitions and/or ensuring that each node operates in accordance with the currently agreed upon state transition. Consensus protocol 3100 can implement any embodiment of consensus protocol described herein.

Coordination across different storage clusters 2535 can be minimal and/or non-existent, for example, based on each storage cluster coordinating state data and/or corresponding query execution separately. For example, state data 3105 across different storage clusters is optionally unrelated.

Each storage cluster's nodes 37 can perform various database tasks (e.g. participate in query execution) based on accessing/utilizing the state data 3105 of its given storage cluster, for example, without knowledge of state data of other storage clusters. This can include nodes syncing state data 3105 and/or otherwise utilizing the most recent version of state data 3105, for example, based on receiving updates from a leader node in the cluster, triggering a sync process in response to determining to perform a corresponding task requiring most recent state data, accessing/updating a locally stored copy of the state data, and/or otherwise determining updated state data.

In some embodiments, updating of state data (such as configuration data, system metadata, data shared via a consensus protocol, and/or any other state data described herein), for example, utilized by nodes to perform respective functionality over time, can be performed in conjunction with an event driven model. In some embodiments, such updating of state data over time can be performed in a same or similar fashion as updating of configuration data as disclosed by: U.S. Utility application Ser. No. 18/321,212, entitled COMMUNICATING UPDATES TO SYSTEM METADATA VIA A DATABASE SYSTEM, filed May 22, 2023; and/or U.S. Utility application Ser. No. 18/310,262, entitled "GENERATING A SEGMENT REBUILD PLAN VIA A NODE OF A DATABASE", filed May 1, 2023; which are hereby incorporated herein by reference in their entirety and made part of the present U.S. Utility Patent Application for all purposes.

In some embodiments, system metadata can be generated and/or updated over time with different corresponding metadata sequence numbers (MSNs). For example, such generation/updating of metadata over time can be implemented via any features and/or functionality of the generation of data ownership information over time with corresponding OSNs as disclosed by U.S. Utility application Ser. No. 16/778,194, entitled "SERVICING CONCURRENT QUERIES VIA VIRTUAL SEGMENT RECOVERY", filed Jan. 31, 2020, and issued as U.S. Pat. No. 11,061,910 on Jul. 13, 2021, which is hereby incorporated herein by reference in its entirety and made part of the present U.S. Utility Patent Application for all purposes. In some embodiments, the system metadata management system 2702 and/or a corresponding metadata system protocol can be implemented via a consensus protocols mediated via a plurality of nodes, for example, to update system metadata 2710, in a via any features and/or functionality of the execution of consensus protocols mediated via a plurality of nodes as disclosed by this U.S. Utility application Ser. No. 16/778,194. In some embodiments, each version of system metadata 2710 can assign nodes to different tasks and/or functionality via any features and/or functionality of assigning nodes to different segments for access in query execution in different versions of data ownership information as disclosed by this U.S. Utility application Ser. No. 16/778,194. In some embodiments, system metadata indicates a current version of data ownership information, where nodes utilize system metadata and corresponding system configuration data to determine their own ownership of segments for use in query execution accordingly, and/or to execute queries utilizing correct sets of segments accordingly, based on processing the denoted data ownership information as U.S. Utility application Ser. No. 16/778,194.

Figure 24U:
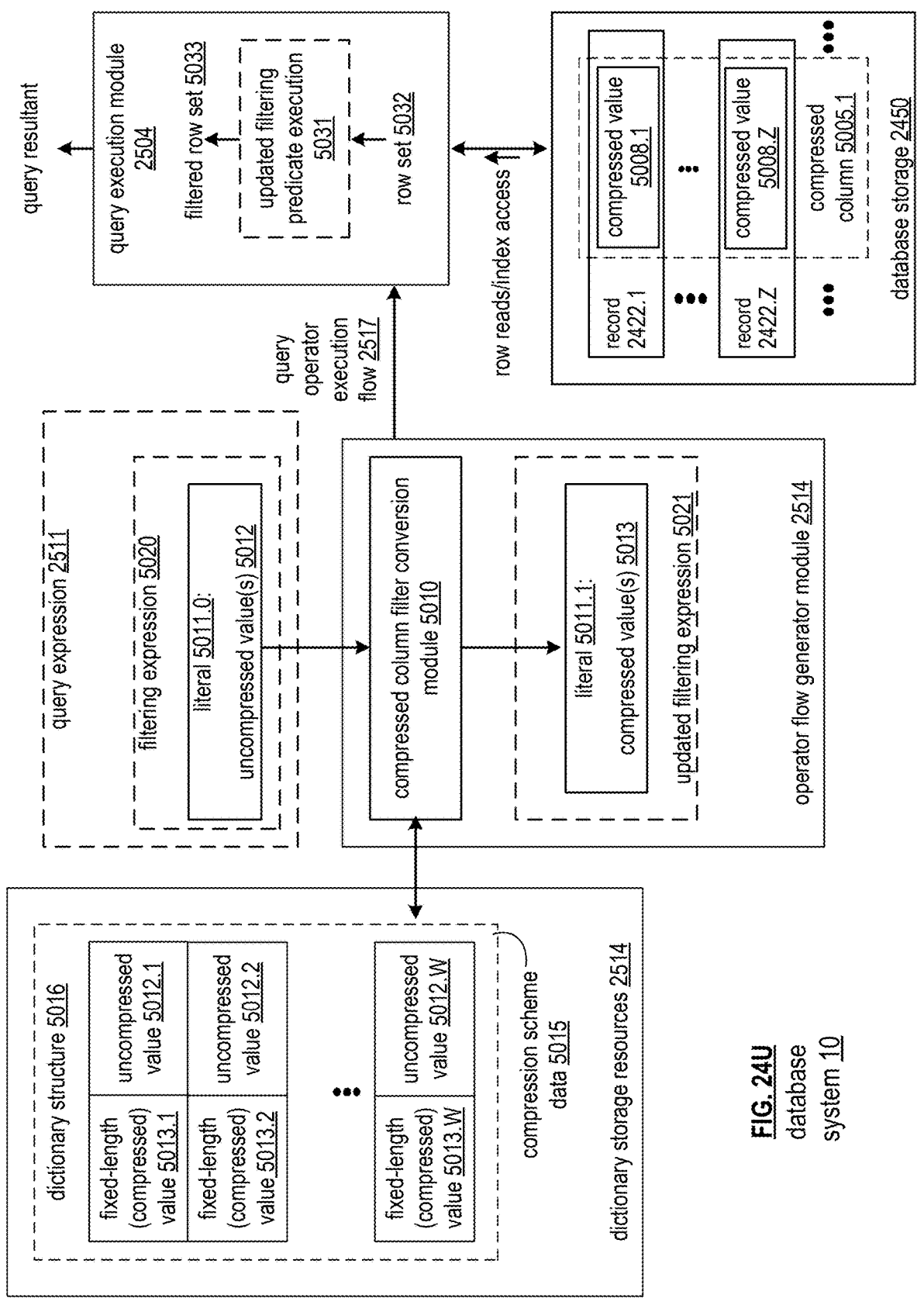
FIG. 24U is a schematic block diagram of a database system that implements a compressed column filter conversion module based on accessing a dictionary structure in accordance with various embodiments.
Figure 24V:
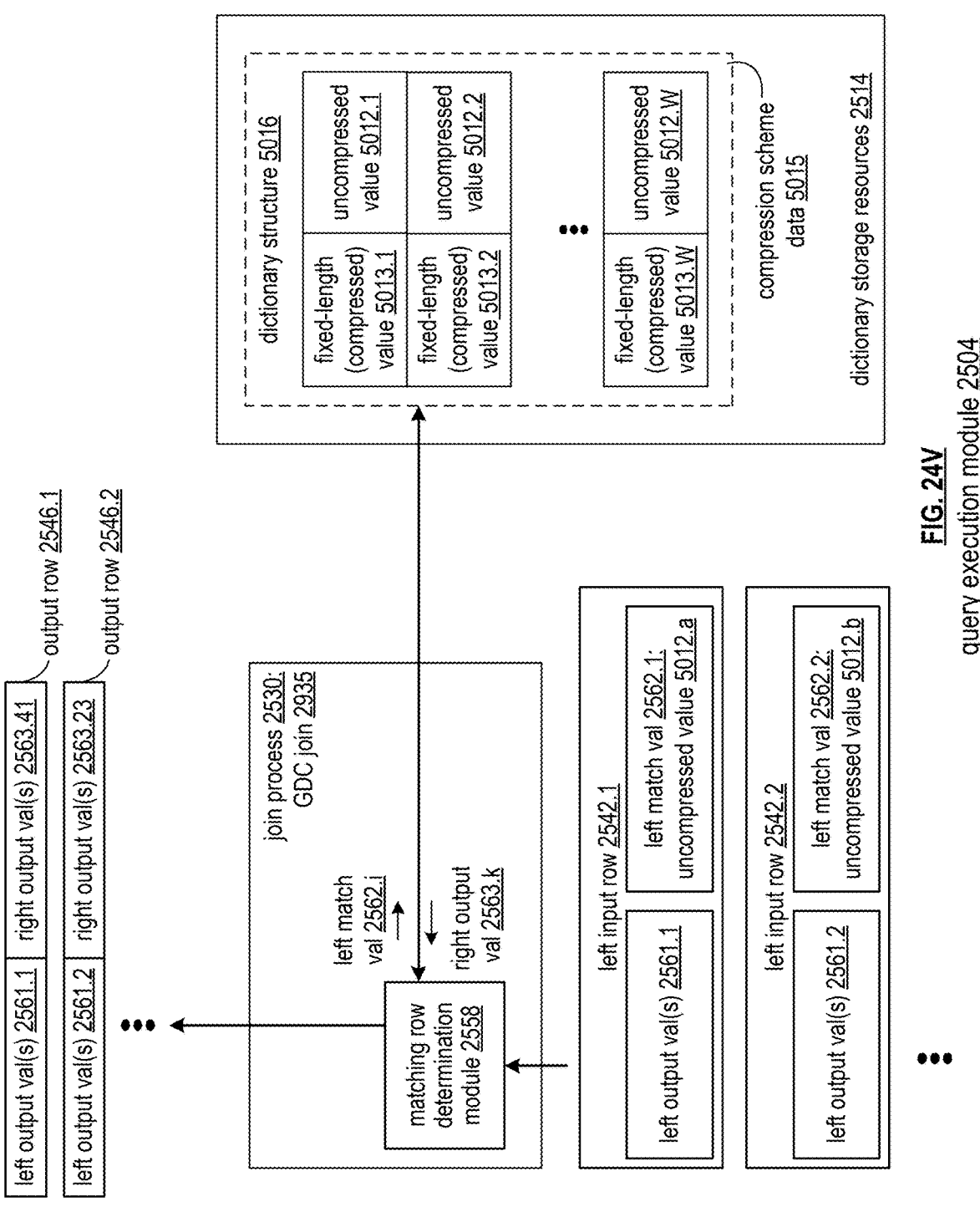
FIG. 24V is a schematic block diagram of a query execution module that implements a Global Dictionary Compression join via access to a dictionary structure in accordance with various embodiments.

FIGS. 24U and 24V illustrate embodiments of a database system 10 that utilizes a dictionary structure to store compressed columns. Some or all features and/or functionality of the dictionary structure 5016 of FIGS. 24U and/or 24V can implement any compression scheme data and/or means of generating and/or accessing compressed columns described herein. Any other features and/or functionality of database system 10 of FIG. 24U and/or 24V can implement any other embodiment of database system 10 described herein.

In some embodiments, columns are compressed as compressed columns 5005 based on a globally maintained dictionary (e.g. dictionary structure 5016), for example, in conjunction with applying Global Dictionary Compression (GDC). Applying Global Dictionary Compression can include replaces variable length column values with fixed length integers on disk (e.g. in database storage 2450), where the globally maintained dictionary is stored elsewhere, for example, via different (e.g. slower/less efficient) memory resources of a different type/in a different location from the database storage 2450 that stores the compressed columns 5005 accessed during query execution.

The dictionary structure can store a plurality of fixed-length, compressed values 5013 (e.g. integers) each mapped to a single uncompressed value 5012 (e.g. variable-length values, such as strings). The mapping of compressed values 5013 to uncompressed values 5012 can be in accordance with a one-to-one mapping. The mapping of compressed values 5013 to uncompressed values 5012 can be based on utilizing the fixed-length values 5013 as keys of a corresponding map and/or dictionary data structure, and/or can be based on utilizing the uncompressed values 5012 as keys of a corresponding map and/or dictionary data structure.

A given uncompressed value 5012 that is included in many rows of one or more tables can be replaced (i.e. "compressed") via a same corresponding compressed value 5013 mapped to this uncompressed value 5012 as the compressed value 5008 for these rows in compressed column 5005 in database storage. As new rows are received for storage over time, their column values for one or more compressed columns 5005 can be replaced via corresponding compressed values 5008 based on accessing the dictionary structure and determining whether the uncompressed value 5012 of this column is stored in the dictionary structure 5016. If yes, the compressed value 5013 mapped to the uncompressed value 5012 in this existing entry is stored as compressed value 5008 in the compressed column 5005 in the database storage 2450. If no, the dictionary structure 5016 can be updated to include a new entry that includes the uncompressed value 5012 and a new compressed value 5013 (e.g. different from all existing compressed values in the structure) generated for this uncompressed value 5012, where this new compressed value 5013 is stored as is applied as compressed value 5008 in the database storage 2450.

The dictionary structure 5016 can be stored in dictionary storage resources 2514, which can be different types of resources from and/or can be stored in a different location from the database storage 2450 storing the compressed columns for query execution. In some embodiments, the dictionary storage resources 2514 storing dictionary structure 5016 can be considered a portion/type of memory as of database storage 2450 that are accessed during query execution as necessary for decompressing column values. In some embodiments, the dictionary storage resources 2514 storing dictionary structure 5016 can be implemented as metadata storage resources, for example, implemented by a metadata consensus state mediated via a metadata storage cluster of nodes maintaining system metadata such as GDCs of the database system 10.

The dictionary structure 5016 can correspond to a given column 5005, where different columns optionally have their own dictionary structure 5016 build and maintained. Alternatively, a common dictionary structure 5016 can optionally be maintained for multiple columns of a same table/same dataset, and/or for multiple columns across different tables/different datasets. For example, a given uncompressed value 5012 appearing in different columns 5005 of the same or different table is compressed via the same fixed-length value 5013 as dictated by the dictionary structure 5016.

This dictionary structure 5016 can be globally maintained (e.g. across some or all nodes, indicating fixed length values mapped across one or more segments stored in conjunction with storing one or more relational database tables) and can be updated overtime (e.g. as more data is added with new variable length values requiring mapping to fixed length values). For example, the dictionary structure 5016 is maintained/stored in state data that is mediated/accessible by some or all nodes 37 of the database system 10 via the dictionary structure 5016 being included in any embodiment of state data described herein.

In some embodiments, dictionary compression via dictionary structure 5016 can implement the compression scheme utilized to generate (e.g. compress/decompress the values of) compressed columns 5005 of FIG. 24U based on implementing some or all features and/or functionality of the compression of data during ingress via a dictionary as disclosed by U.S. Utility application Ser. No. 16/985,723, entitled "DELAYING SEGMENT GENERATION IN DATABASE SYSTEMS", filed Aug. 5, 2020, which is hereby incorporated herein by reference in its entirety and made part of the present U.S. Utility Patent Application for all purposes.

In some embodiments, dictionary compression via dictionary structure 5016 can implement the compression scheme utilized to generate (e.g. compress/decompress the values of) compressed columns 5005 of FIG. 24U based on implementing some or all features and/or functionality of global dictionary compression as disclosed by U.S. Utility application Ser. No. 16/220,454, entitled "DATA SET COMPRESSION WITHIN A DATABASE SYSTEM", filed Dec. 14, 2018, issued as U.S. Pat. No. 11,256,696 on Feb. 22, 2022, which is hereby incorporated herein by reference in its entirety and made part of the present U.S. Utility Patent Application for all purposes.

In some embodiments, dictionary compression via dictionary structure 5016 can be utilized in performing GDC join processes during query execution to enable recovery of uncompressed values during query execution, for example, based on implementing some or all features and/or functionality of GDC joins as disclosed by U.S. Utility application Ser. No. 18/226,525, entitled "SWITCHING MODES OF OPERATION OF A ROW DISPERSAL OPERATION DURING QUERY EXECUTION", filed Jul. 26, 2023, which is hereby incorporated herein by reference in its entirety and made part of the present U.S. Utility Patent Application for all purposes.

FIG. 24U illustrates an embodiment of database system 10 where a compressed column filter conversion module 5010 accesses a dictionary structure 5016 to generate an updated filtering expression 5021 in conjunction with query execution.

The compressed column filter conversion module 5010 can generate updated filtering expression 5021 based on updating one or more literals 5011.1 from corresponding literals 5011.0 based on replacing uncompressed values 5012 with compressed values 5013 mapped to these compressed values based on accessing dictionary structure 5016 and determining which fixed-length compressed value 5013 is mapped to each given uncompressed value 5012. Such functionality can be implemented for one or more queries executed by database system 10 to reduce access to the dictionary structure during query execution in conjunction with performing one or more optimizations of the query operator execution flow to improve query performance.

FIG. 24V illustrates an embodiment of executing a join process 2530 that is implemented as a global dictionary compression (GDC) join. This can include applying a matching row determination module 2558 via access to a dictionary structure 5016, In some embodiments, unlike hash maps generated during query execution for access in conjunction with executing other types of JOIN operations (e.g. as described in U.S. Utility application Ser. No. 18/226,525), the dictionary structure 5016 can optionally be accessed during GDC join processes based on being globally maintained, and thus being generated prior to execution of the corresponding query. In particular, the dictionary structure 5016 can be implemented in conjunction with compressing one or more columns, such as a variable length values stored in one or more variable length columns, by mapping these variable length, uncompressed values (e.g. strings, other large values of a given column) to corresponding fixed-length, compressed values 5013 (e.g. integers or other fixed length values).

For example, segments can store the fixed length values to improve storage efficiency and/or queries can access and process these fixed length values, where the uncompressed variable length values are only required via access to dictionary structure 5016 to emit an uncompressed value 5012 for a given fixed-length value 5013 of a given input row. This functionality can be achieved via performing a corresponding join as described herein, where the matching condition 2519 is implemented for a compressed column and indicates matching by the value of the compressed column, such as simply emitting the uncompressed value mapped to the compressed column as the right output value 2563 for a given input row, implemented as a left input row 2542 of a join operation.

Figure 24W:
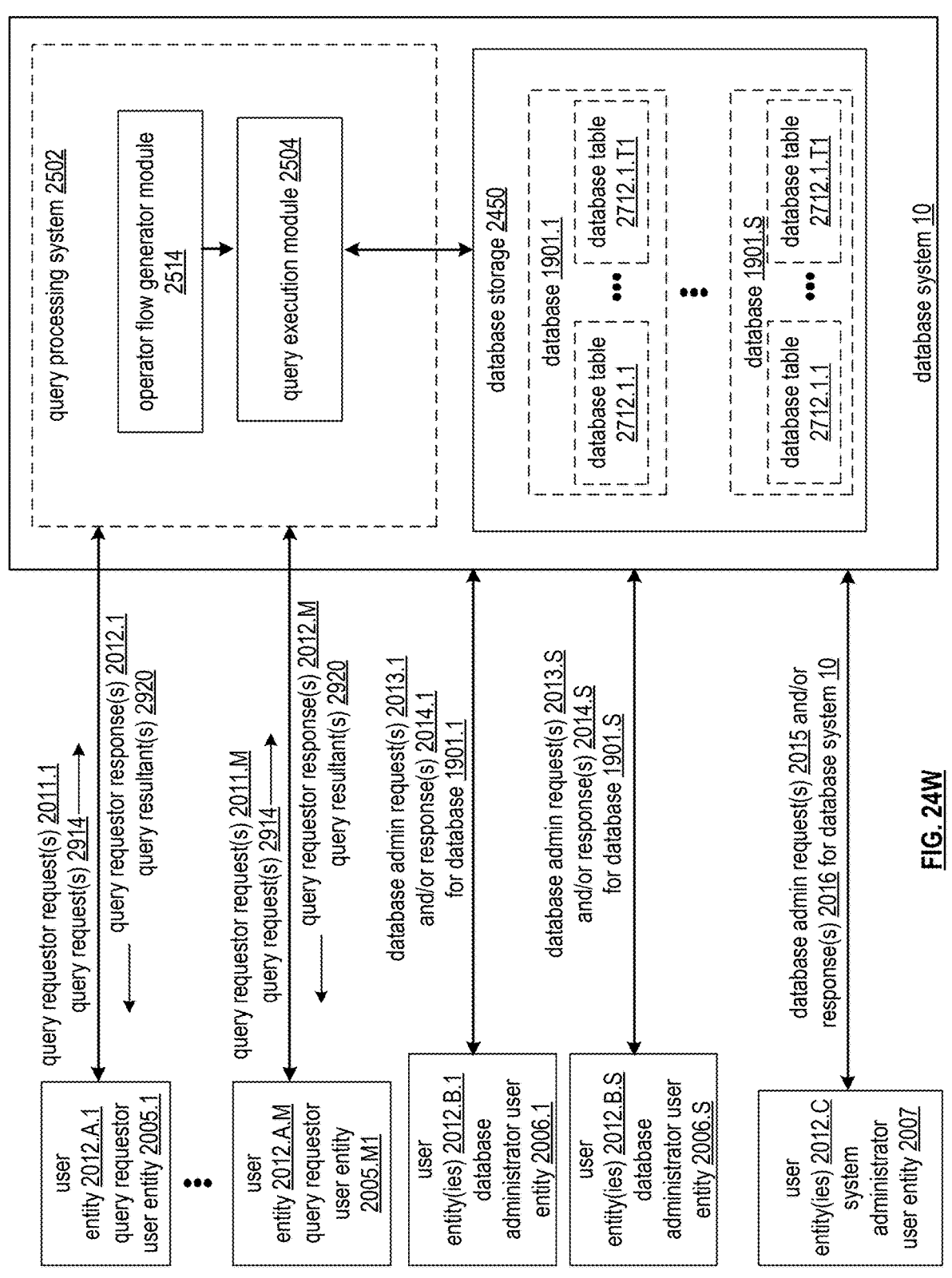
FIG. 24W is a schematic block diagram illustrating communication between database system 10 and a plurality of user entities in accordance with various embodiments.

FIG. 24W illustrates an embodiment of database system 10 operable to communicate with a plurality of user entities. Some or all features and/or functionality of FIG. 24W can implement any embodiment of database system 10 described herein.

Various users can send data to and/or receive data from database system 10 over time, for example, as corresponding requests and/or responses. Requests can indicate requests for queries to be executed, requests that include data to be loaded/stored, requests that include configuration data configuring any values/functionality utilized by database system 10 to perform its functionality, data supplied in response to a request from database system 10, and/or other requests to database system 10 for processing by database system 10. Responses can indicate query resultants of executed queries, notifications/confirmation that requests were processed successfully or rendered failure, error notifications, data supplied in response to a request from user entity 2012, and/or other information.

Some or all user entities 2012 can be implemented as user entities corresponding to humans that communicate with database system 10 (e.g. requests are configured via user input to a corresponding computing device of database system 10 or communicating with database system 10); user entities corresponding to groups of multiple people, for example, corresponding to companies/establishments that communicate with database system 10; user entities corresponding to automated entities such as one or more computing devices and/or server systems (e.g. implemented via artificial intelligence, machine learning, and/or configured instructions to cause these automated entities to send requests and/or process responses; and/or corresponding to a given person and configured to send/receive data based on user input from a corresponding person); and/or other user entities. Some or all user entities 2012 can be implemented as humans and/or devices included in/associated with database system 10 (e.g. personnel/employees of a service provided by database system 10; computing devices implementing nodes/processing modules of database system 10 that communicate via internal communication resources of database system 10, etc.). Some or all user entities 2012 can be implemented as humans and/or devices external from database system 10 (e.g. humans/companies that are customers of a service provided by database system 10; computing devices external from the computing devices/nodes/processing resources of database system 10 that communicate with database system 10 via a corresponding communication interface, etc.)

User entities 2012 can include various types of user entities 2012, which can include one or more user entities 2012.A, one or more user entities 2012.B, and/or one or more user entities 2012.C. A given user entity can optionally implement multiple types of user entities 2012 (e.g. a given user entity 2012 operates as both a user entity 2012.A and a user entity 2012.B). Multiple different users (e.g. different people, different devices) can implement a given user entity 2012 (e.g. different employees of a given company implement a given user entity 2012 at different times; different devices associated with a given person or company implement a given user entity 2012 at different times, etc.).

In some embodiments, some or all user entities 2012 can configure/perform functionality corresponding to workload management (WLM).

User entities 2012 can include one or more user entities 2012.A.1-2012.A.M corresponding to query requestor user entities 2005.1-2005.M. Query requestor user entities 2005 can send query requests 2914 indicating queries for execution and/or receive query resultants in response 2920. User entities 2012 can optionally be implemented in a same or similar fashion as external requesting entity 2912.

User entities 2012 can include one or more user entities 2012.B.1-2012.B.S corresponding to database administrator user entities 2006 that request/configure/monitor loading/ storage of/access to a corresponding database 1901 that stores a corresponding plurality of database tables 2712.1-2712-T (e.g. database administrator user entities 2006 optionally correspond to data sources that load their data to the system for use in query execution, where this data source sources data included in tables 2712 of a corresponding database 1901).

For example, in some embodiments, database system 10 can implement database storage 2450 to store various tables 2712 corresponding to multiple different databases 1902.1-1901.S, for example, each sourced by, accessible by, and/or configured via corresponding user entities 2012.B. Different databases 1901 can store same or different types of data, same or different numbers of tables 2712, etc. Some or all user entities 2012.A can correspond to a given database 1901 (e.g. based on being associated with the corresponding data source and/or user entities 2012.B) for example, where these user entities are only allowed to query against the given database 1901.

User entities 2012 can include one or more user entities 2012.C corresponding to system administrators of the database system 10 that request/configure/monitor loading/storage of/access to databases in query execution and/or otherwise configure/monitor functionality of database system 10 described herein.

Different user entities can have different corresponding permissions/privileges/access types, for example, indicated in corresponding user permissions data stored by and/or accessible by database system 10. In some embodiments, one or more given user entities can configure permissions of other user entities. Such permissions can configure types of requests that can be sent, restrictions on data included in responses, and/or which data can be accessed (e.g. in loading data and/or requesting data). For example, some user entities 2012.A can be restricted to certain types of queries/query functions be performed, access to only some databases 1902 and/or only some tables 2712, limits on how many queries be executed/how much data be returned, certain levels of query priority, certain service classes of query execution defining corresponding attributes of how queries be executed/how query execution be restricted, etc. As another example, some user entities 2012.B can be restricted to certain types/rates of data loading to a corresponding database 1901, certain permissions regarding how much configuration of database system 10 they can have power over, etc. As another example, different user entities 2012.C can have different permissions regarding how much configuration of database system 10 they can have power over, different functionalities/aspects of database system that they have permissions to configure, etc.

Figure 25A:
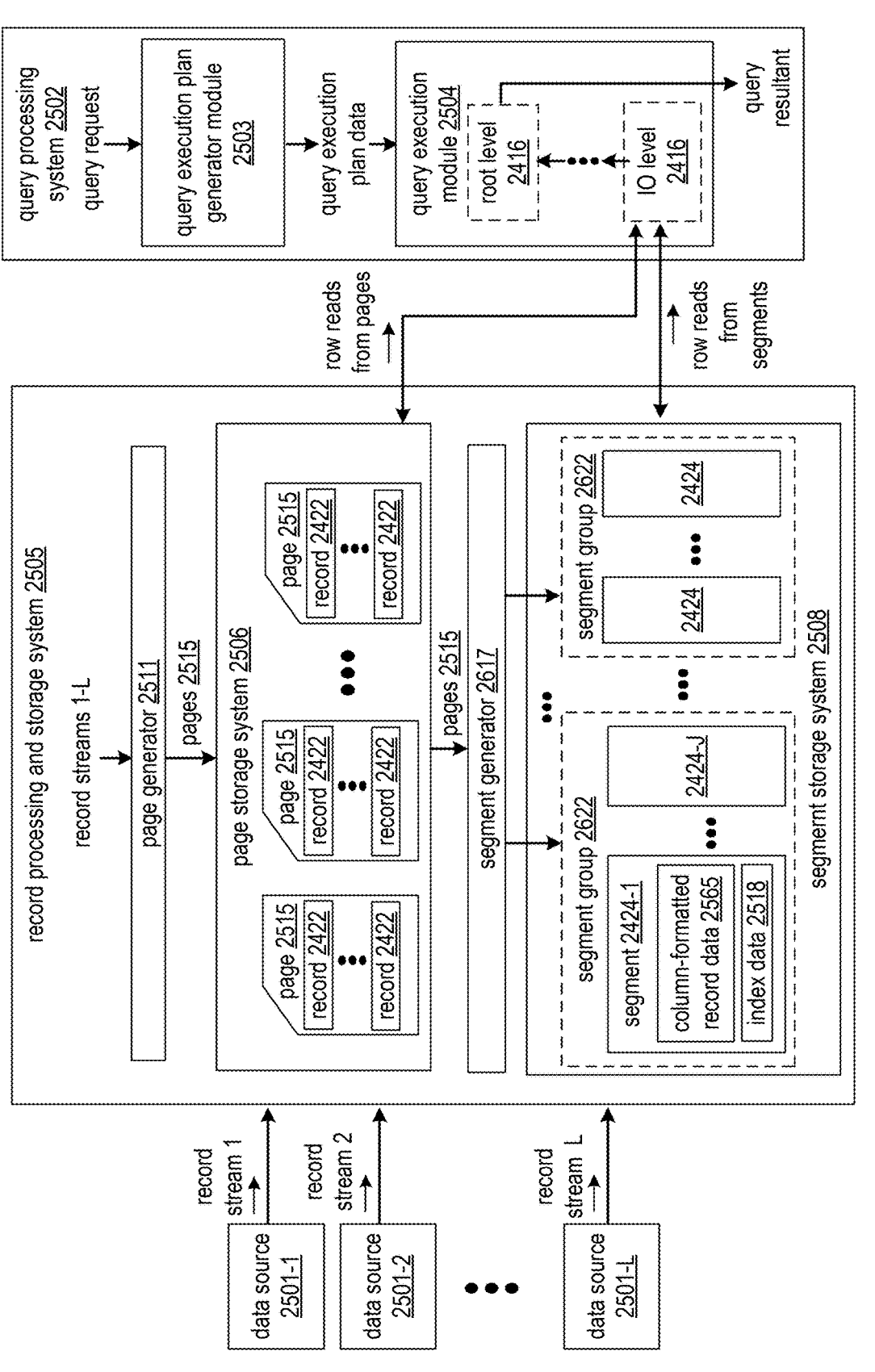
FIGS. 25A-25B are schematic block diagrams of embodiments of a database system that includes a record processing and storage system in accordance with various embodiments.
Figure 25B:
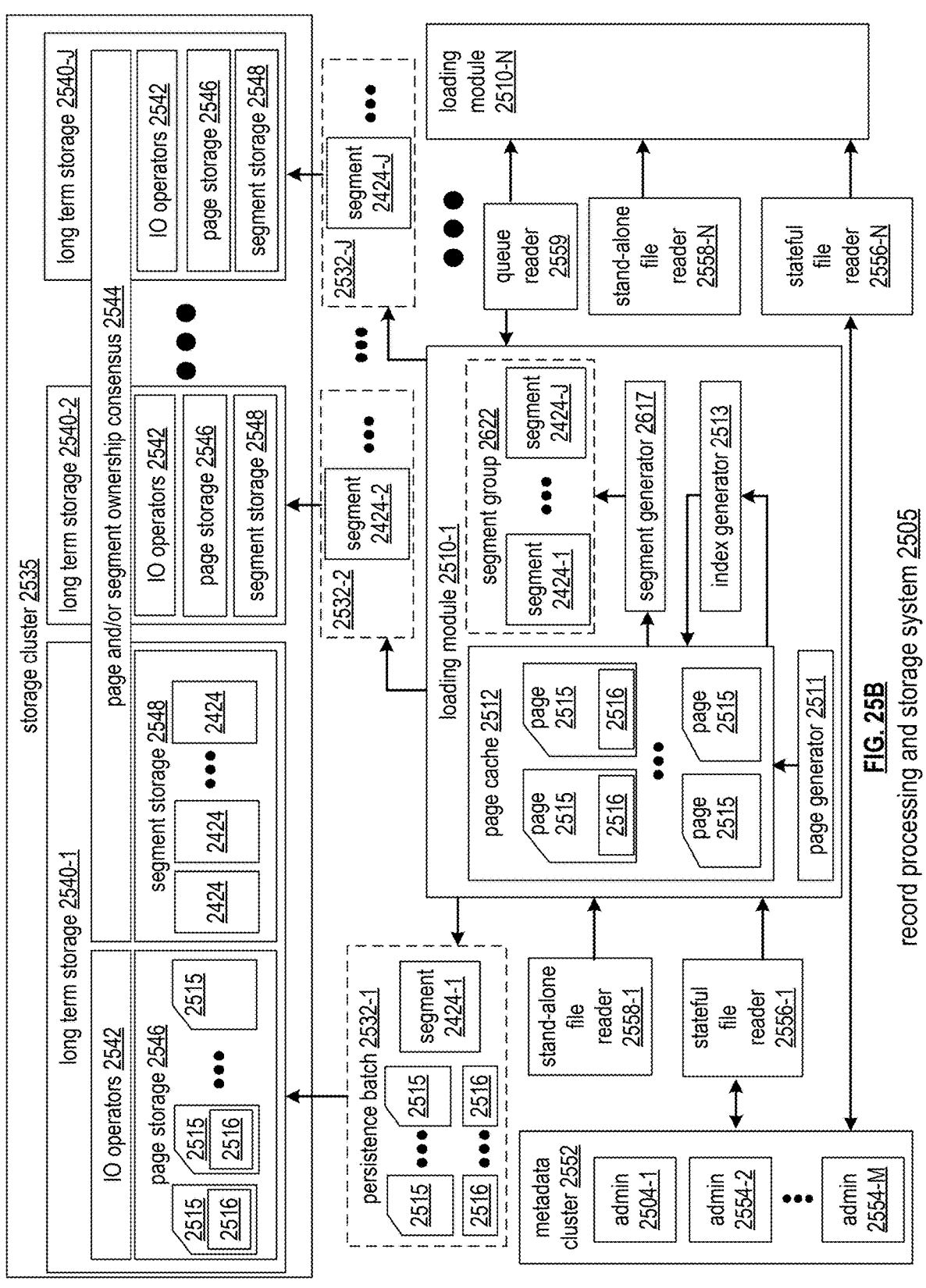
Figure 25C:
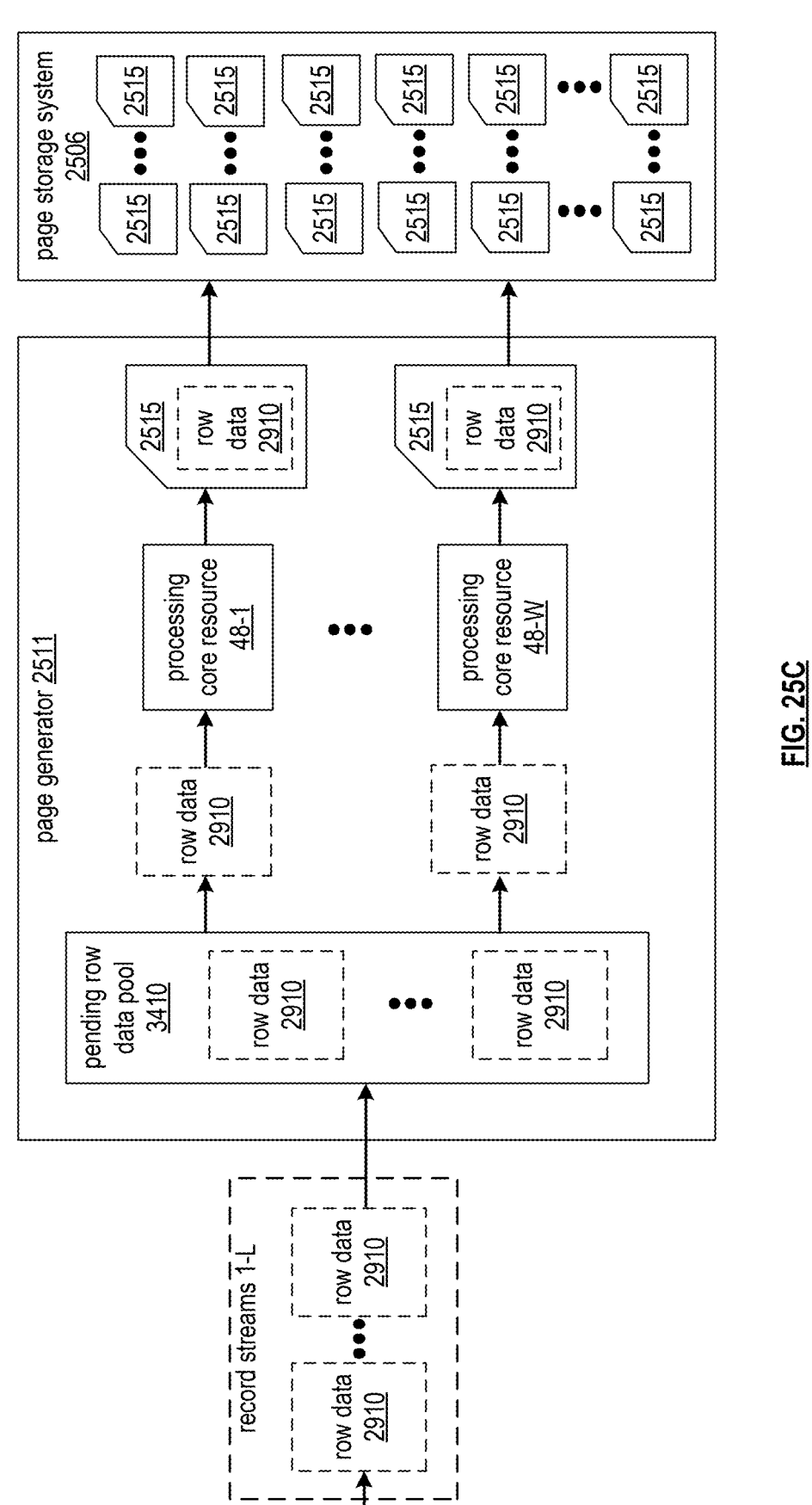
FIG. 25C is a schematic block diagram of an embodiment of a page generator in accordance with various embodiments.

FIGS. 25A-25C illustrate embodiments of a database system 10 operable to execute queries indicating join expressions based on implementing corresponding join processes via one or more join operators. Some or all features and/or functionality of FIGS. 25A-25C can be utilized to implement the database system 10 of FIGS. 24A-24I when executing queries indicating join expressions. Some or all features and/or functionality of FIGS. 25A-25C can be utilized to implement any embodiment of the database system 10 described herein.

FIG. 25A illustrates an embodiment of a database system 10 that implements a record processing and storage system 2505. The record processing and storage system 2505 can be operable to generate and store the segments 2424 discussed previously by utilizing a segment generator 2617 to convert sets of row-formatted records 2422 into column-formatted record data 2565. These row-formatted records 2422 can correspond to rows of a database table with populated column values of the table, for example, where each record 2422 corresponds to a single row as illustrated in FIG. 15. For example, the segment generator 2617 can generate the segments 2424 in accordance with the process discussed in conjunction with FIGS. 15-23. The segments 2424 can be generated to include index data 2518, which can include a plurality of index sections such as the index sections 0-X illustrated in FIG. 23. The segments 2424 can optionally be generated to include other metadata, such as the manifest section and/or statistics section illustrated in FIG. 23.

The generated segments 2424 can be stored in a segment storage system 2508 for access in query executions. For example, the records 2422 can be extracted from generated segments 2424 in various query executions performed by via a query processing system 2502 of the database system 10, for example, as discussed in FIGS. 25A-25D. In particular, the segment storage system 2508 can be implemented by utilizing the memory drives 2425 of a plurality of IO level nodes 37 that are operable to store segments. As discussed previously, nodes 37 at the IO level 2416 can store segments 2424 in their memory drives 2425 as illustrated in FIG. 24C. These nodes can perform IO operations in accordance with query executions by reading rows from these segments 2424 and/or by recovering segments based on receiving segments from other nodes as illustrated in FIG. 24D. The records 2422 can be extracted from the column-formatted record data 2565 for these IO operations of query executions by utilizing the index data 2518 of the corresponding segment 2424.

To enhance the performance of query executions via access to segments 2424 to read records 2422 in this fashion, the sets of rows included in each segment are ideally clustered well. In the ideal case, rows sharing the same cluster key are stored together in the same segment or same group of segments. For example, rows having matching values of key columns(s) of FIG. 18 utilized to sort the rows into groups for conversion into segments are ideally stored in the same segments. As used herein, a cluster key can be implemented as any one or more columns, such as key columns(s) of FIG. 18, that are utilized to cluster records into segment groups for segment generation. As used herein, more favorable levels of clustering correspond to more rows with same or similar cluster keys being stored in the same segments, while less favorable levels of clustering correspond to less rows with same or similar cluster keys being stored in the same segments. More favorable levels of clustering can achieve more efficient query performance. In particular, query filtering parameters of a given query can specify particular sets of records with particular cluster keys be accessed, and if these records are stored together, fewer segments, memory drives, and/or nodes need to be accessed and/or utilized for the given query.

These favorable levels of clustering can be hard to achieve when relying upon the incoming ordering of records in record streams 1-L from a set of data sources 2501-1-2501-L. No assumptions can necessarily be made about the clustering, with respect to the cluster key, of rows presented by external sources as they are received in the data stream. For example, the cluster key value of a given row received at a first time $t_1$ gives no information about the cluster key value of a row received at a second time $t_2$ after $t_1$. It would therefore be unideal to frequently generate segments by performing a clustering process to group the most recently received records by cluster key. In particular, because records received within a given time frame from a particular data source may not be related and have many different cluster key values, the resulting record groups utilized to generate segments would render unfavorable levels of clustering.

To achieve more favorable levels of clustering, the record processing and storage system 2505 implements a page generator 2511 and a page storage system 2506 to store a plurality of pages 2515. The page generator 2511 is operable to generate pages 2515 from incoming records 2422 of record streams 1-L, for example, as is discussed in further detail in conjunction with FIG. 25C. Each page 2515 generated by the page generator 2511 can include a set of records, for example, in their original row format and/or in a data format as received from data sources 2501-1-2501-L. Once generated, the pages 2515 can be stored in a page storage system 2506, which can be implemented via memory drives and/or cache memory of one or more computing devices 18, such as some or all of the same or different nodes 37 storing segments 2424 as part of the segment storage system 2508.

This generation and storage of pages 2515 stored by can serve as temporary storage of the incoming records as they await conversion into segments 2424. Pages 2515 can be generated and stored over lengthy periods of time, such as hours or days. During this length time frame, pages 2515 can continue to be accumulated as one or more record streams of incoming records 1-L continue to supply additional records for storage by the database system.

The plurality of pages generated and stored over this period of time can be converted into segments, for example once a sufficient amount of records have been received and stored as pages, and/or once the page storage system 2506 runs out of memory resources to store any additional pages. It can be advantageous to accumulate and store as many records as possible in pages 2515 prior to conversion to achieve more favorable levels of clustering. In particular, performing a clustering process upon a greater numbers of records, such as the greatest number of records possible can achieve more favorable levels of clustering, For example, greater numbers of records with common cluster keys are expected to be included in the total set of pages 2515 of the page storage system 2506 when the page storage system 2506 accumulates pages over longer periods of time to include a greater number of pages. In other words. delaying the grouping of rows into segments as long as possible increases the chances of having sufficient numbers of records with same and/or similar cluster keys to group together in segments. Alternatively, the conversion of pages into segments can occur at any frequency, for example, where pages are converted into segments more frequently and/or in accordance with any schedule or determination in other embodiments of the record processing and storage system 2505.

This mechanism of improving clustering levels in segment generation by delaying the clustering process required for segment generation as long as possible can be further leveraged to reduce resource utilization of the record processing and storage system 2505. As the record processing and storage system 2505 is responsible for receiving records streams from data sources for storage, for example, in the scale of terabyte per second load rates, this process of generating pages from the record streams should therefore be as efficient as possible. The page generator 2511 can be further implemented to reduce resource consumption of the record processing and storage system 2505 in page generation and storage by minimizing the processing of, movement of, and/or access to records 2422 of pages 2515 once generated as they await conversion into segments.

To reduce the processing induced upon the record processing and storage system 2505 during this data ingress, sets of incoming records 2422 can be included in a corresponding page 2515 without performing any clustering or sorting. For example, as clustering assumptions cannot be made for incoming data, incoming rows can be placed into pages based on the order that they are received and/or based on any order that best conserves resources. In some embodiments, the entire clustering process is performed by the segment generator 2617 upon all stored pages all at once, where the page generator 2511 does not perform any stages of the clustering process.

In some embodiments, to further reduce the processing induced upon the record processing and storage system 2505 during this data ingress, incoming record data of data streams 1-L undergo minimal reformatting by the page generator 2511 in generating pages 2515. In some cases, the incoming data of record streams 1-L is not reformatted and is simply "placed" into a corresponding page 2515. For example, a set of records are included in given page in accordance with formatted row data received from data sources.

While delaying segment generation in this fashion improves clustering and further improves ingress efficiency, it can be unideal to wait for records to be processed into segments before they appear in query results, particularly because the most recent data may be of the most interest to end users requesting queries. The record processing and storage system 2505 can resolve this problem by being further operable to facilitate page reads in addition to segment reads in facilitating query executions.

As illustrated in FIG. 25A, a query processing system 2502 can implement a query execution plan generator module 2503 to generate query execution plan data based on a received query request. The query execution plan data can be relayed to nodes participating in the corresponding query execution plan 2405 indicated by the query execution plan data, for example, as discussed in conjunction with FIG. 24A. A query execution module 2504 can be implemented via a plurality of nodes participating in the query execution plan 2405, for example, where data blocks are propagated upwards from nodes at IO level 2416 to a root node at root level 2412 to generate a query resultant. The nodes at IO level 2416 can perform row reads to read records 2422 from segments 2424 as discussed previously and as illustrated in FIG. 24C. The nodes at IO level 2416 can further perform row reads to read records 2422 from pages 2515. For example, once records 2422 are durably stored by being stored in a page 2515, and/or by being duplicated and stored in multiple pages 2515, the record 2422 can be available to service queries, and will be accessed by nodes 37 at IO level 2416 in executing queries accordingly. This enables the availability of records 2422 for query executions more quickly, where the records need not be processed for storage in their final storage format as segments 2424 to be accessed in query requests. Execution of a given query can include utilizing a set of records stored in a combination of pages 2515 and segments 2424. An embodiment of an IO level node that stores and accesses both segments and pages is illustrated in FIG. 25E.

The record processing and storage system 2505 can be implemented utilizing the parallelized data input sub-system 11 and/or the parallelized ingress sub-system 24 of FIG. 4. The record processing and storage system 2505 can alternatively or additionally be implemented utilizing the parallelized data store, retrieve, and/or process sub-system 12 of FIG. 6. The record processing and storage system 2505 can alternatively or additionally be implemented by utilizing one or more computing devices 18 and/or by utilizing one or more nodes 37.

The record processing and storage system 2505 can be otherwise implemented utilizing at least one processor and at least one memory. For example, the at least one memory can store operational instructions that, when executed by the at least one processor, cause the record processing and storage system to perform some or all of the functionality described herein, such as some or all of the functionality of the page generator 2511 and/or of the segment generator 2617 discussed herein. In some cases, one or more individual nodes 37 and/or one or more individual processing core resources 48 can be operable to perform some or all of the functionality of the record processing and storage system 2505, such as some or all of the functionality of the page generator 2511 and/or of the segment generator 2617, independently or in tandem by utilizing their own processing resources and/or memory resources.

The query processing system 2502 can be alternatively or additionally implemented utilizing the parallelized query and results sub-system 13 of FIG. 5. The query processing system 2502 can be alternatively or additionally implemented utilizing the parallelized data store, retrieve, and/or process sub-system 12 of FIG. 6. The query processing system 2502 can alternatively or additionally be implemented by utilizing one or more computing devices 18 and/or by utilizing one or more nodes 37.

The query processing system 2502 can be otherwise implemented utilizing at least one processor and at least one memory. For example, the at least one memory can store operational instructions that, when executed by the at least one processor, cause the record processing and storage system to perform some or all of the functionality described herein, such as some or all of the functionality of the query execution plan generator module 2503 and/or of the query execution module 2504 discussed herein. In some cases, one or more individual nodes 37 and/or one or more individual processing core resources 48 can be operable to perform some or all of the functionality of the query processing system 2502, such as some or all of the functionality of query execution plan generator module 2503 and/or of the query execution module 2504, independently or in tandem by utilizing their own processing resources and/or memory resources.

In some embodiments, one or more nodes 37 of the database system 10 as discussed herein can be operable to perform multiple functionalities of the database system 10 illustrated in FIG. 25A. For example, a single node can be utilized to implement the page generator 2511, the page storage system 2506, the segment generator 2617, the segment storage system 2508, the query execution plan generator module, and/or the query execution module 2504 as a node 37 at one or more levels 2410 of a query execution plan 2405. In particular, the single node can utilize different processing core resources 48 to implement different functionalities in parallel, and/or can utilize the same processing core resources 48 to implement different functionalities at different times.

Some or all data sources 2501 can implemented utilizing at least one processor and at least one memory. Some or all data sources 2501 can be external from database system 10 and/or can be included as part of database system 10. For example, the at least one memory of a data source 2501 can store operational instructions that, when executed by the at least one processor of the data source 2501, cause the data source 2501 to perform some or all of the functionality of data sources 2501 described herein. In some cases, data sources 2501 can receive application data from the database system 10 for download, storage, and/or installation. Execution of the stored application data by processing modules of data sources 2501 can cause the data sources 2501 to execute some or all of the functionality of data sources 2501 discussed herein.

In some embodiments, system communication resources 14, external network(s) 17, local communication resources 25, wide area networks 22, and/or other communication resources of database system 10 can be utilized to facilitate any transfer of data by the record processing and storage system 2505. This can include, for example: transmission of record streams 1-L from data sources 2501 to the record processing and storage system 2505; transfer of pages 2515 to page storage system 2506 once generated by the page generator 2511; access to pages 2515 by the segment generator 2617; transfer of segments 2424 to the segment storage system 2508 once generated by the segment generator 2617; communication of query execution plan data to the query execution module 2504, such as the plurality of nodes 37 of the corresponding query execution plan 2405; reading of records by the query execution module 2504, such as IO level nodes 37, via access to pages 2515 stored page storage system 2506 and/or via access to segments 2424 stored segment storage system 2508; sending of data blocks generated by nodes 37 of the corresponding query execution plan 2405 to other nodes 37 in conjunction with their execution of the query; and/or any other accessing of data, communication of data, and/or transfer of data by record processing and storage system 2505 and/or within the record processing and storage system 2505 as discussed herein.

The record processing and storage system 2505 and/or the query processing system 2502 of FIG. 25A, and/or any other embodiment of record processing and storage system 2505 and/or the query processing system 2502 described herein, can be implemented at a massive scale, for example, by being implemented by a database system 10 that is operable to receive, store, and perform queries against a massive number of records of one or more datasets, such as millions, billions, and/or trillions of records stored as many Terabytes, Petabytes, and/or Exabytes of data as discussed previously. In particular, the record processing and storage system 2505 and/or the query processing system 2502 can each be implemented by a large number, such as hundreds, thousands, and/or millions of computing devices 18, nodes 37, and/or processing core resources 48 that perform independent processes in parallel, for example, with minimal or no coordination, to implement some or all of the features and/or functionality of the record processing and storage system 2505 and/or the query processing system 2502 at a massive scale.

Some or all functionality performed by the record processing and storage system 2505 and/or the query processing system 2502 as described herein cannot practically be performed by the human mind, particularly when the database system 10 is implemented to store and perform queries against records at a massive scale as discussed previously. In particular, the human mind is not equipped to perform record processing, record storage, and/or query execution for millions, billions, and/or trillions of records stored as many Terabytes, Petabytes, and/or Exabytes of data. Furthermore, the human mind is not equipped to distribute and perform record processing, record storage, and/or query execution as multiple independent processes, such as hundreds, thousands, and/or millions of independent processes, in parallel and/or within overlapping time spans.

Some or all features and/or functionality of FIG. 25A can be performed via at least one node 37 in conjunction with system metadata, applied across a plurality of nodes 37, for example, where at least one node 37 participates in some or all features and/or functionality of FIG. 25A based on receiving and storing the system metadata in local memory of the at least one node 37 as configuration data, and/or based on further accessing and/or executing this configuration data to implement some or all functionality of the record processing storage system and/or to implement some or all functionality of the query processing system as part of its database functionality accordingly. Performance of some or all features and/or functionality of FIG. 25A can optionally change and/or be updated over time, and/or a set of nodes participating in executing some or all features and/or functionality of FIG. 25A can have changing nodes over time, based on the system metadata applied across the plurality of nodes 37 being updated over time, based on nodes on updating their configuration data stored in local memory to reflect changes in the system metadata based on receiving data indicating these changes to the system metadata, and/or based on nodes being added and/or removed from the plurality of nodes over time.

FIG. 25B illustrates an example embodiment of the record processing and storage system 2505 of FIG. 25A. Some or all of the features illustrated and discussed in conjunction with the record processing and storage system 2505 FIG. 25B can be utilized to implement the record processing and storage system 2505 and/or any other embodiment of the record processing and storage system 2505 described herein.

The record processing and storage system 2505 can include a plurality of loading modules 2510-1-2510-N. Each loading module 2510 can be implemented via its own processing and/or memory resources. For example, each loading module 2510 can be implemented via its own computing device 18, via its own node 37, and/or via its own processing core resource 48. The plurality of loading modules 2510-1-2510-N can be implemented to perform some or all of the functionality of the record processing and storage system 2505 in a parallelized fashion.

The record processing and storage system 2505 can include queue reader 2559, a plurality of stateful file readers 2556-1-2556-N, and/or stand-alone file readers 2558-1-2558-N. For example, the queue reader 2559, a plurality of stateful file readers 2556-1-2556-N, and/or stand-alone file readers 2558-1-2558-N are utilized to enable each loading modules 2510 to receive one or more of the record streams 1-L received from the data sources 2501-1-2501-L as illustrated in FIG. 25A. For example, each loading module 2510 receives a distinct subset of the entire set of records received by the record processing and storage system 2505 at a given time.

Each loading module 2510 can receive records 2422 in one or more record streams via its own stateful file reader 2556 and/or stand-alone file reader 2558. Each loading module 2510 can optionally receive records 2422 and/or otherwise communicate with a common queue reader 2559. Each stateful file reader 2556 can communicate with a metadata cluster 2552 that includes data supplied by and/or corresponding to a plurality of administrators 2554-1-2554-M. The metadata cluster 2552 can be implemented by utilizing the administrative processing sub-system 15 and/or the configuration sub-system 16. The queue reader 2559, each stateful file reader 2556, and/or each stand-alone file reader 2558 can be implemented utilizing the parallelized ingress sub-system 24 and/or the parallelized data input sub-system 11. The metadata cluster 2552, the queue reader 2559, each stateful file reader 2556, and/or each stand-alone file reader 2558 can be implemented utilizing at least one computing device 18 and/or at least one node 37. In cases where a given loading module 2510 is implemented via its own computing device 18 and/or node 37, the same computing device 18 and/or node 37 can optionally be utilized to implement the stateful file reader 2556, and/or each stand-alone file reader 2558 communicating with the given loading module 2510.

Each loading module 2510 can implement its own page generator 2511, its own index generator 2513, and/or its own segment generator 2617, for example, by utilizing its own processing and/or memory resources such as the processing and/or memory resources of a corresponding computing device 18. For example, the page generator 2511 of FIG. 25A can be implemented as a plurality of page generators 2511 of a corresponding plurality of loading modules 2510 as illustrated in FIG. 25B. Each page generator 2511 of FIG. 25B can process its own incoming records 2422 to generate its own corresponding pages 2515.

As pages 2515 are generated by the page generator 2511 of a loading module 2510, they can be stored in a page cache 2512. The page cache 2512 can be implemented utilizing memory resources of the loading module 2510, such as memory resources of the corresponding computing device 18. For example, the page cache 2512 of each loading module 2010-1-2010-N can individually or collectively implement some or all of the page storage system 2506 of FIG. 25A.

The segment generator 2617 of FIG. 25A can similarly be implemented as a plurality of segment generators 2617 of a corresponding plurality of loading modules 2510 as illustrated in FIG. 25B. Each segment generator 2617 of FIG. 25B can generate its own set of segments 2424-1-2424-J included in one or more segment groups 2622. The segment group 2622 can be implemented as the segment group of FIG. 23, for example, where J is equal to five or another number of segments configured to be included in a segment group. In particular, J can be based on the redundancy storage encoding scheme utilized to generate the set of segments and/or to generate the corresponding parity data 2426.

The segment generator 2617 of a loading module 2510 can access the page cache 2512 of the loading module 2510 to convert the pages 2515 previously generated by the page generator 2511 into segments. In some cases, each segment generator 2617 requires access to all pages 2515 generated by the segment generator 2617 since the last conversion process of pages into segments. The page cache 2512 can optionally store all pages generated by the page generator 2511 since the last conversion process, where the segment generator 2617 accesses all of these pages generated since the last conversion process to cluster records into groups and generate segments. For example, the page cache 2512 is implemented as a write-through cache to enable all previously generated pages since the last conversion process to be accessed by the segment generator 2617 once the conversion process commences.

In some cases, each loading module 2510 implements its segment generator 2617 upon only the set of pages 2515 that were generated by its own page generator 2511, accessible via its own page cache 2512. In such cases, the record grouping via clustering key to create segments with the same or similar cluster keys are separately performed by each segment generator 2617 independently without coordination, where this record grouping via clustering key is performed on N distinct sets of records stored in the N distinct sets of pages generated by the N distinct page generators 2511 of the N distinct loading modules 2510. In such cases, despite records never being shared between loading modules 2510 to further improve clustering, the level of clustering of the resulting segments generated independently by each loading module 2510 on its own data is sufficient, for example, due to the number of records in each loading module's 2510 set of pages 2515 for conversion being sufficiently large to attain favorable levels of clustering.

In such embodiments, each loading modules 2510 can independently initiate its own conversion process of pages 2515 into segments 2424 by waiting as long as possible based on its own resource utilization, such as memory availability of its page cache 2512. Different segment generators 2617 of the different loading modules 2510 can thus perform their own conversion of the corresponding set of pages 2515 into segments 2424 at different times, based on when each loading modules 2510 independently determines to initiate the conversion process, for example, based on each independently making the determination to generate segments. Thus, as discussed herein, the conversion process of pages into segments can correspond to a single loading module 2510 converting all of its pages 2515 generated by its own page generator 2511 since its own last the conversion process into segments 2424, where different loading modules 2510 can initiate and execute this conversion process at different times and/or with different frequency.

In other cases, it is ideal for even more favorable levels of clustering to be attained via sharing of all pages for conversion across all loading modules 2510. In such cases, a collective decision to initiate the conversion process can be made across some or all loading modules 2510, for example, based on resource utilization across all loading modules 2510. The conversion process can include sharing of and/or access to all pages 2515 generated via the process, where each segment generator 2617 accesses records in some or all pages 2515 generated by and/or stored by some or all other loading modules 2510 to perform the record grouping by cluster key. As the full set of records is utilized for this clustering instead of N distinct sets of records, the levels of clustering in resulting segments can be further improved in such embodiments. This improved level of clustering can offset the increased page movement and coordination required to facilitate page access across multiple loading modules 2510. As discussed herein, the conversion process of pages into segments can optionally correspond to multiple loading modules 2510 converting all of their collectively generated pages 2515 since their last conversion process into segments 2424 via sharing of their generated pages 2515.

An index generator 2513 can optionally be implemented by some or all loading modules 2510 to generate index data 2516 for some or all pages 2515 prior to their conversion into segments. The index data 2516 generated for a given page 2515 can be appended to the given page, can be stored as metadata of the given page 2515, and/or can otherwise be mapped to the given page 2515. The index data 2516 for a given page 2515 correspond to page metadata, for example, indexing records included in the corresponding page. As a particular example, the index data 2516 can include some or all of the data of index data 2518 generated for segments 2424 as discussed previously, such as index sections 0-$x$ of FIG. 23. As another example, the index data 2516 can include indexing information utilized to determine the memory location of particular records and/or particular columns within the corresponding page 2515.

In some cases, the index data 2516 can be generated to enable corresponding pages 2515 to be processed by query IO operators utilized to read rows from pages, for example, in a same or similar fashion as index data 2518 is utilized to read rows from segments. In some cases, index probing operations can be utilized by and/or integrated within query IO operators to filter the set of rows returned in reading a page 2515 based on its index data 2516 and/or to filter the set of rows returned in reading a segment 2424 based on its index data 2518.

In some cases, index data 2516 is generated by index generator 2513 for all pages 2515, for example, as each page 2515 is generated, or at some point after each page 2515 is generated. In other cases, index data 2516 is only generated for some pages 2515, for example, where some pages do not have index data 2516 as illustrated in FIG. 25B. For example, some pages 2515 may never have corresponding index data 2516 generated prior to their conversion into segments. In some cases, index data 2516 is generated for a given page 2515 with its records are to be read in execution of a query by the query processing system 2502. For example, a node 37 at IO level 2416 can be implemented as a loading module 2510 and can utilize its index generator 2513 to generate index data 2516 for a particular page 2515 in response to having query execution plan data indicating that records 2422 be read the particular page from the page cache 2512 of the loading module in conjunction with execution of a query. The index data 2516 can be optionally stored temporarily for the life of the given query to facilitate reading of rows from the corresponding page for the given query only. The index data 2516 alternatively be stored as metadata of the page 2515 once generated, as illustrated in FIG. 25B. This enables the previously generated index data 2516 of a given page to be utilized in subsequent queries requiring reads from the given page.

As illustrated in FIG. 25B, each loading modules 2510 can generate and send pages 2515, corresponding index data 2516, and/or segments 2424 to long term storage 2540-1-2540-J of a particular storage cluster 2535. For example, system communication resources 14 can be utilized to facilitate sending of data from loading modules 2510 to storage cluster 2535 and/or to facilitate sending of data from storage cluster 2535 to loading modules 2510.

The storage cluster 2535 can be implemented by utilizing a storage cluster 35 of FIG. 6, where each long term storage 2540-1-2540-J is implemented by a corresponding computing device 18-1-18-J and/or by a corresponding node 37-1-37-J. In some cases, each storage cluster 35-1-35-$z$ of FIG. 6 can receive pages 2515, corresponding index data 2516, and/or segments 2424 from its own set of loading modules 2510-1-2510-N, where the record processing and storage system 2505 of FIG. 25B can include $z$ sets of loading modules 2510-1-2510-N that each generate pages 2515, segments 2524, and/or index data 2516 for storage in its own corresponding storage cluster 35.

The processing and/or memory resources utilized to implement each long term storage 2540 can be distinct from the processing and/or memory resources utilized to implement the loading modules 2510. Alternatively, some loading modules can optionally share processing and/or memory resources long term storage 2540, for example, where a same computing device 18 and/or a same node 37 implements a particular long term storage 2540 and also implements a particular loading modules 2510.

Each loading module 2510 can generate and send the segments 2424 to long term storage 2540-1-2540-J in a set of persistence batches 2532-1-2532-J sent to the set of long term storage 2540-1-2540-J as illustrated in FIG. 25B. For example, upon generating a segment group 2522 of J segments 2424, a loading module 2510 can send each of the J segments in the same segment group to a different one of the set of long term storage 2540-1-2540-J in the storage cluster 2535. For example, a particular long term storage 2540 can generate recovered segments as necessary for processing queries and/or for rebuilding missing segments due to drive failure as illustrated in FIG. 24D, where the value K of FIG. 24D is less than the value J and wherein the nodes 37 of FIG. 24D are utilized to implement the long term storage 2540-1-2540-J.

As illustrated in FIG. 25B, each persistence batch 2532-1-2532-J can optionally or additionally include pages 2515 and/or their corresponding index data 2516 generated via index generator 2513. Some or all pages 2515 that are generated via a loading module 2510's page generator 2511 can be sent to one or more long term storage 2540-1-2540-J. For example, a particular page 2515 can be included in some or all persistence batches 2532-1-2532-J sent to multiple ones of the set of long term storage 2540-1-2540-J for redundancy storage as replicated pages stored in multiple locations for the purpose of fault tolerance. Some or all pages 2515 can be sent to storage cluster 2535 for storage prior to being converted into segments 2424 via segment generator 2617. Some or all pages 2515 can be stored by storage cluster 2535 until corresponding segments 2424 are generated, where storage cluster 2535 facilitates deletion of these pages from storage in one or more long term storage 2540-1-2540-J once these pages are converted and/or have their records 2422 successfully stored by storage cluster 2535 in segments 2424.

In some cases, a loading module 2510 maintains storage of pages 2515 via page cache 2512, even if they are sent to storage cluster 2535 in persistence batches 2532. This can enable the segment generator 2617 to efficiently read pages 2515 during the conversion process via reads from this local page cache 2512. This can be ideal in minimizing page movement, as pages do not need to be retrieved from long term storage 2540 for conversion into segments by loading modules 2510 and can instead be locally accessed via maintained storage in page cache 2512. Alternatively, a loading module 2510 removes pages 2515 from storage via page cache 2512 once they are determined to be successfully stored in long term storage 2540. This can be ideal in reducing the memory resources required by loading module 2510 to store pages, as only pages that are not yet durably stored in long term storage 2540 need be stored in page cache 2512.

Each long term storage 2540 can include its own page storage 2546 that stores received pages 2515 generated by and received from one or more loading modules 2010-1-2010-N, implemented utilizing memory resources of the long term storage 2540. For example, the page storage 2546 of each long term storage 2540-1-2540-J can individually or collectively implement some or all of the page storage system 2506 of FIG. 25A. The page storage 2546 can optionally store index data 2516 mapped to and/or included as metadata of its pages 2515. Each long term storage 2540 can alternatively or additionally include its own segment storage 2548 that stores segments generated by and received from one or more loading modules 2010-1-2010-N. For example, the segment storage 2548 of each long term storage 2540-1-2540-J can individually or collectively implement some or all of the segment storage system 2508 of FIG. 25A.

The pages 2515 stored in page storage 2546 of long term storage 2540 and/or the segments 2424 stored in segment storage 2548 of long term storage 2540 can be accessed to facilitate execution of queries. As illustrated in FIG. 25B, each long term storage 2540-1-2540-J can perform IO operators 2542 to facilitate reads of records in pages 2515 stored in their page storage 2546 and/or to facilitate reads of records in segments 2424 stored in their segment storage 2548. For example, some or all long term storage 2540-1-2540-J can be implemented as nodes 37 at the IO level 2416 of one or more query execution plans 2405. In particular, the some or all long term storage 2540-1-2540-J can be utilized to implement the query processing system 2502 by facilitating reads to stored records via IO operators 2542 in conjunction with query executions.

Note that at a given time, a given page 2515 may be stored in the page cache 2512 of the loading module 2510 that generated the given page 2515, and may alternatively or additionally be stored in one or more long term storage 2540 of the storage cluster 2535 based on being sent to the in one or more long term storage 2540. Furthermore, at a given time, a given record may be stored in a particular page 2515 in a page cache 2512 of a loading module 2510, may be stored the particular page 2515 in page storage 2546 of one or more long term storage 2540, and/or may be stored in exactly one particular segment 2424 in segment storage 2548 of one long term storage 2540.

Because records can be stored in multiple locations of storage cluster 2535, the long term storage 2540 of storage cluster 2535 can be operable to collectively store page and/or segment ownership consensus 2544. This can be useful in dictating which long term storage 2540 is responsible for accessing each given record stored by the storage cluster 2535 via IO operators 2542 in conjunction with query execution. In particular, as a query resultant is only guaranteed to be correct if each required record is accessed exactly once, records reads to a particular record stored in multiple locations could render a query resultant as incorrect. The page and/or segment ownership consensus 2544 can include one or more versions of ownership data, for example, that is generated via execution of a consensus protocol mediated via the set of long term storage 2540-1-2540-J. The page and/or segment ownership consensus 2544 can dictate that every record is owned by exactly one long term storage 2540 via access to either a page 2515 storing the record or a segment 2424 storing the record, but not both. The page and/or segment ownership consensus 2544 can indicate, for each long term storage 2540 in the storage cluster 2535, whether some or all of its pages 2515 or some or all of its segments 2424 are to be accessed in query executions, where each long term storage 2540 only accesses the pages 2515 and segments 2424 indicated in page and/or segment ownership consensus 2544.

In such cases, all record access for query executions performed by query execution module 2504 via nodes 37 at IO level 2416 can optionally be performed via IO operators 2542 accessing page storage 2546 and/or segment storage 2548 of long term storage 2540, as this access can guarantee reading of records exactly once via the page and/or segment ownership consensus 2544. For example, the long term storage 2540 can be solely responsible for durably storing the records utilized in query executions. In such embodiments, the cached and/or temporary storage of pages and/or segments of loading modules 2510, such as pages 2515 in page caches 2512, are not read for query executions via accesses to storage resources of loading modules 2510.

Some or all features and/or functionality of FIG. 25B can be performed via at least one node 37 in conjunction with system metadata applied across a plurality of nodes 37, for example, where at least one node 37 participates in some or all features and/or functionality of FIG. 25B based on receiving and storing the system metadata in local memory of the at least one node 37 as configuration data and/or based on further accessing and/or executing this configuration data to implement some or all functionality of a loading module 2510, to implement some or all functionality of a file reader, and/or to implement some or all functionality of the storage cluster 2535 as part of its database functionality accordingly. Performance of some or all features and/or functionality of FIG. 25B can optionally change and/or be updated over time, and/or a set of nodes participating in executing some or all features and/or functionality of FIG. 25B can have changing nodes over time, based on the system metadata applied across the plurality of nodes 37 being updated over time, based on nodes on updating their configuration data stored in local memory to reflect changes in the system metadata based on receiving data indicating these changes to the system metadata, and/or based on nodes being added and/or removed from the plurality of nodes over time.

FIG. 25C illustrates an example embodiment of a page generator 2511. The page generator 2511 of FIG. 25C can be utilized to implement the page generator 2511 of FIG. 25A, can be utilized to implement each page generator 2511 of each loading module 2510 of FIG. 25B, and/or can be utilized to implement any embodiments of page generator 2511 described herein.

A single incoming record stream, or multiple incoming record streams 1-L, can include the incoming records 2422 as a stream of row data 2910. Each row data 2910 can be transmitted as an individual packet and/or a set of packets by the corresponding data source 2501 to include a single record 2422, such as a single row of a database table. Alternatively each row data 2910 can be transmitted by the corresponding data source 2501 as an individual packet and/or a set of packets to include a batched set of multiple records 2422, such as multiple rows of a database table. Row data 2910 received from the same or different data source over time can each include a same number of rows or a different number of rows, and can be sent in accordance with a particular format. Row data 2910 received from the same or different data source over time can include records with the same or different numbers of columns, with the same or different types and/or sizes of data populating its columns, and/or with the same or different row schemas. In some cases, row data 2910 is received in a stream over time for processing by a loading module 2510 via a stateful file reader 2556 and/or via a stand-alone file reader 2558.

Incoming rows can be stored in a pending row data pool 3410 while they await conversion into pages 2515. The pending row data pool 3410 can be implemented as an ordered queue or an unordered set. The pending row data pool 3410 can be implemented by utilizing storage resources of the record processing and storage system. For example, each loading module 2510 can have its own pending row data pool 3410. Alternatively, multiple loading modules 2510 can access the same pending row data pool 3410 that stores all incoming row data 2910, for example, by utilizing queue reader 2559.

The page generator 2511 can facilitate parallelized page generation via a plurality of processing core resources 48-1-48-W. For example, each loading module 2510 has its own plurality of processing core resources 48-1-48-W, where the processing core resources 48-1-48-W of a given loading module 2510 is implemented via the set of processing core resources 48 of one or more nodes 37 utilized to implement the given loading module 2510. As another example, the plurality of processing core resources 48-1-48-W are each implemented by a corresponding one of the set of each loading module 2510-1-2510-N, for example, where each loading module 2510-1-2510-N is implemented via its own processing core resources 48-1-48-W.

Over time, each processing core resource 48 can retrieve and/or can be assigned pending row data 2910 in the pending row data pool 3410. For example, when a given processing core resource 48 has finished another job, such as completed processing of another row data 2910, the processing core resource 48 can fetch a new row data 2910 for processing into a page 2515. For example, the processing core resource 48 retrieves a first ordered row data 2910 from a queue of the pending row data pool 3410, retrieves a highest priority row data 2910 from the pending row data pool 3410, retrieves an oldest row data 2910 from the pending row data pool 3410, and/or retrieves a random row data 2910 from the pending row data pool 3410. Once one processing core resource 48 retrieves and/or otherwise utilizes a particular row data 2910 for processing into a page, the particular row data 2910 is removed from the pending row data pool 3410 and/or is otherwise not available for processing by other processing core resources 48.

Each processing core resource 48 can generate pages 2515 from the row data received over time. As illustrated in FIG. 25C, the pages 2515 are depicted to include only one row data, such as a single row or multiple rows batched together in the row data 2910. For example, each page is generated directly from corresponding row data 2910. Alternatively, a page 2515 can include multiple row data 2910, for example, in sequence and/or concatenated in the page 2515. The page can include multiple row data 2910 from a single data source 2501 and/or can include multiple row data 2910 from multiple different data sources 2501. For example, the processing core resource 48 can retrieve one row data 2910 from the pending row data pool 3410 at a time, and can append each row data 2910 to a given page until the page 2515 is complete, where the processing core resource 48 appends subsequently retrieved row data 2910 to a new page. Alternatively, the processing core resource 48 can retrieve multiple row data 2910 at once, and can generate a corresponding page 2515 to include this set of multiple row data 2910.

Once a page 2515 is complete, the corresponding processing core resource 48 can facilitate storage of the page in page storage system 2506. This can include adding the page 2515 to the page cache 2512 of the corresponding loading module 2510. This can include facilitating sending of the page 2515 to one or more long term storage 2540 for storage in corresponding page storage 2546. Different processing core resources 48 can each facilitate storage of the page via common resources, or via designated resources specific to each processing core resources 48, of the page storage system 2506.

Some or all features and/or functionality of FIG. 25C can be performed via at least one node 37 in conjunction with system metadata applied across a plurality of nodes 37, for example, where at least one node 37 participates in some or all features and/or functionality of FIG. 25C based on receiving and storing the system metadata in local memory of the at least one node 37 as configuration data and/or based on further accessing and/or executing this configuration data to implement some or all functionality of a loading module 2510, to implement some or all functionality of page generator 2511 and/or page storage system 2506 as part of its database functionality accordingly. Performance of some or all features and/or functionality of FIG. 25C can optionally change and/or be updated over time, and/or a set of nodes participating in executing some or all features and/or functionality of FIG. 25C can have changing nodes over time, based on the system metadata applied across the plurality of nodes 37 being updated over time, based on nodes on updating their configuration data stored in local memory to reflect changes in the system metadata based on receiving data indicating these changes to the system metadata, and/or based on nodes being added and/or removed from the plurality of nodes over time.

Figure 25D:
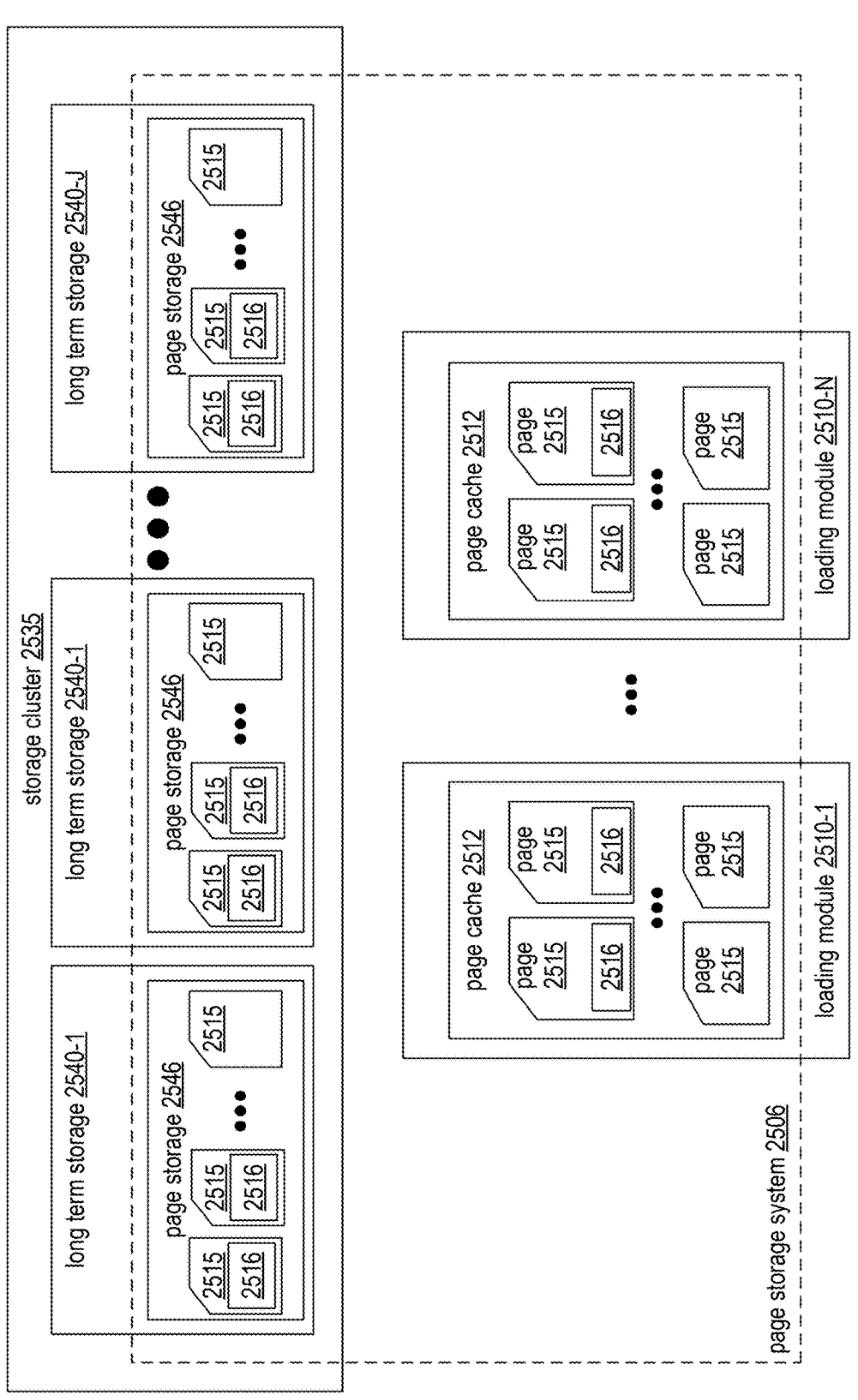
FIG. 25D is a schematic block diagram of an embodiment of a page storage system of a record processing and storage system in accordance with various embodiments.
Figure 25E:
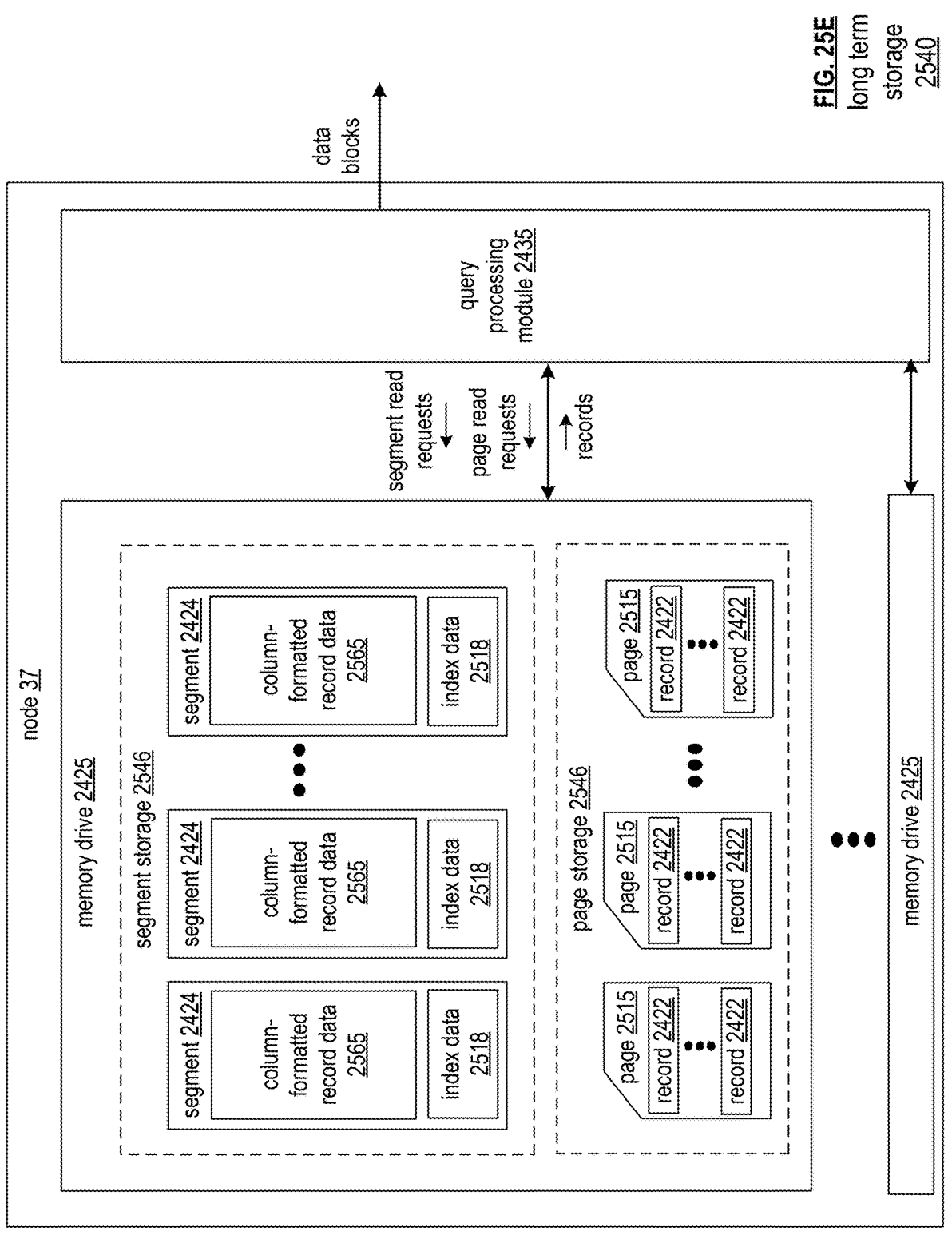
FIG. 25E is a schematic block diagram of a node that implements a query processing module that reads records from segment storage and page storage in accordance with various embodiments.

FIG. 25D illustrates an example embodiment of the page storage system 2506. As used herein, the page storage system 2506 can include page cache 2512 of a single loading module 2510; can include page caches 2512 of some or all loading module 2510-1-2510-N; can include page storage 2546 of a single long term storage 2540 of a storage cluster 2535; can include page storage 2546 of some or all long term storage 2540-1-2540-J of a single storage cluster 2535; can include page storage 2546 of some or all long term storage 2540-1-2540-J of multiple different storage clusters, such as some or all storage clusters 35-1-35-z; and/or can include any other memory resources of database system 10 that are utilized to temporarily and/or durably store pages.

Some or all features and/or functionality of FIG. 25D can be performed via at least one node 37 in conjunction with system metadata applied across a plurality of nodes 37, for example, where at least one node 37 participates in some or all features and/or functionality of FIG. 25D based on receiving and storing the system metadata in local memory of the at least one node 37 as configuration data and/or based on further accessing and/or executing this configuration data to implement some or all functionality of a loading module 2510 and/or a given long term storage 2540 as part of its database functionality accordingly. Performance of some or all features and/or functionality of FIG. 25D can optionally change and/or be updated over time, and/or a set of nodes participating in executing some or all features and/or functionality of FIG. 25D can have changing nodes over time, based on the system metadata applied across the plurality of nodes 37 being updated over time, based on nodes on updating their configuration data stored in local memory to reflect changes in the system metadata based on receiving data indicating these changes to the system metadata, and/or based on nodes being added and/or removed from the plurality of nodes over time.

FIG. 25E illustrates an example embodiment of a node 37 utilized to implement a given long term storage 2540 of FIG. 25B. The node 37 of FIG. 25E can be utilized to implement the node 37 of FIG. 25B, FIG. 25C, 25D, some or all nodes 37 at the IO level 2416 of a query execution plan 2405 of FIG. 24A, and/or any other embodiments of node 37 described herein. As illustrated a given node 37 can have its own segment storage 2548 and/or its own page storage 2546 by utilizing one or more of its own memory drives 2425. Note that while the segment storage 2548 and page storage 2546 are segregated in the depiction of a memory drives 2425, any resources of a given memory drive or set of memory drives can be allocated for and/or otherwise utilized to store either pages 2515 or segments 2424. Optionally, some particular memory drives 2425 and/or particular memory locations within a particular memory drive can be designated for storage of pages 2515, while other particular memory drives 2425 and/or other particular memory locations within a particular memory drive can be designated for storage of segments 2424.

The node 37 can utilize its query processing module 2435 to access pages and/or records in conjunction with its role in a query execution plan 2405, for example, at the IO level 2416. For example, the query processing module 2435 generates and sends segment read requests to access records stored in segments of segment storage 2548, and/or generates and sends page read requests to access records stored in pages 2515 of page storage 2546. In some cases, in executing a given query, the node 37 reads some records from segments 2424 and reads other records from pages 2515, for example, based on assignment data indicated in the page and/or segment ownership consensus 2544. The query processing module 2435 can generate its data blocks to include the raw row data of the read records and/or can perform other query operators to generate its output data blocks as discussed previously. The data blocks can be sent to another node 37 in the query execution plan 2405 for processing as discussed previously, such as a parent node and/or a node in a shuffle node set within the same level 2410.

Some or all features and/or functionality of FIG. 25E can be performed a given node 37 in conjunction with system metadata applied across a plurality of nodes 37, for example, where the given node 37 performs some or all features and/or functionality of FIG. 25E based on receiving and storing the system metadata in local memory of the at least one node 37 as configuration data, and/or based on further accessing and/or executing this configuration data to implement some or all functionality of the given node 37 of FIG. 25E as part of its database functionality accordingly. Performance of some or all features and/or functionality of FIG. 25E can optionally change and/or be updated over time based on the system metadata applied across the plurality of nodes 37 being updated over time and/or based on nodes on updating their configuration data stored in local memory to reflect changes in the system metadata based on receiving data indicating these changes to the system metadata.

In some embodiments, some or all features and/or functionality of loading new data (e.g. as new pages and/or new segments), for example, via one or more loading modules 2510 and/or via record processing and storage system 2505 as described herein implements some or all features and/or functionality of loading modules, record processing and storage system, and/or any loading of data for storage and access in query execution as disclosed by: U.S. Utility application Ser. No. 18/355,497, entitled "TRANSFER OF A SET OF SEGMENTS BETWEEN STORAGE CLUSTERS OF A DATABASE SYSTEM", filed Jul. 20, 2023; and/or U.S. Utility application Ser. No. 18/308,954, entitled "QUERY EXECUTION DURING STORAGE FORMATTING UPDATES", filed Apr. 28, 2023; which are hereby incorporated herein by reference in its entirety and made part of the present U.S. Utility Patent Application for all purposes.

Figure 25F:
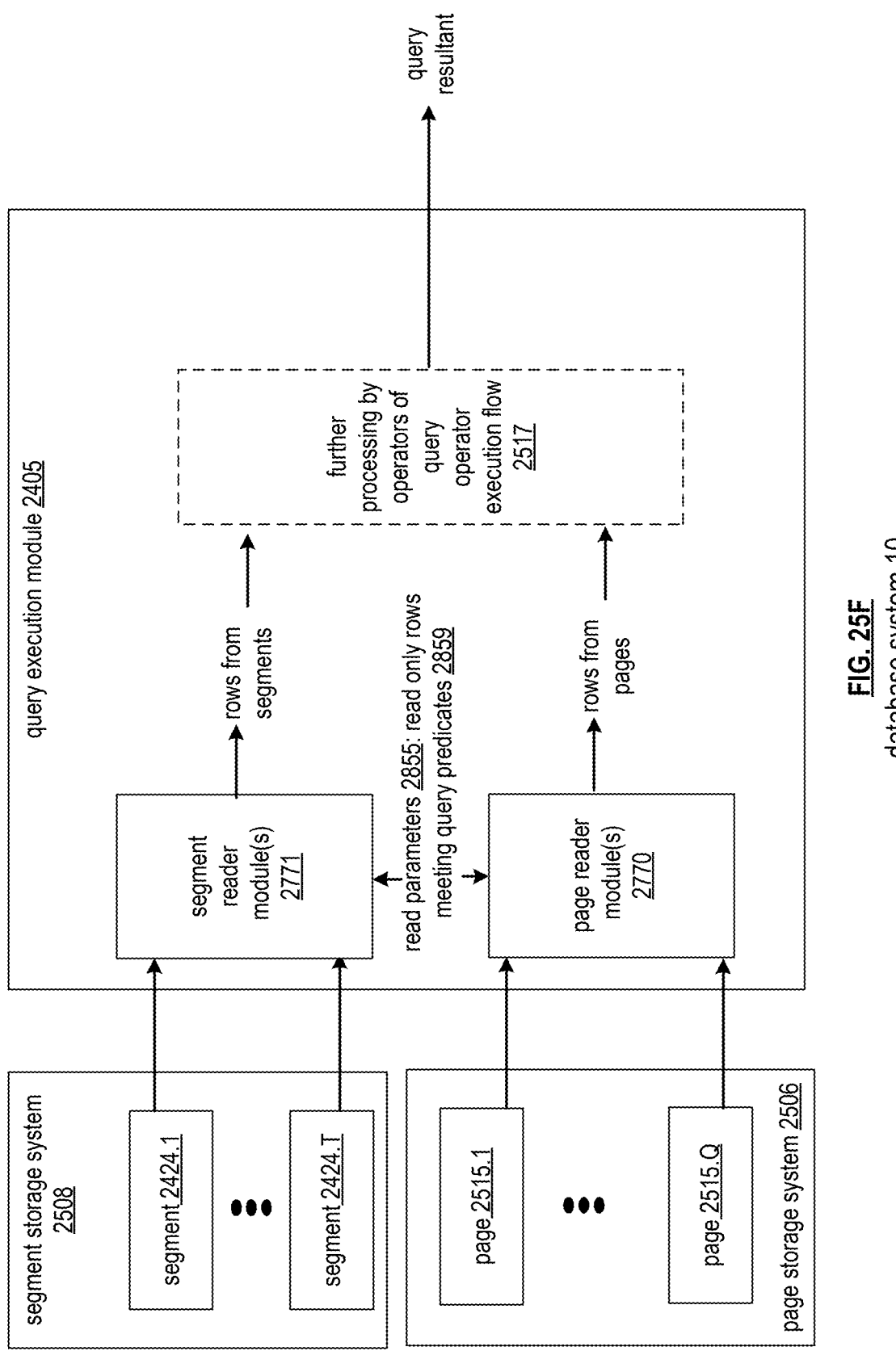
FIG. 25F is a schematic block diagram of a query execution module that implements at least one segment reader module and at least one page reader module in accordance with various embodiments.

FIG. 25F illustrates an embodiment of a query execution module 2504 of a database system 10 that implements at least one page reader module 2770 operable to read rows from pages and at least one segment reader module 2771 operable to read rows from segments. For example, the query is performed based on accessing both pages and segments based on being performed against all durable rows of a respective one or more datasets, even if a corresponding one or more page conversion processes have not yet been performed to generate segments from the respective pages The segment reader module 2771 and page reader module 2770 can be configured to read rows based on read parameters 2855. In the case of query execution, read parameters 2855 can indicate reading/emitting only rows meeting query predicates 2859 for the respective query (e.g. based on filtering being implemented at the IO level) and/or reading/emitting only column values from rows required for evaluating query predicates and/or for further processing of the respective query. Note that even rows/columns not emitted may still be read to evaluate corresponding filtering parameters, for example, via a source element and respective filtering elements in the case where no secondary index is implemented in the corresponding segment or page.

The segment reader module 2771 and page reader module 2770 can be implemented by nodes (e.g. storing the respective pages/segments) at IO level of a query execution plan executing the query. The rows read/filtered from the pages and segments can be further processed/filtered/manipulated, for example, via execution of operators at higher levels of query execution plan 2405 to ultimately render a query resultant.

The segment reader module 2771 and page reader module 2770 can be configured differently to account for differences in respective structuring of pages vs. segments, for example, ensuring that corresponding interfacing to data structured accordingly renders retrieval of the correct results from the correct locations.

Figure 25G:
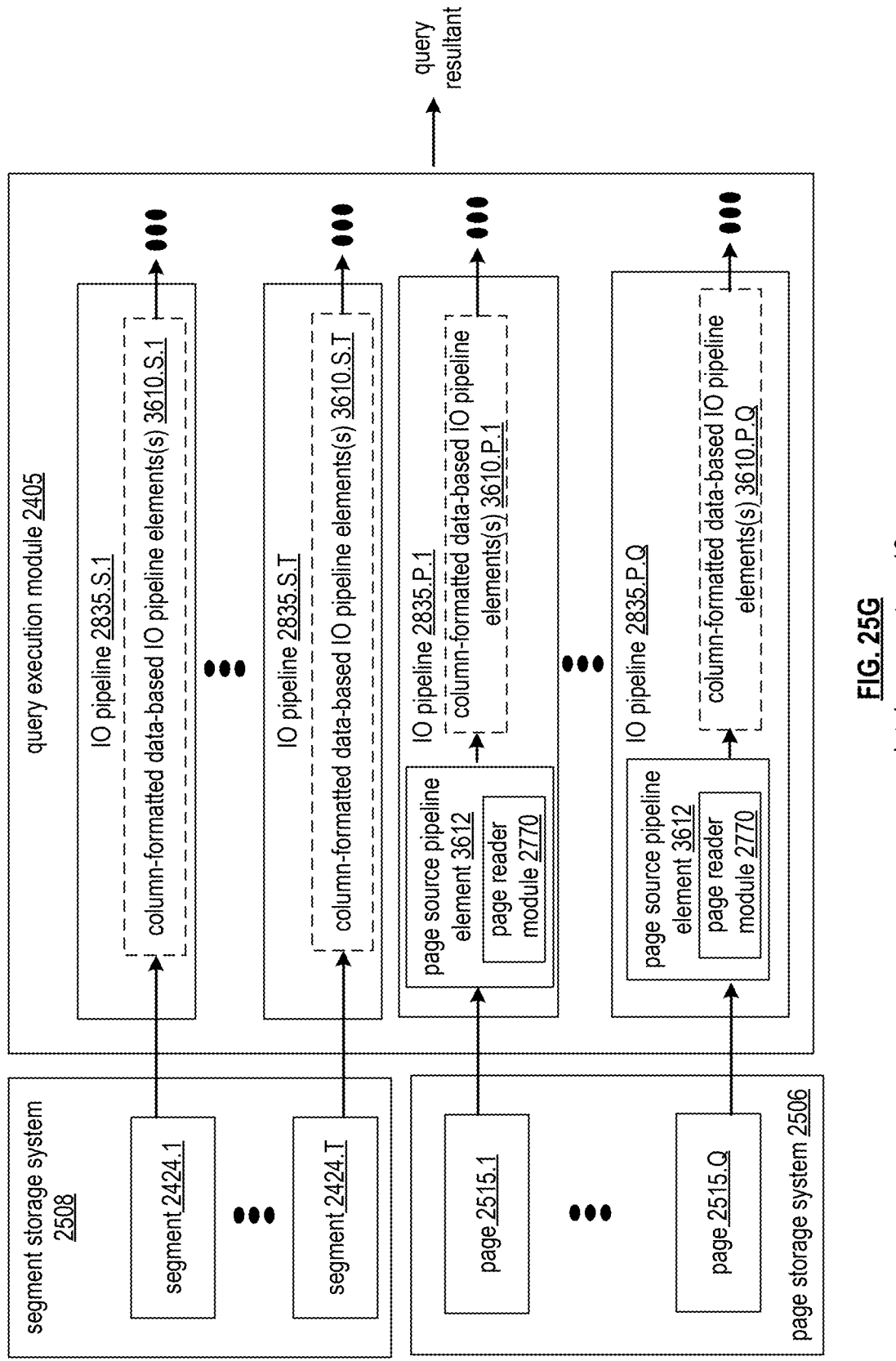
FIG. 25G is a schematic block diagram of a query execution module that implements a plurality of IO pipelines in accordance with various embodiments.

FIG. 25G illustrates an embodiment of query execution module where reads to a plurality of segments and a plurality of pages is based on applying a plurality of IO pipelines 2835. A plurality of segment IO pipelines 2835.5.1-2835.S.T can each be operable to read/filter rows from a corresponding one of the segments 2424.1-2424.T, for example, each implementing segment reader module 2771 of FIG. 25F to read rows from these segments during query execution. A plurality of page IO pipelines 2835.P.1-2835.P.Q can similarly each be operable to read/filter rows from a corresponding one of the pages 2515.1-2515.Q, for example, each implementing page reader module 2770 of FIG. 25F to read rows from these segments during query execution. In particular, the IO pipelines 2835.P can be adapted from IO pipelines 2835.Q to include a page source pipeline element 3612 that extracts rows/corresponding column values from pages in accordance with the page format, despite its difference from column format. The age source pipeline element 3612 can thus implement some or all of page reader module 2770, where the remainder of the page IO pipeline optionally operates identically a segment IO pipeline (e.g. in the case where no secondary index elements are included in the segment IO pipeline, for example, in embodiments where pages do not have secondary indexes based on indexing being performed only once segments are generated).

Figure 25H:
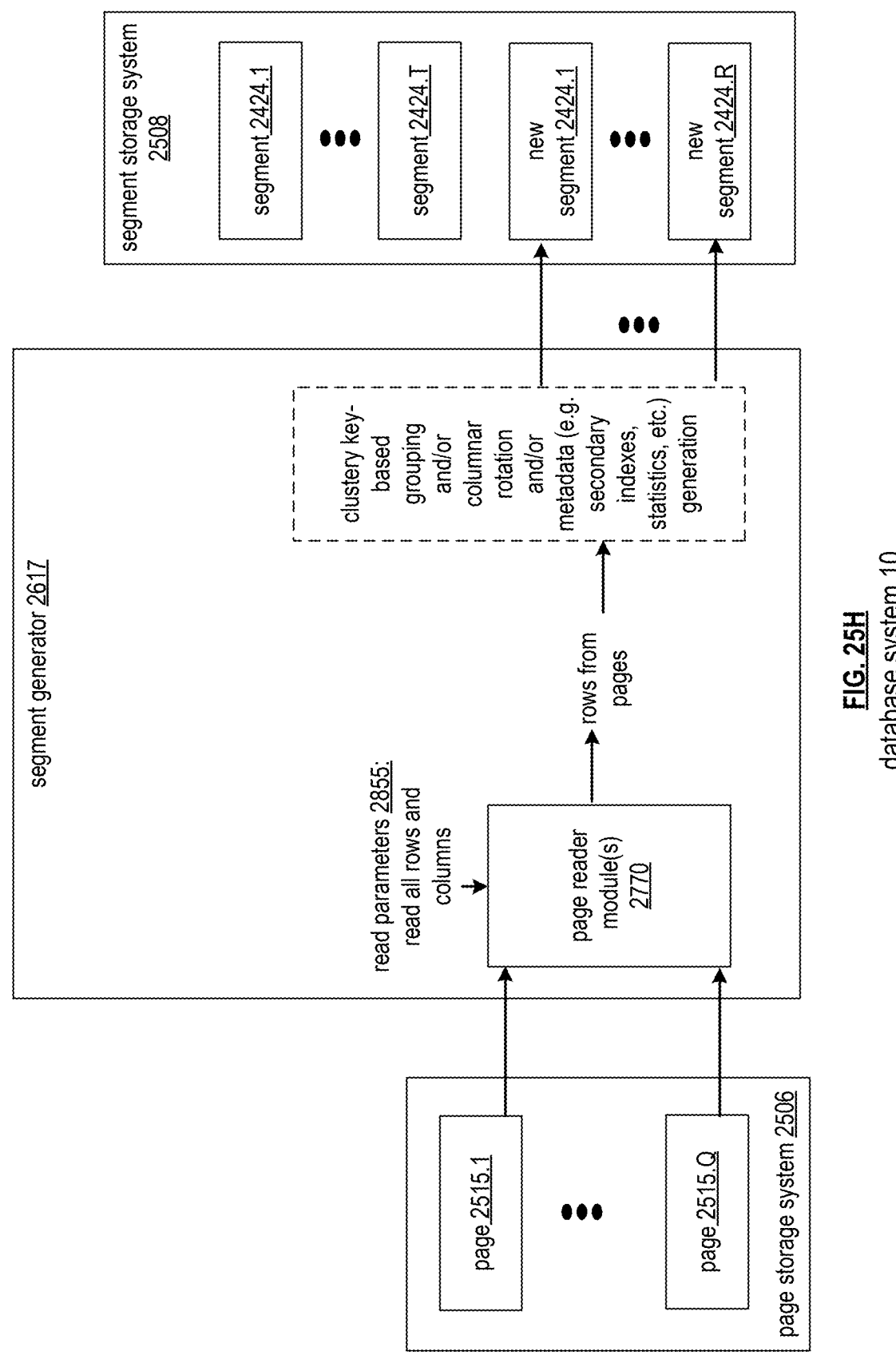
FIG. 25H is a schematic block diagram of a segment generator that implements at least one page reader module in accordance with various embodiments.

In some embodiments, the plurality of IO pipelines 2835.5.1-2835.S.T and IO pipelines 2835.P.1-2835.P.Q and/or corresponding query execution module 2405 of FIG. 25G implements some or all features and/or functionality of the IO pipelines and/or query execution module 2405 disclosed by: U.S. Utility application Ser. No. 18/364,761, entitled "GENERATING ADDENDUM PARTS FOR SUBSEQUENT PROCESSING VIA A DATABASE SYSTEM", filed Aug. 3, 2023, which is hereby incorporated herein by reference in its entirety and made part of the present U.S. Utility Patent Application for all purposes FIG. 25H illustrates an embodiment of segment generator 2617 where the one or more page reader modules are further implemented to support reading of rows from pages in performing page conversion process to generate segments from pages, in addition to being implemented to read rows from pages during query execution. In this case, the read parameters 2855 applied by page reader module 2770 can indicate all rows and columns be read to be included in segments, rather than only a filtered subset as indicated in a query predicate in applying page reader module 2770 during query execution. The rows can be further processed in performing cluster key-based grouping, columnar rotation, metadata generation, and/or other steps/processes associated with generating segments from pages, for example, via implementing any embodiment of page conversion process and/or segment generation described herein.

The new resulting segments 2424.1-2424.R generated from a set of pages 2515.1-2515.Q can be stored in segment storage system 2508 (e.g. via corresponding nodes) and can be accessed in subsequent queries instead of pages 2515.1-2515.Q (e.g. memory consumed to store these pages 2515.1-2515.Q is freed/the pages are deleted once the respective segments are confirmed to be stored).

A given set of rows included in a given page 2515 can be dispersed across multiple segments and/or multiple segment groups (e.g. based on cluster key grouping rendering different rows of a same page be stored separately). A given set of rows included in a given segment 2424 can have originated from a plurality of different pages 2515 (e.g. based on cluster key grouping rendering different rows of different page be stored together).

Figure 25I:
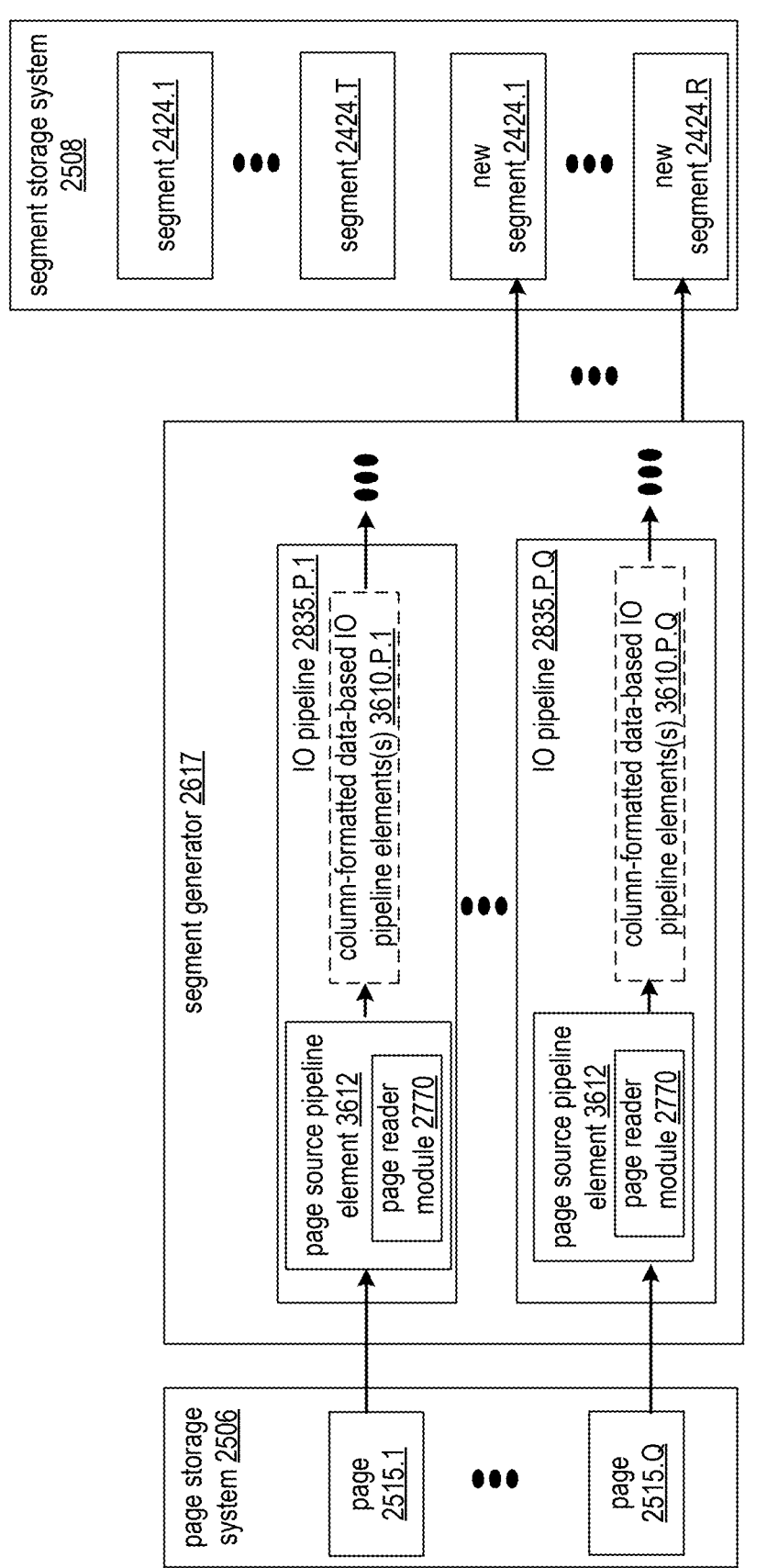
FIG. 25I is a schematic block diagram of a segment generator that implements a plurality of 10 pipelines in accordance with various embodiments.

FIG. 25I illustrates an embodiment of a segment generator implementing a plurality of IO pipelines 2835.P.1-2835.P.Q in a same or similar fashion as executed in FIG. 25G. However, these page IO pipelines 2835.P.1-2835.P.Q do not implement filtering of rows based on query predicates that may appear in page 10 pipelines for query execution. Other filtering, such as filtering out deleted rows or duplicate rows in duplicate spans of row numbers appearing in other pages, may be implemented in both the case of query execution and segment generation to ensure rows are read across all pages 2515 exactly once in a corresponding query resultant and/or set of segments, and to ensure that any deleted rows are not included in the corresponding query resultant and/or set of segments.

FIGS. 26A-26F illustrate embodiments of a database system 10 that implements some or all pages 2515 described herein as compressed pages having a compressed fixed length section and a compressed variable length section. The embodiments illustrated in 26A-26F can be utilized to implement one or more nodes 37 of one or more computing devices 18 implementing database system 10. Some or all features and/or functionality of FIGS. 26A-26F can be utilized to implement any embodiment of database system 10 described herein.

In some embodiments of database system 10, some or all pages 2515 are formatted via uncompressed fixed length and variable length page sections and via an index info section For example, pages 2515 are implemented via some or all features and/or functionality of page formatting disclosed by U.S. Utility application Ser. No. 16/985,723, entitled "DELAYING SEGMENT GENERATION IN DATABASE SYSTEMS", filed Aug. 5, 2020, which is hereby incorporated herein by reference in its entirety and made part of the present U.S. Utility Patent Application for all purposes.

In other embodiments of database system 10, some or all pages 2515 are instead formatted via compressed fixed length and/or variable length page sections, and/or optionally do not include any index info section. As a particular example, any embodiment of fixed length and/or variable length page sections described herein can be compressed via a compression algorithm, such as the Zstandard (zstd) compression algorithm. The page reader module 2770 can be adapted to provide an interface that allows efficient scanning of page data (e.g. from arbitrary subintervals of the cluster key keyspace or row list) via accessing compression frames containing the compressed data. As a particular example, the page reader module 2770 is adapted to read only one compression frame at a time, for example, where only one compression frame is held in memory at a time. Examples of such embodiments are illustrated and discussed in further detail in conjunction with FIGS. 26A-26F.

Such embodiments of formatting of some or all pages 2515 via compressing the fixed length and/or variable length page sections can improve the technology of database systems based on enabling larger conversion page sets for segment generation (e.g. as resource constraints on page batch partitions are primarily size-based in some embodiments); based on reducing I/O bottleneck during page queries (e.g. any queries that require reading rows from pages); and/or based on enabling implementing of an in-memory page cache to increase page query performance.

In some embodiments, a cluster key index page section is included in and/or mapped to pages 2515 to enable iterating over the page in cluster key order, mapping to the natural row number within the page (e.g. not sorted by cluster key, and instead corresponding to position on disk, for example, based on when it was received). The cluster key index page section can be stored in a serializedClusterKeyIndex_t. Page reader module 2270 (e.g. implementing pageIndexRow-Reader_t, for example, which wraps a pageRowReader_t) can be implemented to utilize the index to iterate in CK order and/or to apply a deleted rows list to skip rows when relevant.

In other embodiments, such as the embodiments of FIGS. 26A-26F, pages 2515 are implemented to not included such an index page section, for example, because the fixed length section also stores the values for cluster key columns. To enable the functionality of jumping to/reading from arbitrary subintervals of cluster key without such an index, rows in the fixed length and variable length sections can be sorted in cluster key order, for example, during page finalization (e.g. in mutablePage_t::finalize( )). In some embodiments, the cluster key index is built for in-progress pages in the page generator thread (e.g. before all rows are added and the page is complete), and this structure is utilized to iterate in CK order while compressing the fixed length and variable sections in finalize( ) to ensure the respective sections include their rows are sorted in cluster key order. The sorted and compressed page can begin as a newly constructed page (e.g. a newly constructed mutablePage_t) that is built by iterating over the existing page (e.g. existing mutableP-age_t), for example, via page reader module 2770 (e.g. implementing pageIndexRowReader_t). In some embodiments, the fixed length section of the existing page is sorted in-place since each of the row strides has the same length. In other embodiments, the memory for a new page is allocated to enable this sorting of the fixed length and variable length sections into the new page. In some embodiments, this allocating of new memory can increase the likelihood that page finalization will result in an out of memory (OOM) condition (e.g. will OOM), and database system 10 can be adapted to handle such situations, for example, based on occurring at higher frequency under such embodiments.

Such formatting of pages via a sorted and/or compressed fixed length section and variable length section can enable removal of the cluster key index section, which can improve the technology of database systems based on directly decreasing page sizes, and/or enabling iterating over a durable page to involve traversing sequential memory rather than random access due to the sorting of rows. For example, such traversing of sequential memory rather than random access can allow keep only a subset of the page (e.g. one compression frame per page section) in memory at a time, which can improve CPU caching.

In other embodiments, the cluster key index structure is instead included in page 2515, where the index is fragmented and/or otherwise configured to enable traversal of the cluster key index structure the structure one fragment (compression frame) at a time, and/or a plurality of cluster key indexes corresponding to the plurality of indexes are stored. In some embodiments, removal of the cluster key index structure via the sorting of fixed and variable length sections is preferred to reduce complexity and/or storage space required while still enabling storing of only one compression frame at a time in traversing the page.

In some embodiments, at least skip list is implemented instead of the cluster key index structure to provide comparably efficient methods of seeking within and traversing the CK values via the sorted and compressed structuring, and to enabling processing of row-based subsets (e.g. chunks) of the page in the IO layer. The at least one skip list for the given page can be implemented to provide mappings from {cluster key value→compression frame} and {row number→compression frame}, which will enable seeking to and iterating over arbitrary subranges of both without needing to decompress anything but data needed to be will used, for example, allowing processing of one compression frame at a time in iterating over rows of a page. The at least one slip list for a given page can include one skip lists or two skip lists (e.g. depending on whether the cluster keys and row numbers are grouped in a same skip list or are mapped in different skip lists). For example, in some embodiments, zstd compression in the IO layer is enabled based on building and cursor-ing over the row to frame mapping. In some embodiments, the skip list(s) are added as additional page section(s) of the page. In cases where deleted rows are identified (e.g. in an addendum part as described herein), the skip list(s) can enable skip decompression of frames composed entirely of data for deleted rows, as these rows need not be read, which can improve efficiency of processing a page.

In some embodiments, compressed and uncompressed pages both exist simultaneously in database system 10. Such flexibility enables disabling of page compression via system configuration, which can protect from issues in dealing with a legacy format, and/or allow a fall back to uncompressed (e.g. if a determination is made that such a change is more favorable for runtime efficiency, energy efficiency, etc., for example, if added compression compute during loading backs up processing, etc.). In such embodiments, different configurations of page reader module 2770 can be implemented to handle the different formatting (e.g. iterate over the page using either a pageIndexRowReader_t in the case where the page is formatted without sorting and compression of FIGS. 26A-26F, or compressedPageRowReader_t in the case where the page is formatted with sorting and compression of FIGS. 26A-26F). For example, the different configuration can each implement the same interface, and/or templating will render choosing of the right implementation depending on the format of the page to be read.

In some embodiments, most functionality of reading a page without compressing and sorting based on having a cluster key index structure (e.g. functionality of pageIn-dexRowReader_t interface), such as advancing by row, advancing by key, getting current key, etc., can be relatively implemented over the sorted fixed length section after being decompressed (e.g. using a pageRowReader_t configured enable such functionality). A getNumberOfRowsForKey( ) function can be implemented to return the number of rows mapped to a given key in the case where pages are sorted and compressed based on checking the skip list to find the frame where the cluster key ends, decompressing that frame if it's not the one currently being processed, then iterating until we find the row at which the cluster key changes. This function can be performed during batch partitioning (e.g. via sim-plePageBatchPartitioner_t::byteCountRows( )). In some embodiment, computation efficiency is increased in light of a new backing format, where the function samples cluster keys for their row counts and provides a page size CDF, both of which can be optionally calculated with no additional cost if the exact row count for each cluster key is not relied upon, where seek to the next desired sampling row and getting the cluster key row count during traversal is instead performed.

In some embodiments Zstd compression (e.g. without training a dictionary) is used for the compression itself to generate respective compression frames. Frames can be aligned between the fixed length and variable length sections, meaning the same subset of rows will exist in the n-th frame of each section. The fixed length section can contain offsets into the variable section for variable row data, so aligning frames can simplify the tracking. Only need one fixed length and only one variable length frame need be open at once in reading the page, and both will have the same boundaries (e.g. based on containing the same set of rows). This also enables the need for only one mapping of row number and cluster to compression frame per page (e.g. via only one or two corresponding skip lists per page, as fixed length and variable length sections do not need different skip lists). Zstd compression can allow that frames be flushed at any time.

The size (and in effect, number of) frames per page can play a large role in how effectively the IO layer and segment generation can parallelize. For example, it can be generally assumed that there will be many frames per page, so that the duplicate cost of decompression for overlapping frames for row (in IO) and cluster key (in seg gen) ranges can be low.

In some embodiments, the Zstd compression (or other compression) of the pages 2515 can have configurable compression level. For example, selection of compression level can be based on a tradeoff between compression throughput and amount of compression, which can be useful in maintaining loading throughput. The frame size can be configurable by row count, size, and/or some function of page characteristics (e.g. frames per page). Different com-pression can be configured for different pages and/or uncom-pressed pages can be utilized in some cases, for example, to maintain the capability to generate uncompressed pages as well as add an ability to create pages in index-less format without compression, which can aid in testing and bench-marking.

In some embodiments, a page cache is implemented. For example, nodes 37 can keep a cache of pages in memory, for example, where loader nodes perform caching that falls back to these nodes for misses. This can be utilized in imple-menting time zone conversion and virtual read caching. In some embodiments, the cache is configurable by size, and/or counters to track the hit ratio are implemented ensure it is sized appropriately.

FIGS. 26A-26F illustrate example embodiments of such functionality of generating and/or reading from pages hav-ing compressed and/or sorted fixed length and variable length sections.

Figure 26A:
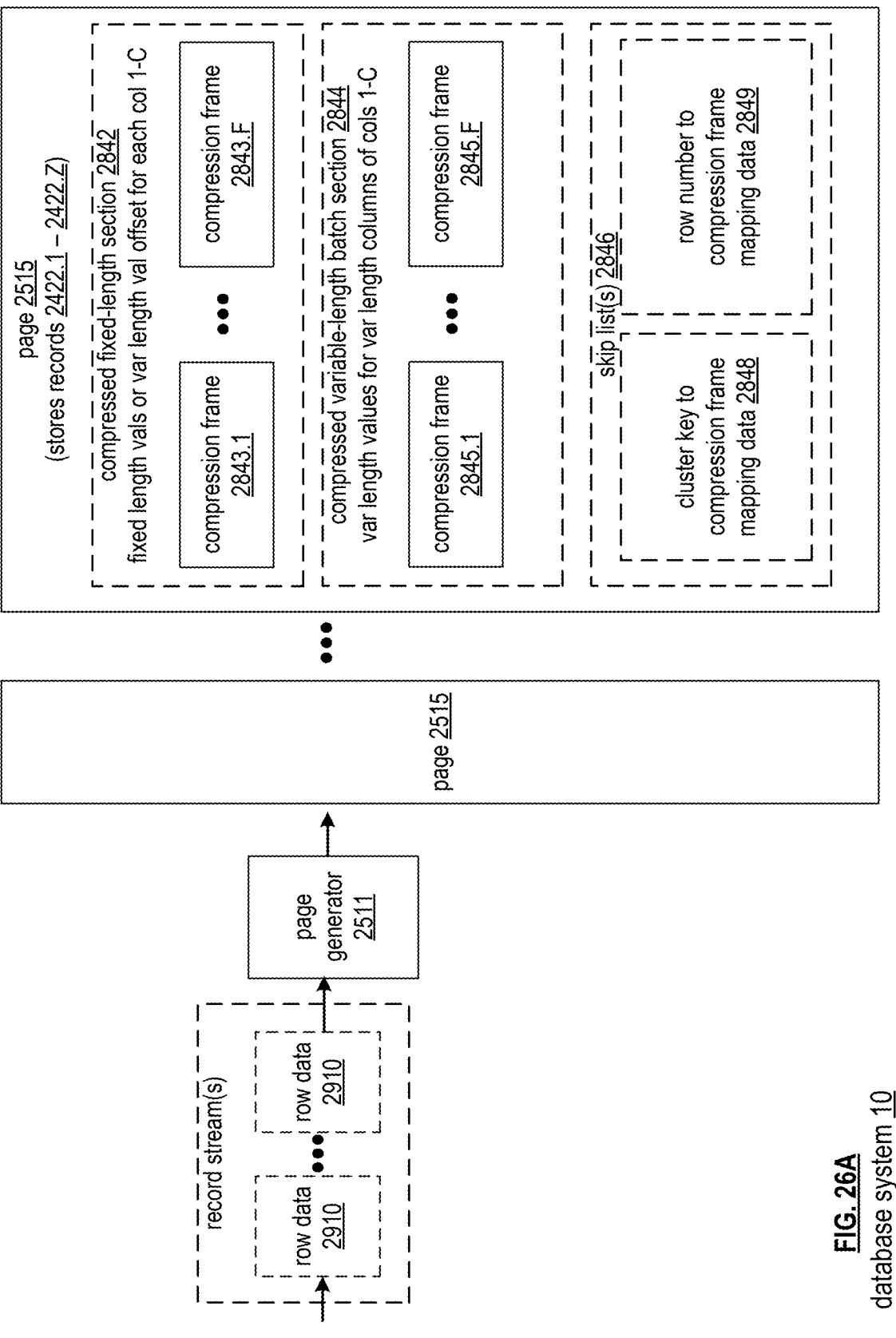
FIG. 26A is a schematic block diagram of a page generator that generates a plurality of pages each having a compressed fixed-length section and a compressed variable-length section in accordance with various embodiments.

FIG. 26A illustrates an embodiment of a page generator 2511 that processes one or more record streams of row data 2910 to generate a plurality of pages 2515 that each store a respective plurality of records 2422.1-242.Z (e.g. distinct from records in other pages; different pages can store same or different numbers of records) via: a compressed fixed-length section 2842 (e.g. storing fixed length values and/or variable length value offsets for each of a set of C columns 1-C) that includes a first plurality of compression frames 2843.1-2843.F; a compressed variable-length section 2844 (e.g. storing variable length values for variable length col-umns of columns 1-C) that includes a second plurality of compression frames 2845.1-2845.F; and/or one or more skip lists 2846 that includes cluster key to compression frame mapping data and/or row number to compression frame mapping data (e.g. each in their own skip lists, or both in the same skip list). Some or all features and/or functionality of FIG. 26A can be utilized to implement any embodiment of page 2515 described herein and/or of database system 10 described herein.

Figure 26B:
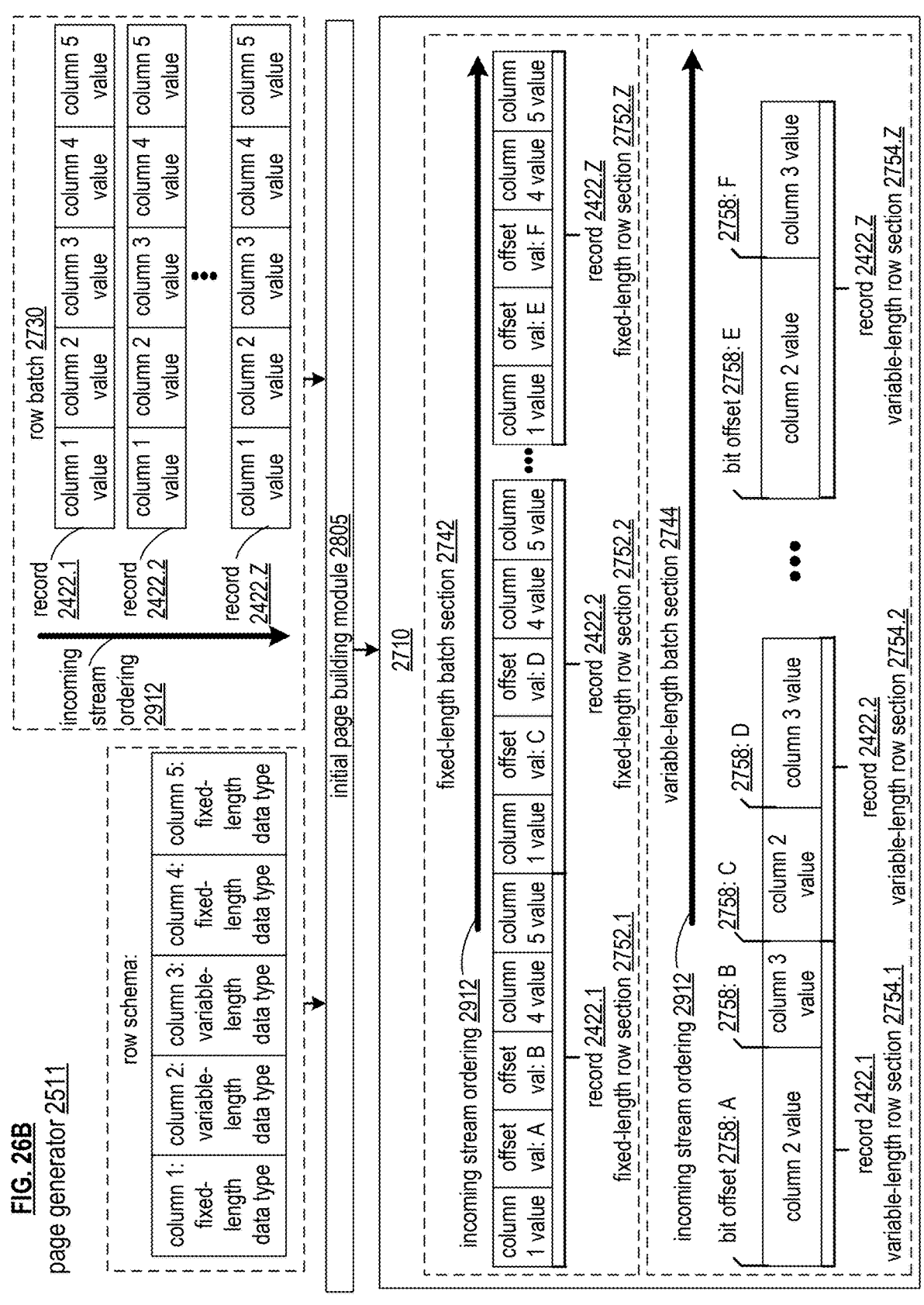
FIG. 26B is a schematic block diagram of a page generator that implements an initial page building module in accordance with various embodiments.

FIG. 26B illustrates an example of a page generator 2511 that implements initial page building module 2805 that generates formatted record data 2710 from an example row batch 2730 under an example schema. The formatted record data 2710 can be generated to include fixed-length batch section 2742 and variable-length batch section 2744. Fixed-length batch section 2742 can include a plurality of fixed-length row sections 2752 for the plurality of records in accordance with an incoming stream ordering 2912 (e.g. unsorted ordering). Variable-length batch section 2742 can include a plurality of variable-length row sections 2754 for the plurality of records in accordance with the incoming stream ordering 2912 (e.g. the unsorted ordering). The fixed-length batch section 2742, fixed-length row sections 2752, variable-length batch section 2742, and/or variable-length row sections 2754 can be implemented via some or all features and/or functionality disclosed by U.S. Utility appli-cation Ser. No. 16/985,723, entitled "DELAYING SEG-MENT GENERATION IN DATABASE SYSTEMS", filed Aug. 5, 2020, which is hereby incorporated herein by reference in its entirety and made part of the present U.S. Utility Patent Application for all purposes.

Figure 26C:
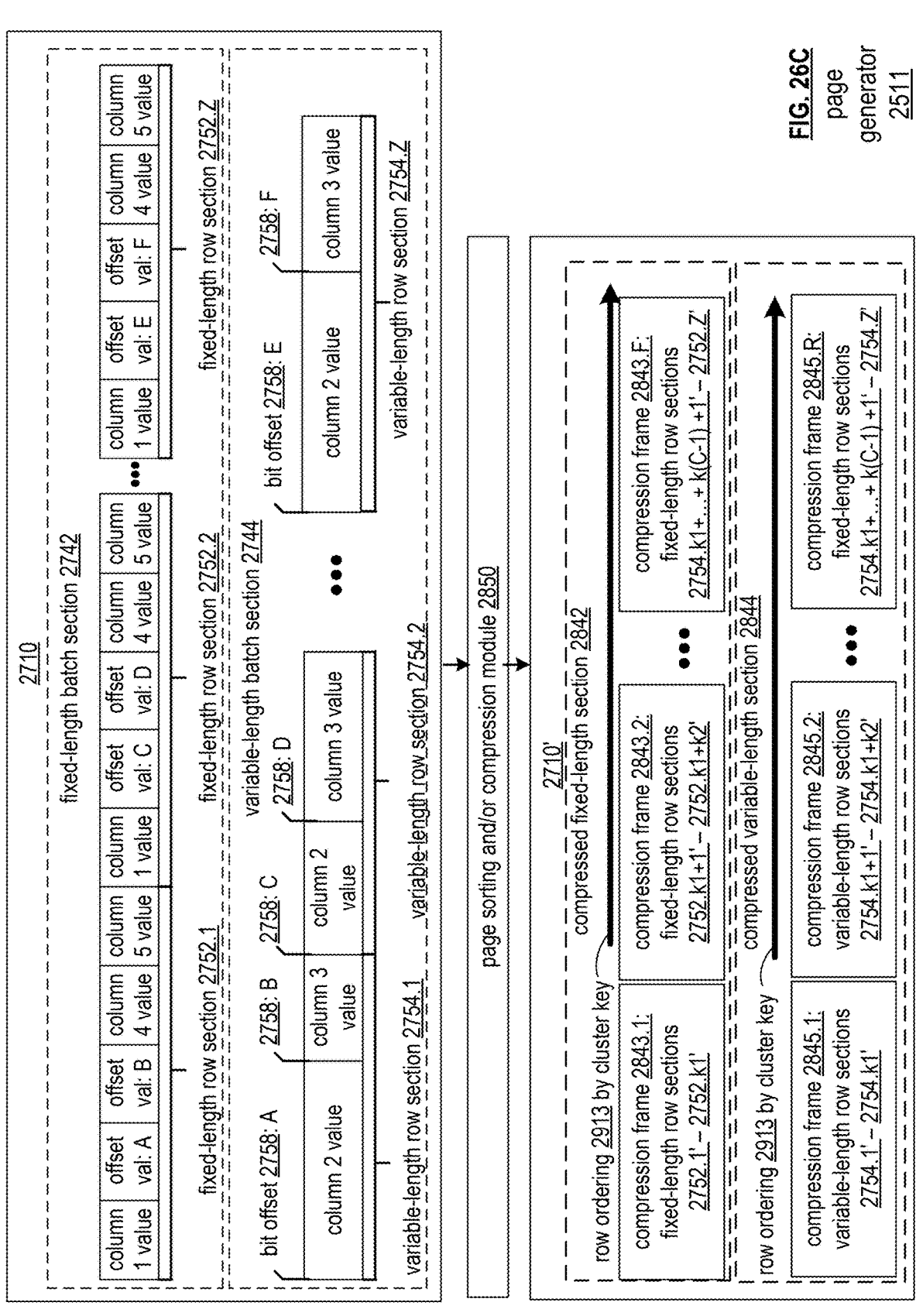
FIG. 26C is a schematic block diagram of a page generator that implements a page sorting and/or compression module in accordance with various embodiments.

FIG. 26C illustrates an example of a page generator 2511 that further implements a page sorting and/or compression module 2850 that generates updated formatted record data 2710' from record formatted data, for example, generated via initial page building module 2805 of FIG. 26B.

Compressed fixed-length section 2842 can be generated from fixed-length batch section 2742 to include a plurality of compression frames 2843 that each include a set of k fixed-length row sections, where k is the same or different for different compression frames 2843. Similarly, com-pressed fixed-length section 2842 can be generated from fixed-length batch section 2742 to include a plurality of compression frames 2843 that each include a set of k fixed-length row sections, where k is the same or different for different compression frames 2845.

The fixed-length row sections within a compression frame 2843 and the variable-length row sections within a com-pression frame 2845 can be ordered in a row ordering 2913 by cluster key, where the row sections compression frames 2843 and 2845 themselves are also ordered in the row ordering 2913 by cluster key. For example, first, the rows 2422.1-2422.$Z$ of the page are sorted to render an ordering from 2422.1'-2422.$Z'$ (e.g. where row 2422.1' is optionally different from row 2422.1 based on row 2422.1' being first in the ordering 2913 but not in the ordering 2912, where row 2422.1' is some other row 2422.$x$ of the ordering 2912, denoted as 2422.1' to indicate it is ordered first in the ordering 2913), and then the fixed-length batch section and variable length sections including respective row sections in sorted ordered are then compressed into respective compression frames The fixed-length row sections within a compression frame, and the compression frames themselves, can be ordered in the row ordering 2913 by cluster key (e.g. first the rows 1-Z of the page are sorted, and then the fixed-length batch section and the including this sorted set of rows are compressed).

For example, compression frame 2843.1 includes the first k1 row sections in the ordering 2913 that include row sections 2952.1'-2752.$k$1', corresponding to rows 2422.1'-2422.$k$1'. Due to the frames being aligned, compression frame 2845.1 includes the first k1 row sections in the ordering 2913 that include row sections 2954.1'-2754.$k$1', again corresponding to rows 2422.1'-2422.$k$1'.

Figure 26D:
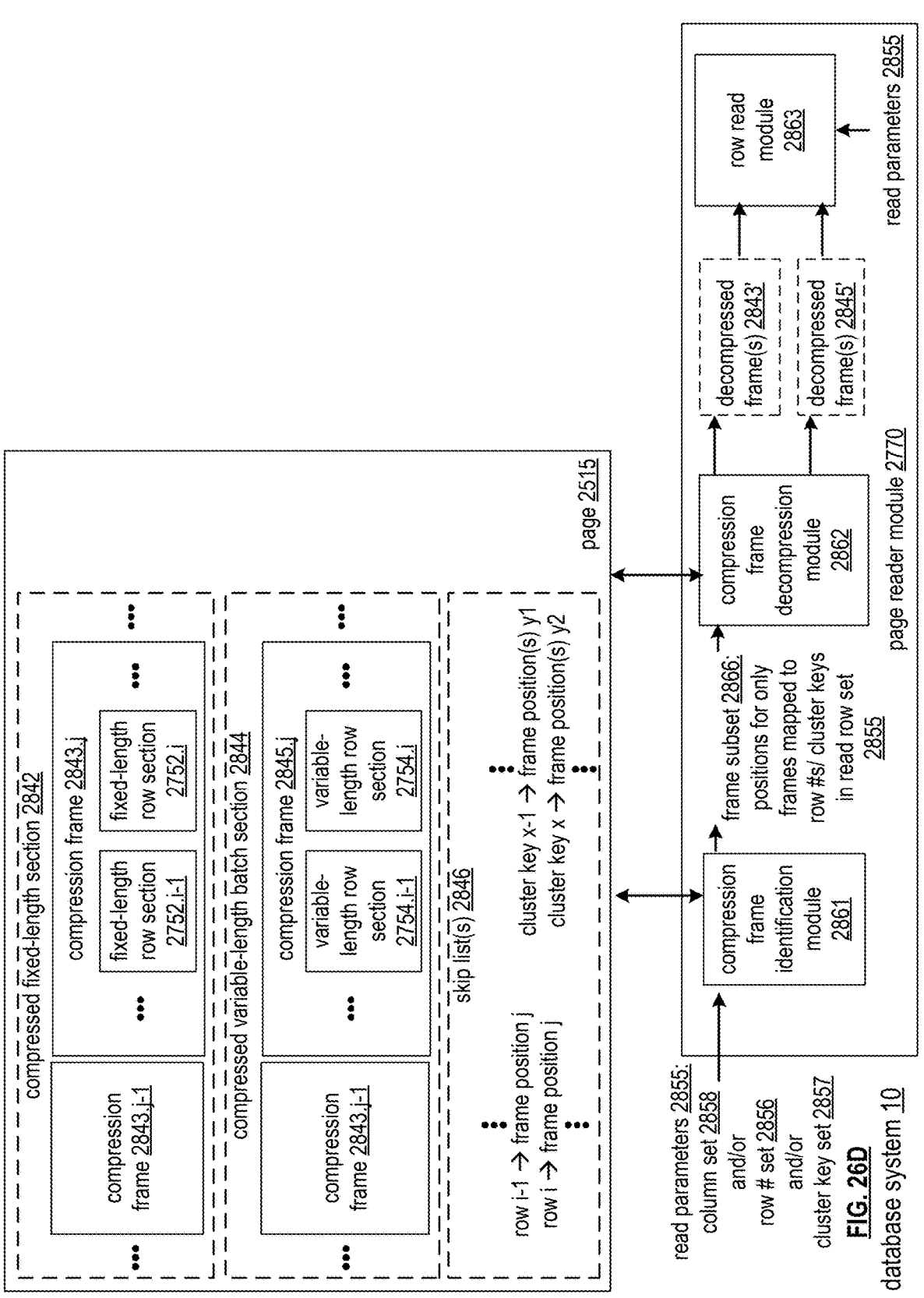
FIGS. 26D and 26E are schematic block diagrams of a page reader module that implements a compression frame identification module, a compression frame decompression module, and/or a row read module in accordance with various embodiments.

FIG. 26D illustrates an embodiment of database system 10 implementing a page reader module 2770 that reads rows from a page 2515 in accordance with read parameters 2855, for example, as part of executing a query or generating segments from rows of the given page.

Read parameters 2855 can indicate a column set 2858 (e.g. some or all columns 1-C to be sourced), a row number set 2856 (e.g. some or all rows, such as only rows to have column values sourced as indicated by a row list emitted by an IO pipeline element that filtered on one or more other columns), and/or a cluster key set 2857 (e.g. some or all possible cluster key values, for example where each cluster key value is defined as a corresponding sets of column values for a set of one or more columns corresponding to cluster key for the given dataset/table/schema) to be read. Only pairs of compression frames 2843 and 2845 having row numbers/cluster keys included in the respective sets indicated by read parameters 2855 need be included (e.g. a query filtering by columns(s) implemented as the cluster key renders only compression frames that include cluster key values specified by the corresponding filtering parameters be decompressed).

Such frames to be decompressed can be indicated in a frame subset 2866 identified by compression frame identification module 2861 via accessing the one or more skip lists 2846 to identify frame positions for only the row #s/cluster key values indicated in read parameters 2855. In cases where all rows are to be read, the frame subset 2866 can indicate all frames.

A given frame position mapped to a particular row number or cluster key can indicate the position of a corresponding compression frame in the respective ordering in both the compressed fixed-length section 2842 and compressed variable-length section (e.g. the position is the same for both sections due to the sections being aligned) that includes the respective row number or cluster key. The mapping of cluster key values to frame positions can indicate multiple frames for a given cluster key in the case where the rows having the given cluster key spans multiple consecutive frames.

In this example, a given row 2422.$i$ has its fixed-length row section in the jth compression frame 2843.$j$ of the compressed fixed-length section and has its variable length row section in the jth compression frame of the compressed variable-length section, where this mapping is reflected in the skip list. The row number can correspond to the number of the row prior to ordering (e.g. its position/offset in the original formatted record data 2710 in accordance with ordering 2912).

The frames identified in compression frame identification module 2861 can be decompressed via compression frame decompression module 2862 (e.g. in accordance with the corresponding compression algorithm such as the zstd algorithm) to render decompressed frames 2843' and 2845 for each identified frame position in frame subset 2866. The decompressed frames are read by row read module 2863 for further processing (e.g. grouping/formatting into segments, or filtering/manipulating in query execution).

In some embodiments, frames are optionally processed one at a time (e.g. one pair of fixed-length and variable length compression frames at a time), where a given pair of aligned frames 2843 and 2845 having a position indicated in frame subset 2866 are decompressed into memory (e.g. a page cache or other memory) for reading by row read module 2863, and once reading of these decompressed frames is completed, a next pair of aligned frames 2843 and 2845 having a position indicated in frame subset 2866 are decompressed into memory (e.g. some or all memory freed by the prior frame to overwrite the previously processed frame) for reading by row read module 2863.

Figure 26E:
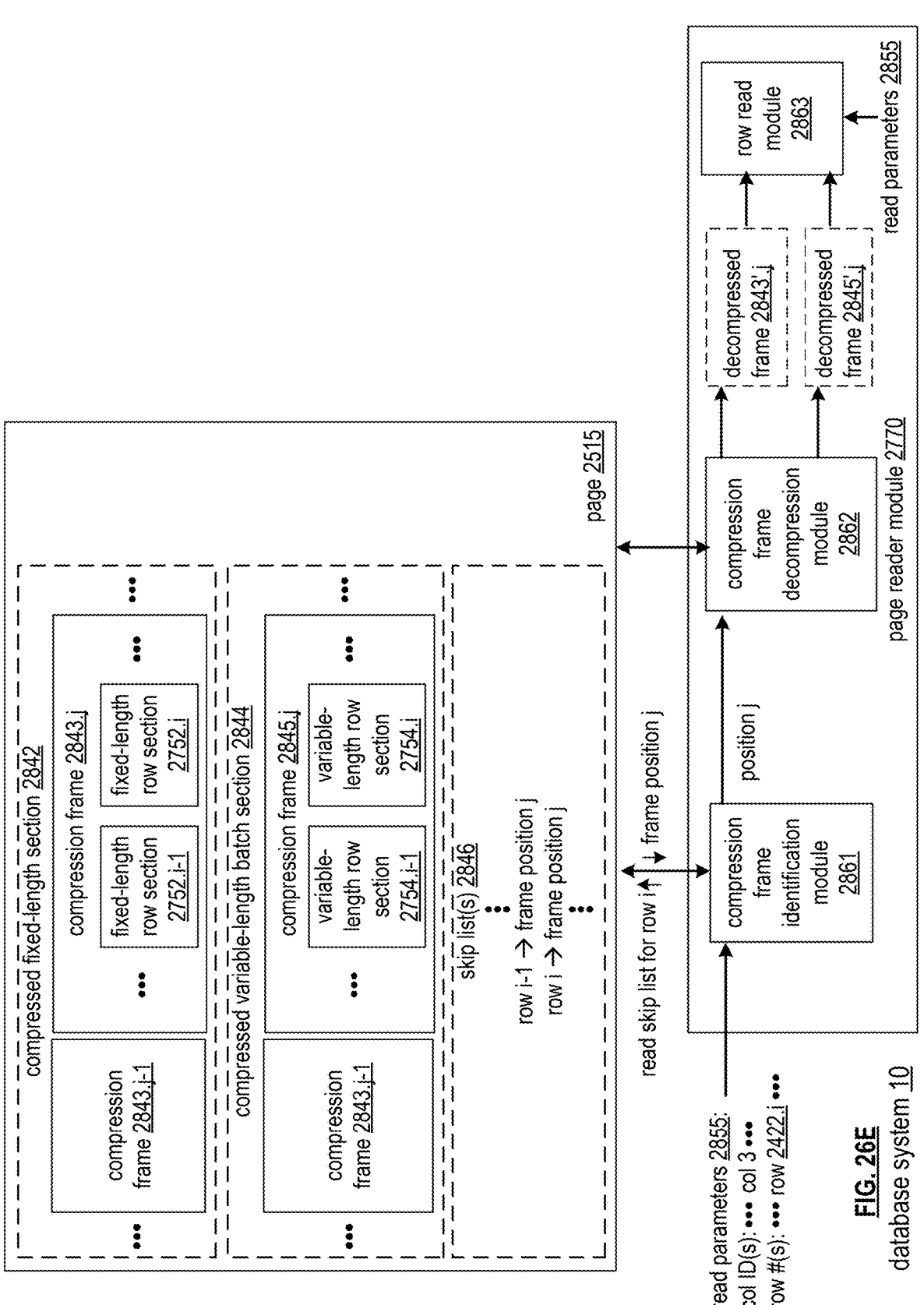

FIG. 26E illustrates a particular example of applying page reader module 2770 when read parameters 2855 indicate a set of row numbers that includes row 2422.$i$ and indicates a set of columns that includes column 3. Compression frame identification module 2861 accesses skip list 2846 to determine row i is included in frames having frame position j, and indicates frame position j in its frame subset 2866. Compression frame decompression module 2862 compresses frames 2843.$j$ and 2845.$j$ accordingly for processing via row read module 2863.

Figure 26F:
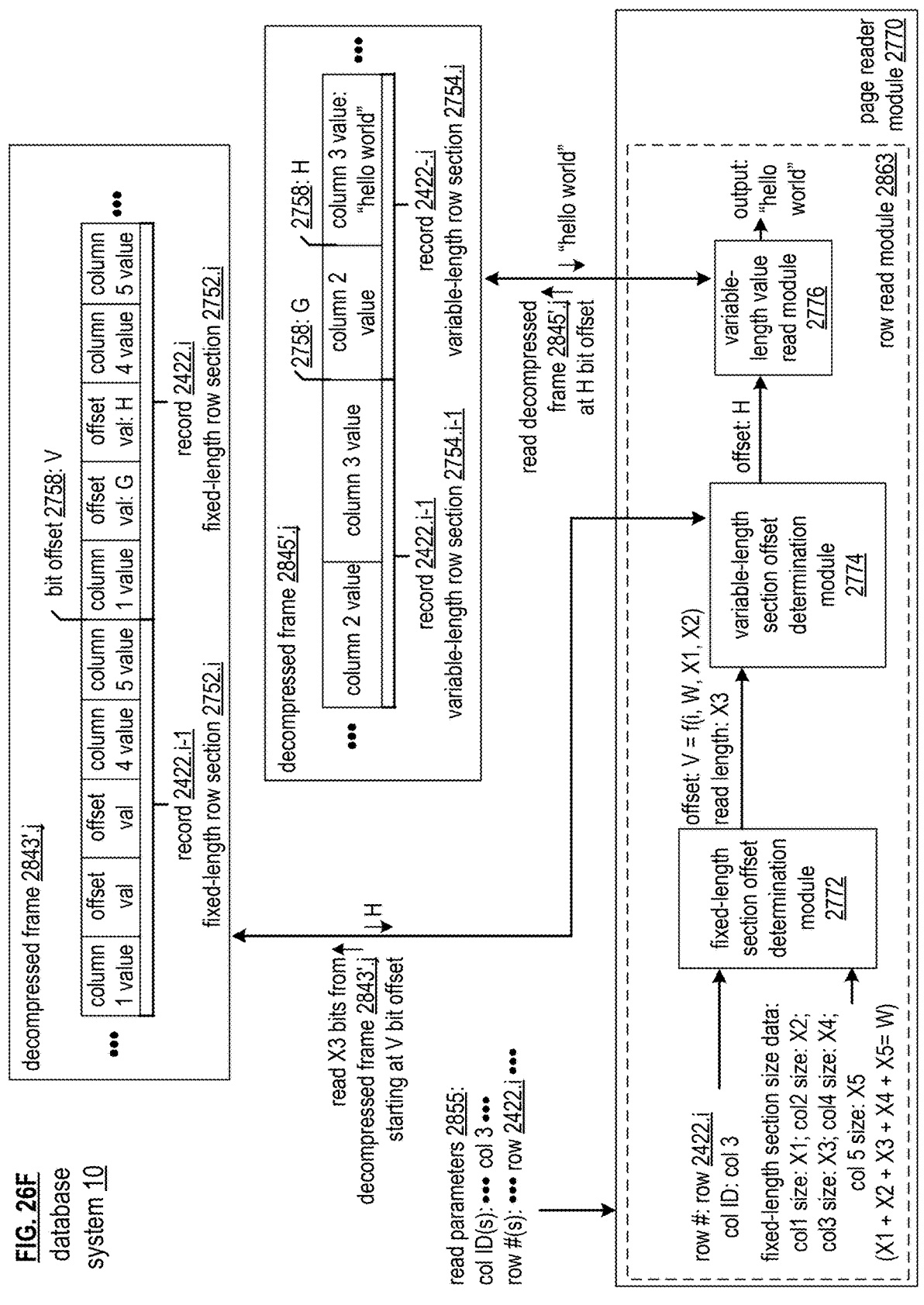
FIG. 26F is a schematic block diagram of a page reader module that implements a fixed-length section offset determination module, a variable-length section offset determination module, and/or a variable-length value read module.

FIG. 26F illustrates an embodiment of row read module 2863 that reads rows (e.g. at least variable-length column 3 of at least row i, in continuing from the example of FIG. 26E) from decompressed frames 2843.$j$ and 2845.$j$. A fixed-length section offset determination module 2722 can determine an offset for column 3 of the given row i in the fixed-length section (e.g. based on known structuring of the frame and/or its original offset value, for example, where the offset is some function of the sizes of some or all fixed length columns and/or the ordering of row i in ordering 2913). The respective offset value can be read from the decompressed frame 2843' via a variable-length section offset determination module 2774 for processing via a variable-length value read module 2776, which reads decompressed frame 2845' at/based on this respective offset value to retrieve the corresponding column value for variable-length column 3.

The fixed-length section offset determination module 2722, variable-length section offset determination module 2774, and/or variable-length value read module 2776 can be implemented via some or all features and/or functionality disclosed by U.S. Utility application Ser. No. 16/985,723, entitled "DELAYING SEGMENT GENERATION IN DATABASE SYSTEMS", filed Aug. 5, 2020, which is hereby incorporated herein by reference in its entirety and made part of the present U.S. Utility Patent Application for all purposes.

FIG. 26G illustrates a method for execution by at least one processing module of a database system 10. For example, the database system 10 can utilize at least one processing module of one or more nodes 37 of one or more computing devices 18, where the one or more nodes execute operational instructions stored in memory accessible by the one or more nodes, and where the execution of the operational instructions causes the one or more nodes 37 to execute, independently or in conjunction, the steps of FIG. 26G, for example, based on participating in execution of a query being executed by the database system 10 and/or based on participating in execution of a loading process being executed by the database system 10. Some or all of the method of FIG. 26G can be performed by nodes executing a loading operation as a plurality of loading modules and/or can be performed by nodes executing a query, for example, via one or more nodes 37 implemented as nodes of a query execution module 2504 implementing a query execution plan 2405. In some embodiments, a node 37 can implement some or all of FIG. 26G based on implementing a corresponding plurality of processing core resources 48.1-48.W. Some or all of the steps of FIG. 26G can optionally be performed by any other one or more processing modules of the database system 10.

Some or all steps of FIG. 26G can be performed in parallel and/or concurrently via a plurality of parallelized processing resources (e.g. implemented via a plurality of nodes 37 and/or a plurality of processing core resources 48). For example, multiple instances of any given step of FIG. 26G can be performed in parallel and/or concurrently via a plurality of parallelized processing resources, where each parallelized processing resource of the plurality of parallelized processing resources performs the given step in parallel with and/or concurrently with other ones of the plurality of parallelized processing resources also performing the given step. As another example, any given step of FIG. 26G can be performed based on a plurality of parallelized processing resources performing assigned portions of the given step in parallel and/or concurrently, where each parallelized processing resource of the plurality of parallelized processing resources performs their assigned portion of the step in parallel with and/or concurrently with other ones of the plurality of parallelized processing resources also performing their own assigned portions of the given step.

Some or all of the steps of FIG. 26G can be performed to implement some or all of the functionality of the database system 10 as described in conjunction with FIGS. 26A-26F, for example, by implementing some or all of the functionality of query execution module 2504, segment generator module 2617, page generator module 2511, and/or page reader module 2770. Some or all steps of FIG. 26G can be performed by database system 10 in accordance with other embodiments of the database system 10 and/or nodes 37 discussed herein. Some or all of the steps of FIG. 26G can be performed in conjunction with performing some or all steps of any other method described herein.

Step 2682 includes receiving a plurality of rows for storage, Step 2684 includes generating a plurality of pages from the plurality of rows. In various examples, each page of the plurality of pages is generated to include a corresponding set of rows of the plurality of rows in accordance with a compressed row-formatted structuring. Step 2686 includes reading at least one row of the corresponding set of rows from each of a subset of the plurality of pages.

Performing step 2684 can include performing step 2688, step 2690, step 2692, and/or step 2694. Step 2688 includes generating a variable length section of the each page that includes, for each row of the corresponding set of rows, a set of variable length values of a set of variable length columns of the corresponding set of rows. Step 2690 includes generating a fixed length section of the each page that includes, for the each row of the corresponding set of rows, a set of fixed length values of a set of fixed length columns of the corresponding set of rows and a set of offset values for the set of variable length columns each indicating a location of a corresponding variable length value of the each row in the variable length section. Step 2692 includes generating a plurality of compression frames of the each page based on compressing the fixed length section and the variable length section. Step 2694 includes generating at least one skip list of the each page mapping each of the corresponding set of rows to a corresponding one of the plurality of compression frames.

Performing step 2686 can include performing step 2696 and/or step 2698. Step 2696 includes accessing the at least one skip list of the each of a subset of the plurality of pages to identify at least one compression frame corresponding to the at least one row. Step 2698 includes decompressing the at least one compression frame to access the at least one row.

In various examples, the fixed length section of the each page is generated to include fixed length values and offsets of the corresponding set of rows in sorted order by cluster key of the corresponding set of rows. In various examples, the variable length section of the each page is generated to include variable length values of the corresponding set of rows in sorted order by cluster key of the corresponding set of rows.

In various examples, generating the each page of the plurality of pages includes: generating a corresponding initial page that includes an unsorted fixed length section and an unsorted variable length section; and/or generating the each page based on iterating over the corresponding initial page to sort the unsorted fixed length section and the unsorted variable length section to generate the fixed length section and the variable length section of the each page.

In various examples, the at least one skip list includes: a mapping from cluster key value to compression frame; and/or a mapping from row number to compression frame.

In various examples, the mapping from cluster key value to compression frame is stored as a first skip list of the at least one skip list. In various examples, the mapping from row number to compression frame is stored as a second skip list of the at least one skip list.

In various examples, a first subset of the plurality of compression frames correspond to the fixed length section. In various examples, a second subset of the plurality of compression frames correspond to the variable length section. In various examples, the first subset of the plurality of compression frames and the second subset of the plurality of compression frames are aligned based on each given subset of rows included in any given compression frame of the first subset of the plurality of compression frames at a corresponding frame position in an ordering of the first subset of the plurality of compression frames all being included in a corresponding compression frame of the second subset of the plurality of compression frames at the corresponding frame position in an ordering of the second subset of the plurality of compression frames.

In various examples, reading a given variable length value of a given row of the at least one row is based on: reading an offset value indicating the location of the given variable length value in the variable length section based on decompressing a compression frame, having a given frame position in the ordering of the first subset of the plurality of compression frames, that includes the given row in the fixed length section; and/or reading the given variable length value from the location indicated by the offset value based on decompressing a corresponding compression frame in the second subset of the plurality of compression frames having the given frame position in the ordering of the second subset of the plurality of compression frames.

In various examples, reading the at least one row of the corresponding set of rows from the each of the subset of the plurality of pages is based on iterating over all rows of the corresponding set of rows of the each of the subset of the plurality of pages.

In various examples, generating the each page is based on appending each of a set of incoming rows to an end of the fixed length section and an end of the variable length section one at a time as the each of the set of incoming rows is received, until the fixed length section and the variable length section are completed. In various examples, the plurality of compression frames are generated after the fixed length section and the variable length section are completed.

In various examples, the at least one row of the corresponding set of rows is read from each of the subset of the plurality of pages in accordance with performing a database operation. In various examples, performing the database operation further includes at least one of: reading at least one first additional row from each of a subset of a second plurality of pages stored in accordance with an uncompressed row-formatted structuring; and/or reading at least one second additional row from each of a subset of a plurality of segments stored in accordance with a columnar-formatted structuring. In various examples, output of the database operation is based on a full set of rows that includes the at least one row of the corresponding set of rows read from each of the subset of the plurality of pages and at least one of: the at least one first additional row read from the each of the subset of the second plurality of pages, or the at least one second additional row read from the each of the subset of the plurality of segments.

In various examples, accessing the at least one skip list of the each of the subset of the plurality of pages includes skipping a subset of the plurality of compression frames that each are entirely composed of data corresponding to deleted rows.

In various examples, the plurality of compression frames are generated based on applying Zstandard compression.

In various examples, generating the plurality of pages includes implementing a plurality of parallelized loading modules to generate the plurality of pages in parallel based on each of the plurality of parallelized loading modules generating a corresponding subset of the plurality of pages in parallel with other ones of the plurality of parallelized loading modules generating other corresponding subsets of the plurality of pages.

In various examples, the at least one row is read from each of the subset of the plurality of pages in conjunction with executing an IO portion of a query to identify a plurality of rows meeting filtering predicates of a corresponding query expression for processing in conjunction with executing the query.

In various examples, the IO portion of the query is performed via a parallelized plurality of nodes that identify the plurality of rows in parallel based on each of the plurality of nodes accessing a corresponding subset of pages in the subset of the plurality of pages in parallel with other ones of the plurality of nodes accessing other corresponding subsets of pages in the subset of the plurality of pages.

In various examples, the corresponding set of rows are read from each of the set of pages in conjunction with performing a page conversion process upon the set of pages to generate a plurality of segments that include the set of rows in a columnar-based format for long term storage.

In various examples, the page conversion process is performed via a parallelized plurality of segment generator modules that generate the plurality of segments in parallel based on each of the plurality of parallelized segment generation modules generating a corresponding subset of the plurality of segments in parallel with other ones of the plurality of parallelized segment generation modules generating other corresponding subsets of the plurality of segments.

In various examples, the method further includes: receiving a second plurality of rows for storage; and/or generating a second plurality of pages from the plurality of rows. In various examples, each page of the second plurality of pages is generated to include a corresponding set of rows of the plurality of rows in accordance with a column-formatted structuring different from the row-formatted structuring. In various examples, the at least one row is read in conjunction with performing a database operation that involves accessing rows of the plurality of rows and the second plurality of rows. In various examples, the method further includes reading at least one row from each of a subset of the second plurality of pages based on applying a columnar-formatted structuring-based read process.

In various examples, the method further includes: applying deduplication in reading the at least one row of the corresponding set of rows from each of a subset of the plurality of pages to guarantee each of the plurality of rows is not read more than once in performing the database operation; and/or applying deduplication in reading the at least one row from each of a subset of the second plurality of pages based on applying a columnar-formatted structuring-based read process to guarantee each of the second plurality of rows is not read more than once in performing the database operation.

In various embodiments, any one of more of the various examples listed above are implemented in conjunction with performing some or all steps of FIG. 26G. In various embodiments, any set of the various examples listed above can be implemented in tandem, for example, in conjunction with performing some or all steps of FIG. 26G, and/or in conjunction with performing some or all steps of any other method described herein.

In various embodiments, at least one memory device, memory section, and/or memory resource (e.g., a non-transitory computer readable storage medium) can store operational instructions that, when executed by one or more processing modules of one or more computing devices of a database system, cause the one or more computing devices to perform any or all of the method steps of FIG. 26G described above, for example, in conjunction with further implementing any one or more of the various examples described above.

In various embodiments, a database system includes at least one processor and at least one memory that stores operational instructions. In various embodiments, the operational instructions, when executed by the at least one processor, cause the database system to perform some or all steps of FIG. 26G, for example, in conjunction with further implementing any one or more of the various examples described above.

In various embodiments, the operational instructions, when executed by the at least one processor, cause the database system to: receive a plurality of rows for storage and generate a plurality of pages from the plurality of rows, where each page of the plurality of pages is generated to include a corresponding set of rows of the plurality of rows in accordance with a compressed row-formatted structuring based on: generating a variable length section of the each page that includes, for each row of the corresponding set of rows, a set of variable length values of a set of variable length columns of the corresponding set of rows; generating a fixed length section of the each page that includes, for the each row of the corresponding set of rows, a set of fixed length values of a set of fixed length columns of the corresponding set of rows and a set of offset values for the set of variable length columns each indicating a location of a corresponding variable length value of the each row in the variable length section; generating a plurality of compression frames of the each page based on compressing the fixed length section and the variable length section; and/or generating at least one skip list of the each page mapping each of the corresponding set of rows to a corresponding one of the plurality of compression frames. In various embodiments, the operational instructions, when executed by the at least one processor, further cause the database system to: read at least one row of the corresponding set of rows from each of a subset of the plurality of pages based on: accessing the at least one skip list of the each of a subset of the plurality of pages to identify at least one compression frame corresponding to the at least one row; and/or decompressing the at least one compression frame to access the at least one row.

FIGS. 27A-27E illustrate embodiments of a database system 10 that implements some or all pages 2515 described herein as compressed column-formatted pages having a plurality of compressed column sections. The embodiments illustrated in 27A-27E can be utilized to implement one or more nodes 37 of one or more computing devices 18 implementing database system 10. Some or all features and/or functionality of FIGS. 27A-27E can be utilized to implement any embodiment of database system 10 described herein.

In some embodiments of database system 10, some or all pages 2515 are formatted in a columnar, compressed format sorted by cluster key (CK). For example, some or all pages have this formatting instead of row-wise formatting, such as the formatting of FIGS. 26A-26F and/or other row-based formatting of pages discussed herein. In some embodiments, this compressed format does not contain a cluster key index page section, but still provides an interface that allows scanning page data from arbitrary subintervals of the cluster key keyspace or row list as efficiently as possible. For example, the page reader module 2770 is configured to read rows from pages in this compressed column-based format.

In some embodiments, generating pages 2511 under the compressed column-based format includes rotating the page data from a row-wise layout to individually-compressed column streams. For example, as pages are still mutable pages being built, the row-wise layout is used, where incoming data gets appended one row at a time. Once the page is complete, the columnar rotation occurs (e.g. as part of finalizing the page), for example, by generating a new page under the compressed columnar formatting from the completed row-formatted page. This columnar format can be useful in enabling decompressing of only the columns needed at query time, and/or unifying the decompression implementation for pages and segments 2424 (e.g. where segments have their columns compressed in a same or similar manner as the pages 2515 under this formatting).

In some embodiments, frames need not be aligned across columns, and each column thus has its own skip list(s) mapping both cluster key values and row numbers to the compression frame where the relevant data lives for the respective column.

In some embodiments, each column stream is sorted by cluster key, enabling foregoing of use of the cluster key index page section. The ordering by cluster key can enable corresponding iterating over the page in cluster order, mapping to the natural row number within the page (e.g.

In making a page durable (e.g. via mutablePage_t::finalize( )), each column stream of the given page can be compressed, for example, via zstd compression or another type of compression. The resulting compressed column streams can be included in pages instead of compressed or uncompressed fixed-length or variable length sections of FIGS. 26A-26F and/or as otherwise described herein. In some embodiments, since the compressed size of each column stream is not known in advance, the columns are compressed sequentially into the durable page, for example, once the underlying rows are sorted by cluster key.

In some embodiments, such rotation, sorting, and/or compression can be performed to generate a compressed column-formatted page with compressed columns sorted by cluster key from a completed row-formatted page (e.g. mutablePage_t) based on: (1) allocating enough memory (e.g. scratch memory) to hold a copy of the raw data for each column present in the page; (2) iterating over each row in the completed row-formatted page in cluster key order (e.g. mutablePage_t), for example, via accessing its cluster key index page section (e.g. via a pageIndexRowReader_t), (3) copying the current row's data into the allocated memory (e.g. allocated scratch memory) for that column to created uncompressed sorted columns, and/or (4) iterate over each of these uncompressed sorted columns in the memory to compressing the data in the memory into the durable page.

In some embodiments, if the mutable page is freed completing this copy+rotation, and if the scratch memory for each column after it has been compressed is freed, this approach uses at most size of mutablePage_t+size of raw page data amount of memory (e.g. without additional memory required for cluster key index or variable length offsets) in the worst case (e.g. when no compression is applied).

FIGS. 27A-27E illustrate example embodiments of such functionality of generating and reading from pages having individually compressed columns.

Figure 27A:
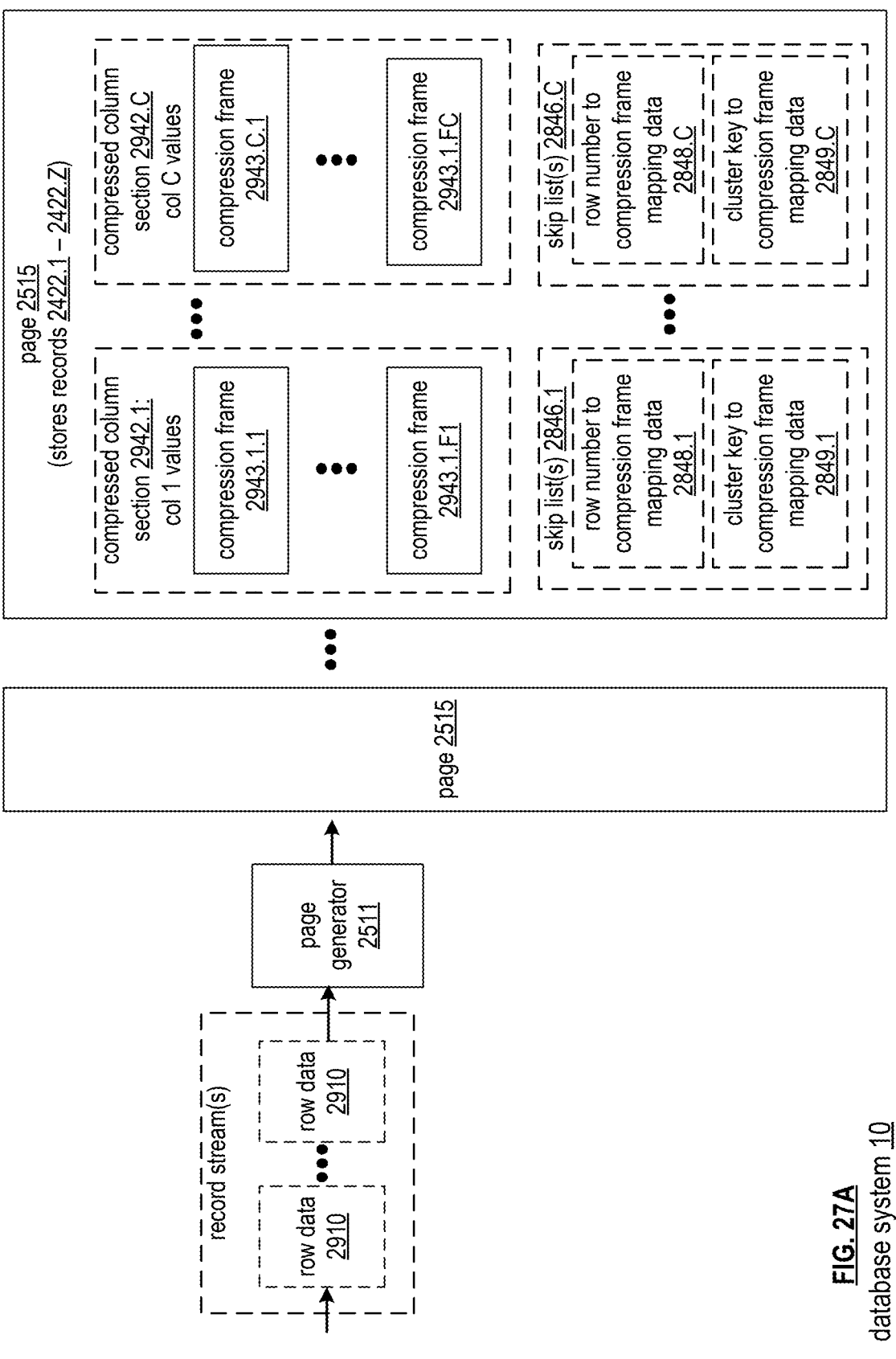
FIG. 27A is a schematic block diagram of a page generator that generates a plurality of pages each having a plurality of compressed column sections in accordance with various embodiments.

FIG. 27A illustrates an embodiment of a page generator 2511 that processes one or more record streams of row data 2910 to generate a plurality of pages 2515 that each store a respective plurality of records 2422.1-242.Z (e.g. distinct from records in other pages; different pages can store same or different numbers of records) via: a plurality of compressed column sections 2942.1-2942.C (e.g. each storing values for a corresponding column of a set of C columns 1-C) that each include a corresponding plurality of compression frames 2943.1-2943.F (e.g. different column sections can have same or different numbers F of compression frames); and/or a plurality of skip list sections 2846.1-2846.C that each include one or more skip lists 2846 that includes cluster key to compression frame mapping data and/or row number to compression frame mapping data (e.g. each in their own skip lists, or both in the same skip list) for a respective compressed column section 2942. Some or all features and/or functionality of FIG. 27A can be utilized to implement any embodiment of page 2515 described herein and/or of database system 10 described herein.

Figure 27B:
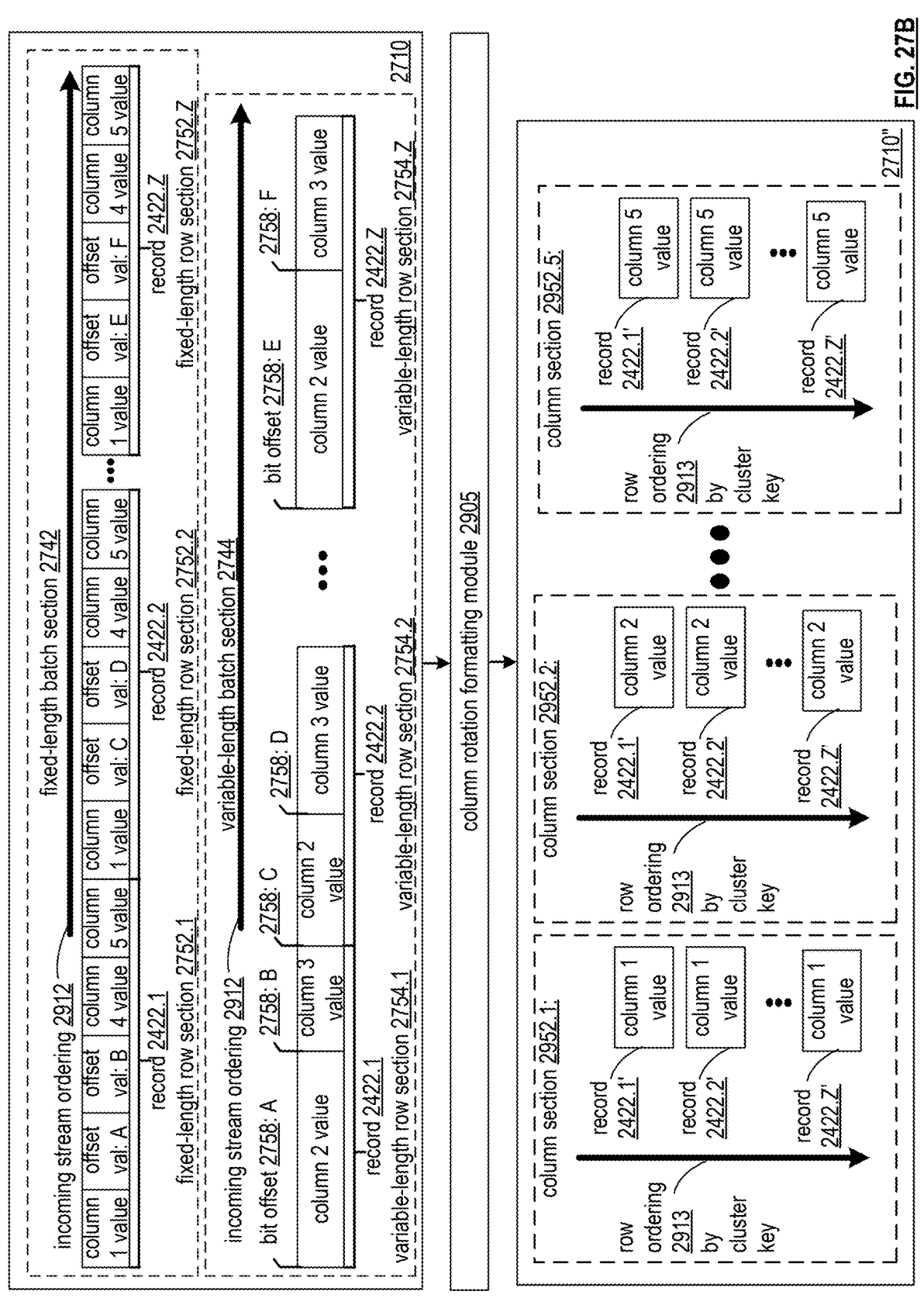
FIG. 27B is a schematic block diagram of a column rotation formatting module in accordance with various embodiments.
Figure 27C:
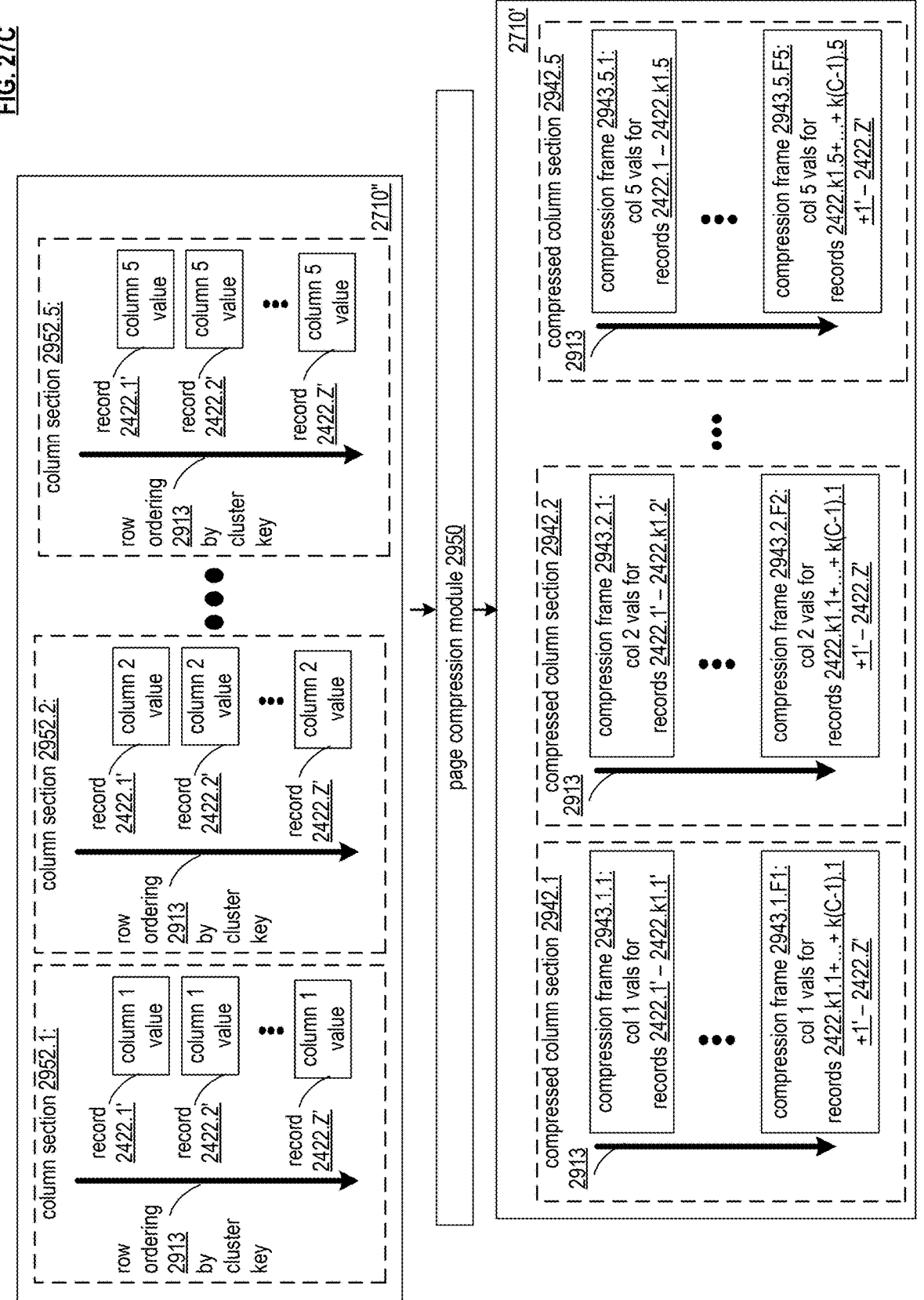
FIG. 27C is a schematic block diagram of a page compression module in accordance with various embodiments.

FIGS. 27B and 27C illustrate an example of a page generator 2511 that implements a column rotation formatting module 2905 and page compression module 2950 to generate updated formatted record data 2710' from record formatted data 2710, for example, generated via initial page building module 2805 of FIG. 26B.

As illustrated in FIG. 27B, a column rotation formatting module 2905 can generate intermediate formatted record data 2710'' that includes a plurality of column sections 2952 that each include a plurality of column values for the respective column ordered by cluster key. For example, first, the rows 2422.1-2422.Z of the page are sorted to render an ordering from 2422.1'-2422.Z' (e.g. where row 2422.1' is optionally different from row 2422.1 based on row 2422.1' being first in the ordering 2913 but not in the ordering 2912, where row 2422.1' is some other row 2422.x of the ordering 2912, denoted as 2422.1' to indicate it is ordered first in the ordering 2913). For example, record 2422.1' is ordered first by cluster key and has a corresponding column value included in each respective column section first, where record 2422.2' is ordered second and has a corresponding column value included in each respective column section second, etc. This can include writing the intermediate formatted record data 2710'' to scratch memory allocated for this operation.

As illustrated in FIG. 27C, a page compression module 2950 can generate updated formatted record data 2710' from the intermediate formatted record data 2710'' (e.g. generated via column rotation formatting module 2905 of FIG. 27B). that includes a plurality of compressed column sections 2942 that are each compressed from a respective column section 2952 (e.g. each column is compressed separately) to include the sorted column values of the respective column section 2952 in a plurality of compression frames 2943.1-2943.F, where F is the same or different for different compressed column sections 2943. Each compression frame can each include a set of k fixed-length row sections, where k is the same or different for different compression frames 2843, and where k is optionally not aligned across compression frames (e.g. records having column 1 values included in jth compression frame 2943.1.j for compressed column section 2942.11 are different from records having column 2 values included in jth compression frame 2943.2.j for compressed column section 2942.2 1. The records having their column values within a compression frame 2943 can be ordered in a row ordering 2913 by cluster key, where the row sections compression frames 2943 themselves are also ordered in the row ordering 2913 by cluster key.

Figure 27D:
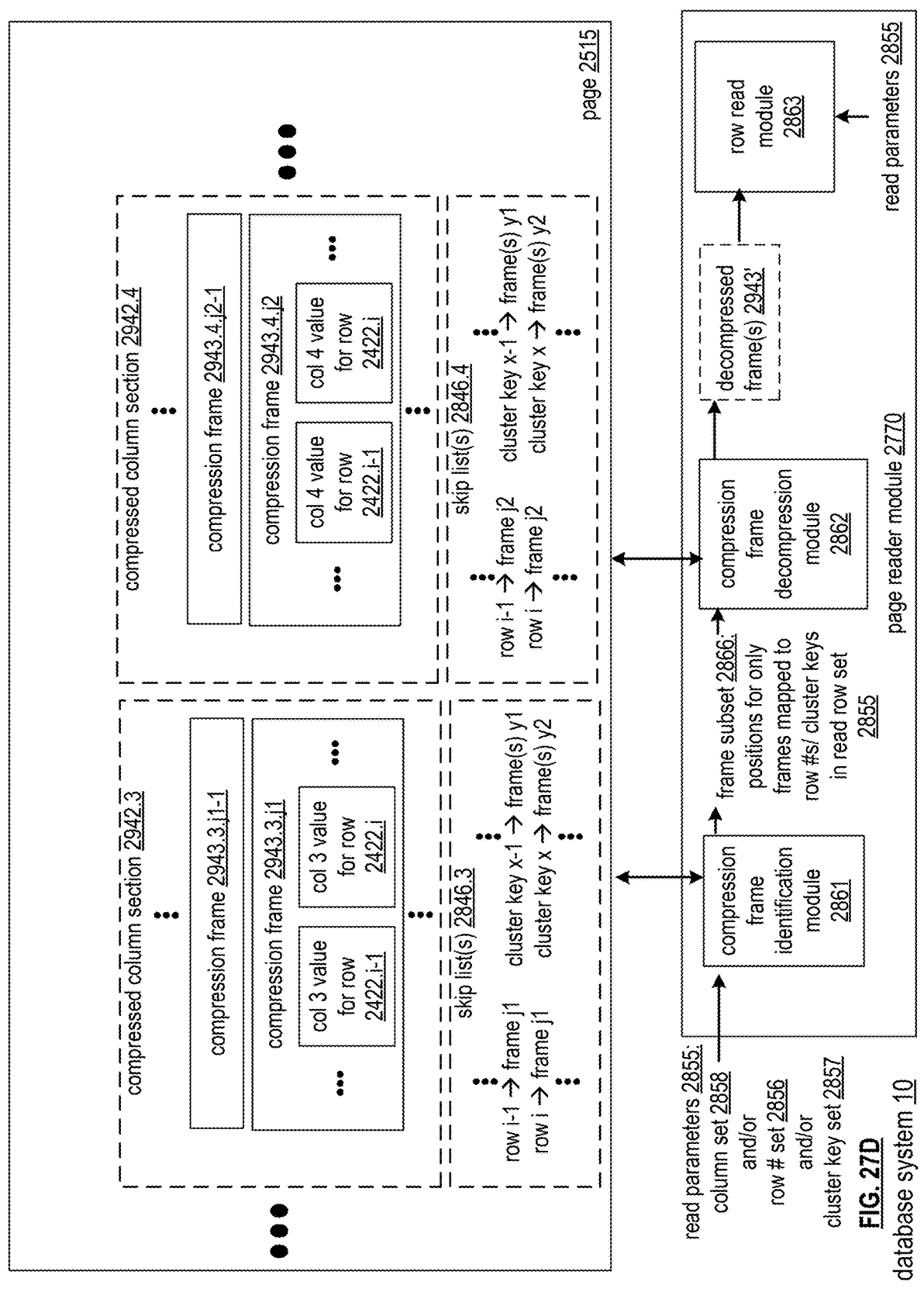
FIGS. 27D and 27E are schematic block diagrams of a page reader module that implements a compression frame identification module, a compression frame decompression module, and/or a row read module in accordance with various embodiments.

FIG. 27D illustrates an embodiment of database system 10 implementing a page reader module 2770 that reads rows from a page 2515 in accordance with read parameters 2855, for example, as part of executing a query or generating segments from rows of the given page.

Read parameters 2855 can indicate a column set 2858 (e.g. some or all columns 1-C to be sourced), a row number set 2856 (e.g. some or all rows, such as only rows to have column values sourced as indicated by a row list emitted by an IO pipeline element that filtered on one or more other columns), and/or a cluster key set 2857 (e.g. some or all possible cluster key values, for example where each cluster key value is defined as a corresponding sets of column values for a set of one or more columns corresponding to cluster key for the given dataset/table/schema) to be read. Only pairs of compression frames 2843 and 2845 having row numbers/cluster keys included in the respective sets indicated by read parameters 2855 need be included (e.g. a query filtering by columns(s) implemented as the cluster key renders only compression frames that include cluster key values specified by the corresponding filtering parameters be decompressed).

Such frames to be decompressed can be indicated in a frame subset 2866 identified by compression frame identification module 2861 via accessing the one or more skip lists 2846 to identify frame positions for only the columns/row #s/cluster key values indicated in read parameters 2855. In cases where all rows are to be read for a given column, the frame subset 2866 can indicate all frames of the given compressed column section be decompressed.

A given frame position mapped to a particular row number or cluster key for a given compressed column section can indicate the position of a corresponding compression frame in the respective ordering in the compressed column section. The mapping of cluster key values to frame positions can indicate multiple frames for a given cluster key in the case where the rows having the given cluster key spans multiple consecutive frames.

A given row's frame position across multiple different compressed column sections can be different based on the compression frames not being aligned across columns (e.g. due to different columns having different data sizes). In other embodiments, some or all of the compressed column sections can be aligned, where only one skip list is required, where a given row is in the same frame position across some or all compressed column sections.

In this example, a given row 2422.i has its column 3 value in compression in the j1th compression frame 2943.3.j1 of the compressed column section 2942.3 and its column 4 value in the j2th compression frame 2943.4.j2 of the compression column section 2942.4, where these mappings are reflected skip list 2846.3 and 2846.4, respectively. The row number can correspond to the number of the row prior to ordering (e.g. its position/offset in the original formatted record data 2710 in accordance with ordering 2912).

The frames identified in compression frame identification module 2861 can be decompressed via compression frame decompression module 2862 (e.g. in accordance with the corresponding compression algorithm such as the zstd algorithm) to render decompressed frames 2843' and 2845 for each identified frame position in frame subset 2866. The decompressed frames are read by row read module 2863 for further processing (e.g. grouping/formatting into segments, or filtering/manipulating in query execution).

In some embodiments, frames are optionally processed one at a time (e.g. one compression frame of a given column is processed at a time), where a given frame 2943 having a position indicated in frame subset 2866 is decompressed into memory (e.g. a page cache or other memory) for reading by row read module 2863, and once reading of this decompressed frame is completed, a next frame 2943 having a position indicated in frame subset 2866 is decompressed into memory (e.g. some or all memory freed by the prior frame to overwrite the previously processed frame) for reading by row read module 2863. In some embodiments, one column is processed at a time, where a first column to be sourced has its respective identified frames decompressed one at a time, and then after processing all identified frames of the first column, a next column to be sourced then has its respective identified frames decompressed one at a time, and so on. In some embodiments, different columns are accessed in parallel. In some embodiments, different columns are each separately sourced in this fashion in accordance with applying a corresponding source element of an IO pipeline indicating a corresponding column to be read, where different columns are sourced once their respective source elements are applied in accordance with their placement in the IO pipeline.

Figure 27E:
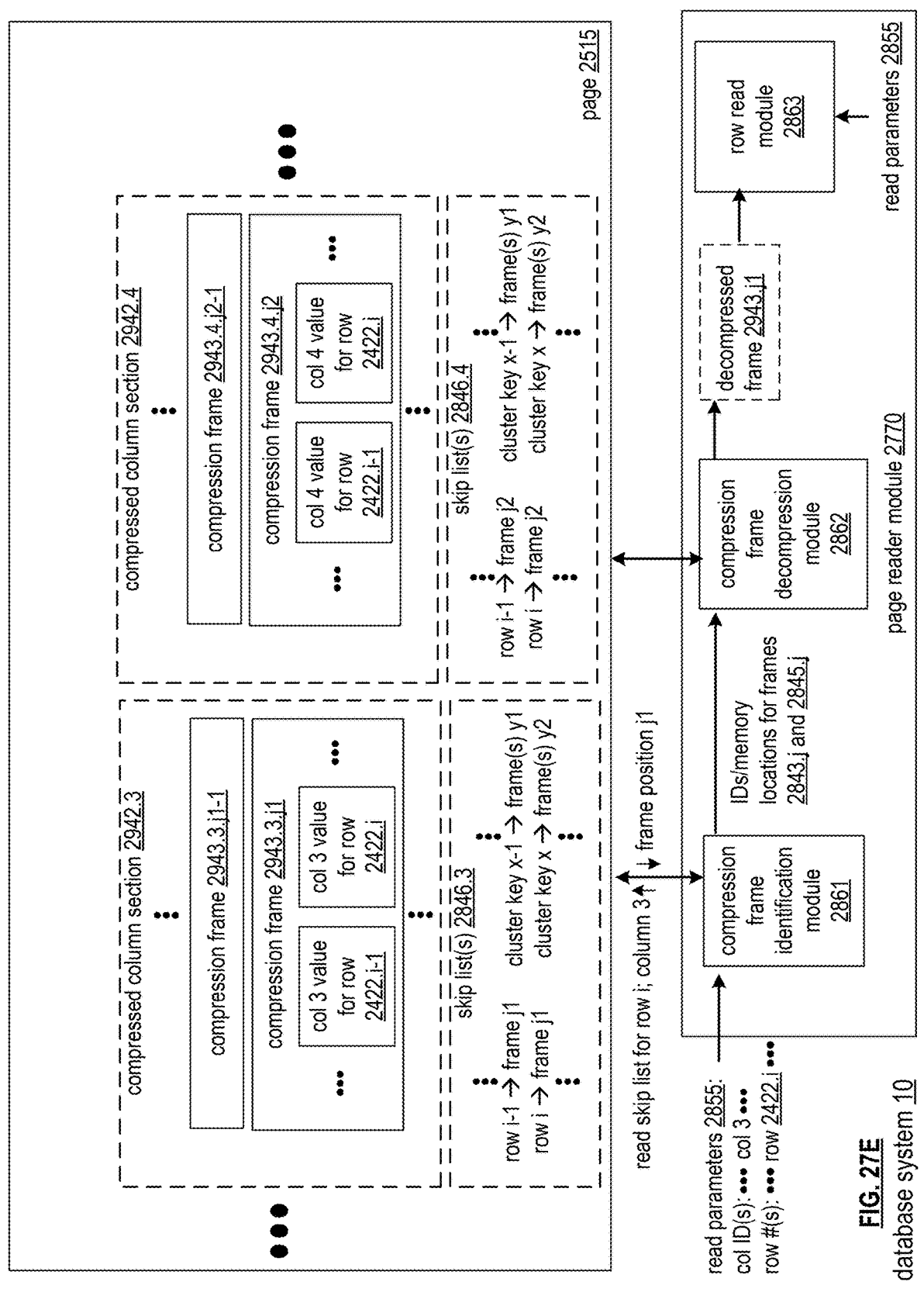

FIG. 27E illustrates a particular example of applying page reader module 2770 when read parameters 2855 indicate a set of row numbers that includes row 2422.*i* and indicates a set of columns that includes column 3. Compression frame identification module 2861 accesses skip list 2846.3 to determine the column 3 value for row i is included in the compression frame of compressed column stream 2942.3 for column 3 having frame position j1, and indicates frame position j1 in its frame subset 2866 for column 3. Compression frame decompression module 2862 compresses frame 2943.*j*1 accordingly for processing via row read module 2863.

FIG. 27F illustrates a method for execution by at least one processing module of a database system 10. For example, the database system 10 can utilize at least one processing module of one or more nodes 37 of one or more computing devices 18, where the one or more nodes execute operational instructions stored in memory accessible by the one or more nodes, and where the execution of the operational instructions causes the one or more nodes 37 to execute, independently or in conjunction, the steps of FIG. 27F, for example, based on participating in execution of a query being executed by the database system 10 and/or based on participating in execution of a loading process being executed by the database system 10. Some or all of the method of FIG. 27F can be performed by nodes executing a loading operation as a plurality of loading modules and/or can be performed by nodes executing a query, for example, via one or more nodes 37 implemented as nodes of a query execution module 2504 implementing a query execution plan 2405. In some embodiments, a node 37 can implement some or all of FIG. 27F based on implementing a corresponding plurality of processing core resources 48.1-48.W. Some or all of the steps of FIG. 27F can optionally be performed by any other one or more processing modules of the database system 10.

Some or all steps of FIG. 27F can be performed in parallel and/or concurrently via a plurality of parallelized processing resources (e.g. implemented via a plurality of nodes 37 and/or a plurality of processing core resources 48). For example, multiple instances of any given step of FIG. 27F can be performed in parallel and/or concurrently via a plurality of parallelized processing resources, where each parallelized processing resource of the plurality of parallelized processing resources performs the given step in parallel with and/or concurrently with other ones of the plurality of parallelized processing resources also performing the given step. As another example, any given step of FIG. 27F can be performed based on a plurality of parallelized processing resources performing assigned portions of the given step in parallel and/or concurrently, where each parallelized processing resource of the plurality of parallelized processing resources performs their assigned portion of the step in parallel with and/or concurrently with other ones of the plurality of parallelized processing resources also performing their own assigned portions of the given step.

Some or all of the steps of FIG. 27F can be performed to implement some or all of the functionality of the database system 10 as described in conjunction with FIGS. 27A-27E, for example, by implementing some or all of the functionality of query execution module 2504, segment generator module 2617, page generator module 2511, and/or page reader module 2770. Some or all steps of FIG. 27F can be performed by database system 10 in accordance with other embodiments of the database system 10 and/or nodes 37 discussed herein. Some or all of the steps of FIG. 27F can be performed in conjunction with performing some or all steps of any other method described herein.

Step 2782 includes receiving a plurality of rows for storage. Step 2784 includes generating a plurality of pages from the plurality of rows. In various examples, each page of the plurality of pages is generated to include a corresponding set of rows of the plurality of rows in accordance with a compressed columnar-formatted structuring. Step 2786 includes reading a subset of the plurality of columns of the corresponding set of rows from each of a subset of the plurality of pages based on decompressing the corresponding subset of compression frames corresponding to each of the subset of the plurality of columns.

Performing step 2784 can include performing step 2788 and/or step 2790. Step 2788 includes generating a plurality of columns from the corresponding set of rows. In various examples, each column of the plurality of columns is generated to include column values of the corresponding set of rows sorted by cluster key of the corresponding set of rows. Step 2790 includes generating a plurality of compression frames of the each page based on compressing each column of the plurality of columns individually to generate a corresponding set of compression frames of the plurality of compression frames corresponding to the each column.

In various examples, the each page of the plurality of pages is generated further based on generating a plurality of skip lists for the plurality of columns based on generating, for the each column of the plurality of columns, at least one corresponding skip list of the plurality of skip lists mapping each of the corresponding set of rows to a corresponding one of the corresponding set of compression frames corresponding to the each column. In various examples, a subset of the corresponding set of rows are read from each of the subset of the plurality of columns based on accessing the at least one skip list corresponding to the each column to identify a subset of compression frames of the corresponding set of compression frames corresponding to the each of the subset of the plurality of columns corresponding to the subset of the corresponding set of rows.

In various examples, the at least one corresponding skip list for the each column includes: a mapping from cluster key value to compression frame of the corresponding set of compression frames of the each column; and/or a mapping from row number to compression frame of the corresponding set of compression frames of the each column.

In various examples, the method further includes generating an initial page for the each page in accordance with row-formatted structuring based on: generating a variable length section of the each page that includes, for each row of the corresponding set of rows, a set of variable length values of a set of variable length columns of the corresponding set of rows; and/or generating a fixed length section of the each page that includes, for the each row of the corresponding set of rows, a set of fixed length values of a set of fixed length columns of the corresponding set of rows and a set of offset values for the set of variable length columns each indicating a location of a corresponding variable length value of the each row in the variable length section. In various examples, generating the each page is based on iterating over the fixed length section and the variable length section of the initial page to generate the plurality of compressed column streams from the corresponding set of rows.

In various examples, generating the initial page for the each page is based on appending each of a set of incoming rows to an end of the fixed length section and an end of the variable length section one at a time as the each of the set of incoming rows is received, until the fixed length section and the variable length section are completed. In various examples, the each page is generated after the fixed length section and the variable length section of the initial page are completed.

In various examples, iterating over the fixed length section and the variable length section of the initial page to generate the plurality of compressed column streams from the corresponding set of rows is based on: iterating over the corresponding set of rows in order by cluster key to populate a plurality of uncompressed columns to contain column values for the corresponding set of rows sorted by cluster key in accordance with the columnar-formatted structuring; and/or compressing each uncompressed column of the plurality of columns based on iterating over the each uncompressed column to generate a corresponding column of the plurality of columns in accordance with the compressed columnar-formatted structuring.

In various examples, generating the plurality of compressed column streams from the corresponding set of rows is further based on allocating memory having a total capacity corresponding to a total amount of raw data included in the initial page for the plurality of uncompressed columns. In various examples, iterating over the corresponding set of rows in order by cluster key to populate the plurality of uncompressed columns includes, for each row in the corresponding set of rows in iterating over the corresponding set of rows, copying the corresponding column value of the each row into the allocated memory. In various examples, iterating over the each uncompressed column to generate a corresponding column of the plurality of columns includes compressing the each uncompressed column into the each page.

In various examples, the plurality of columns are written to the each page one at a time based on compressing the plurality of uncompressed columns one at a time.

In various examples, the memory corresponds to scratch memory.

In various examples, the cluster key for the corresponding set of rows corresponds to a corresponding column (or set of columns) of the corresponding set of rows. In various examples, an ordering of the plurality of rows by cluster key corresponds to an ordering of the plurality of rows by value of the corresponding column (or set of columns).

In the plurality of compression frames are generated based on applying Zstandard compression.

In various examples, generating the plurality of pages includes implementing a plurality of parallelized loading modules to generate the plurality of pages in parallel based on each of the plurality of parallelized loading modules generating a corresponding subset of the plurality of pages in parallel with other ones of the plurality of parallelized loading modules generating other corresponding subsets of the plurality of pages.

In various examples, only the subset of the plurality of columns is read from each of the subset of the plurality of pages in conjunction with executing an IO portion of a query to identify ones of the plurality of rows meeting filtering predicates involving the subset of the plurality of columns of a corresponding query expression for processing in conjunction with executing the query.

In various examples, the IO portion of the query is performed via a parallelized plurality of nodes that identify the plurality of rows in parallel based on each of the plurality of nodes accessing a corresponding subset of pages in the subset of the plurality of pages in parallel with other ones of the plurality of nodes accessing other corresponding subsets of pages in the subset of the plurality of pages.

In various examples, the subset of the plurality of columns includes all of the plurality of columns. In various examples, all of the plurality of columns are read from each of the set of pages in conjunction with performing a page conversion process upon the set of pages to generate a plurality of segments that include the set of rows in a column-based format for long term storage.

In various examples, the page conversion process is performed via a parallelized plurality of segment generator modules that generate the plurality of segments in parallel based on each of the plurality of parallelized segment generation modules generating a corresponding subset of the plurality of segments in parallel with other ones of the plurality of parallelized segment generation modules generating other corresponding subsets of the plurality of segments.

In various examples, the method further includes: receiving a second plurality of rows for storage; and/or generating a second plurality of pages from the plurality of rows. In various examples, each page of the second plurality of pages is generated to include a corresponding set of rows of the plurality of rows in accordance with a column-formatted structuring different from the compressed column-formatted structuring. In various examples, the subset of the plurality of columns are read in conjunction with performing a database operation that involves accessing rows of the plurality of rows and the second plurality of rows. In various examples, the method further includes reading the subset of the plurality of columns from each of a subset of the second plurality of pages based on applying a columnar-formatted structuring-based read process.

In various examples, the method further includes applying deduplication in reading the subset of the plurality of columns of the corresponding set of rows from each of a subset of the plurality of pages to guarantee each of the plurality of rows is not read more than once in performing the database operation. In various examples, the method further includes applying deduplication in reading the subset of the plurality of columns from each of a subset of the second plurality of pages based on applying a columnar-formatted structuring-based read process to guarantee each of the second plurality of rows is not read more than once in performing the database operation.

In various embodiments, any one of more of the various examples listed above are implemented in conjunction with performing some or all steps of FIG. 27F. In various embodiments, any set of the various examples listed above can be implemented in tandem, for example, in conjunction with performing some or all steps of FIG. 27F, and/or in conjunction with performing some or all steps of any other method described herein.

In various embodiments, at least one memory device, memory section, and/or memory resource (e.g., a non-transitory computer readable storage medium) can store operational instructions that, when executed by one or more processing modules of one or more computing devices of a database system, cause the one or more computing devices to perform any or all of the method steps of FIG. 27F described above, for example, in conjunction with further implementing any one or more of the various examples described above.

In various embodiments, a database system includes at least one processor and at least one memory that stores operational instructions. In various embodiments, the operational instructions, when executed by the at least one processor, cause the database system to perform some or all steps of FIG. 27F, for example, in conjunction with further implementing any one or more of the various examples described above.

In various embodiments, the operational instructions, when executed by the at least one processor, cause the database system to receive a plurality of rows for storage and generate a plurality of pages from the plurality of rows, where each page of the plurality of pages is generated to include a corresponding set of rows of the plurality of rows in accordance with a compressed columnar-formatted structuring based on: generating a plurality of columns from the corresponding set of rows, wherein each column of the plurality of columns is generated to include column values of the corresponding set of rows sorted by cluster key of the corresponding set of rows; and/or generating a plurality of compression frames of the each page based on compressing each column of the plurality of columns individually to generate a corresponding set of compression frames of the plurality of compression frames corresponding to the each column. In various embodiments, the operational instructions, when executed by the at least one processor, further cause the database system to read a subset of the plurality of columns of the corresponding set of rows from each of a subset of the plurality of pages based on decompressing the corresponding subset of compression frames corresponding to each of the subset of the plurality of columns.

FIGS. 28A-28E illustrate embodiments of a database system 10 that implements some or all pages 2515 described herein as column-formatted pages implemented as "page segments" based on having a plurality of column sections in a same or similar formatting as segments 2424, for example, to enable generating of pages and/or reading of pages via same or similar processes/interfacing/functions/computer code as generating of segments and/or reading of segments. The embodiments illustrated in 28A-28E can be utilized to implement one or more nodes 37 of one or more computing devices 18 implementing database system 10. Some or all features and/or functionality of FIGS. 28A-28E can be utilized to implement any embodiment of database system 10 described herein.

In some embodiments, alternatively or in addition to embodiments of formatting pages 2515 described in FIGS. 26A-26F and/or FIGS. 27A-27E, durable pages 2515 are generated from completed mutable pages (e.g. mutableP-age_t object) via applying portions of the segment generation process (e.g. via corresponding segment generation code) utilized to generate segments, where pages 2515 are thus constructed with same or similar columnar formatting as segments 2424. This can improve the technology of database systems based using same code in multiple places (e.g. reducing possibility of coding bugs in multiple places, reducing software engineering time required to generate, debug, test, and/or improve upon the corresponding process/code, etc.) and further based on rendering better query performance when accessing pages during queries, for example, based on reducing the amount of IO needed using the some or all same approaches (e.g. and/or some or all same code code) used for accessing segments 2424 (e.g. only columns needed to service the query will need to be read, and rows needed to read from those columns can be restricted using cluster key (CK) and/or non-index filters; page query processing can be performed identically and/or substantially identically to processing segments as far as the IO layer is concerned, where only columns necessary for a given query need to be decompressed, and/or where existing pipelining optimizations for IO/decompression reduction can be applied to pages as well as segments). Furthermore, the structuring of pages 2515 can be configured to ensure page reading performance during segment generation is favorable (e.g. is not worse/substantially worse than page reading for segment generation than when applying other formats of pages 2515 described herein).

In some embodiments, each page 2515 (e.g. each "page segment") can be created from a single finalizing page (e.g. with no batching). Columns can be compressed via the same compression scheme they'll ultimately use when converted to segments (e.g. zstd compression and/or additional compression in addition to zstd compression). In some embodiments, zstd compression is applied to some or all columns. In some embodiments, leveraging block IO/pipelining to read from pages makes page compression less critical for achieving better page performance due to performance gains achieved via block IO and applying IO pipelines, where compressing columns is optionally not performed for some or all columns.

In some embodiments, some aspects of segments 2424 are not included in pages, where generation of constructs such as secondary indexes, statistics, and/or other metadata included in segments 2424 is skipped in generating page segments (e.g. where the page is otherwise formatted in the same fashion). In some embodiments, the page 2515 is generated to include secondary index structures, where secondary index generation is performed, for example, when a customer workload would benefit from it and/or it is determined to not have too high an impact on page (and/or, consequently, segment) generation.

FIGS. 28A-28E illustrate example embodiments of such functionality of generating and reading from pages having column formatted record data matching and/or having substantially similar formatting as column formatted record data stored in segments, enabling pages to be generated via applying a same or similar process as generating segments, and/or enabling pages to be read (e.g. in generating segments and/or in executing queries) via applying a same or similar process as reading rows from segments.

Figure 28A:
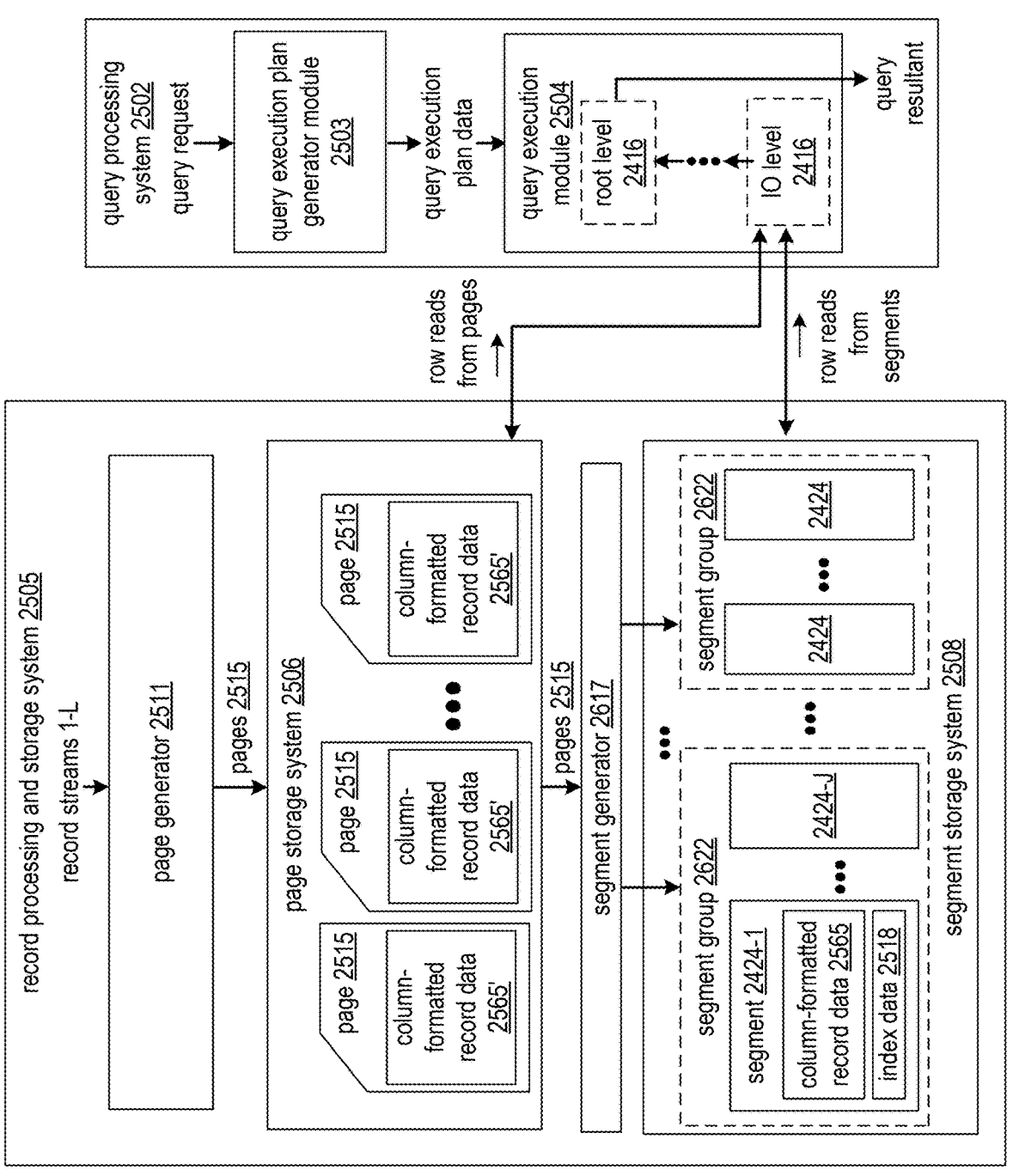
FIG. 28A is a schematic block diagram of a record processing and storage system that generates and processes pages having column-formatted record data in accordance with various embodiments.

FIG. 28A illustrates an embodiment of a record processing and storage system 2505 that implements a page generator 2511 and operable to generate pages 2515 to include respective sets of rows formatted as column-formatted record data 2655', where these pages are ultimately converted into segments via segment generator that also include column-formatted record data 2565 (e.g. with different sets/numbers of segments, as reading and grouping rows across multiple pages in a conversion page set by cluster key can still be applied in generating segments as discussed herein). Query execution module 2504 can execute queries against durable pages not yet converted into segments and segments as discussed herein, for example, via applying some or all functionality of segment read module 2771 in implementing page read module 2770.

Some or all features and/or functionality of FIG. 28A can implement the some or all features and/or functionality of FIG. 25A and/or any embodiment of record processing and storage system 2505 described herein. Some or all features and/or functionality of column formatted record data 2565' can implement some or all features of updated formatted record data 2710' and/or intermediate formatted record data 2710", for example, where column formatted record data 2565' includes a plurality of column sections that are compressed or uncompressed.

Figure 28B:
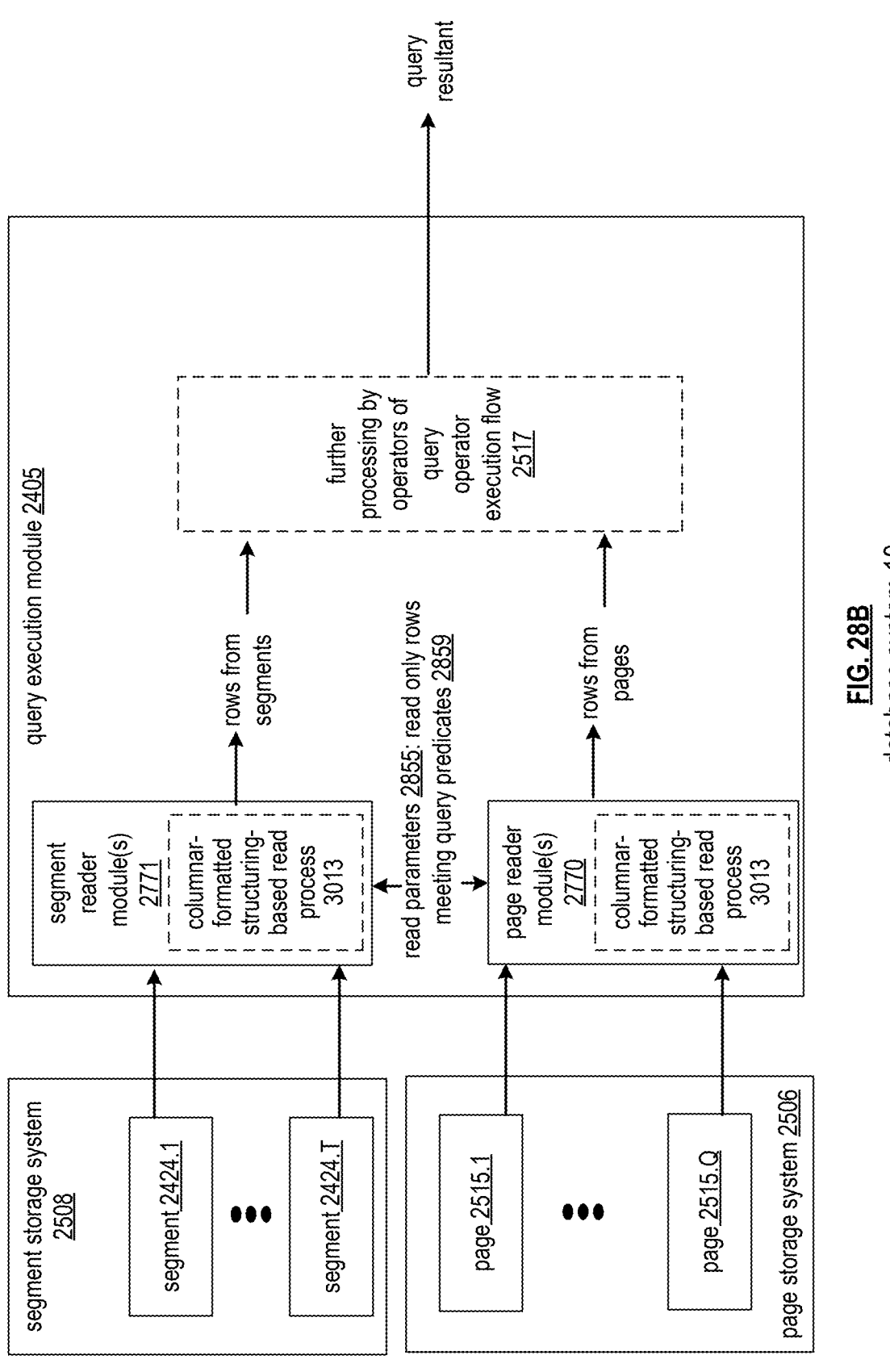
FIG. 28B is a schematic block diagram of a query execution module that implements a columnar-formatted structuring-based read process via at least one segment reader module and at least one page reader module in accordance with various embodiments.

FIG. 28B illustrates an embodiment of query execution module that implements segment reader module 2771 and page reader module 2770 to read rows from segments and pages, respectively, based on applying a same columnar-formatted structuring-based read process 3013 operable to read rows from column formatted record data 2565 (and/or column formatted record data 2565', for example, in the case where minor differences exist). Some or all features and/or functionality of query execution module 2405 of FIG. 28B can implement query execution module 2405 of FIG. 25F.

Figure 28C:
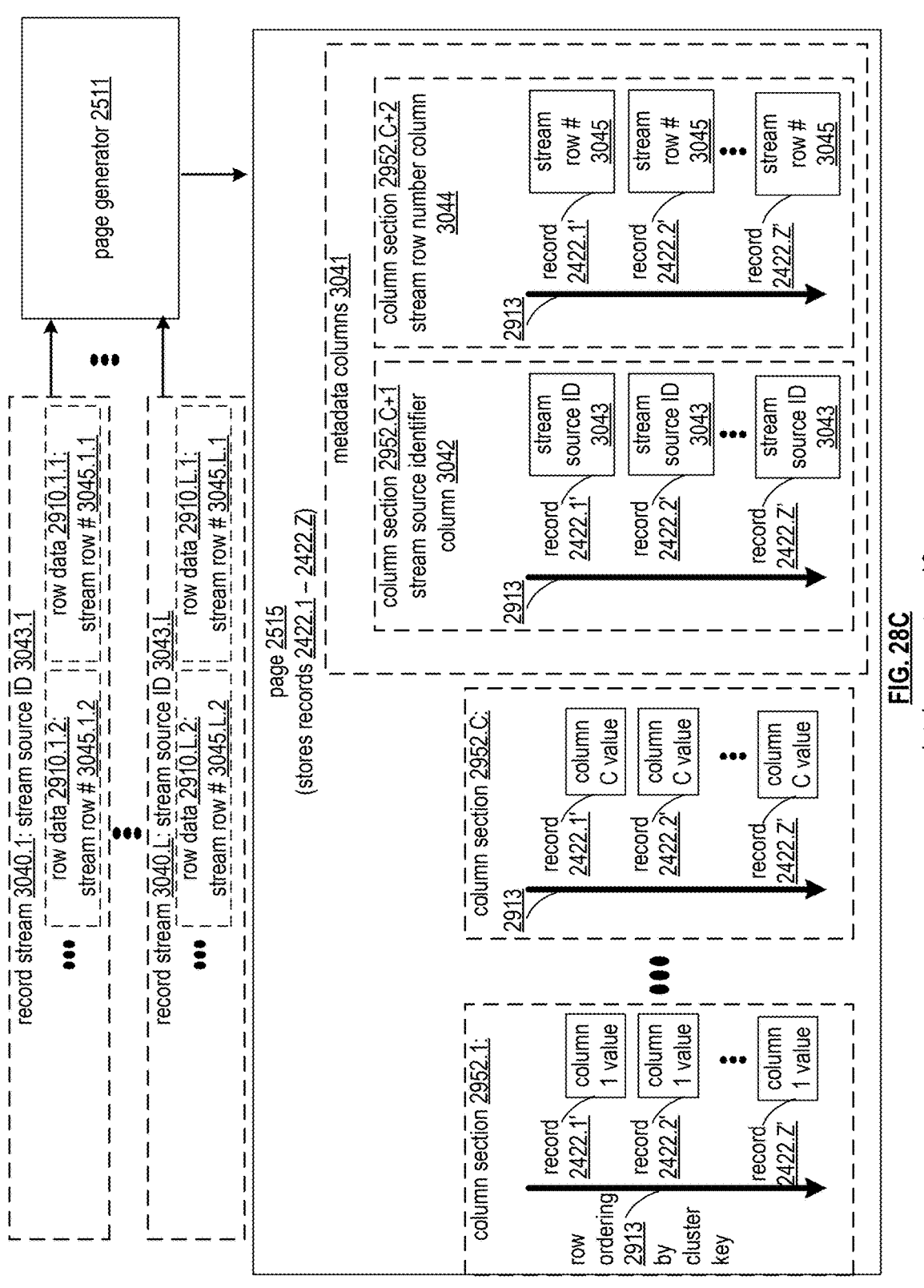
FIG. 28C is a schematic block diagram of a page generator that generates a page that includes a plurality of metadata columns in accordance with various embodiments.
Figure 28D:
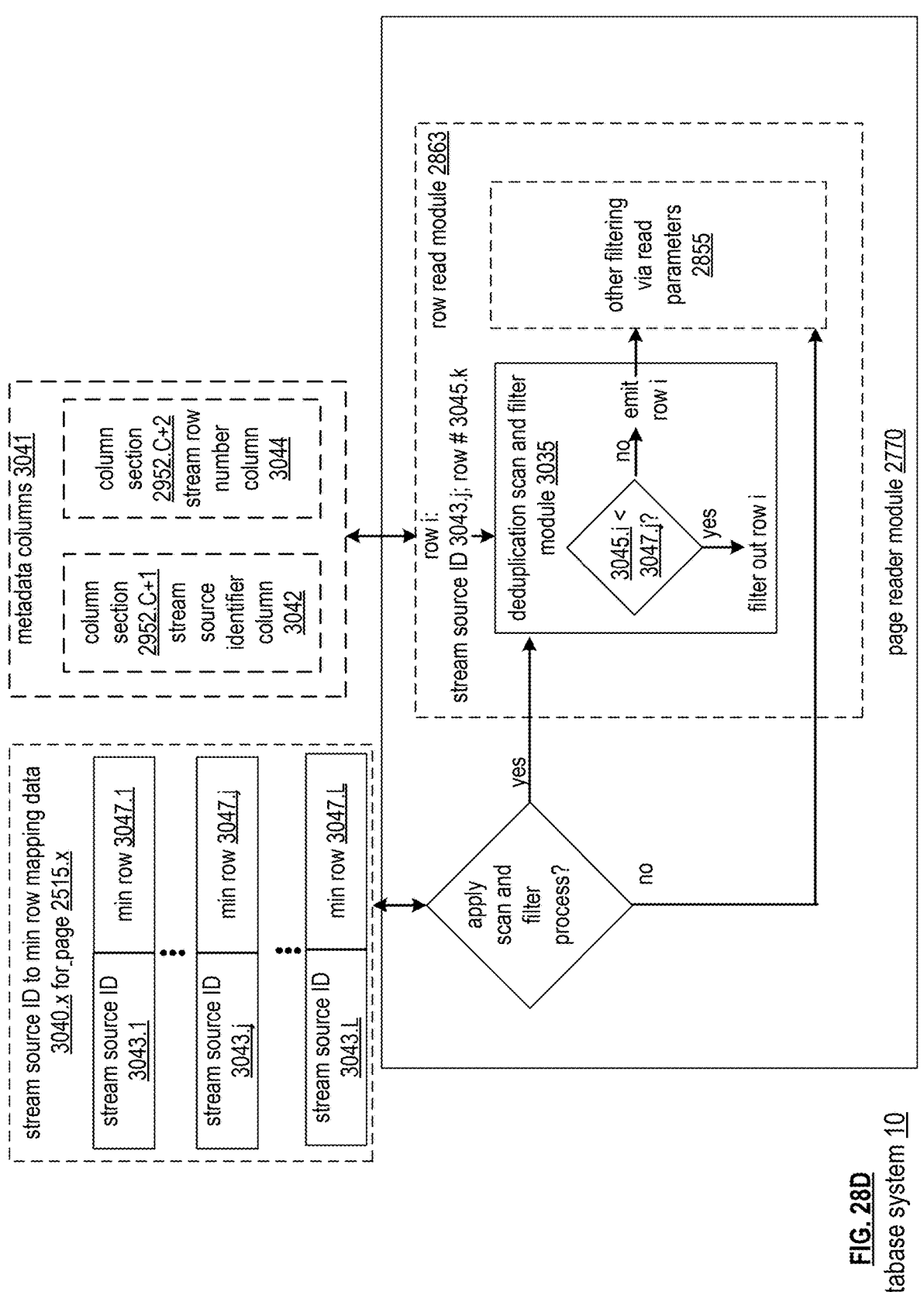
FIG. 28D is a schematic block diagram of a page reader module that implements a deduplication scan and filter module.

FIGS. 28C and 28D present embodiments of database system 10 where pages 2515, for example, storing respective rows as column formatted record data 2565', are operable to ensure deduplication occurs such that duplicate rows do not appear in reads across multiple pages during query execution or segment generation.

In some embodiments, duplicate rows present in durable pages (e.g. due to source outages) need to be handled to ensure duplicates are removed during reads to ensure correct results. In mutable pages and/or other embodiments of page 2515, the fixed length data for every row can be prefixed by the stream source ID and stream row number (e.g. as opposed to page-local row number). In embodiments where such page formatting is applied to durable pages, in both the IO layer of query execution and segment generation, the page reader module 2770 can consult a minimum row offsets mapping from stream source (128 bit repackaged stream id) to minimum row offset (the minimum row to consider valid/non-duplicate for this page) to identify rows to be ignored in reading the page due to being duplicated elsewhere.

Such functionality can be maintained in embodiments where page 2515 is not row-formatted with a fixed-length section having prefixed the stream source ID and stream row number for each row to ensure that rows are similarly deduplicated correctly. As the stream source ID and stream row number cannot be prefixed to fixed-length row sections 2752 for rows in columnar format, this information can be mapped to rows via their own columns stored in the pages 2515. For example, these columns will not be included in the table schema itself and can instead be stored as metadata columns (e.g. they can be included in xg::md::columnMeta-dataBody of other metadata structuring utilized for metadata building and deserialization). These columns can be placed after the schema-defined columns (e.g. with ordinals tracked, for example, in a same or similar fashion as tracking time columns and/or cluster key columns), and/or new columns with new column ordinals (e.g. in std:: numeric_limits<xg::tkt::columnOrdinal_t>::max( )−1), for example, where these new columns are skipped over when present when generating fake ordinals for extends columns when executing extend operations. In some embodiments, a function to get all columns (e.g. m_columnMetadata→g-etAllColumns( )) can be utilized by page reader module 2770 (e.g. via pageRowReader_t) applied to read a mutable page in generating the durable page, where, when the stream id/row number already exist as a prefix to the fixed-length section, these ordinals are not included in a set of column ordinals for the page (e.g. in columnMetadataBody::colum-n_ordinals) and/or are skipped when adding these faux-columns to the metadata for durable pages.

For generating durable pages, the stream source ID and/or stream row number can be extracted from each row (e.g. via a tryGetStreamSourceId( ) and/or tryGetStreamRowNum-ber( )), for example, when using a page index structure (e.g. via the existing pageIndexRowReader_t) in the mutable page before conversion to the durable page. In constructing the page in columnar format, these respective values can be extracted and passed through to a column span builder. In some embodiments, emission info that points to the correct offset for stream source ID and/or stream row number is added, where these values are accessed (e.g. through a tryGetValue( ) function), for example, in a same or similar fashion as other column values are retrieved to build other respective columns.

FIG. 28C illustrates an example embodiment of implementing such functionality. Page generator 2511 can generate a page 2515 that includes column sections 2952.1-2952.C (e.g. that are either compressed as compressed column sections that include compression frames, or remain uncompressed). The page generator 2511 can further generate page 2515 to include two additional columns as metadata columns 3041: a column sections 2952.C+1 that stores a stream source identifier column 3042 that includes stream identifiers 3043 for the plurality of rows in the page (e.g. in order by cluster key); and/or a column section 2952.C+2 that stores a stream row number column 3044 that includes stream row numbers 3045 for the plurality of rows in the page (e.g. in order by cluster key). For example, a given row 2422 is received in row data 2910 included in a record stream 3040 of a set of records streams 3040.1-3040.L each having a corresponding stream source identifier 3043, and a corresponding stream row number 3045 (e.g. its ordering within its respective stream 3040), where the stream source identifier 3043 and stream row number 3045 for the given row are included as its values for stream source identifier column 3042 and stream row number column 3044, respectively. While not illustrated, these values are optionally first prefixed to the fixed-length row section for the row in formatted row data 2710 prior to generating the columnar-formatted record data 2565 as intermediate and/or updated formatted row data 2710 (e.g. via column rotation formatting module 2905).

FIG. 28D illustrates an embodiment of a page reader module 2770 that utilizes these metadata columns 3041 via a deduplication scan and filter module 3035 to remove duplicated rows appearing in other pages to be read, ensuring all rows are read no more than once.

In some embodiments, the two read contexts of pages 2515, segment generation and page queries, need to first filter rows via a deduplication scan and filter module 3035 (e.g. implemented via a corresponding IO pipeline construc-tions prefixed by a scan+filter element) to retrieve{stream id, stream row}column views and filter rows below the min row offset for the corresponding stream source.

In some embodiments, this deduplication scan and filter module 3035 is not applied (e.g. not included in respective IO pipelines 2835) if the page doesn't contain any duplicate rows. For example, the storage cluster can determines whether any pages in a page set overlap existing durable rows and populates deduplication metadata if this is the case to indicate minimum row offsets. For example, such mini-mum row offsets indicate bounds where the page has row numbers overlapping with another pages that need to be filtered out in reading this page, for example, identified via implementing some or all features and/or functionality of page deduplication disclosed by U.S. Utility application Ser. No. 16/985,930, entitled "RECORD DEDUPLICATION IN DATABASE SYSTEMS", filed Aug. 5, 2020, which is hereby incorporated herein by reference in its entirety and made part of the present U.S. Utility Patent Application for all purposes.

This deduplication metadata can be implemented via stream source ID to min row mapping data 3040 for a given page. In some embodiments, during segment generation, these min row offsets of stream source ID to min row mapping data 3040 can be accessible (e.g. via deduplicatedPage_t::minOffsets) for each page in the page batch partition. In some embodiments, query time these min row offsets of stream source ID to min row mapping data 3040 are available (e.g. via pageSegment_t::getStreamBounds( )) once the page is activated as a durable page available for access in query execution.

In some embodiments, if the min offsets and/or corresponding stream bounds are not present for a given page 2515 in stream source ID to min row mapping data 3040, the deduplication scan and filter module 3035 is not applied via row read module 2863 of page reader module 2770 in reading the respective page, as this construct is not necessary due to no duplicated pages existing.

When the min offsets and/or corresponding stream bounds are not present for a given page 2515 in stream source ID to min row mapping data 3040, the deduplication scan and filter module 3035 is not applied via row read module 2863 of page reader module 2770 in reading the respective page. In processing a given row $2422.i$, the deduplication scan and filter module 3035 can determine the stream source identifier $3043.j$ mapped to the given row i in column section $2952.C+$ 1, and can determine the min row $3047.j$ (e.g. corresponding row number and/or offset) for the stream source having this stream source identifier $3043.j$ in the respective page identified in deduplication. The row number $3045.k$ (and/or corresponding offset of the row in the page prior to columnar rotation) can be compared to this min row $3047.j$—if value of row number 3045 (and/or corresponding offset of the row in the page) is less than value of minimum row 3047, the row i is filtered out, and otherwise the row i is emitted for further processing/filtering (e.g. via IO pipeline, where row i is ultimately included in a segment if the read is for segment generation, or where row i is further processed/filtered/manipulated via operators of a corresponding query if the read is for query execution).

Figure 28E:
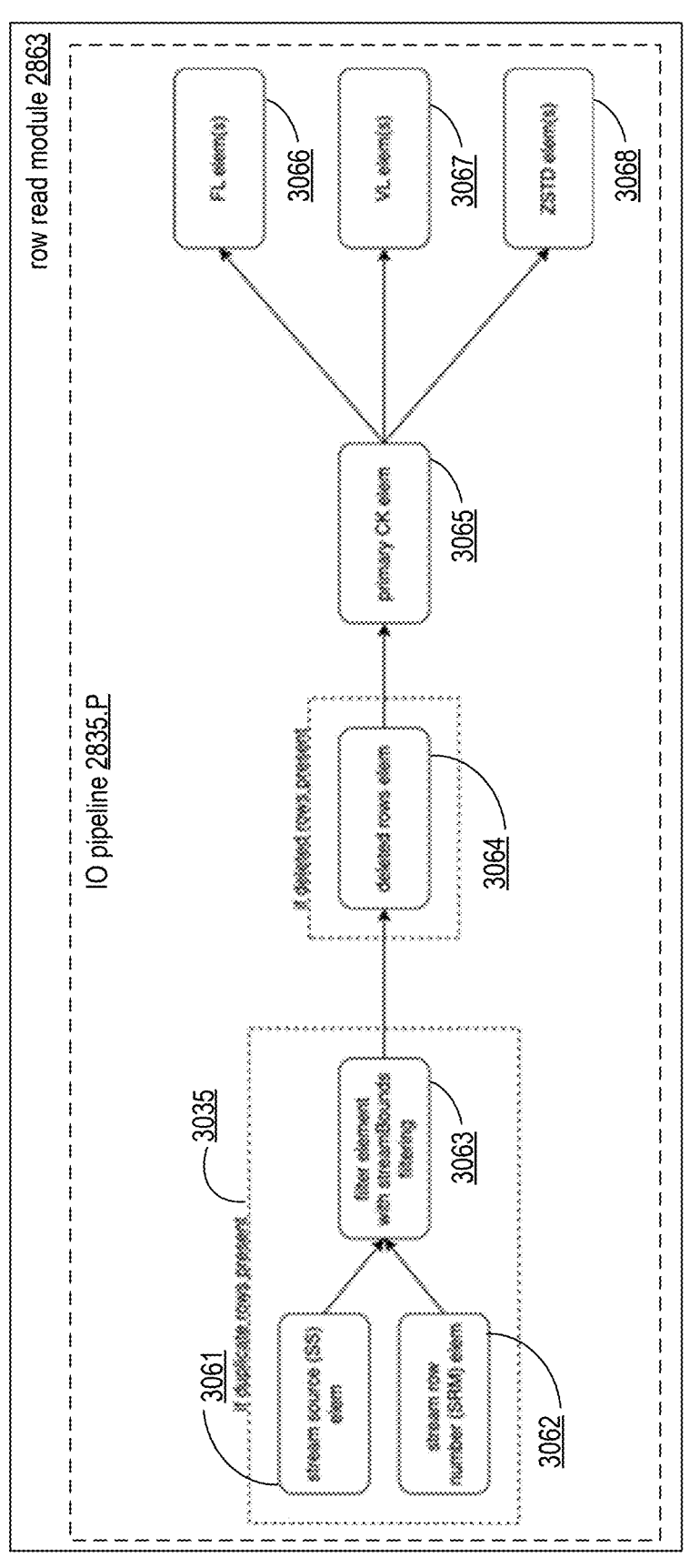
FIG. 28E is a schematic block diagram of an IO pipeline implemented by a row read module of a page reader module.

FIG. 28E illustrates an embodiment of a row read module 2683 of a page reader module 2770 that implements an IO pipeline 2835 for reading a respective page 2515.

In some embodiments, the interface segment generation and/or query execution expects for page reading can be will be implemented by an IO pipeline 2835 that implements some or all features and/or functionality of IO pipeline 2835 described herein to access the column-formatted record data 2565' of pages 2515 in a same or similar fashion as accessing the column-formatted record data 2565 of segments 2424.

For example, IO pipelines 2835 applied to pages can include a construct implementing deduplication scan and filter module 3035 (e.g. when this scan and filter is determined to be applied as discussed in conjunction with FIG. 28D) a deleted rows element 3064 (e.g. when deleted rows are present, for example, in an addendum part), primary cluster key index element 3065, fixed-length column source element(s) 3066 to source some or all fixed-length columns, variable-length column source element(s) 3067 to source some or all variable-length columns, and/or ZSTD source element(s) 3068 to source some or all compressed columns. The source elements 3066, 3067, and/or 3068 can be implemented in a same or similar fashion as any embodiment of source element of an IO pipeline described herein.

In the case where IO pipeline is utilized in query processing, partition and block IO can be performed in a same fashion for both segment 2424 and pages 2515. In the case where IO pipeline is utilized in segment generation, since every row and column needs to be read for inclusion in the segment, the entire page segment can be loaded into memory, where partition and block IO reads can complete synchronously and immediately signal completion to the consuming pipeline elements via the same interface.

For block IO, every 4 k block in the page 2515 can be be requested and processed during segment generation. This can incentivize separating the interface via templating to avoid adding an overhead of function calls (e.g. raw fixed length and/or variable length and/or compressed data size/4 k virtual function calls).

In some embodiments, efficiently implementing deduplication scan and filter module 3035 on stream bounds can include adapting a filter pipeline element (e.g. to ensure that creating a CNF that represents the desired filtering does not result in a worst case of O(# of stream sources with duplicates) filters being evaluated per-row, since the map of stream id→min row offset would need to be unrolled into separate filters). To prevent this overhead, an optional filter element with streamBounds filtering 3063 can be included as a type of filter element of IO pipelines described herein, operable to retrieve the correct minRowOffset from the map, and/or determine that the row can't be a duplicate, on a row-by-row basis based on the current row's stream id, via processing incoming stream source identifiers 3043 sourced from stream source identifier column 3042 by stream source element 3061 in conjunction with processing incoming stream row numbers 3045 sourced from for stream row number column 3044 by stream row number element 3062.

IO pipelines can be configured such that the IO pipeline construction for deduplication scan and filter module 3035 and the deleted rows element 3064 are present (as necessary) as the downstream-most elements in all parallel paths of the query pipeline.

The deleted rows element can skip/filter out rows indicated as deleted in an addendum part for the page, for example, via implementing some or all features and/or functionality of maintaining and processing addendum parts disclosed by: U.S. Utility application Ser. No. 18/364,761, entitled "GENERATING ADDENDUM PARTS FOR SUBSEQUENT PROCESSING VIA A DATABASE SYSTEM", filed Aug. 3, 2023, which is hereby incorporated herein by reference in its entirety and made part of the present U.S. Utility Patent Application for all purposes; and/or U.S. Utility application Ser. No. 18/457,049, entitled "DISTRIBUTED GENERATION OF ADDENDUM PART DATA FOR A SEGMENT STORED VIA A DATABASE SYSTEM", filed Aug. 28, 2023, which is hereby incorporated herein by reference in its entirety and made part of the present U.S. Utility Patent Application for all purposes.

In some embodiments, all eligible columns are compressed (e.g. via zstd compression). Consider an example where, during segment generation, 10,000 pages are loaded simultaneously with 256 columns per page, where an ~3 MB per decompression context corresponds to a high ~7 TB heap memory. High heap usage can also occur at query time due to keeping many Zstd decompression contexts in memory at once.

In some embodiments, when compression is applied to some or all columns in pages, in use cases where every value in a compression frame is required (such as segment generation or Zstd pipeline elements without downstream elements) and/or cases where high heap memory will be used (e.g. pipelines where we know we'll be decompressing many Zstd columns), the amount of heap memory usage can be limited based on bulk-decompressing whole frames into an output buffer. In some embodiments, the frames themselves are substantially smaller than the working memory of a stream decompressor, so this would ultimately save heap memory. This can be implemented based on bulk decompression in a filter pipeline element: a whole frame is decompressed when the value to be materialized isn't present in the scratch buffer.

In some embodiments, entire pages are not read into memory at a single time, except for cases when the loader needs to fetch pages it is missing.

In some embodiments, since the IO operators will consume segments and pages in the same way, one singular interface for both segments and pages can be used, differentiated only by a segmentType( ) field indicating whether the corresponding structure is a segment 2424 (e.g. TKT segment type) or a page 2515 (e.g. page segment type)

In some embodiments, a plurality of interfaces can be implemented and applied to both segments 2424 and pages 2515 implemented as page segments, which can include: a segment_i interface, for example, that includes generic segment metadata getters; a segmentWithParts_t interface that exposes methods for loading/tracking segment parts; and/or a blockIoSegment_t that inherits from segment_i and segmentWithParts_t, and optionally allows for certain mock methods for unit tests. A pageSegment_i interface can inherit from segment_i, and can optionally have no-op implementations of extra members in tktSegment_i and/or segmentWithParts_t, which can be eventually removed when deprecated.

In some embodiments, pages 2515 can be tracked in the storage cluster consensus state.

In some embodiments, different file types differentiate between different types of pages 2515 having different formatting described herein in cases where multiple types of pages are implemented by database system 10. As a particular example, a file type (e.g. TKT_PAGE) can be added to the segment store to differentiate between differentiate between page segments and one or more other types of pages described herein. In such examples, when a file type for TKT_PAGE is encountered during page activation, a same code path in the segment service (e.g. activateSegment and beginLoad) as TKT segment activation can be taken.

Pages and segments can optionally have different sets of parts. For example, segments 2424 include secondary indexes, summary stats, etc., while pages 2515 do not. These missing parts can be handled in processing pages 2515 vs segments 2424. In some embodiments pages include parts such as: column metadata; cluster key indexes; skip lists; and/or addendum parts (e.g. read, delete parts).

In some embodiments, a page cache is implemented to limit IO, for example, enabled by the smaller sizes of compressed pages. In other embodiments, IO reduction comes from the columnar format (e.g. only reading data relevant to the output/filter columns in the query), cluster key indexes, and/or pipelined IO of FIGS. 27A-27E. In some embodiments, a page cache is implemented to further reduce IO.

FIG. 28F illustrates a method for execution by at least one processing module of a database system 10. For example, the database system 10 can utilize at least one processing module of one or more nodes 37 of one or more computing devices 18, where the one or more nodes execute operational instructions stored in memory accessible by the one or more nodes, and where the execution of the operational instructions causes the one or more nodes 37 to execute, independently or in conjunction, the steps of FIG. 28F, for example, based on participating in execution of a query being executed by the database system 10 and/or based on participating in execution of a loading process being executed by the database system 10. Some or all of the method of FIG. 28F can be performed by nodes executing a loading operation as a plurality of loading modules and/or can be performed by nodes executing a query, for example, via one or more nodes 37 implemented as nodes of a query execution module 2504 implementing a query execution plan 2405. In some embodiments, a node 37 can implement some or all of FIG. 28F based on implementing a corresponding plurality of processing core resources 48.1-48.W. Some or all of the steps of FIG. 28F can optionally be performed by any other one or more processing modules of the database system 10.

Some or all steps of FIG. 28F can be performed in parallel and/or concurrently via a plurality of parallelized processing resources (e.g. implemented via a plurality of nodes 37 and/or a plurality of processing core resources 48). For example, multiple instances of any given step of FIG. 28F can be performed in parallel and/or concurrently via a plurality of parallelized processing resources, where each parallelized processing resource of the plurality of parallelized processing resources performs the given step in parallel with and/or concurrently with other ones of the plurality of parallelized processing resources also performing the given step. As another example, any given step of FIG. 28F can be performed based on a plurality of parallelized processing resources performing assigned portions of the given step in parallel and/or concurrently, where each parallelized processing resource of the plurality of parallelized processing resources performs their assigned portion of the step in parallel with and/or concurrently with other ones of the plurality of parallelized processing resources also performing their own assigned portions of the given step.

Some or all of the steps of FIG. 28F can be performed to implement some or all of the functionality of the database system 10 as described in conjunction with FIGS. 28A-28F, for example, by implementing some or all of the functionality of query execution module 2504, segment generator module 2617, page generator module 2511, and/or page reader module 2770. Some or all steps of FIG. 28F can be performed by database system 10 in accordance with other embodiments of the database system 10 and/or nodes 37 discussed herein. Some or all of the steps of FIG. 28F can be performed in conjunction with performing some or all steps of any other method described herein.

Step 2882 includes receiving a plurality of rows for storage. Step 2884 includes generating a plurality of pages from the plurality of rows, where each page of the plurality of pages is generated to include a corresponding set of rows of the plurality of rows in accordance with a columnar-formatted structuring. In various examples, each page of the plurality of pages is generated to include the corresponding set of rows of the plurality of rows in accordance with the columnar-formatted structuring based on generating a plurality of columns from the corresponding set of rows, wherein each column of the plurality of columns is generated to include column values of the corresponding set of rows. Step 2886 includes executing a query. Step 2888 includes performing at least one page conversion process upon the plurality of pages to generate an additional plurality of segments for long term storage in conjunction with the plurality of segments.

Performing step 2886 can include performing step 2890 and/or step 2892. Step 2890 includes reading a first set of column values for a first plurality of rows based on applying a columnar-formatted structuring-based read process to read, from each of a subset of the plurality of pages, column values of at least one row of the corresponding set of rows from a subset of columns of the plurality of columns. Step 2892 includes reading a second set of column values for a second plurality of rows based on applying the columnar-formatted structuring-based read process to read, from each of a subset of a plurality of segments, column values of at least one row of a plurality of additional rows stored in the plurality of segments from the subset of columns of the plurality of columns.

Performing step 2888 can include performing step 2894 and/or step 2896. Step 2894 includes reading all column values for the plurality of rows based on applying the columnar-formatted structuring-based read process to read, from each of the plurality of pages, column values of the corresponding set of rows from all columns of the plurality of columns. Step 2896 includes generating the additional plurality of segments to include the all column values for the plurality of rows in accordance with the columnar-formatted structuring of the plurality of rows.

In various examples, the method further includes, after performing the at least one page conversion process: receiving a second plurality of rows for storage and/or generating a second plurality of pages from the plurality of rows, where each page of the second plurality of pages is generated to include a corresponding set of rows of the second plurality of rows in accordance with the columnar-formatted structuring based on generating a plurality of columns from the corresponding set of rows of the second plurality of rows, wherein each column of the plurality of columns is generated to include column values of the corresponding set of rows of the second plurality of rows. In various examples, the method further includes, after performing the at least one page conversion process, executing a second query based on: reading a third set of column values for a third plurality of rows based on applying the columnar-formatted structuring-based read process to read, from each of a subset of the second plurality of pages, column values of at least one row of the corresponding set of rows from the subset of columns of the plurality of columns; and/or reading a fourth set of column values for a fourth plurality of rows based on applying the columnar-formatted structuring-based read process to read, from each of a subset of a collection of segments that includes the plurality of segments and the additional plurality of segments, column values of at least one row of the plurality of rows and the plurality of additional rows stored in the plurality of segments from the subset of columns of the plurality of columns, wherein the fourth plurality of rows and the first plurality of rows have a non-null intersection based on performance of the at least one page conversion process of the plurality of pages to generate the additional plurality of segments.

In various examples, each column of the plurality of columns is generated to include column values of the corresponding set of rows sorted by cluster key of the corresponding set of rows.

In various examples, at least one column of the plurality of columns is generated as a compressed column that includes a plurality of compression frames.

In various examples, the plurality of compression frames are generated based on applying Zstandard compression.

In various examples, the at least one column of the plurality of columns includes the subset of the plurality of columns. In various examples, reading a first set of column values for a first plurality of rows in conjunction with executing the query is further based on decompressing only the subset of columns of the plurality of columns in response to execution of the query only requiring access to the subset of the plurality of columns.

In various examples, each page of the plurality of pages is generated to further include at least one of: column metadata corresponding to the plurality of columns; at least one cluster key index for a cluster key of the corresponding plurality of rows; at least one secondary index for at least one column of the corresponding plurality of rows; at least one addendum part indicating a deleted subset of the corresponding set of rows; and/or at least one skip list that includes a mapping from cluster key value to compression frame of the corresponding set of compression frames of the each column and/or a mapping from row number to compression frame of the corresponding set of compression frames of the each column.

In various examples, the method further includes generating an initial page for the each page in accordance with row-formatted structuring based on: generating a variable length section of the each page that includes, for each row of the corresponding set of rows, a set of variable length values of a set of variable length columns of the corresponding set of rows; and/or generating a fixed length section of the each page that includes, for the each row of the corresponding set of rows, a set of fixed length values of a set of fixed length columns of the corresponding set of rows and a set of offset values for the set of variable length columns each indicating a location of a corresponding variable length value of the each row in the variable length section. In various examples, generating the each page is based on iterating over the fixed length section and the variable length section of the initial page to generate the plurality of columns from the corresponding set of rows.

In various examples, generating the initial page for the each page is based on appending each of a set of incoming rows to an end of the fixed length section and an end of the variable length section one at a time as the each of the set of incoming rows is received, until the fixed length section and the variable length section are completed. In various examples, the each page is generated after the fixed length section and the variable length section of the initial page are completed.

In various examples, the additional plurality of segments are each generated to include a corresponding plurality of columns in accordance with the columnar-formatted structuring. In various examples, the additional plurality of segments are each generated to further include at least one of: an index section that includes at least one secondary index; or a statistics section indicating distribution information regarding values of the corresponding set of columns.

In various examples, the plurality of pages are configured to be stored for a temporary amount of time prior to being converted into segments via the at least one page conversion process. In various examples, the method further includes foregoing further storage of the plurality of pages after the plurality of segments are generated from the plurality of pages (e.g. deleting the plurality of pages and/or writing over the plurality of pages).

In various examples, generating the plurality of pages includes implementing a plurality of parallelized loading modules to generate the plurality of pages in parallel based on each of the plurality of parallelized loading modules generating a corresponding subset of the plurality of pages in parallel with other ones of the plurality of parallelized loading modules generating other corresponding subsets of the plurality of pages.

In various examples, the query is executed via a parallelized plurality of nodes that identify the plurality of rows in parallel based on each of the plurality of nodes accessing a corresponding subset of pages in the subset of the plurality of pages in parallel with other ones of the plurality of nodes accessing other corresponding subsets of pages in the subset of the plurality of pages.

In various examples, the page conversion process is performed via a parallelized plurality of segment generator modules that generate the plurality of segments in parallel based on each of the plurality of parallelized segment generation modules generating a corresponding subset of the plurality of segments in parallel with other ones of the plurality of parallelized segment generation modules generating other corresponding subsets of the plurality of segments.

In various examples, reading the first set of column values for the first plurality of rows is based on applying the columnar-formatted structuring-based read process to execute, for each of the subset of the plurality of pages, a corresponding IO pipeline that includes a plurality of source elements corresponding to the subset of the plurality of columns each operable to source the column values of a corresponding one of the subset of the plurality of columns.

In various examples, reading the first set of column values for the first plurality of rows via applying the columnar-formatted structuring-based read process is based on performing a plurality of block IO operations to apply the IO pipeline to each of a plurality of 4 Kilobyte blocks of each of the plurality of pages.

In various examples, reading the first set of column values for the first plurality of rows in executing the query includes accessing a stream source identifier column and a stream row number column to filter at least one row in accordance with applying of deduplication to guarantee each of the plurality of rows is not read more than once. In various examples, reading the all column values for the plurality of rows in applying the at least one page conversion process also includes accessing the stream source identifier column and the stream row number column to filter at least one row in accordance with the applying of deduplication to guarantee each of the plurality of rows is not read more than once.

In various examples, generating the each page of the plurality of pages includes generating a mapping of stream source identifier to minimum row for the corresponding set of rows included in the each page. In various examples, applying of deduplication to guarantee each of the plurality of rows is not read more than once is based on accessing the mapping of stream source identifier to minimum row to identify the minimum row value for each of the plurality of row streams.

In various embodiments, any one of more of the various examples listed above are implemented in conjunction with performing some or all steps of FIG. 28F. In various embodiments, any set of the various examples listed above can be implemented in tandem, for example, in conjunction with performing some or all steps of FIG. 28F, and/or in conjunction with performing some or all steps of any other method described herein.

In various embodiments, at least one memory device, memory section, and/or memory resource (e.g., a non-transitory computer readable storage medium) can store operational instructions that, when executed by one or more processing modules of one or more computing devices of a database system, cause the one or more computing devices to perform any or all of the method steps of FIG. 28F described above, for example, in conjunction with further implementing any one or more of the various examples described above.

In various embodiments, a database system includes at least one processor and at least one memory that stores operational instructions. In various embodiments, the operational instructions, when executed by the at least one processor, cause the database system to perform some or all steps of FIG. 28F, for example, in conjunction with further implementing any one or more of the various examples described above.

In various embodiments, the operational instructions, when executed by the at least one processor, cause the database system to receive a plurality of rows for storage and generate a plurality of pages from the plurality of rows, where each page of the plurality of pages is generated to include a corresponding set of rows of the plurality of rows in accordance with a columnar-formatted structuring based on generating a plurality of columns from the corresponding set of rows, wherein each column of the plurality of columns is generated to include column values of the corresponding set of rows. In various embodiments, the operational instructions, when executed by the at least one processor, further cause the database system to execute a query based on: reading a first set of column values for a first plurality of rows based on applying a columnar-formatted structuring-based read process to read, from each of a subset of the plurality of pages, column values of at least one row of the corresponding set of rows from a subset of columns of the plurality of columns; and/or reading a second set of column values for a second plurality of rows based on applying the columnar-formatted structuring-based read process to read, from each of a subset of a plurality of segments, column values of at least one row of a plurality of additional rows stored in the plurality of segments from the subset of columns of the plurality of columns. In various embodiments, the operational instructions, when executed by the at least one processor, further cause the database system to perform at least one page conversion process upon the plurality of pages to generate an additional plurality of segments for long term storage in conjunction with the plurality of segments based on: reading all column values for the plurality of rows based on applying the columnar-formatted structuring-based read process to read, from each of the plurality of pages, column values of the corresponding set of rows from all columns of the plurality of columns; and/or generating the additional plurality of segments to include the all column values for the plurality of rows in accordance with the columnar-formatted structuring of the plurality of rows.

FIG. 28G illustrates a method for execution by at least one processing module of a database system 10. For example, the database system 10 can utilize at least one processing module of one or more nodes 37 of one or more computing devices 18, where the one or more nodes execute operational instructions stored in memory accessible by the one or more nodes, and where the execution of the operational instructions causes the one or more nodes 37 to execute, independently or in conjunction, the steps of FIG. 28G, for example, based on participating in execution of a query being executed by the database system 10 and/or based on participating in execution of a loading process being executed by the database system 10. Some or all of the method of FIG. 28G can be performed by nodes executing a loading operation as a plurality of loading modules and/or can be performed by nodes executing a query, for example, via one or more nodes 37 implemented as nodes of a query execution module 2504 implementing a query execution plan 2405. In some embodiments, a node 37 can implement some or all of FIG. 28G based on implementing a corresponding plurality of processing core resources 48.1-48.W. Some or all of the steps of FIG. 28G can optionally be performed by any other one or more processing modules of the database system 10.

Some or all steps of FIG. 28G can be performed in parallel and/or concurrently via a plurality of parallelized processing resources (e.g. implemented via a plurality of nodes 37 and/or a plurality of processing core resources 48). For example, multiple instances of any given step of FIG. 28G can be performed in parallel and/or concurrently via a plurality of parallelized processing resources, where each parallelized processing resource of the plurality of parallelized processing resources performs the given step in parallel with and/or concurrently with other ones of the plurality of parallelized processing resources also performing the given step. As another example, any given step of FIG. 28G can be performed based on a plurality of parallelized processing resources performing assigned portions of the given step in parallel and/or concurrently, where each parallelized processing resource of the plurality of parallelized processing resources performs their assigned portion of the step in parallel with and/or concurrently with other ones of the plurality of parallelized processing resources also performing their own assigned portions of the given step.

Some or all of the steps of FIG. 28G can be performed to implement some or all of the functionality of the database system 10 as described in conjunction with FIGS. 28A-28E, for example, by implementing some or all of the functionality of query execution module 2504, segment generator module 2617, page generator module 2511, and/or page reader module 2770. Some or all steps of FIG. 28G can be performed by database system 10 in accordance with other embodiments of the database system 10 and/or nodes 37 discussed herein. Some or all of the steps of FIG. 28G can be performed in conjunction with performing some or all steps of any other method described herein.

Step 2982 includes receiving a plurality of rows for storage. Step 2984 includes generating a plurality of pages from the plurality of rows. In various examples, each page of the plurality of pages is generated to include a corresponding set of rows of the plurality of rows in accordance with a columnar-formatted structuring. Step 2986 includes reading a subset of the plurality of columns of the corresponding set of rows from each of a subset of the plurality of pages based on, for at least some of the subset of the plurality of pages, accessing the stream source identifier column and the stream row number column to filter at least one row in accordance with applying of deduplication to guarantee each of the plurality of rows is not read more than once.

Performing step 2984 can include performing step 2988 and/or 2990. Step 2988 includes generating a plurality of columns from the corresponding set of rows, wherein each column of the plurality of columns is generated to include column values of the corresponding set of rows. Step 2990 includes generating a plurality of metadata columns for the corresponding rows that includes: a stream source identifier column indicating a stream source identifier for each of the corresponding set of rows to identify one of a plurality of row streams in which the each of the corresponding set of rows was received; and/or a stream row number column indicating a stream row number for the each of the corresponding set of rows in a the one of the plurality of row streams having the corresponding per-row stream source identifier.

In various examples, generating the each page of the plurality of pages includes generating a mapping of stream source identifier to minimum row for the corresponding set of rows included in the each page. In various examples, reading the subset of the plurality of columns of the corresponding set of rows from each of the subset of the plurality of pages is based on accessing the mapping of stream source identifier to minimum row to identify the minimum row value for each of the plurality of row streams.

In various examples, reading the subset of the plurality of columns of the corresponding set of rows from each of the subset of the plurality of pages includes determining whether performing a scan and filter process is required for the each of the subset of the plurality of pages based on determining whether the mapping of stream source identifier to minimum row for the each of the subset of the plurality of pages indicates any minimum row. In various examples, the stream source identifier column and the stream row number column are accessed to filter the at least one row for only the at least some of the plurality of pages in accordance with performing the scan and filter process for the only the at least some of the plurality of pages based on determining that the only the at least some of the plurality of pages have the any minimum row in a corresponding mapping of stream source identifier to minimum row.

In various examples, determining whether performing the scan and filter process is required for the each of the subset of the plurality of pages is based on applying a conditional stan and filter construct included in a corresponding IO pipeline executed to read the each of the subset of the plurality of pages.

In various examples, filtering the at least one row is based on, for each page in the at least some of the plurality of pages, determining whether to filter each row in the corresponding set of rows based on: identifying the stream source identifier for the each row based on accessing the stream source identifier column; identifying the stream row number for the each row based on accessing the stream row number columns; identifying the minimum row value for the row stream having the stream source identifier for the each row based on accessing the mapping of stream source identifier to minimum row; and/or comparing the stream row number for the each row to the minimum row value for the row stream having the stream source identifier for the each row. In various examples, the each row is filtered out when the stream row number for the each row falls below the minimum row value for the row stream having the stream source identifier for the each row.

In various examples, reading the subset of the plurality of columns of the corresponding set of rows plurality of metadata columns includes skipping reading and emission of the plurality of metadata columns.

In various examples, at least one column of the plurality of columns is generated as a compressed column that includes a plurality of compression frames based on applying Zstandard compression. In various examples, reading a first set of column values for a first plurality of rows in conjunction with executing the query is further based on decompressing only the subset of columns of the plurality of columns in response to reading of the subset of the plurality of pages only requiring access to the subset of the plurality of columns.

In various examples, each page of the plurality of pages is generated to further include at least one addendum part indicating a deleted subset of the corresponding set of rows. In various examples, reading the subset of the plurality of columns of the corresponding set of rows from each of a subset of the plurality of pages is further based on accessing the at least one addendum to filter out the deleted subset of the corresponding set of rows.

In various examples, the method further includes generating an initial page for the each page in accordance with row-formatted structuring based on: generating a variable length section of the each page that includes, for each row of the corresponding set of rows, a set of variable length values of a set of variable length columns of the corresponding set of rows; and/or generating a fixed length section of the each page that includes, for the each row of the corresponding set of rows, a set of fixed length values of a set of fixed length columns of the corresponding set of rows and a set of offset values for the set of variable length columns each indicating a location of a corresponding variable length value of the each row in the variable length section. In various examples, generating the each page is based on iterating over the fixed length section and the variable length section of the initial page to generate the plurality of columns and the plurality of metadata columns from the corresponding set of rows.

In various examples, generating the each page is based on appending each of a set of incoming rows to an end of the fixed length section and an end of the variable length section one at a time as the each of the set of incoming rows is received, until the fixed length section and the variable length section are completed. In various examples, the each page is generated after the fixed length section and the variable length section of the initial page are completed.

In various examples, the plurality of metadata columns are generated based on accessing prefix data for the each row of the corresponding set of row in the fixed length section of the each page indicating the stream source identifier and stream row number for the each row.

In various examples, generating the plurality of pages includes implementing a plurality of parallelized loading modules to generate the plurality of pages in parallel based on each of the plurality of parallelized loading modules generating a corresponding subset of the plurality of pages in parallel with other ones of the plurality of parallelized loading modules generating other corresponding subsets of the plurality of pages.

In various examples, only the subset of the plurality of columns is read from each of the subset of the plurality of pages in conjunction with executing an IO portion of a query to identify ones of the plurality of rows meeting filtering predicates involving the subset of the plurality of columns of a corresponding query expression for processing in conjunction with executing the query.

In various examples, the IO portion of the query is performed via a parallelized plurality of nodes that identify the plurality of rows in parallel based on each of the plurality of nodes accessing a corresponding subset of pages in the subset of the plurality of pages in parallel with other ones of the plurality of nodes accessing other corresponding subsets of pages in the subset of the plurality of pages.

In various examples, the subset of the plurality of columns includes all of the plurality of columns, and wherein all of the plurality of columns are read from each of the set of pages in conjunction with performing a page conversion process upon the set of pages to generate a plurality of segments that include the set of rows in a column-based format for long term storage.

In various examples, the page conversion process is performed via a parallelized plurality of segment generator modules that generate the plurality of segments in parallel based on each of the plurality of parallelized segment generation modules generating a corresponding subset of the plurality of segments in parallel with other ones of the plurality of parallelized segment generation modules generating other corresponding subsets of the plurality of segments.

In various examples, reading the subset of the plurality of columns of the corresponding set of rows from each of a subset of the plurality of pages is based on applying a columnar-formatted structuring-based read process to execute, for each of the subset of the plurality of pages, a corresponding IO pipeline that includes a plurality of source elements corresponding to the subset of the plurality of columns each operable to source the column values of a corresponding one of the subset of the plurality of columns.

In various examples, reading the subset of the plurality of columns of the corresponding set of rows from each of a subset of the plurality of pages via applying the columnar-formatted structuring-based read process is based on performing a plurality of block IO operations to apply the IO pipeline to each of a plurality of 4 Kilobyte blocks of each of the plurality of pages.

In various embodiments, any one of more of the various examples listed above are implemented in conjunction with performing some or all steps of FIG. 28G. In various embodiments, any set of the various examples listed above can be implemented in tandem, for example, in conjunction with performing some or all steps of FIG. 28G, and/or in conjunction with performing some or all steps of any other method described herein.

In various embodiments, at least one memory device, memory section, and/or memory resource (e.g., a non-transitory computer readable storage medium) can store operational instructions that, when executed by one or more processing modules of one or more computing devices of a database system, cause the one or more computing devices to perform any or all of the method steps of FIG. 28G described above, for example, in conjunction with further implementing any one or more of the various examples described above.

In various embodiments, a database system includes at least one processor and at least one memory that stores operational instructions. In various embodiments, the operational instructions, when executed by the at least one processor, cause the database system to perform some or all steps of FIG. 28G, for example, in conjunction with further implementing any one or more of the various examples described above.

In various embodiments, the operational instructions, when executed by the at least one processor, cause the database system to receive a plurality of rows for storage and generate a plurality of pages from the plurality of rows, where each page of the plurality of pages is generated to include a corresponding set of rows of the plurality of rows in accordance with a columnar-formatted structuring based on: generating a plurality of columns from the corresponding set of rows, wherein each column of the plurality of columns is generated to include column values of the corresponding set of rows; and/or generating a plurality of metadata columns for the corresponding rows that includes a stream source identifier column indicating a stream source identifier for each of the corresponding set of rows to identify one of a plurality of row streams in which the each of the corresponding set of rows was received and/or a stream row number column indicating a stream row number for the each of the corresponding set of rows in a the one of the plurality of row streams having the corresponding per-row stream source identifier. In various embodiments, the operational instructions, when executed by the at least one processor, further cause the database system to read a subset of the plurality of columns of the corresponding set of rows from each of a subset of the plurality of pages based on, for at least some of the subset of the plurality of pages, accessing the stream source identifier column and the stream row number column to filter at least one row in accordance with applying of deduplication to guarantee each of the plurality of rows is not read more than once.

FIG. 28H illustrates a method for execution by at least one processing module of a database system 10. For example, the database system 10 can utilize at least one processing module of one or more nodes 37 of one or more computing devices 18, where the one or more nodes execute operational instructions stored in memory accessible by the one or more nodes, and where the execution of the operational instructions causes the one or more nodes 37 to execute, independently or in conjunction, the steps of FIG. 28H, for example, based on participating in execution of a query being executed by the database system 10 and/or based on participating in execution of a loading process being executed by the database system 10. Some or all of the method of FIG. 28H can be performed by nodes executing a loading operation as a plurality of loading modules and/or can be performed by nodes executing a query, for example, via one or more nodes 37 implemented as nodes of a query execution module 2504 implementing a query execution plan 2405. In some embodiments, a node 37 can implement some or all of FIG. 28H based on implementing a corresponding plurality of processing core resources 48.1-48.W. Some or all of the steps of FIG. 28H can optionally be performed by any other one or more processing modules of the database system 10.

Some or all steps of FIG. 28H can be performed in parallel and/or concurrently via a plurality of parallelized processing resources (e.g. implemented via a plurality of nodes 37 and/or a plurality of processing core resources 48). For example, multiple instances of any given step of FIG. 28H can be performed in parallel and/or concurrently via a plurality of parallelized processing resources, where each parallelized processing resource of the plurality of parallelized processing resources performs the given step in parallel with and/or concurrently with other ones of the plurality of parallelized processing resources also performing the given step. As another example, any given step of FIG. 28H can be performed based on a plurality of parallelized processing resources performing assigned portions of the given step in parallel and/or concurrently, where each parallelized processing resource of the plurality of parallelized processing resources performs their assigned portion of the step in parallel with and/or concurrently with other ones of the plurality of parallelized processing resources also performing their own assigned portions of the given step.

Some or all of the steps of FIG. 28H can be performed to implement some or all of the functionality of the database system 10 as described in conjunction with FIGS. 28A-28E, for example, by implementing some or all of the functionality of query execution module 2504, segment generator module 2617, page generator module 2511, and/or page reader module 2770. Some or all steps of FIG. 28H can be performed by database system 10 in accordance with other embodiments of the database system 10 and/or nodes 37 discussed herein. Some or all of the steps of FIG. 28H can be performed in conjunction with performing some or all steps of any other method described herein.

Step 3082 includes receiving a plurality of rows for storage. Step 3984 includes generating a plurality of pages from the plurality of rows. In various examples, each page of the plurality of pages is generated to include a corresponding set of rows of the plurality of rows in accordance with a columnar-formatted structuring based on generating a plurality of columns from the corresponding set of rows. In various examples, each column of the plurality of columns is generated to include column values of the corresponding set of rows. Step 3086 includes reading a subset of the plurality of columns of the corresponding set of rows from each of a subset of the plurality of pages via applying a columnar-formatted structuring-based read process to execute, for each of the subset of the plurality of pages, a corresponding IO pipeline that includes a plurality of source elements corresponding to the subset of the plurality of columns each operable to source the column values of a corresponding one of the subset of the plurality of columns.

In various examples, the plurality of columns include a set of fixed length columns and a set of variable length columns. In various examples, the plurality of source elements includes a set of fixed length source elements that includes a fixed length source element for each one of the set of fixed length columns included in the subset of the plurality of columns, each operable to read fixed length values from a corresponding one of the set of fixed length columns. In various examples, the plurality of source elements alternatively or additionally includes a set of variable length source elements that includes a variable length source element for each one of the set of variable length columns included in the subset of the plurality of columns, each operable to read variable length values from a corresponding one of the set of variable length columns.

In various examples, the plurality of columns alternatively or additionally include a set of compressed columns. In various examples, the plurality of source elements includes a set of compressed column elements that includes a compressed column element for each one of the set of compressed columns included in the subset of the plurality of columns, each operable to read and decompress values from a corresponding one of the set of compressed columns.

In various examples, the set of compressed columns are generated based on applying Zstandard compression.

In various examples, each of the plurality of columns are sorted by cluster key of the corresponding set of rows. In various examples, the corresponding IO pipeline further includes a primary cluster key index element operable to emit only ones of the corresponding set of rows having cluster keys meeting required cluster key parameters.

In various examples, the each page is generated to further include cluster key index data for the plurality of columns. In various examples, the primary cluster key index element is applied based on accessing the cluster key index data to identify the only ones of the corresponding set of rows having cluster keys meeting the required cluster key parameters.

In various examples, the required cluster key parameters are applied in conjunction with grouping the plurality of rows by cluster key as part of a page conversion process to generate a plurality of segments from the plurality of rows. In various examples, the required cluster key parameters are applied in conjunction with filtering the plurality of rows as part of query execution to apply filtering parameters indicating the required cluster key parameters.

In various examples, the required cluster key parameters are applied in conjunction with filtering the plurality of rows as part of query execution to apply the filtering parameters indicating the required cluster key parameters, and/or the filtering parameters further indicate additional filtering parameters corresponding to at least one non-cluster key column of the plurality of columns. In various examples, the corresponding IO pipeline further includes at least one filter element serially after at least one corresponding source element operable to compare corresponding sourced column values to the additional filtering parameters and emit only ones of the corresponding set of rows having column values meeting the additional filtering parameters.

In various examples, generating the plurality of pages includes implementing a plurality of parallelized loading modules to generate the plurality of pages in parallel based on each of the plurality of parallelized loading modules generating a corresponding subset of the plurality of pages in parallel with other ones of the plurality of parallelized loading modules generating other corresponding subsets of the plurality of pages.

In various examples, only the subset of the plurality of columns is read from each of the subset of the plurality of pages in conjunction with executing an IO portion of a query to identify plurality of rows meeting filtering predicates involving the subset of the plurality of columns of a corresponding query expression for processing in conjunction with executing the query.

In various examples, the IO portion of the query is performed via a parallelized plurality of nodes that identify the plurality of rows in parallel based on each of the plurality of nodes accessing a corresponding subset of pages in the subset of the plurality of pages in parallel with other ones of the plurality of nodes accessing other corresponding subsets of pages in the subset of the plurality of pages.

In various examples, the method further includes, as part of performing the IO portion of the query: reading a subset of the plurality of columns of rows from each of a subset of a plurality of segments via applying the columnar-formatted structuring-based read process to execute, for at least some of the subset of the plurality of segments, the corresponding IO pipeline that includes the plurality of source elements corresponding to the subset of the plurality of columns. In various examples, a query resultant of the query is generated based on: the ones of the plurality of rows meeting the filtering predicates; and/or the ones of the rows of the subset of the plurality of segments meeting the filtering predicates.

In various examples, the method further includes, as part of performing the IO portion of the query: reading a subset of the plurality of columns of rows from each of a subset of a plurality of additional pages having a row-formatted structuring via applying a corresponding IO pipeline that includes the plurality of source elements corresponding to the subset of the plurality of columns. In various examples, a query resultant of the query is generated based on: the ones of the plurality of rows meeting the filtering predicates; and/or the ones of the rows of the subset of the additional plurality of pages meeting the filtering predicates.

In various examples, the subset of the plurality of columns includes all of the plurality of columns. In various examples, all of the plurality of columns are read from each of the set of pages in conjunction with performing a page conversion process upon the set of pages to generate a plurality of segments that include the set of rows in a column-based format for long term storage.

In various examples, the page conversion process is performed via a parallelized plurality of segment generator modules that generate the plurality of segments in parallel based on each of the plurality of parallelized segment generation modules generating a corresponding subset of the plurality of segments in parallel with other ones of the plurality of parallelized segment generation modules generating other corresponding subsets of the plurality of segments.

In various examples, the method further includes, after performing the page conversion process in conjunction with performing an IO portion of a query, reading the subset of the plurality of columns of the corresponding set of rows from each of a subset of the plurality of segments via applying the columnar-formatted structuring-based read process to execute, for each of the subset of the plurality of segments, the corresponding IO pipeline that includes the plurality of source elements corresponding to the subset of the plurality of columns.

In various examples, reading the subset of the plurality of columns of the corresponding set of rows from each of a subset of the plurality of pages via applying the columnar-formatted structuring-based read process is based on performing a plurality of block IO operations to apply the IO pipeline to each of a plurality of 4 Kilobyte blocks of each of the plurality of pages.

In various examples, reading the subset of the plurality of columns of the corresponding set of rows from each of a subset of the plurality of pages via applying the columnar-formatted structuring-based read process includes accessing a stream source identifier column and a stream row number column to filter at least one row in accordance with applying of deduplication to guarantee each of the plurality of rows is not read more than once.

In various embodiments, any one of more of the various examples listed above are implemented in conjunction with performing some or all steps of FIG. 28H. In various embodiments, any set of the various examples listed above can be implemented in tandem, for example, in conjunction with performing some or all steps of FIG. 28H, and/or in conjunction with performing some or all steps of any other method described herein.

In various embodiments, at least one memory device, memory section, and/or memory resource (e.g., a non-transitory computer readable storage medium) can store operational instructions that, when executed by one or more processing modules of one or more computing devices of a database system, cause the one or more computing devices to perform any or all of the method steps of FIG. 28H described above, for example, in conjunction with further implementing any one or more of the various examples described above.

In various embodiments, a database system includes at least one processor and at least one memory that stores operational instructions. In various embodiments, the operational instructions, when executed by the at least one processor, cause the database system to perform some or all steps of FIG. 28H, for example, in conjunction with further implementing any one or more of the various examples described above.

In various embodiments, the operational instructions, when executed by the at least one processor, cause the database system to: receive a plurality of rows for storage; generate a plurality of pages from the plurality of rows, where each page of the plurality of pages is generated to include a corresponding set of rows of the plurality of rows in accordance with a columnar-formatted structuring based on generating a plurality of columns from the corresponding set of rows, and/or where each column of the plurality of columns is generated to include column values of the corresponding set of rows; and/or read a subset of the plurality of columns of the corresponding set of rows from each of a subset of the plurality of pages via applying a columnar-formatted structuring-based read process to execute, for each of the subset of the plurality of pages, a corresponding IO pipeline that includes a plurality of source elements corresponding to the subset of the plurality of columns each operable to source the column values of a corresponding one of the subset of the plurality of columns.

As used herein, an "AND operator" can correspond to any operator implementing logical conjunction. As used herein, an "OR operator" can correspond to any operator implementing logical disjunction.

It is noted that terminologies as may be used herein such as bit stream, stream, signal sequence, etc. (or their equivalents) have been used interchangeably to describe digital information whose content corresponds to any of a number of desired types (e.g., data, video, speech, text, graphics, audio, etc. any of which may generally be referred to as 'data').

As may be used herein, the terms "substantially" and "approximately" provides an industry-accepted tolerance for its corresponding term and/or relativity between items. For some industries, an industry-accepted tolerance is less than one percent and, for other industries, the industry-accepted tolerance is 10 percent or more. Other examples of industry-accepted tolerance range from less than one percent to fifty percent. Industry-accepted tolerances correspond to, but are not limited to, component values, integrated circuit process variations, temperature variations, rise and fall times, thermal noise, dimensions, signaling errors, dropped packets, temperatures, pressures, material compositions, and/or performance metrics. Within an industry, tolerance variances of accepted tolerances may be more or less than a percentage level (e.g., dimension tolerance of less than +/−1%). Some relativity between items may range from a difference of less than a percentage level to a few percent. Other relativity between items may range from a difference of a few percent to magnitude of differences.

As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to".

As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., indicates an advantageous relationship that would be evident to one skilled in the art in light of the present disclosure, and based, for example, on the nature of the signals/items that are being compared. As may be used herein, the term "compares unfavorably", indicates that a comparison between two or more items, signals, etc., fails to provide such an advantageous relationship and/or that provides a disadvantageous relationship. Such an item/signal can correspond to one or more numeric values, one or more measurements, one or more counts and/or proportions, one or more types of data, and/or other information with attributes that can be compared to a threshold, to each other and/or to attributes of other information to determine whether a favorable or unfavorable comparison exists. Examples of such an advantageous relationship can include: one item/signal being greater than (or greater than or equal to) a threshold value, one item/signal being less than (or less than or equal to) a threshold value, one item/signal being greater than (or greater than or equal to) another item/signal, one item/signal being less than (or less than or equal to) another item/signal, one item/signal matching another item/signal, one item/signal substantially matching another item/signal within a predefined or industry accepted tolerance such as 1%, 5%, 10% or some other margin, etc. Furthermore, one skilled in the art will recognize that such a comparison between two items/signals can be performed in different ways. For example, when the advantageous relationship is that signal 1 has a greater magnitude than signal 2, a favorable comparison may be achieved when the magnitude of signal 1 is greater than that of signal 2 or when the magnitude of signal 2 is less than that of signal 1. Similarly, one skilled in the art will recognize that the comparison of the inverse or opposite of items/signals and/or other forms of mathematical or logical equivalence can likewise be used in an equivalent fashion. For example, the comparison to determine if a signal X>5 is equivalent to determining if −X<−5, and the comparison to determine if signal A matches signal B can likewise be performed by determining−A matches −B or not(A) matches not(B). As may be discussed herein, the determination that a particular relationship is present (either favorable or unfavorable) can be utilized to automatically trigger a particular action. Unless expressly stated to the contrary, the absence of that particular condition may be assumed to imply that the particular action will not automatically be triggered. In other examples, the determination that a particular relationship is present (either favorable or unfavorable) can be utilized as a basis or consideration to determine whether to perform one or more actions. Note that such a basis or consideration can be considered alone or in combination with one or more other bases or considerations to determine whether to perform the one or more actions. In one example where multiple bases or considerations are used to determine whether to perform one or more actions, the respective bases or considerations are given equal weight in such determination. In another example where multiple bases or considerations are used to determine whether to perform one or more actions, the respective bases or considerations are given unequal weight in such determination.

As may be used herein, one or more claims may include, in a specific form of this generic form, the phrase "at least one of a, b, and c" or of this generic form "at least one of a, b, or c", with more or less elements than "a", "b", and "c". In either phrasing, the phrases are to be interpreted identically. In particular, "at least one of a, b, and c" is equivalent to "at least one of a, b, or c" and shall mean a, b, and/or c. As an example, it means: "a" only, "b" only, "c" only, "a" and "b", "a" and "c", "b" and "c", and/or "a", "b", and "c".

As may also be used herein, the terms "processing module", "processing circuit", "processor", "processing circuitry", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, processing circuitry, and/or processing unit may be, or further include, memory and/or an integrated memory element, which may be a single memory device, a plurality of memory devices, and/or embedded circuitry of another processing module, module, processing circuit, processing circuitry, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, processing circuitry, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, processing circuitry and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, processing circuitry and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with one or more other routines. In addition, a flow diagram may include an "end" and/or "continue" indication. The "end" and/or "continue" indications reflect that the steps presented can end as described and shown or optionally be incorporated in or otherwise used in conjunction with one or more other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, a quantum register or other quantum memory and/or any other device that stores data in a non-transitory manner. Furthermore, the memory device may be in a form of a solid-state memory, a hard drive memory or other disk storage, cloud memory, thumb drive, server memory, computing device memory, and/or other non-transitory medium for storing data. The storage of data includes temporary storage (i.e., data is lost when power is removed from the memory element) and/or persistent storage (i.e., data is retained when power is removed from the memory element). As used herein, a transitory medium shall mean one or more of: (a) a wired or wireless medium for the transportation of data as a signal from one computing device to another computing device for temporary storage or persistent storage; (b) a wired or wireless medium for the transportation of data as a signal within a computing device from one element of the computing device to another element of the computing device for temporary storage or persistent storage; (c) a wired or wireless medium for the transportation of data as a signal from one computing device to another computing device for processing the data by the other computing device; and (d) a wired or wireless medium for the transportation of data as a signal within a computing device from one element of the computing device to another element of the computing device for processing the data by the other element of the computing device. As may be used herein, a non-transitory computer readable memory is substantially equivalent to a computer readable memory. A non-transitory computer readable memory can also be referred to as a non-transitory computer readable storage medium.

One or more functions associated with the methods and/or processes described herein can be implemented via a processing module that operates via the non-human "artificial" intelligence (AI) of a machine. Examples of such AI include machines that operate via anomaly detection techniques, decision trees, association rules, expert systems and other knowledge-based systems, computer vision models, artificial neural networks, convolutional neural networks, support vector machines (SVMs), Bayesian networks, genetic algorithms, feature learning, sparse dictionary learning, preference learning, deep learning and other machine learning techniques that are trained using training data via unsupervised, semi-supervised, supervised and/or reinforcement learning, and/or other AI. The human mind is not equipped to perform such AI techniques, not only due to the complexity of these techniques, but also due to the fact that artificial intelligence, by its very definition-requires "artificial" intelligence 13 i.e. machine/non-human intelligence.

One or more functions associated with the methods and/or processes described herein can be implemented as a large-scale system that is operable to receive, transmit and/or process data on a large-scale. As used herein, a large-scale refers to a large number of data, such as one or more kilobytes, megabytes, gigabytes, terabytes or more of data that are received, transmitted and/or processed. Such receiving, transmitting and/or processing of data cannot practically be performed by the human mind on a large-scale within a reasonable period of time, such as within a second, a millisecond, microsecond, a real-time basis or other high speed required by the machines that generate the data, receive the data, convey the data, store the data and/or use the data.

One or more functions associated with the methods and/or processes described herein can require data to be manipulated in different ways within overlapping time spans. The human mind is not equipped to perform such different data manipulations independently, contemporaneously, in parallel, and/or on a coordinated basis within a reasonable period of time, such as within a second, a millisecond, microsecond, a real-time basis or other high speed required by the machines that generate the data, receive the data, convey the data, store the data and/or use the data.

One or more functions associated with the methods and/or processes described herein can be implemented in a system that is operable to electronically receive digital data via a wired or wireless communication network and/or to electronically transmit digital data via a wired or wireless communication network. Such receiving and transmitting cannot practically be performed by the human mind because the human mind is not equipped to electronically transmit or receive digital data, let alone to transmit and receive digital data via a wired or wireless communication network.

One or more functions associated with the methods and/or processes described herein can be implemented in a system that is operable to electronically store digital data in a memory device. Such storage cannot practically be performed by the human mind because the human mind is not equipped to electronically store digital data.

One or more functions associated with the methods and/or processes described herein may operate to cause an action by a processing module directly in response to a triggering event—without any intervening human interaction between the triggering event and the action. Any such actions may be identified as being performed "automatically", "automatically based on" and/or "automatically in response to" such a triggering event. Furthermore, any such actions identified in such a fashion specifically preclude the operation of human activity with respect to these actions-even if the triggering event itself may be causally connected to a human activity of some kind.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A parallelized data input sub-system of a database system, the parallelized data input sub-system comprises:
    a plurality of computing device clusters, wherein a computing device cluster of the plurality of computing device clusters includes a plurality of computing devices, wherein the plurality of computing device clusters includes pluralities of computing nodes, wherein a plurality of the pluralities of computing nodes is configured as loader computing nodes, wherein the loader computing nodes are operable, in parallel, to receive respective portions of a dataset, wherein a loader computing node of the loader computing nodes is operable to:
    receive rows of columnar data of a first portion of the portions of the dataset;
    convert a page of the rows of columnar data into a page of column oriented data;
    temporarily store the page of column oriented data;
    convert the page of column oriented data into long term storage data, wherein the long term storage data has a corresponding column orientation to the page of column oriented data; and
    while receiving the first portion:
        receive a query request regarding a specific page of column oriented data prior to the specific page of column oriented data being converted into specific long term storage data; and
        when the specific page of columnar oriented data has been temporarily stored:
            provide the specific page of column oriented data to a computing device of the database system executing the query on the specific page of column oriented data.

2. The parallelized data input sub-system of claim 1, wherein the loader computing node is operable to convert the page of the rows of columnar data into the page of column oriented data by:

determining a key column of the page of rows of columnar data;

grouping the page of rows of columnar data by the key column to produce an ordered page of rows of columnar data;

rotating the ordered page of rows of columnar data to produce ordered columns of data; and appending respective column key mappings and row identification mappings to respective columns of the ordered columns of data to produce the page of column oriented data.

3. The parallelized data input sub-system of claim 2, wherein the loader computing node is further operable to:

compress the ordered columns of data to produce compressed ordered columns of data; and appending the respective column key mappings, respective compression frame mappings, and the respective row identification mappings to the respective columns of the compressed ordered columns of data to produce the page of column oriented data.

4. The parallelized data input sub-system of claim 1, wherein the loader computing node is further operable to:

receive second rows of columnar data of a second portion of the portions of the dataset;

convert a page of the second rows of columnar data into a second page of column oriented data;

temporarily store the second page of column oriented data;

convert the second page of column oriented data into second long term storage data, wherein the second long term storage data has the corresponding column orientation to the second page of column oriented data; and while receiving the second portion:

receive the query request regarding the specific page of column oriented data prior to the specific page of column oriented data being converted into the specific long term storage data; and when the specific page of column oriented data has been temporarily stored:

provide the specific page of column oriented data to the computing device of the database system executing the query on the specific page of column oriented data.

5. The parallelized data input sub-system of claim 1, wherein a second loader computing node of the loader computing nodes is operable to:

receive second rows of columnar data of a second portion of the portions of the dataset;

convert a page of the second rows of columnar data into a second page of column oriented data;

temporarily store the second page of column oriented data;

convert the second page of column oriented data into second long term storage data, wherein the second long term storage data has the corresponding column orientation to the second page of column oriented data; and while receiving the second portion:

receive the query request regarding the specific page of column oriented data prior to the specific page of column oriented data being converted into the specific long term storage data; and when the specific page of column oriented data has been temporarily stored:

provide the specific page of column oriented data to the computing device of the database system executing the query on the specific page of column oriented data, second portion different node.

6. The parallelized data input sub-system of claim 1 further comprises:

wherein the loader computing nodes are operable, in parallel, to receive respective second portions of a second dataset, wherein the loader computing node is operable to:

receive second rows of columnar data of a first portion of the second portions of the second dataset;

convert a page of the second rows of columnar data into a second page of column oriented data;

temporarily store the second page of column oriented data;

convert the second page of column oriented data into second long term storage data, wherein the second long term storage data has the corresponding column orientation to the second page of column oriented data; and while receiving the first portion of the second portions:

receive a second query request regarding a second specific page of column oriented data prior to the second specific page of column oriented data being converted into second specific long term storage data; and when the second specific page of column oriented data has been temporarily stored:

provide the second specific page of column oriented data to a computing device of the database system executing the second query on the second specific page of column oriented data.

7. The parallelized data input sub-system of claim 1, wherein the loader computing node is operable to convert the page of column oriented data into the long term storage data by:

redundancy encoding the page of column oriented data to produce a plurality of data and parity blocks;

generating one or more indexes regarding the page of column oriented data;

generating statistical data regarding the page of column oriented data; and arranging the data and parity blocks, the one or more indexes, the statistical data, and a key column as the long term storage data.

8. The parallelized data input sub-system of claim 7, wherein the loader computing node is further operable to:

include metadata regarding the data and parity blocks in the long term storage data.

9. A computer readable memory comprises:

a first memory section that stores operational instructions that, when executed by loader computing nodes of a plurality of computing nodes of pluralities of computing nodes of a plurality of computing device clusters of a parallelized data input sub-system of a database system, cause the loader computing nodes to:

receive, in parallel, respective portions of a dataset;

a second memory section that stores operational instructions that, when executed by a loader computing node of the loader computing nodes, cause the loader computing node to:

receive rows of columnar data of a first portion of the portions of the dataset;

convert a page of the rows of columnar data into a page of column oriented data;

temporarily store the page of column oriented data;

convert the page of column oriented data into long term storage data, wherein the long term storage data has a corresponding column orientation to the page of column oriented data; and while receiving the first portion:

receive a query request regarding a specific page of column oriented data prior to the specific page of column oriented data being converted into specific long term storage data; and when the specific page of columnar oriented data has been temporarily stored:

provide the specific page of column oriented data to a computing device of the database system executing the query on the specific page of column oriented data.

10. The computer readable memory of claim 9, wherein the second memory section further stores operational instructions that, when executed by the loader computing node, cause the loader computing node to convert the page of the rows of columnar data into the page of column oriented data by:

determining a key column of the page of rows of columnar data;

grouping the page of rows of columnar data by the key column to produce an ordered page of rows of columnar data;

rotating the ordered page of rows of columnar data to produce ordered columns of data; and appending respective column key mappings and respective row identification mappings to respective columns of the ordered columns of data to produce the page of column oriented data.

11. The computer readable memory of claim 10, wherein the second memory section further stores operational instructions that, when executed by the loader computing node, cause the loader computing node to:

compress the ordered columns of data to produce compressed ordered columns of data; and appending the respective column key mappings, respective compression frame mappings, and the respective row identification mappings to the respective columns of the compressed ordered columns of data to produce the page of column oriented data.

12. The computer readable memory of claim 9, wherein the second memory section further stores operational instructions that, when executed by the loader computing node, cause the loader computing node to:

receive second rows of columnar data of a second portion of the portions of the dataset;

convert a page of the second rows of columnar data into a second page of column oriented data;

temporarily store the second page of column oriented data;

convert the second page of column oriented data into second long term storage data, wherein the second long term storage data has the corresponding column orientation to the second page of column oriented data; and while receiving the second portion:

receive the query request regarding the specific page of column oriented data prior to the specific page of column oriented data being converted into the specific long term storage data; and when the specific page of column oriented data has been temporarily stored:

provide the specific page of column oriented data to the computing device of the database system executing the query on the specific page of column oriented data.

13. The computer readable memory of claim 9 further comprises:

a third memory section that stores operational instructions that, when executed by a second loader computing node of the loader computing nodes, cause the second loader computing node to:

receive second rows of columnar data of a second portion of the portions of the dataset;

convert a page of the second rows of columnar data into a second page of column oriented data;

temporarily store the second page of column oriented data;

convert the second page of column oriented data into second long term storage data, wherein the second long term storage data has the corresponding column orientation to the second page of column oriented data; and while receiving the second portion:

receive the query request regarding the specific page of column oriented data prior to the specific page of column oriented data being converted into the specific long term storage data; and when the specific page of column oriented data has been temporarily stored:

provide the specific page of column oriented data to the computing device of the database system executing the query on the specific page of column oriented data, second portion different node.

14. The computer readable memory of claim 9 further comprises:

wherein the first memory section further stores operational instructions that when executed by the loader computing nodes, cause the loader computing nodes to:

receive, in parallel, respective second portions of a second dataset; and wherein the second memory section further stores operational instructions that when executed by the loader computing node, cause the loader computing node to:

receive second rows of columnar data of a first portion of the second portions of the second dataset;

convert a page of the second rows of columnar data into a second page of column oriented data;

temporarily store the second page of column oriented data;

convert the second page of column oriented data into second long term storage data, wherein the second long term storage data has the corresponding column orientation to the second page of column oriented data; and while receiving the first portion of the second portions:

receive a second query request regarding a second specific page of column oriented data prior to the second specific page of column oriented data being converted into second specific long term storage data; and when the second specific page of column oriented data has been temporarily stored:

provide the second specific page of column oriented data to a computing device of the database system executing the second query on the second specific page of column oriented data.

15. The computer readable memory of claim 9, wherein the second memory section further stores operational instructions that, when executed by the loader computing node, cause the loader computing node to convert the page of column oriented data into the long term storage data by:

redundancy encoding the page of column oriented data to produce a plurality of data and parity blocks;

generating one or more indexes regarding the page of column oriented data;

generating statistical data regarding the page of column oriented data; and arranging the data and parity blocks, the one or more indexes, the statistical data, and a key column as the long term storage data.

16. The computer readable memory of claim 15, wherein the second memory section further stores operational instructions that, when executed by the loader computing node, cause the loader computing node to:

include metadata regarding the data and parity blocks in the long term storage data.

\* \* \* \* \*